United States Patent [19]

Herzer et al.

[11] 4,051,794

[45] Oct. 4, 1977

[54] AUTOMATIC SEWING MACHINE

[75] Inventors: William P. Herzer, High Bridge, N.J.; Robert E. Cullen, Norwood, Mass.

[73] Assignee: Union Special Corporation, Chicago, Ill.

[21] Appl. No.: 592,951

[22] Filed: July 3, 1975

Related U.S. Application Data

[63] Continuation-in-part of Ser. No. 496,748, Aug. 12, 1974, Pat. No. 3,982,491.

[51] Int. Cl.$^2$ .............................................. D05B 21/00
[52] U.S. Cl. .............................................. 112/121.12
[58] Field of Search ...................... 112/121.12, 121.11, 112/158 E; 235/151.11, 151; 318/567, 569; 340/172.5

[56] References Cited

U.S. PATENT DOCUMENTS

| 1,997,673 | 4/1935 | Boothby | 318/242 X |
|---|---|---|---|
| 3,208,414 | 9/1965 | Reeber et al. | 112/121.12 |
| 3,400,677 | 9/1968 | Bowers et al. | 318/567 X |
| 3,465,298 | 9/1969 | La Duke et al. | 235/151.11 X |
| 3,752,098 | 8/1973 | Logan et al. | 112/121.12 |
| 3,753,242 | 8/1973 | Townsend | 340/172.5 |
| 3,820,082 | 6/1974 | Bauknecht et al. | 340/172.5 |
| 3,854,660 | 12/1974 | Henegar | 235/151.11 X |
| 3,855,956 | 12/1974 | Wurst | 112/158 E |
| 3,872,808 | 3/1975 | Wurst | 112/121.11 X |

Primary Examiner—Werner H. Schroeder
Assistant Examiner—Peter Nerbun

[57] ABSTRACT

An automatic sewing machine comprising, a sewing needle, a work holder for moving a work piece relative the needle, and memory means having a plurality of randomly addressable storage locations for retaining the data words. The sewing machine has address means for sequentially selecting the storage locations, and means responsive to the data words of the selected storage locations for moving the work holder and performing a sewing operation.

41 Claims, 59 Drawing Figures

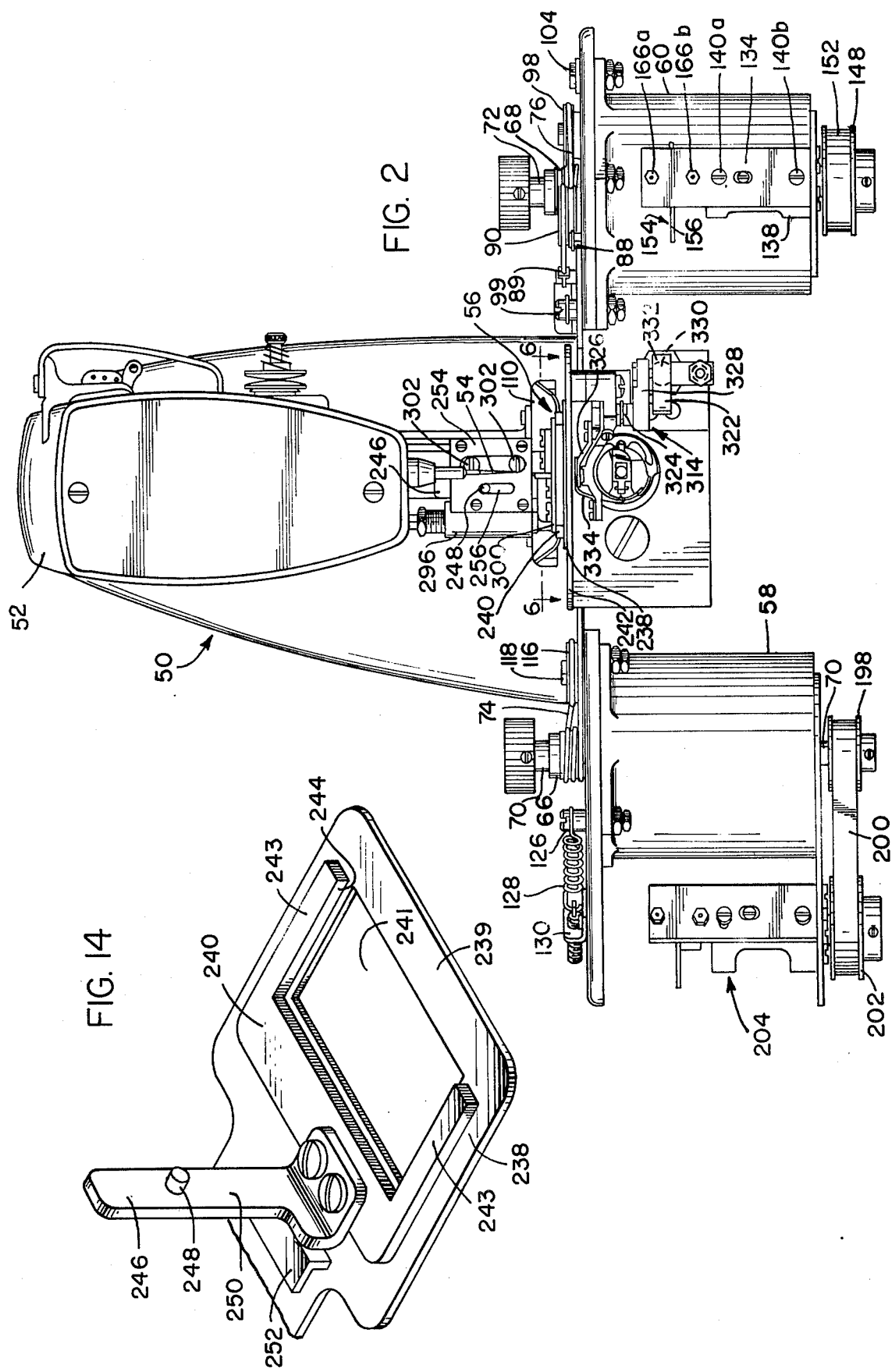

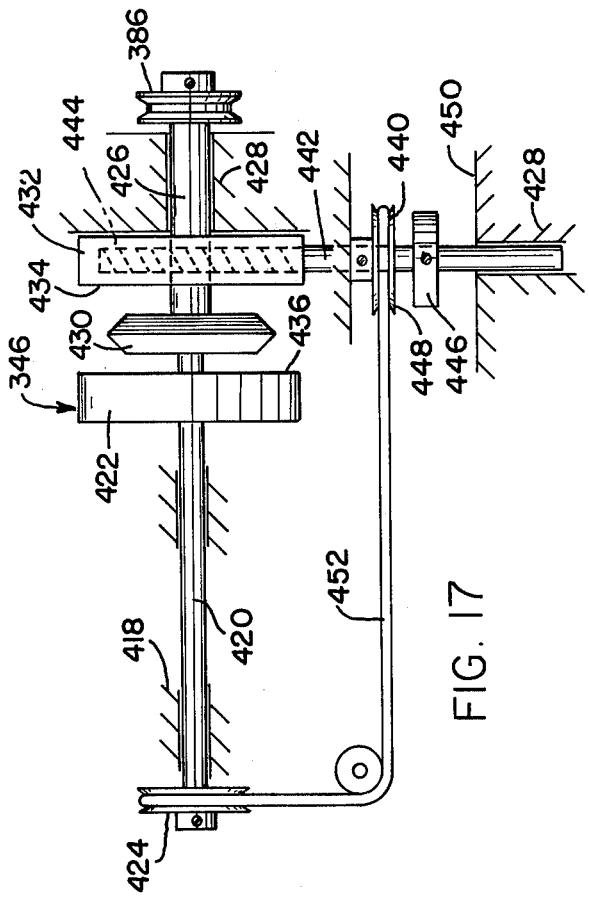
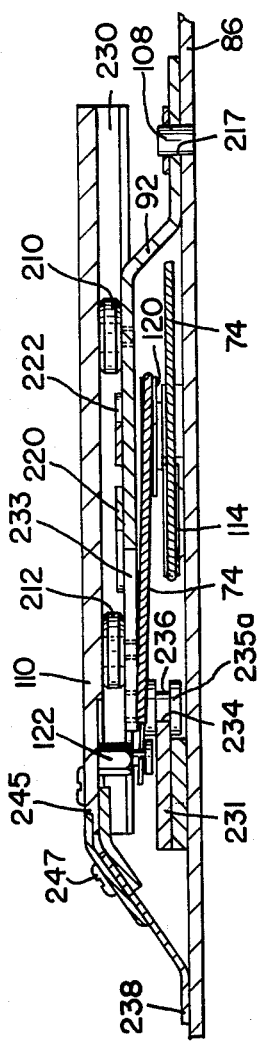
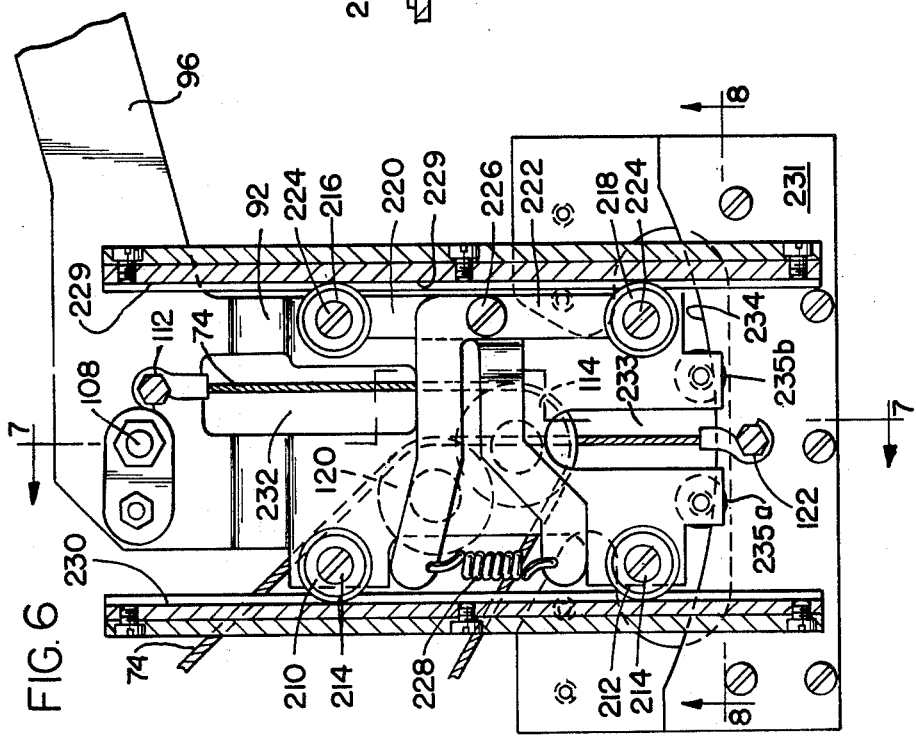
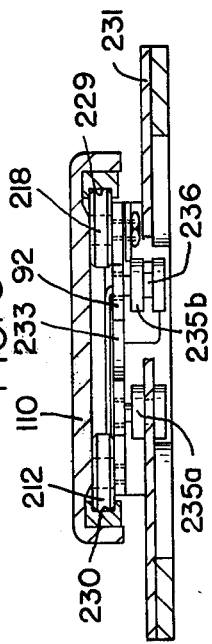

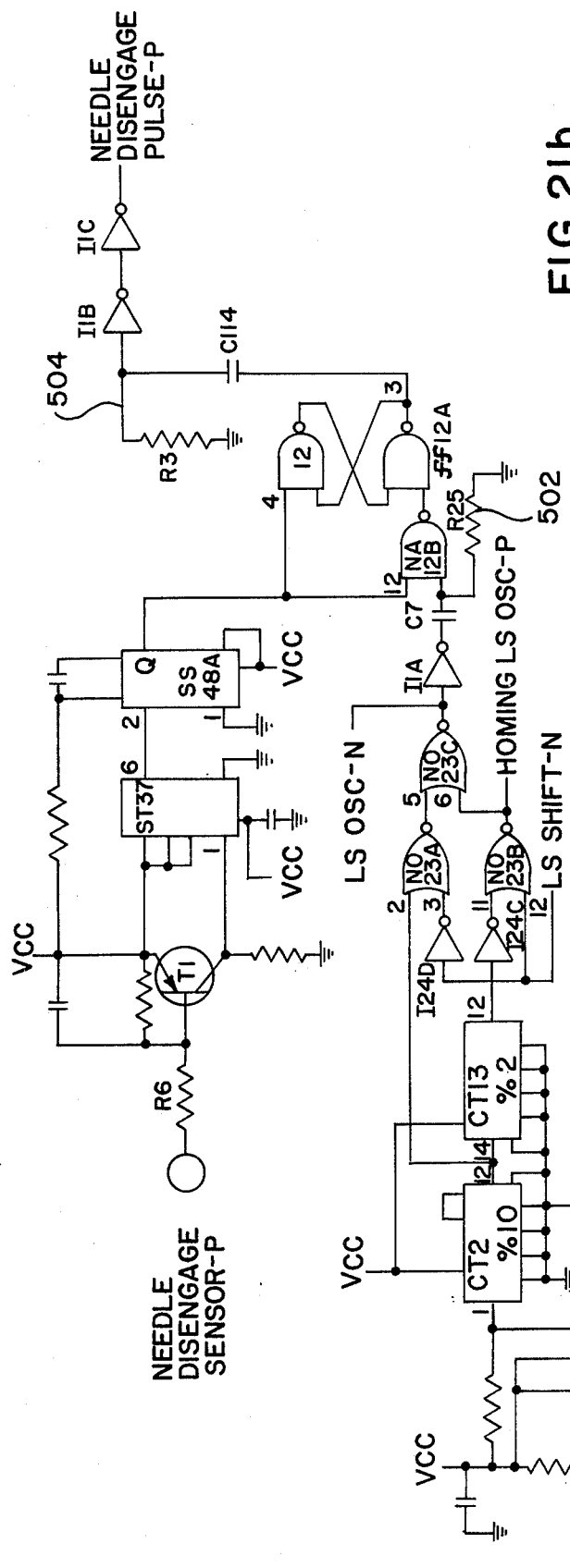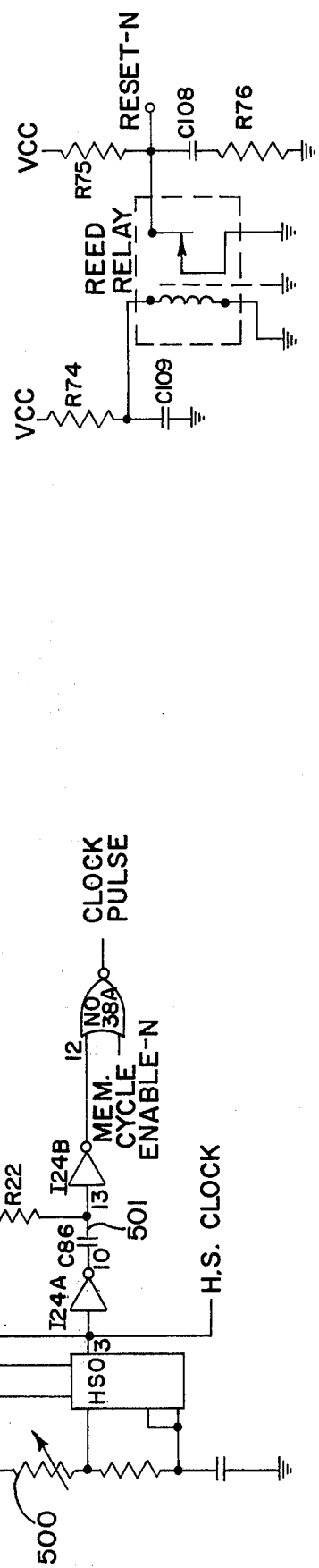

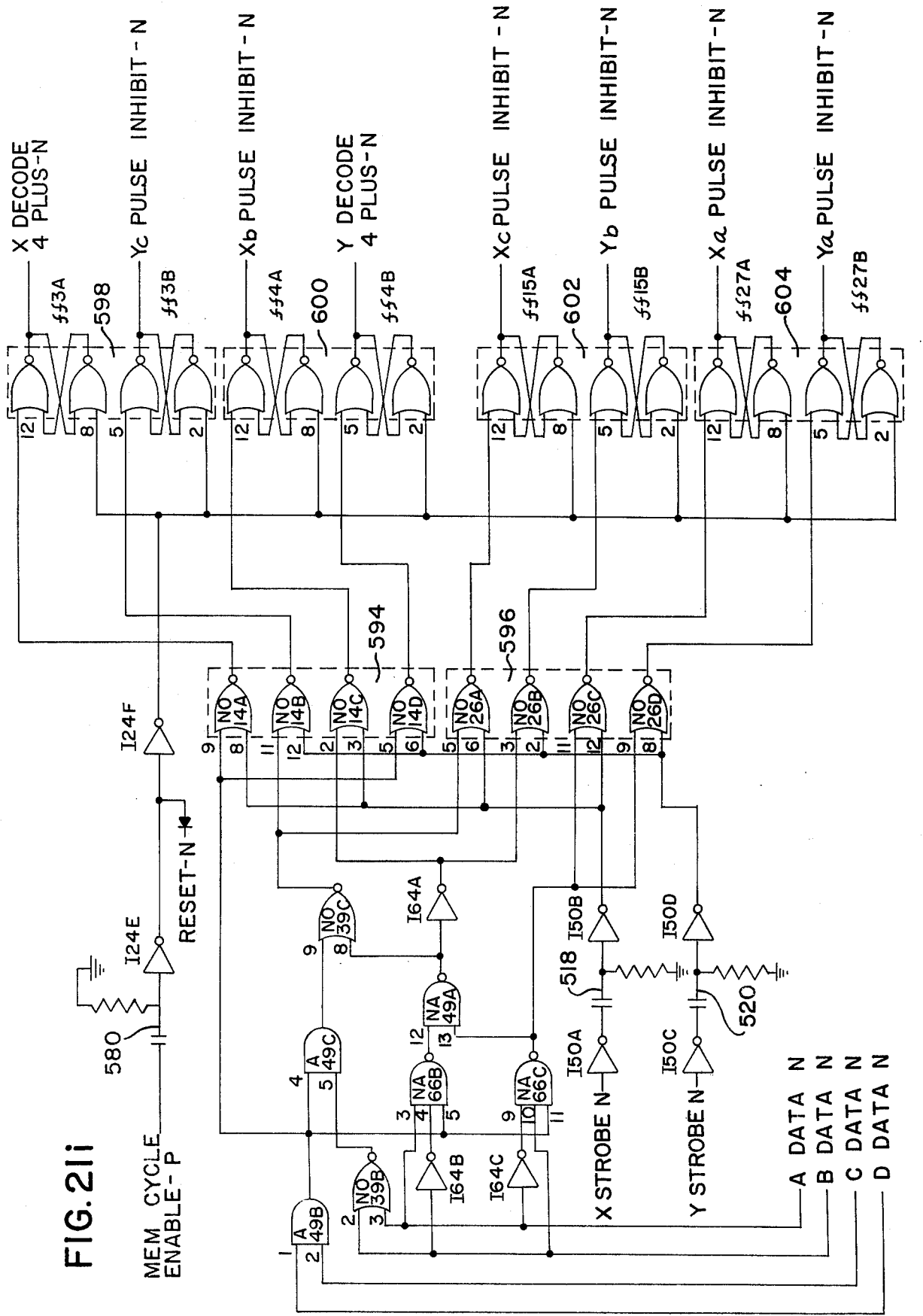

FIG. 27
EXTENDED PROGRAM MODE
| BANKS A & B ADDRESS | | | | | | | | | BANK B | | | | | | BANK A | | | | | |
|---|---|---|---|---|---|---|---|---|---|---|---|---|---|---|---|---|---|---|---|---|
| $a_8$ | $a_7$ | $a_6$ | $a_5$ | $a_4$ | $a_3$ | $a_2$ | $a_1$ | WORD | MEMORY CYCLE NO. | | $b_8$ | $b_7$ | $b_6$ | $b_5$ | MEMORY CYCLE NO. | | $b_4$ | $b_3$ | $b_2$ | $b_1$ |
| 0 | 0 | 0 | 0 | 0 | 0 | 0 | 0 | 1 | 86 | | Y DATA | | | | — | | — | | | |
| 0 | 0 | 0 | 0 | 0 | 0 | 0 | 1 | 2 | 86 | | X DATA | | | | 1 | | Y DATA | | | |
| 0 | 0 | 0 | 0 | 0 | 0 | 1 | 0 | 3 | 86 | | CONTROL | | | | 1 | | X DATA | | | |
| 0 | 0 | 0 | 0 | 0 | 0 | 1 | 1 | 4 | 87 | | Y DATA | | | | 1 | | CONTROL | | | |
| 0 | 0 | 0 | 0 | 0 | 1 | 0 | 0 | 5 | 87 | | X DATA | | | | 2 | | Y DATA | | | |
| 0 | 0 | 0 | 0 | 0 | 1 | 0 | 1 | 6 | 87 | | CONTROL | | | | 2 | | X DATA | | | |
| 0 | 0 | 0 | 0 | 0 | 1 | 1 | 0 | 7 | 88 | | Y DATA | | | | 2 | | CONTROL | | | |
| 0 | 0 | 0 | 0 | 0 | 1 | 1 | 1 | 8 | 88 | | X DATA | | | | 3 | | | | | |
| 0 | 0 | 0 | 0 | 1 | 0 | 0 | 0 | 9 | 88 | | CONTROL | | | | 3 | | | | | |
| 0 | 0 | 0 | 0 | 1 | 0 | 0 | 1 | 10 | — | | — | | | | 3 | | | | | |
  
| 1 | 1 | 1 | 1 | 1 | 0 | 0 | 1 | 250 | 169 | Y DATA | | | |
|---|---|---|---|---|---|---|---|---|---|---|---|---|---|
| 1 | 1 | 1 | 1 | 1 | 0 | 1 | 0 | 251 | 169 | X DATA | 84 | | Y DATA |
| 1 | 1 | 1 | 1 | 1 | 0 | 1 | 1 | 252 | 169 | CONTROL | 84 | | X DATA |
| 1 | 1 | 1 | 1 | 1 | 1 | 0 | 0 | 253 | 170 | Y DATA | 84 | | CONTROL |
| 1 | 1 | 1 | 1 | 1 | 1 | 0 | 1 | 254 | 170 | X DATA | 85 | | Y DATA |
| 1 | 1 | 1 | 1 | 1 | 1 | 1 | 0 | 255 | 170 | CONTROL | 85 | | X DATA |
| 1 | 1 | 1 | 1 | 1 | 1 | 1 | 1 | 256 | — | — | 85 | | CONTROL |
FIG. 21n
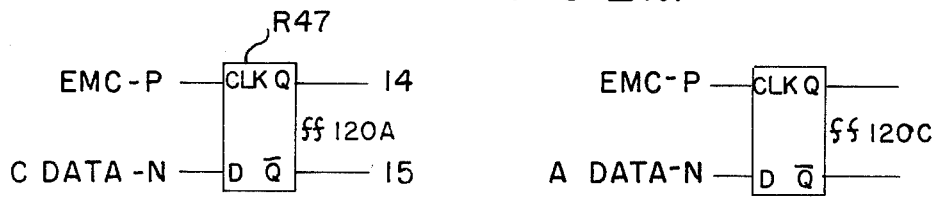
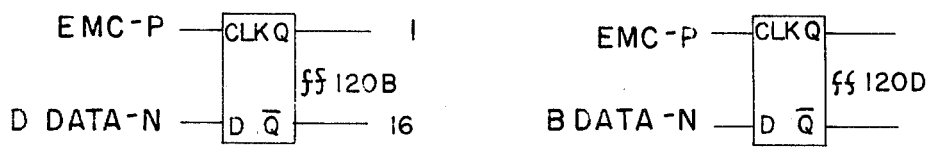

FIG. 26
SEPERATE OR REMOTE PROGRAM MODE
| ADDRESS | | | | | | | | WORD | MEMORY CYCLE NO. | BANK B | | | | BANK A | | | |
|---|---|---|---|---|---|---|---|---|---|---|---|---|---|---|---|---|---|
| $a_8$ | $a_7$ | $a_6$ | $a_5$ | $a_4$ | $a_3$ | $a_2$ | $a_1$ | | | $b_8$ | $b_7$ | $b_6$ | $b_5$ | $b_4$ | $b_3$ | $b_2$ | $b_1$ |
| 0 | 0 | 0 | 0 | 0 | 0 | 0 | 0 | 1 | — | — | | | | — | | | |
| 0 | 0 | 0 | 0 | 0 | 0 | 0 | 1 | 2 | 1 | Y DATA | | | | Y DATA | | | |
| 0 | 0 | 0 | 0 | 0 | 0 | 1 | 0 | 3 | 1 | X DATA | | | | X DATA | | | |
| 0 | 0 | 0 | 0 | 0 | 0 | 1 | 1 | 4 | 1 | CONTROL | | | | CONTROL | | | |
| 0 | 0 | 0 | 0 | 0 | 1 | 0 | 0 | 5 | 2 | Y DATA | | | | Y DATA | | | |
| 0 | 0 | 0 | 0 | 0 | 1 | 0 | 1 | 6 | 2 | X DATA | | | | X DATA | | | |
| 0 | 0 | 0 | 0 | 0 | 1 | 1 | 0 | 7 | 2 | CONTROL | | | | CONTROL | | | |
| 0 | 0 | 0 | 0 | 0 | 1 | 1 | 1 | 8 | 3 | Y DATA | | | | Y DATA | | | |
| 0 | 0 | 0 | 0 | 1 | 0 | 0 | 0 | 9 | 3 | X DATA | | | | X DATA | | | |
| 0 | 0 | 0 | 0 | 1 | 0 | 0 | 1 | 10 | 3 | CONTROL | | | | CONTROL | | | |
  
| | | | | | | | | | | | | | | | | | |
|---|---|---|---|---|---|---|---|---|---|---|---|---|---|---|---|---|---|
| 1 | 1 | 1 | 1 | 1 | 0 | 1 | 0 | 251 | 84 | Y DATA | | | | Y DATA | | | |
| 1 | 1 | 1 | 1 | 1 | 0 | 1 | 1 | 252 | 84 | X DATA | | | | X DATA | | | |
| 1 | 1 | 1 | 1 | 1 | 1 | 0 | 0 | 253 | 84 | CONTROL | | | | CONTROL | | | |
| 1 | 1 | 1 | 1 | 1 | 1 | 0 | 1 | 254 | 85 | Y DATA | | | | Y DATA | | | |
| 1 | 1 | 1 | 1 | 1 | 1 | 1 | 0 | 255 | 85 | X DATA | | | | X DATA | | | |
| 1 | 1 | 1 | 1 | 1 | 1 | 1 | 1 | 256 | 85 | CONTROL | | | | CONTROL | | | |
FIG. 23
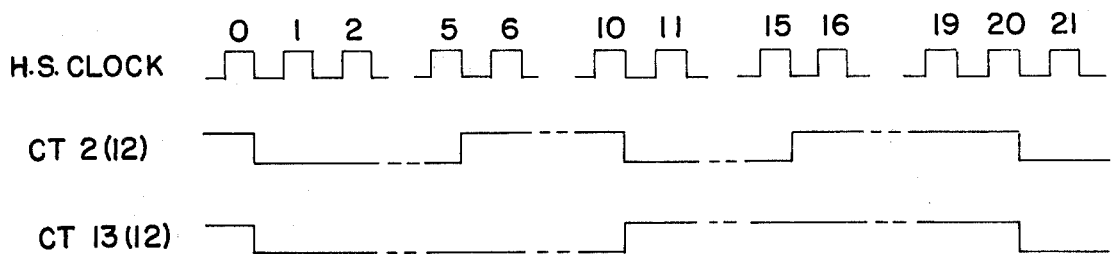

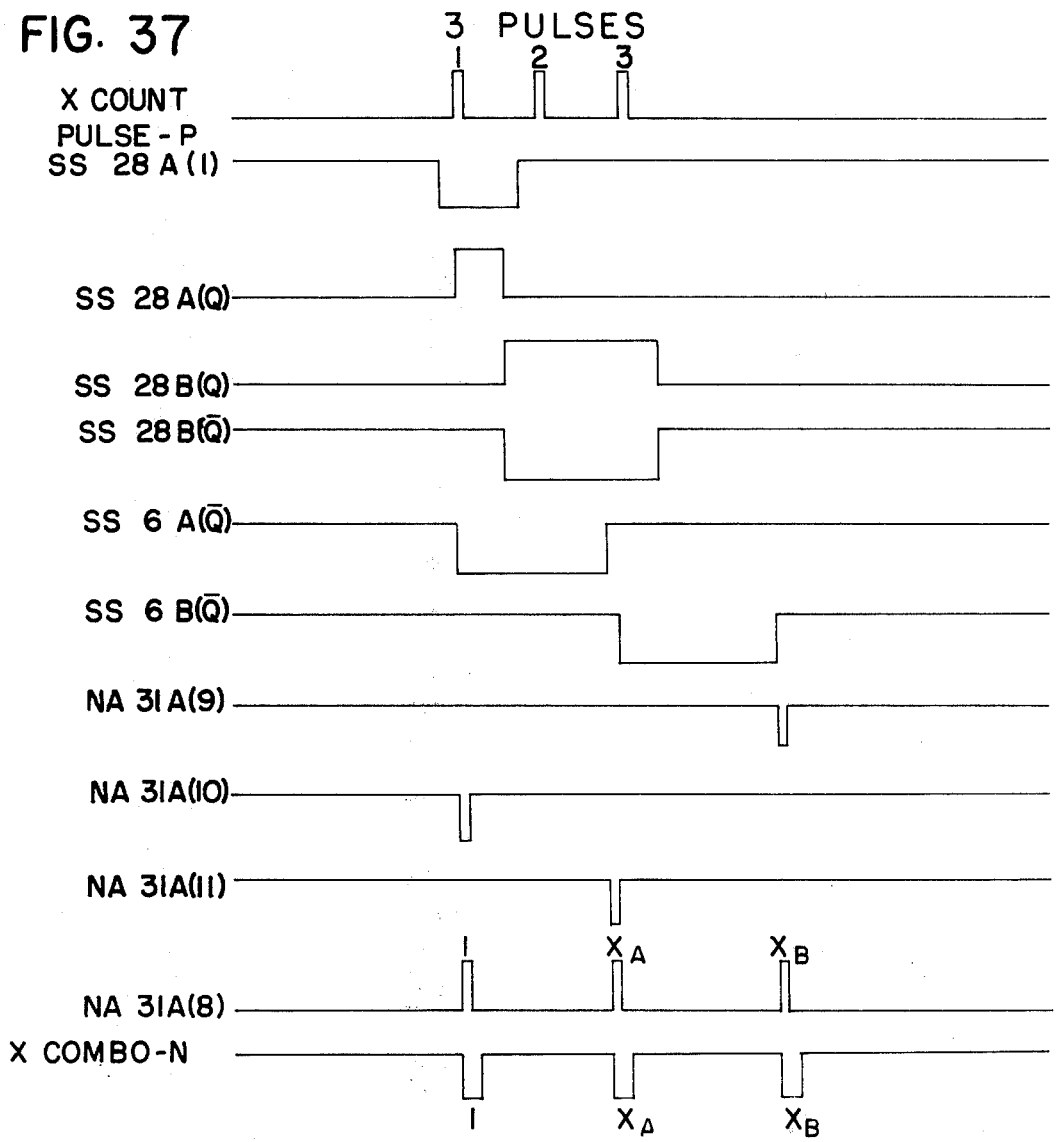

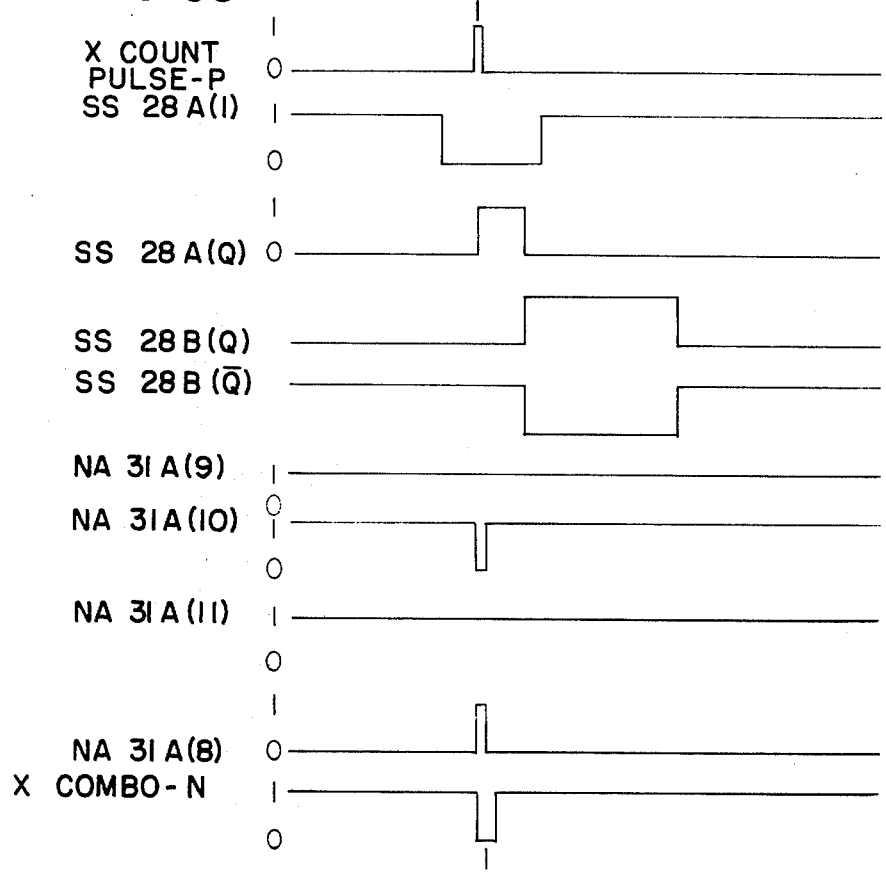

FIG. 33

| PULSES | X DATA OR Y DATA WORD | | | | INVERTED WORD | | | | PULSE INHIBIT FLIP FLOP SIGNALS | | | | | | | |
|---|---|---|---|---|---|---|---|---|---|---|---|---|---|---|---|---|
| | D7/D3 | D6/D2 | D5/D1 | D4/D0 | D DATA-N | C DATA-N | B DATA-N | A DATA-N | $X_A$ INHIBIT-N | $X_B$ INHIBIT-N | $X_C$ INHIBIT-N | X DECODE PLUS-N | $Y_A$ INHIBIT-N | $Y_B$ INHIBIT-N | $Y_C$ INHIBIT-N | Y DECODE PLUS-N |
| 0 | 0 | 0 | 0 | 0 | 1 | 1 | 1 | 1 | 1 | 1 | 1 | 1 | 1 | 1 | 1 | 1 |
| 1 | 0 | 0 | 0 | 1 | 1 | 1 | 1 | 0 | 0 | 0 | 0 | 1 | 0 | 0 | 0 | 1 |
| 2 | 0 | 0 | 1 | 0 | 1 | 1 | 0 | 1 | 1 | 0 | 0 | 1 | 1 | 0 | 0 | 1 |
| 3 | 0 | 0 | 1 | 1 | 1 | 1 | 0 | 0 | 1 | 1 | 0 | 1 | 1 | 1 | 0 | 1 |
| 4 | 0 | 1 | 0 | 0 | 1 | 0 | 1 | 1 | 1 | 1 | 1 | 0 | 1 | 1 | 1 | 0 |
| 5 | 0 | 1 | 0 | 1 | 1 | 0 | 1 | 0 | 1 | 1 | 1 | 0 | 1 | 1 | 1 | 0 |
| 6 | 0 | 1 | 1 | 0 | 1 | 0 | 0 | 1 | 1 | 1 | 1 | 0 | 1 | 1 | 1 | 0 |
| 7 | 0 | 1 | 1 | 1 | 1 | 0 | 0 | 0 | 1 | 1 | 1 | 0 | 1 | 1 | 1 | 0 |
| 8 | 1 | 0 | 0 | 0 | 0 | 1 | 1 | 1 | 1 | 1 | 1 | 0 | 1 | 1 | 1 | 0 |
| 9 | 1 | 0 | 0 | 1 | 0 | 1 | 1 | 0 | 1 | 1 | 1 | 0 | 1 | 1 | 1 | 0 |
| 10 | 1 | 0 | 1 | 0 | 0 | 1 | 0 | 1 | 1 | 1 | 1 | 0 | 1 | 1 | 1 | 0 |
| 11 | 1 | 0 | 1 | 1 | 0 | 1 | 0 | 0 | 1 | 1 | 1 | 0 | 1 | 1 | 1 | 0 |
| 12 | 1 | 1 | 0 | 0 | 0 | 0 | 1 | 1 | 1 | 1 | 1 | 0 | 1 | 1 | 1 | 0 |
| 13 | 1 | 1 | 0 | 1 | 0 | 0 | 1 | 0 | 1 | 1 | 1 | 0 | 1 | 1 | 1 | 0 |
| 14 | 1 | 1 | 1 | 0 | 0 | 0 | 0 | 1 | 1 | 1 | 1 | 0 | 1 | 1 | 1 | 0 |
| 15 | 1 | 1 | 1 | 1 | 0 | 0 | 0 | 0 | 1 | 1 | 1 | 0 | 1 | 1 | 1 | 0 |

AUTOMATIC SEWING MACHINE

This application is a continuation-in-part of application Ser. No. 496,748, filed Aug. 12, 1974, now U.S. Pat. No. 3,982,491.

BACKGROUND OF THE INVENTION

The present invention relates to sewing machines, and more particularly to programmed controlled automatic sewing machines.

Sewing machines having a work holder for moving a work piece through a predetermined pattern relative the machine's sewing needle are known. Such machines are particularly useful when the same pattern is stitched repetitively. The earliest of such automatic sewing machines are relatively complex cam controlled devices in which the entire cam apparatus must be replaced and time-consuming adjustments must be made whenever it is desired to change a machine from one sewing pattern to another. Certain of the cam controlled machines, such as those for sewing buttonholes and tacking, have no capability at all for conversion to other stitch patterns.

More recently, sewing machines have become available in which the work holder is moved according to a sequence of instructions stored in a mechanically controlled element such as a punched paper tape, cards, or a magnetic tape. In such machines, the sequence of instructions in the recording medium controls the movement of the work holder during the portion of each needle cycle when the needle is out of the work piece.

Automatic sewing machines with work holders using paper or magnetic tape or cards to control their movement, however, suffer certain disadvantages. First, the tape and card machines move relatively slowly from one location of stored information to the next location. Accordingly, for the machine to work fast enough, a complete instruction must be placed in a single storage location. Further, the complexity of the operation of the sewing machine is limited by the amount of information which can be placed in each such location. A second limitation, mechanical in nature, exists since the sewing machine speed is limited by the speed at which the storage medium can be physically moved from one storage location to the next. Third, a paper or magnetic tape or card reader is relatively costly in comparison to cam controlled machines. Further, although buffer units to enable faster operation are available, they considerably increase the expense of the system.

SUMMARY OF THE INVENTION

A principal feature of the present invention is the provision of an automatic sewing machine having randomly addressable memory means to enhance the speed and sewing capabilities of the machine.

The sewing machine of the present invention comprises, a sewing needle, means for reciprocating the needle, and a work holder for moving a work piece during sewing. The sewing machine has memory means having a plurality of randomly addressable storage locations which are capable of retaining positional and command data words, and address means for sequentially selecting the storage locations. The machine also has means for sequentially reading the information from selected storage locations, means for generating signals representing the read information, and means responsive to the signals for controlling the reciprocating means and moving the work holder.

A feature of the present invention is that the storage locations have a plurality of information bits defining a plurality of separate data banks.

Another feature of the present invention is the provision of means for separately selecting any of the data banks of the selected storage locations.

A further feature of the invention is that the reading means sequentially reads information from the selected storage locations of the selected data bank.

Still another feature of the invention is the provision of means for initializing the address means at a predetermined storage location.

Yet another feature of the invention is the provision of means for automatically changing the bank selecting means to select a different bank at a predetermined storage location in a selected bank.

A feature of the present invention is the provision of switch means for successively changing the bank selecting means to select different banks.

Another feature of the invention is the provision of means for indicating the selected data bank.

Yet another feature of the invention is the provision of means for generating a clock signal asynchronous relative the operation of the sewing machine for sequencing the address means.

A still further feature of the invention is that the bank selecting means selectively enables and inhibits certain output signals from the memory means to form data signals.

Another feature of the invention is the provision of means for forming separate pulses in timed relation with the machine in order to selectively initiate the moving means at different times relative the operation of the machine.

A further feature of the invention is the provision of means for decoding a plurality of selected data words from the memory means during one cycle of the sewing machine.

A feature of the present invention is the provision of first and second clamp means and means for selectively engaging the first and second clamp means against a work piece.

A further feature of the invention is the provision of means for determining the temperature associated with part of the moving means and means for deenergizing the moving means to prevent damage resulting from an out of temperature condition.

Yet another feature of the invention is the provision of means for determining if the clamp means becomes disassociated from an engaging position with the work piece and means to interrupt the moving means in order to prevent sewing while the clamp means is in its disassociated position.

A still further feature of the present invention is the provision of means for moving the work holder to a predetermined position spaced from a reference position.

Another feature of the invention is the provision of means for generating pulse trains for the moving means, and means for modifying the pulse trains according to selected data words in the storage locations.

A feature of the present invention is the provision of means for generating a reference pulse train and means for modifying the reference pulse train for energizing the moving means.

A further feature of the invention is the provision of means for initiating the moving means to move the work holder to a predetermined location relative the needle and means for stopping the moving means if a predetermined time period has been exceeded after initiation of the moving means.

Another feature of the present invention is the provision of means for moving the work holder while the reciprocating means stops the needle.

Yet another feature of the present invention is the provision of means for cutting a thread on the sewing machine prior to moving the work holder while reciprocation of the needle has stopped.

Still another feature of the present invention is the provision of means for forming a pulse to initiate the moving means while reciprocation of the needle is stopped.

A further feature of the present invention is the provision of means for automatically opening clamp means on the machine when reciprocation of the needle has stopped at the end of a sewing sequence.

A feature of the present invention is the provision of sensor means for determining a break in a thread on the machine and means responsive to the sensor means for forming a signal to indicate a thread break.

A further feature of the present invention is that the thread break signal forming means is enabled when the machine is in a predetermined mode of operation to prevent erroneous signals by the forming means.

Further features will become more fully apparent in the following description of the embodiments of this invention and from the appended claims.

DESCRIPTION OF THE DRAWINGS

In the drawings:

FIG. 6 is a top sectional view of pivotal and extendable arm means of the sewing machine of FIG. 1;

FIG. 7 is a sectional view taken substantially as indicated along the line 7—7 of FIG. 6;

FIG. 8 is a sectional view taken substantially as indicated along the line 8—8 of FIG. 6;

FIG. 14 is a fragmentary perspective view of clamp means for the sewing machine of FIG. 1;

FIG. 17 is a diagrammatic view of the reciprocating means of FIG. 15;

FIG. 23 is a timing diagram of clock signals formed by the control system of the present invention;

FIGS. 26–30 are diagrammatic views illustrating data configurations in memory means of the sewing machine of the present invention;

FIG. 33 is a diagrammatic view illustrating various signals utilized in connection with forming pulse trains for driving means;

FIG. 35 is a timing diagram illustrating the relative timing of various signals utilized to form the pulse trains for the driving means for one motor step;

FIG. 37 is a timing diagram illustrating the relative timing of various signals utilized to form the pulse trains for the driving means for three motor steps;

DESCRIPTION OF THE PREFERRED EMBODIMENTS

Figure 1:
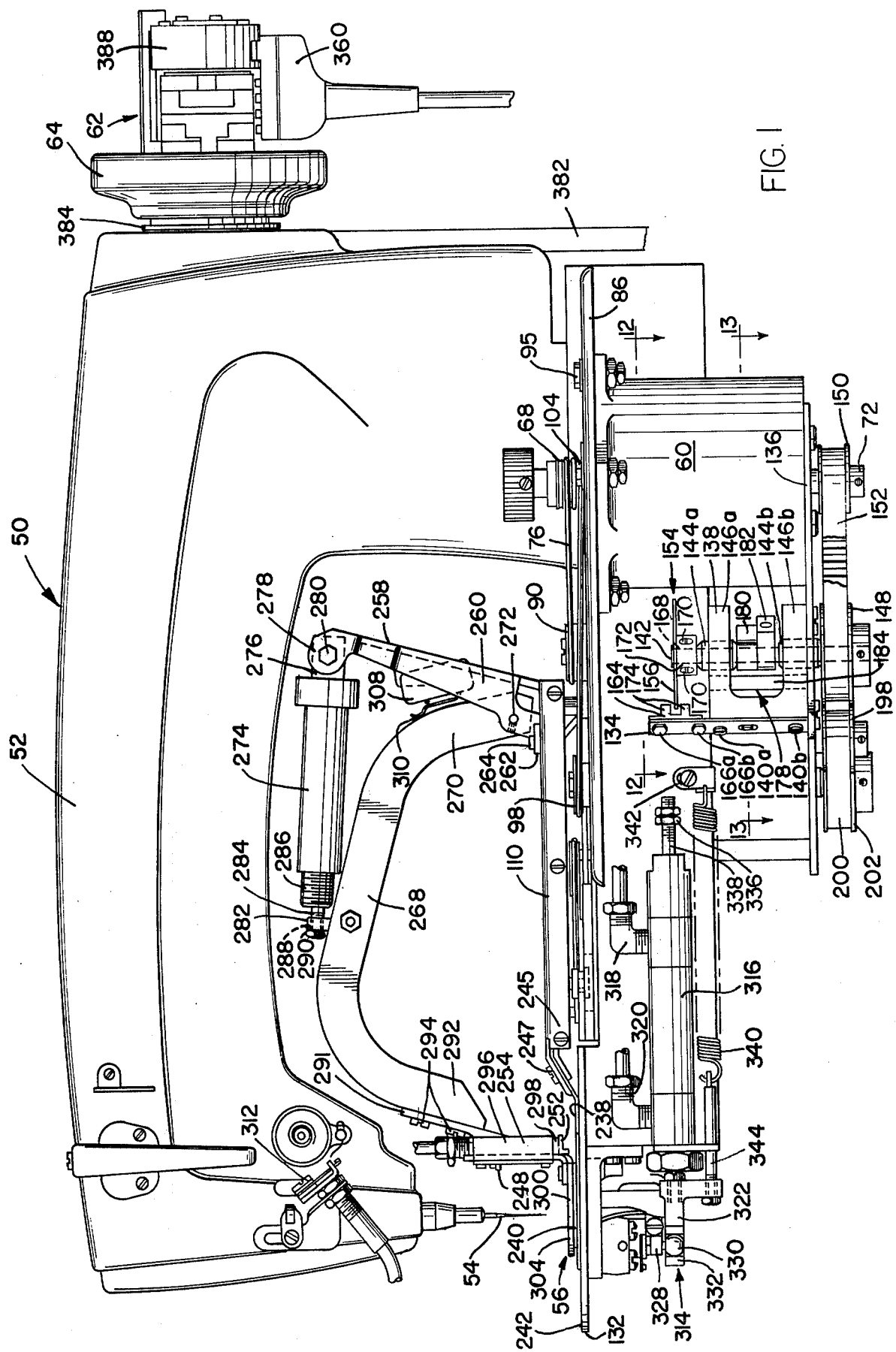
FIG. 1 is a side elevational view of a sewing machine of the present invention.
Figure 3:
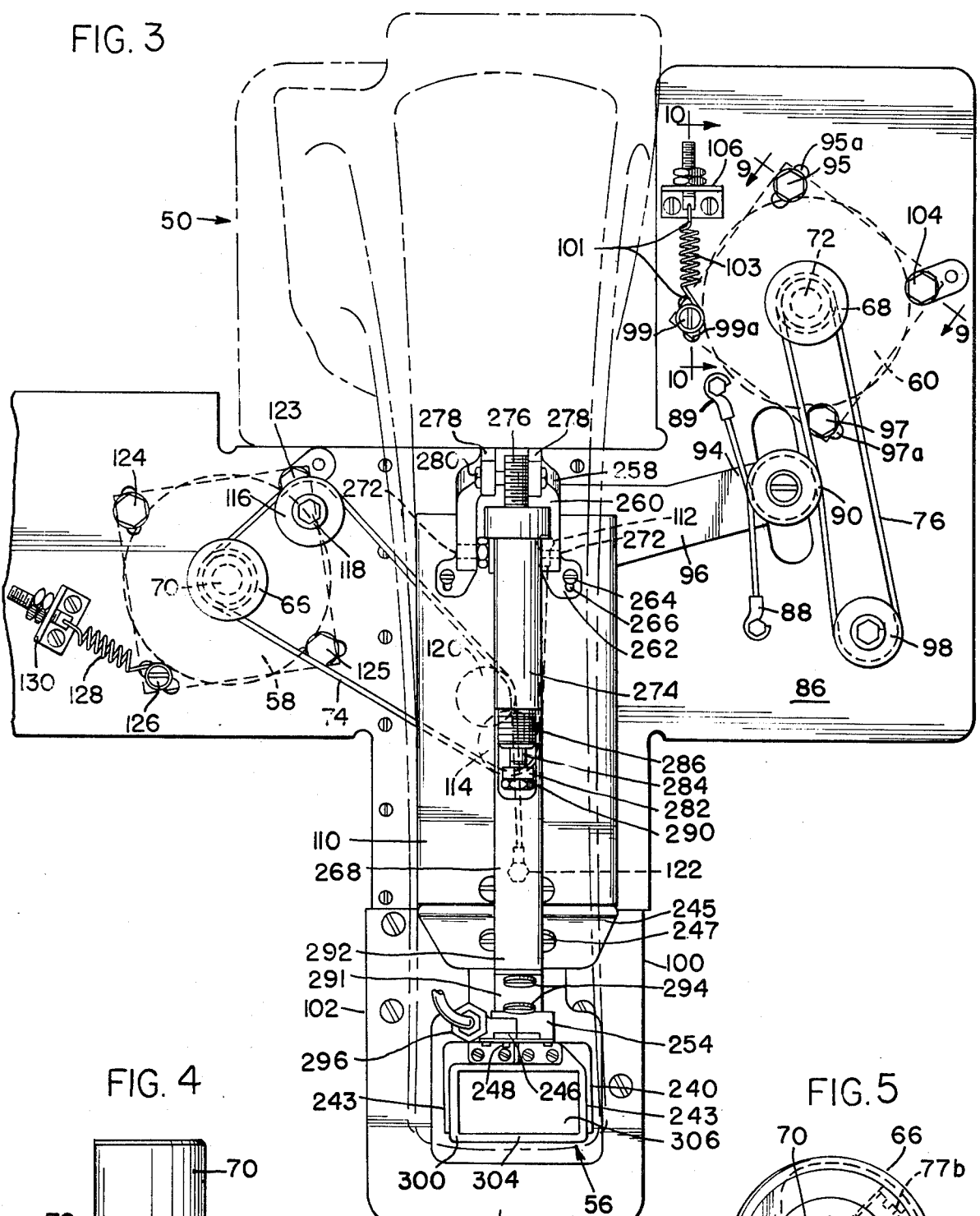
FIG. 3 is a top sectional view of the sewing machine of FIG. 1.
Figure 2I:
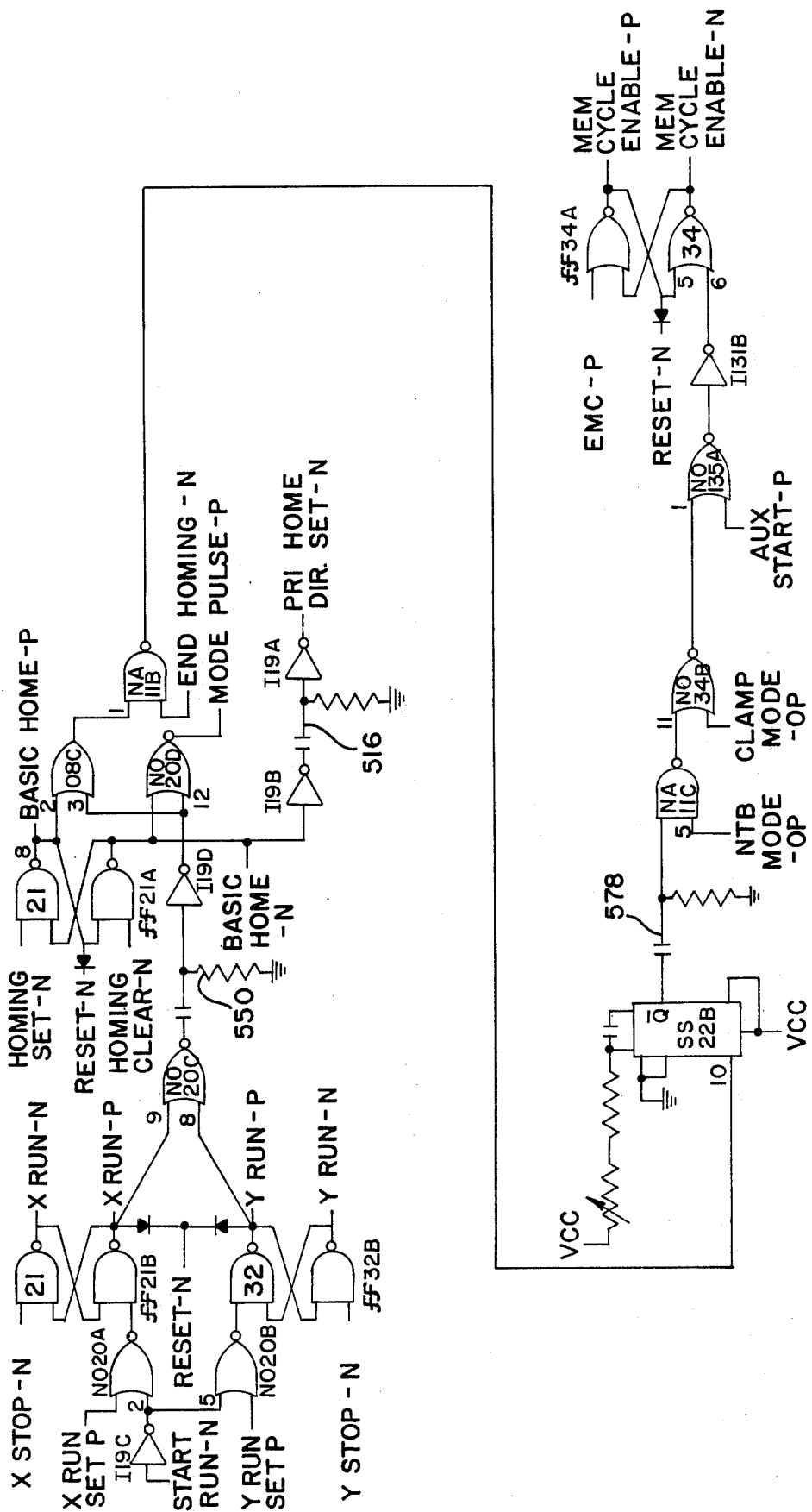
FIG. 2 is a front elevational view of the sewing machine of FIG. 1.
Figure 2I:
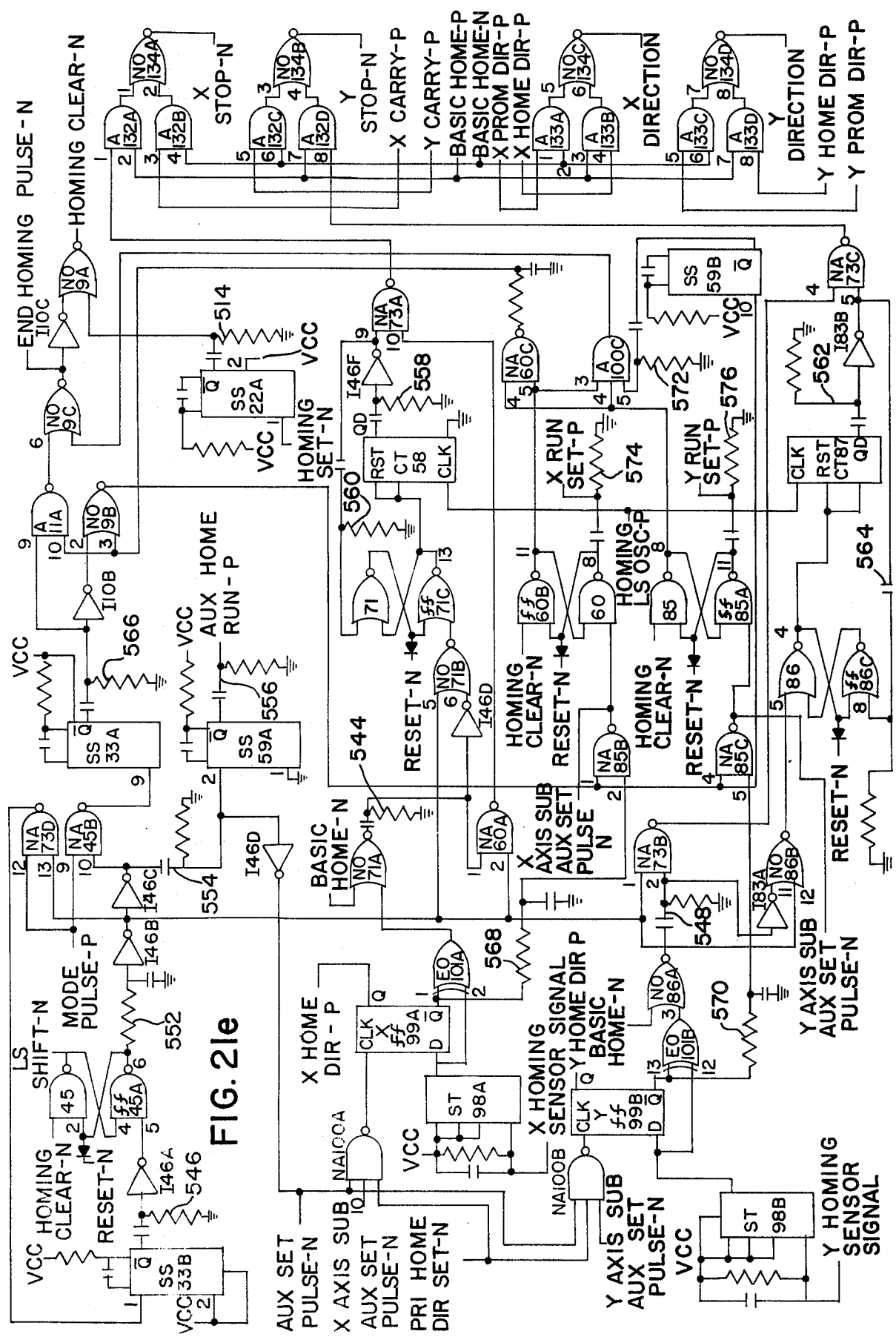
Figure 2I:
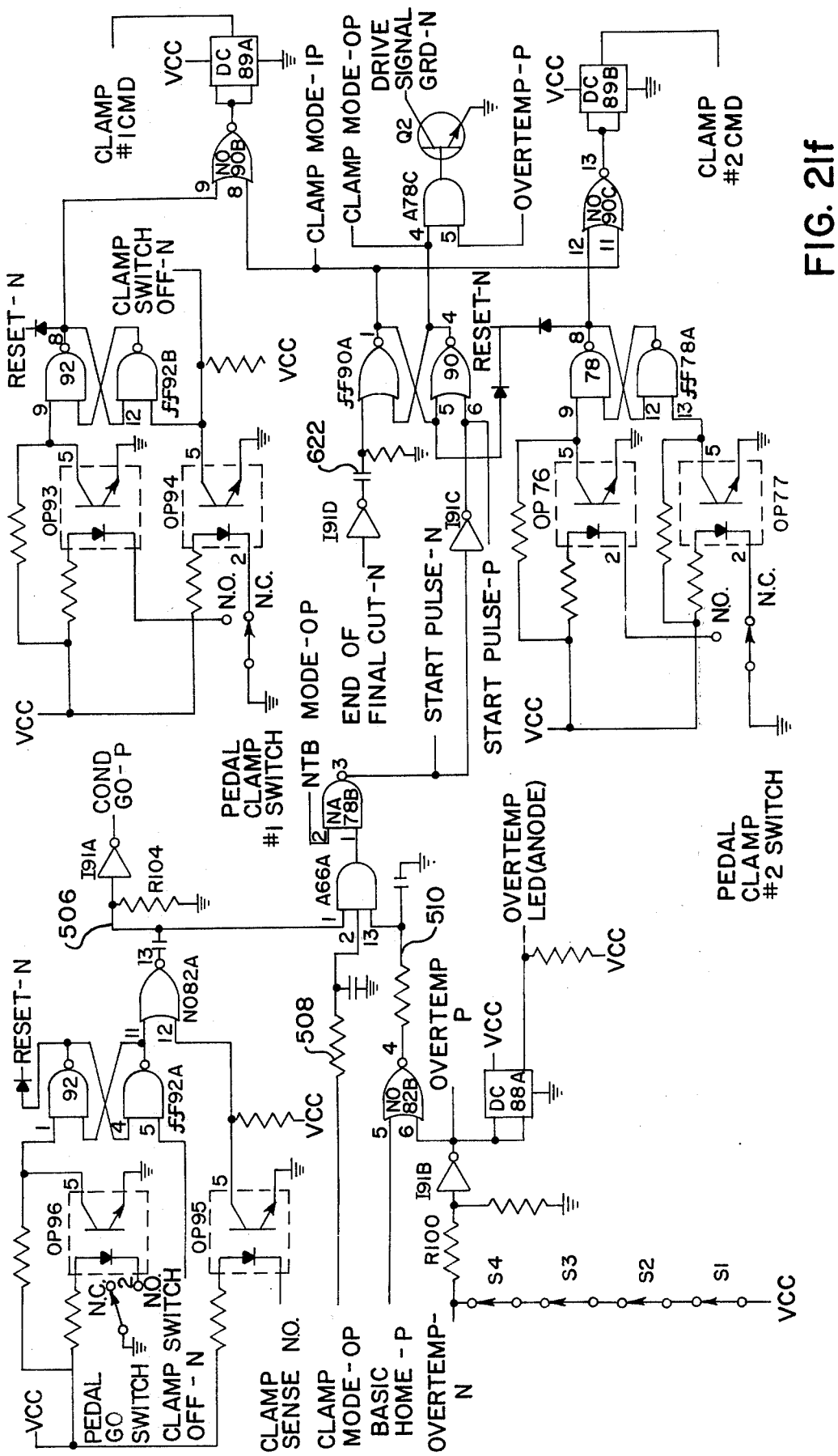

Referring now to FIGS. 1-3, there is shown a program controlled sewing machine 50 according to the invention having an overhanging arm 52 which carries mechanical power to a sewing needle 54. The work piece to be sewn (not shown) is retained by a work holder generally designated 56 which is moved in a horizontal plane by a novel power translation system. This system is driven by a pair of stepping motors 58 and 60 positioned on opposite sides of the arm 52 which supply driving power to move the work holder in two coordinate directions, termed the X and Y coordinate or reference directions. The power translation system acts to translate the rotary drive of the stepping motors to movement of the work holder in its two coordinate directions, with the Y coordinate direction being generally aligned with the longitudinal axis of the arm 52, and with the X coordinate direction being transverse to the longitudinal axis of the arm.

The stepping motors are driven by electrical signals from novel electrical circuitry of the control system.

These signals are synchronized to the movement of the needle 54 into and out of the work piece by an electromechanical synchronization unit 62. The unit 62 is connected to and driven by a hand wheel 64 of the sewing machine, and supplies synchronization signals to the electrical circuitry.

In this particular embodiment, the work holder is moved in a predetermined pattern relative to the movement and position of the sewing machine needle. A sequence of instructions describing the desired pattern of movement and stitching of the work holder 56 is stored in a storage element or memory unit having a plurality of randomly addressably storage locations. The instructions may include information utilized as commands for controlling movement of the work holder and reciprocation of the needle, and positional information for directing movement of the work holder relative the needle in variable distances along the two coordinate directions. Preferably, the storage element is a programmable read only memory. In such devices the instructions stored in the various storage locations may be changed to describe a desired new pattern of movement. The storage element may also be, for example, a randomly addressably read only memory in which the stored instructions may not be changed to describe a new pattern of movement. Solid state memory elements of both types are available and are preferred. As known to the art, such memory or storage elements are nonvolatile, i.e., they retain data during power disruptions, and are nondestructive, i.e., data is not destroyed as a result of the reading operation ("Reference Data for Radio Engineers", Ch. 40, p. 18, Howard W. Sams & Co., Inc., Indianapolis, Ind., 1975; G. Luecke, J. P. Mize, and W. N. Carr, "Semiconductor Memory Design and Application", pp. 15–18, McGraw-Hill Book Company, New York, 1973; and L. Nashelsky, "Introduction to Digital Computer Technology", p. 474, John Wiley & Sons, Inc., New York, 1972).

Electrical control circuitry is provided which reads information from as many of the addressable locations of the storage element as necessary to obtain a complete instruction for each movement of the work holder. It also converts each instruction into a sequence of pulses to be applied to the stepping motors, and thus drives the motors at a time when, as indicated by the synchronizing unit 62, the needle 54 is not engaged in the work piece. In this manner, movement of the work holder is timed not to adversely affect the movement of the sewing needle 54.

As best shown in FIG. 3, the power translating system used to transmit power from stepping motors 58 and 60 to the work holder 56 comprises two cable systems, or other suitable means, such as gears, with one being provided for each coordinate direction. The cable systems are arranged as follows. Pulleys 66 and 68 are attached to the shafts 70 and 72 of the stepping motors 58 and 60, respectively. Cables 74 and 76 are secured around the pulleys 66 and 68, respectively, as will be described below. In this manner, the rotational movement of the stepping motor shafts 70 and 72 is converted into linear movement of the cables 74 and 76.

Figure 4:
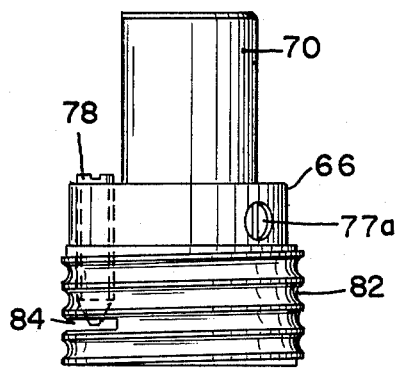
FIG. 4 is an elevational view of a pulley for driving means of the sewing machine of FIG. 1.
Figure 5:
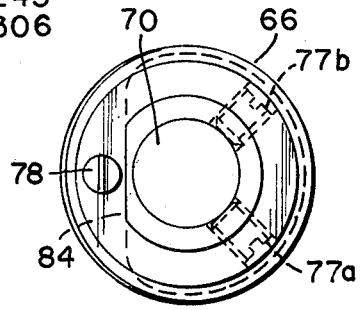
FIG. 5 is a top plan view of the pulley of FIG. 4.

Since both pulleys 66 and 68 and associated structure may be substantially the same, the pulley 66 will be described as representative in connection with FIGS. 4 and 5. As shown, the pulley 66 may be secured to the associated motor shaft 70 by a pair of screws 77a and 77b. The associated cable may be wound a plurality of times, e.g., 2¼ to 2½ rounds, in a spiral groove 82 formed in the outer surface of the pulley, with a central portion of the wound cable being received in a circumferential cutout 84, where the cable may be secured to the pulley by a screw 78. Thus, at least part of a turn of the cable is made above the cutout 84 and part of a turn of the cable is made below the cutout. In this manner, the appropriate cable is rigidly secured to each pulley.

Referring now to FIGS. 1–3, 6, and 7, the cable 76, which pivots the work holder about a pivot pin 108 secured to a base plate 86 of the sewing machine, is attached at both ends to the base plate 86 by a pair of hook and shoulder screws 88 and 89. As best shown in FIG. 3, portions of the cable 76 are threaded in opposite rotational directions in upper and lower grooves of a free turning pulley 90. As illustrated in FIGS. 3, 6, and 7, the pulley 90 is rotably mounted adjacent an end 94 of a connecting member 96 extending from a pivoting arm 92 which is pivotally mounted on the base plate 86 by the pivot pin 108. Referring again to FIG. 3, one turn of the cable 76 passes from the pulley 90 to the motor pulley 68, while the other turn of the cable passes from the pulley 90 to a free turning pulley 98 which is pivotally mounted on the base plate 86. As shown, the cable 76 is threaded around the pulley 98 from where it passes to the motor pulley 68, such that the cable 76 is threaded around the pulleys 90, 98 and 68 intermediate its ends.

Since the cable ends are fixed, it will be apparent that as the stepping motor 60 rotates the motor pulley 68, the cable course between the pulleys 90 and 68 will be shortened or enlarged, depending upon the rotational direction of the motor shaft 72, while the cable course between the pulleys 90 and 98 will be simultaneously enlarged or shortened in an inverse manner. Accordingly, if the motor pulley 68 is driven by the motor 60 in a clockwise direction, as viewed in FIG. 3, the pulley 90 is moved in a direction generally toward the motor pulley 68 and away from the pulley 98. Contrawise, the pulley 90 is moved in a direction generally toward the pulley 98 and away from the pulley 68 corresponding to a counterclockwise rotation of the pulley 68.

Referring now to FIGS. 3, 6, and 7, since the pulley 90 is connected to member 96, movement of the pulley 90 is transferred to pivotal movement of the pivoting arm 92 about the pin 108. As will be seen below, the pivoting arm 92 carries with it, as it pivots, an extendable arm 110 which has one end attached to the work holder 56. Thus, as the arm 92 rotates about the pivot pin 108, so do the arm 110 and work holder 56. Accordingly, clockwise rotation of the motor pulley 68, as viewed in FIG. 3, results in movement of the work holder 56 toward an edge 100 of the base plate 86, which may be designated as movement in the −X direction, while the work holder is moved toward an opposing edge 102 of the plate 86 corresponding to counterclockwise rotation of the pulley 68, which will be termed +X direction.

As shown in FIGS. 1–3, 9, and 10, one corner of the stepping motor 60 is pivotally mounted on the underside of the base plate 86 by suitable means, such as a bolt 104 extending through an aperture 104a in the plate 86, a washer 104b intermediate the head of the bolt 104 and the plate 86, and a pair of lock nuts 104c threaded onto the bolt 104. Two adjacent corners of the motor 60 are slidably mounted on the base plate 86 by similar nut and bolt assemblies, as shown, with bolts 95 and 97 in the respective assemblies being received in slots 95a and 97a, respectively, extending through the plate 86. The opposing corner of the motor is also slidably mounted on the plate 86 by a nut and bolt assembly, with a bolt 99 in this assembly extending through a slot 99a in the plate 86. The ends 101 of a helical spring 103, or other suitable spring means, are connected between a head of the bolt 99 and a bracket assembly 106, which is secured to the upper surface of the base plate 86, as shown. The spring 103 and associated structure is arranged such that the bolt 99 will be positioned adjacent the longitudinal center of the elongated slot 99a when the machine is at rest.

During operation of the machine, the stepping motor 60 is permitted to rotate slightly about bolt 104 with the bolts 95, 97 and 99 sliding in their associated slots, while the spring 103 applies forces to the bolt 99 and maintains continuous tension on the cable 76 through the motor pulley 68. The use of the above motor mounting structure for employment of the motor mass in dampening shocks to the cable system is set forth fully in an application Ser. No. 543,099, filed 1-22-75, now U.S. Pat. No. 3,974,787 and incorporated herein by reference.

As shown in FIGS. 1-3, 6, and 7, one end of the cable 74, which controls radial movement of the extendable arm 110, is secured to a post 112 which depends from the arm 110 adjacent one end thereof remote the work holder 56. From the post 112, the cable 74 is threaded around a free turning pulley 114 which is pivotally mounted to the base plate 86 beneath the arm 110 by suitable means, such as a screw. The cable 74 passes from the pulley 114 to the motor pulley 66 on which the cable is threaded approximately 2¼ turns. From the motor pulley 66, the cable 74 is threaded around a free turning pulley 116, which is pivotally mounted on the base plate 86 by a screw 118, and a free turning pulley 120 which is pivotally mounted on the base plate beneath the arm 110 by suitable means, such as a screw. The other end of the cable 74 passing from the pulley 120 is secured to a post 122 depending from the other end of the arm 110 adjacent the work holder 56.

As best shown in FIG. 3, one corner of the stepping motor 58 is pivotally mounted beneath the base plate 86 by a nut and bolt assembly 123, in a manner similar to that described in connection with the stepping motor 60. As before, adjacent corners of the stepping motor 58 are slidably mounted beneath the base plate 86 by nut and bolt assemblies 124 and 125, while the remote motor corner is slidably mounted below the plate with a nut and bolt assembly 126. A spring 128 has its ends connected to the assembly 126 and a bracket assembly 130 which is secured to the upper surface of the base plate 86. In a manner as previously described, the spring 128 applies forces to the assembly 126, and the cable 74 is thereby maintained under continuous tension through the motor pulley 66.

It will be apparent that as the motor shaft 70 rotates, the cable segment intermediate the pulley 120 and the post 122 will be shortened or enlarged, depending upon the rotational direction of the shaft, while the cable segment intermediate the pulley 114 and the post 112 will be simultaneously enlarged or shortened in an inverse manner. Thus, as viewed in FIG. 3, rotational movement of the motor pulley 66 in a clockwise direction is translated into linear movement of the cable end segments, and results in radial movement of the extendable arm 110 and work holder 56 relative the needle and pivot pin 108 toward an outer edge 132 of the base plate, which may be designated as movement in the +Y direction, while counterclockwise rotation of the motor pulley 66 results in radial movement of the arm 110 and work holder 56 in a direction away from the edge 132, termed the —Y direction. Accordingly, it will be seen that simultaneous energization of the X and Y stepping motors 60 and 58, respectively, causes simultaneous pivotal and radial movement of the work holder in the X and Y coordinate directions, respectively.

Though, at first glance, the coordinate system in which the work holder moves appears to be polar, that is, a coordinate system having a radial component delivered by moving the extendable arm 110 over the pivoting arm 92, and an angular component delivered by rotating the pivoting arm 92 about pivot pin 108, there is built into the system means for causing the work holder to move in what closely approximates a rectangular coordinate system with respect to the needle 54. This means includes apparatus whereby, when the work holder is rotated about pivot pin 108, the circular line of stitching which would normally result from such movement is modified to approximate a straight line of stitching such as would be created in a rectangular coordinate system. This approximation of a straight line of stitching is accomplished automatically by shortening the effective length of the extendable arm 110 by amounts dependent on the amount of rotational movement imparted to the work holder by the pivoting arm 92. The amount by which the effective length of the extendable arm is shortened for a particular angular position of arm 92 is determined by (1) the distance from the post 122 to both the needle 54 and the pivot pin 108, (2) the distance from the axis about which pulley 120 rotates to the post 122 and (3) the radius of the pulley 120 at the inside of its circumferential groove. The pulley 120 is spaced to one side of a line between the pivot pin 108 and needle 54, a distance equal to the radius of the pulley plus one-half the thickness of the cable.

With the structure shown in the drawings, the post 122, for a fixed position of the stepping motor 58 traces a path called the involute of a circle (the circle being the inner circumference of pulley 120), and the result is to pull the post 122 radially inward more and more as the angle through which the arm 92 is rotated increases from its center position. As already discussed, the amount of radially inward movement required is such as to have the needle sew along a path which approximates a straight line when only a rotational movement is imparted to the work holder by the cable 76. As pivoting arm 92 pivots about pin 108 from its center position, the cable 74 winds or unwinds about the pulley 120, for clockwise or counterclockwise rotation, respectively. As a result, for the same angular rotation of arm 92 from the center position, the compensatory effect will vary depending upon the direction of rotation from the center position. In order to maintain the compensation as symmetrical as possible, it is desirable to keep the radius of the pulley 120 as small as possible, consistent with proper handling of the cable 74.

As described below, each of the stepping motors 58 and 60 has an associated homing assembly and limit assembly. The homing assemblies for the stepping motors are utilized to position the work holder during a homing mode at a predetermined home location in the X and Y coordinate directions. The control system automatically enters the homing mode at the beginning and at the end of a sewing operation, the latter comprising a sequence of stitches, during which the work holder is moved to the home position. The home location may be preselected relative the needle by suitable adjustment of the X and Y homing assemblies, and would normally be chosen at a position to permit full range of movement by the work holder in a stitch pattern, as permitted by the limit assemblies. Since the stepping motors are utilized in an open loop condition during a sewing operation, while under program control, the homing assemblies prevent cumulative errors in reference position between consecutive sewing operations by starting each sewing operation at th same home position. Since the work holder and retained work piece are positioned with extreme accuracy at the beginning and end of a sewing operation, auxiliary device, such as slitting knives to cut buttonholes, may be utilized in conjunction with the machine even when a high degree of positional accuracy is required.

The limit assemblies are utilized to confine movement of the work holder within a predetermined range of positions, and thus limit movement of the work holder relative the needle in the X and Y coordinate directions. In this manner, obstruction between a clamp in the work holder and the sewing needle is prevented, which otherwise might result in damage to the machine and possible injury to the machine operator. As will be seen below, the limit assembly may be adjusted to vary the freedom of movement by the work holder relative the needle.

Figure 11:
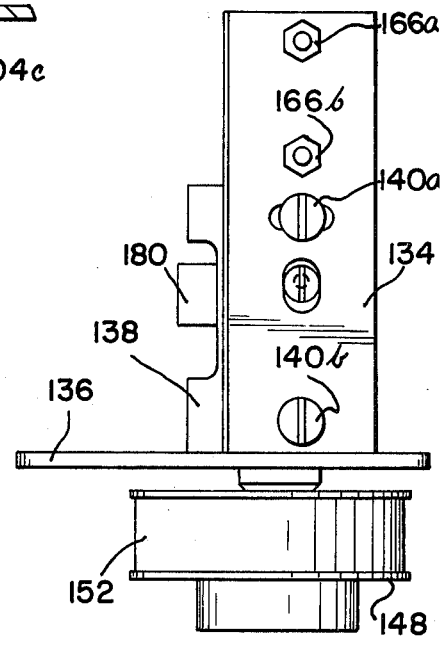
FIG. 11 is an elevational view of a limit and homing assembly for the sewing machine of FIG. 1.
Figure 10:
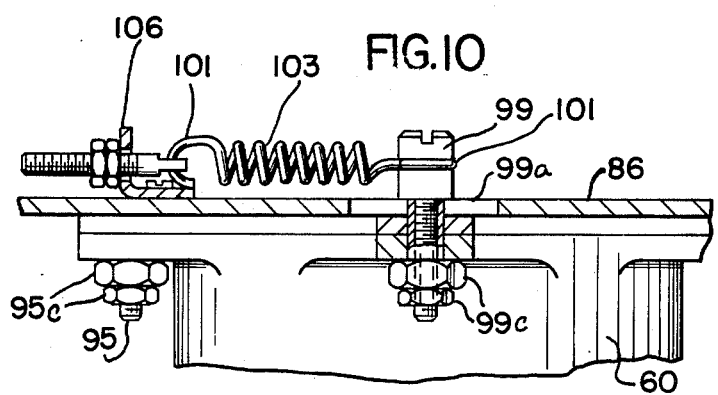
FIG. 10 is another sectional view of the securement means for the driving means.

Since the homing and limit assemblies for both stepping motors may be substantially the same, only the homing and limit assemblies associated with the X stepping motor 60 will be described in detail. As shown in FIGS. 1, 2, and 11, a support plate 134 is mounted on the upper surface of a base plate 136, and a forked support bracket 138 is secured to the support plate 134 by a pair of screws 140a and 140b which extend through slots in the plate 134 which permit slight adjustment of the bracket 138. As shown in FIG. 1, a shaft 142 is journaled by suitable bearings 144a and 144b in the tines 146a and 146b of the bracket 138, with the rotably mounted shaft 142 extending through the base plate 136, and with a pulley 148 being secured to a lower end of the shaft. A pulley 150 is also secured to the lower end of the motor shaft 72, and an endless belt 152 extends around the pulleys 148 and 150, such that the shaft 142 is driven by the motor shaft 72.

Figure 12:
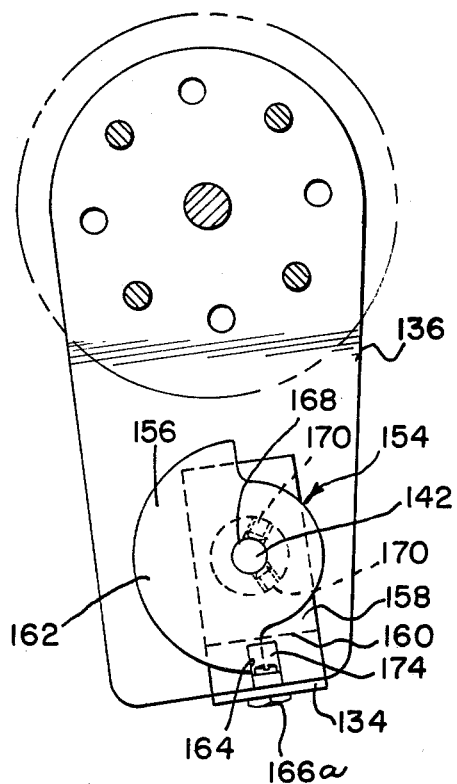
FIG. 12 is a top sectional view of the homing assembly of FIG. 11.

An X homing assembly generally designated 154 is best described in connection with FIGS. 1, 2, and 12. The homing assembly 154 comprises a homing disc 156 having a notch or cutout 158 defining a radially extending edge 160 intermediate the notch 158 and an outer portion 162 of the disc 156, and an optical sensor 164 which is mounted on the plate 134 by a pair of bolts or screws 166a and 166b. The shaft 142 is received in a bore 168 extending through the disc 156, and the disc 156 is secured to the shaft 142 by a pair of screws 170 extending through threaded apertures in a depending portion 172 of the disc 156 to a location at the inner surface of the bore 168. Thus, rotational movement of the shaft 142 results in rotation of the homing disc 156.

As shown, the outer portion 162 of the disc 156 is permitted to pass between spaced tines 174 of the optical sensor 164, one of which contains a light-emitting diode and the other a phototransistor. Accordingly, the sensor 164 detects the presence or absence of the notch 158, and generates a signal which changes state as the disc edge 160 passes through the sensor tines 174 responsive to a change of condition in light passage or interruption between the tines 174. Depending upon the rotational position of the disc 156 and disc edge 160, the output signal thus provides an indication to the control system of the present position of the edge 160 relative the sensor, and the signal may be utilized to determine the rotational direction the motor shaft 72 should be moved to drive the disc edge 160 toward the sensor. When the edge 160 passes through the sensor tines 174, a change of condition in the sensor signal indicates to the control system that a crossing of the edge between the sensor tines has just taken place. If desired, the stepping motor could be stopped at the time of edge crossing, or, if the edge overshoots the desired alignment, the motor direction may be reversed by the control system to bring the disc into proper alignment. However, in a preferred embodiment, the homing assembly is utilized in a somewhat different manner to obtain a more precise alignment of the disc edge relative the sensor and thus the work holder relative the needle, as described in detail below. In either event, it will be apparent that the homing assembly is utilized in a closed loop manner with the control system and stepping motor to precisely position the work holder during the homing mode.

It will also be seen that the rotational position of the disc 156 and disc edge 160 may be adjusted through use of screws 170 when the disc is secured to the shaft 142. Accordingly, depending on the annular position of the disc edge 160 relative the shaft 142, the edge 160 may be suitably adjusted to pass through the sensor tines 174 for different rotational positions of the shaft 142, and the corresponding different positions of the work holder relative the needle at the time of edge crossing. In this manner, the home position of the work holder relative the needle may be readily modified, as desired. The operation of the Y homing assembly in conjunction with the control system and Y stepping motor for placing the work holder at its home position along the Y coordinate direction is similar to that described above for the X homing assembly.

Figure 13:
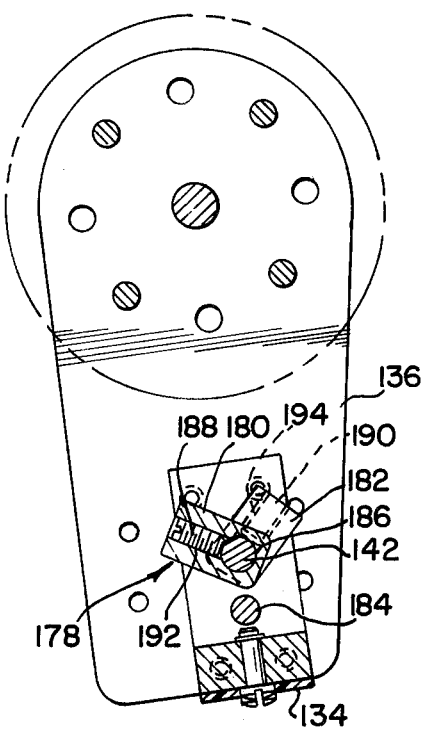
FIG. 13 is a sectional view of the limit assembly of FIG. 11.
Figure 9:
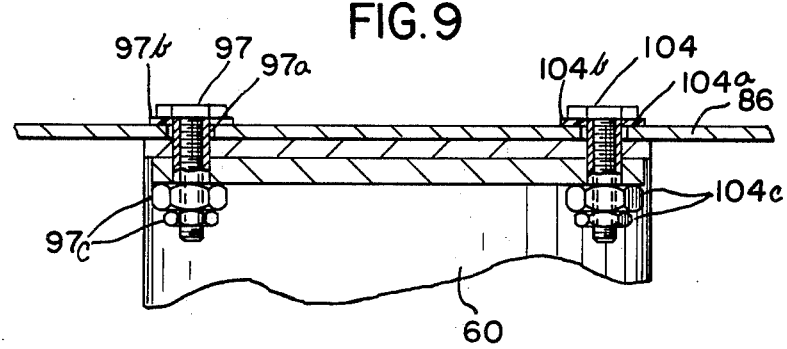
FIG. 9 is a fragmentary sectional view showing securement means for the driving means of the sewing machine of FIG. 1.

As shown in FIGS. 1 and 13, the X limit assembly generally designated 178 comprises a pair of elongated mechanical stops 180 and 182, and an associated mechanical abutment rod 184 extending between the tines 146a and b of the support bracket 138. The shaft 142 is received in bores 186 extending through both stops 180 and 182 adjacent one of their ends, and the stops 180 and 182 are secured to the shaft 142 by a pair of screws 188 and 190, respectively, which are received in threaded apertures 192 and 194 extending longitudinally through the stops 180 and 182, respectively, to the bores 186. Thus. the angular positions of the stops 180 and 182 relative the shaft 142 may be adjusted by placing the stops at their desired angular positions before being secured to the shaft through use of the screws 188 and 190.

As viewed in FIG. 13, the shaft 142 is permitted to rotate in a clockwise direction until the stop 182 engages against the rod 184. The interengaged stop 182 and rod 184 then prevent further rotation of the shaft 142 and motor shaft 72, and thus stops the work holder driven by the X stepping motor at a predetermined position relative the needle in the X direction. Similarly, the shaft 142 is permitted to rotate in a counterclockwise direction until the stop 180 engages the rod 184, at which time the work holder is stopped at a predetermined position relative the needle in the opposite X direction. Thus, it will be seen that the shaft 142 is permitted to rotate through an angle determined by the angular positions of the stops 180 and 182, and the work holder is permitted to move through a range of positions along the X coordinate direction, before movement of the work holder is stopped.

In this manner, the limit assembly 178 limits the range of positions which may be assumed by the work holder relative the needle to prevent clamp in the work holder from striking the needle. The spaced positions at which the work holder is stopped may be modified by suitable adjustment of the angular positions of the stops 180 and 182 on the shaft 142. Such adjustment is particularly desirable due to the various sizes of clamps which may be utilized to hold the workpiece on the sewing machine, and each of the clamps may require a suitable adjustment of the stops 180 and 182 depending upon the location at which the clamps would strike the sewing needle in the X coordinate direction. The Y limit assembly utilized to limit the range of positions assumable by the work holder in the Y coordinate direction is similar to that descirbed in connection with the X limit assembly above.

As shown in FIGS. 1 and 2, a pulley 198 is secured to the lower end of the shaft 70 driven by the Y stepping motor 58, and an endless belt 200 extends around the pulley 198 and a pulley 202 which is secured to a shaft for driving the Y limit and homing assemblies generally designated 204. As previously discussed, the Y limit and homing assemblies are substantially identical to the X assemblies, and operate in a similar manner to obtain a home position for and limit movement of the work holder along the Y coordinate direction. Accordingly, the X and Y limit and homing assemblies cooperate with the control system and the X and Y stepping motors to limit movement of the work holder throughout a range of positions and position the work holder at the preselected home location in the X and Y coordinate directions.

Referring now to FIGS. 6-8, the pivoting arm 92 has a pair of free turning rollers 210 and 212 mounted on the pivoting arm 92 by means of screws 214, and a pair of free turning rollers 216 and 218 attached to levers 220 and 222, respectively, by means of screws 224. The levers 220 and 222 are both attached to the pivoting arm 92 by a screw 226 about which they can freely pivot. A helical spring 228 extends between ends of the levers 220 and 222, with ends of the spring 228 passing through suitable openings in the levers. The spring 228 biases the levers 220 and 222 about the screw 226 and the associated rollers 216 and 218 against a longitudinal track 229, extending along one side of the extendable arm 110, in which the rollers 216 and 218 ride. The rollers 210 and 212 ride in a track 230 which extends longitudinally along the other side of the extendable arm 110. Accordingly, the rollers are spring loaded against the tracks to retain the arms 92 and 110 together, and the rollers move along the respective tracks, with the extendable arm 110 riding on the rollers and moving longitudinally relative the pivotal arm 92. When the extendable arm 110 reaches its furthest radial positions in the +Y and −Y directions, the posts 112 and 122 are received in the cutouts 232 and 233, respectively, formed in the pivoting arm 92 to prevent obstruction between the posts and the arm 92.

As shown, a retaining plate 231 is mounted above the base plate 86, and defines a retaining edge 234 facing toward the pivot pin 108. The pivoting arm 92 has a pair of retaining members 235a and 235b depending from a forward portion of the arm 92 at a location with a portion of the plate 231 adjacent the edge 234 received in grooves 236 defined in the retaining members 235a and b. The members 235a and b move along the edge 234 when the arm 92 is pivoted about the pin 108, and retain the forward portions of the arms 92 and 110 at the desired vertical position relative the base plate 86. In particular, the retaining members 235a and b prevent the arms 92 and 110 from rising relative the base plate 86 when clamp forces are applied against the work surface of the sewing machine in the region of the needle.

Assembled, the forward part of extendable arm 110, the part nearest the work holder, rides on rollers 212 and 218 while the trailing part of the arm 110 rides on rollers 210 and 216. The work holder, attached to the extendable arm 110, pivots with pivoting arm 92 around pivot pin 108 by means of an opening 217 in pivoting arm 92 through which pin 108 extends. As previously described, pivotal movement is controlled by the cable 76, driven by stepping motor 60. The extendable arm 110 riding on the rollers 210, 212, 216, and 218 in tracks 229 and 230 moves along the pivoting arm 92 in a substantially radial direction with respect to pivot pin 108. The cable 74, driven by stepping motor 58, controls the radial movement of the extendable arm 110. Thus, depending on the direction of motor rotation, one end of the cable at the post 112 pulls while the other end of the cable at the post 122 relaxes, or vice versa. In this way, there is always a positive drive to control radial movement of the extendable arm.

The work holder 56 may comprise any suitable clamp arrangement, or other structure, to retain the fabric while being sewn. For example, the work holder may include a lower clamp member positioned adjacent the work surface of the sewing machine, and an upper clamp member which is brought into position against the lower clamp member to hold the fabric and moved away from the lower clamp member to release the fabric, such as described in application Ser. No. 496,749, filed Aug. 12, 1974, and incorporated herein by reference. Alternatively, the work holder may comprise openable clamp members to separately hold the fabric and a label to be sewn on the fabric, as will be described in the present application. In either event, it will become apparent in the description of the electrical circuitry that the control system is compatible with both types of clamping assemblies, as well as others.

Referring now to FIGS. 1-3, and 14, there is shown a lower clamp member 238 which is positioned adjacent a work surface 242 of the sewing machine, with the lower clamp member 238 having a peripheral portion 239 defining a window 241 through which the fabric is sewn. As illustrated in FIGS. 1, 3, and 7, the lower clamp member 238 is secured to a forward end 245 of the extendable arm 110 by a pair of screws 247, such that the lower surface of the clamp member 238 is located adjacent the work surface 242.

As illustrated in FIGS. 1-3, and 14, the work holder also has a fabric clamp member 240 which is brought into position against the upper surface of the lower clamp member 238 to retain the fabric between the two clamp members 238 and 240 during sewing. As shown, the fabric member 240 has a pair of spaced retaining elements 243 defining a cutout 244 through which the fabric is sewn, with the elements 243 being spaced apart a distance aproximately equal to the distance between the sides of the lower clamp member 238, such that the elements 243 may engage against the side peripheral portions of the lower clamp member 238 when the fabric clamp member 240 is brought into position against the lower clamp member 238. As will be seen below, the size of the cutout 244 extending from the forward end of the clamp member 240 is selected approximately equal to the size of a label to be sewn onto the fabric.

The clamp member 240 also has a tongue 246 extending upwardly from a rearward part of the clamp member, and a pin 248 projecting forwardly from a front surface 250 of the tongue 246. As shown, the clamp member 240 has a ledge 252 extending rearwardly from the tongue 246 adjacent its lower end for a purpose described below. As best shown in FIG. 2, the lower clamp member 240 is mounted in a clamp frame 254 with the tongue 246 slidably received in the frame 254. As shown, the pin 248 projects through a slot 256 in the frame, and the tongue is permitted to move in the frame between a first lower position with the pin 248 located at a lower end of the slot 256, and a second upper position with the pin 248 located at an upper end of the slot 256.

As illustrated in FIGS. 1 and 3, the clamping apparatus includes a forked retaining member 258 having a pair of lower tines 260 and an ear 262 extending from the lower end of each tine 260. The retaining member 258 is secured to the upper surface of the extendable arm 110 by a pair of screws 264 extending through slots 266 in the ears 262, such that adjustment of the retaining member 258 relative the longitudinal direction of the arm 110 can be made through movement of the screws 264 in the slots 266 prior to securement of the retaining member 258.

An arched locking member 268 has its rearward end 270 pivotally mounted between the tines 260 adjacent a lower end of the forked member 258 by suitable means, such as a pin 272 extending through the tines 260 and locking member 268, as shown. An air cylinder 274 is also provided for actuating the locking member 268 and clamping device. A rearward end 276 of the cylinder 274 is pivotally mounted between a pair of spaced ears 278 extending from an upper end of the retaining member 258 by suitable means, such as a bolt 280 extending through the ears 278 and the rearward end 276 of the cylinder. The locking member 268 has a bracket 282 extending upwardly from a central portion of the member 268, and the forward threaded end 284 of a plunger 286, which is received in the cylinder 274, extends through an aperture 288 in the bracket 282 where it is secured in place by suitable means, such as a nut 290. As shown, a flange 291 extending from the clamp frame 254 is secured to a forward end 292 of the locking member 268 by a pair of screws 294.

Prior to a sewing operation, the pressure is reduced in the cylinder 274, and the plunger 286 is thereby retracted into the cylinder. In this configuration, the locking member 268 has been pivoted about the pin 272 to place the member 268 and associated clamp frame 254 in a raised position, with the fabric clamp member 240 being spaced from the lower clamp member 238 even though the clamp member 240 is located in its lower first position, as further described below.

As shown in FIGS. 1-3, a source of air is supplied to an air cylinder 296 which is secured to the clamp frame 254, and which has a movable piston 298 engaging against the upper surface of the ledge 252 on the fabric clamp member 240. The pressurized cylinder 296 urges the piston 298 against the ledge 252, and the clamp member 240 is driven to its lower first position with the pin 248 on the tongue 246 engaging against the lower part of the slot 256 which serves as a stop. In this configuration, the fabric clamp member 240 is spaced from an upper label clamp member 300 a distance approximately equal to the length of the slot 256, and the fabric clamp member 240 is also spaced above the lower clamp member 238, as previously noted.

When it is desired to perform a sewing operation, the operator may place the fabric on the lower clamp member 238 with the portion of the fabric to be sewn positioned in the window 241 of the lower clamp member 238. Next, the operator depresses a first foot pedal of known type having a pair of separately actuatable single-pole, double-throw switches, termed a Pedal Clamp No. 1 Switch and a Pedal Clamp No. 2 Switch, respectively. As will be discussed in connection with the control system of the present invention, both switches have a normally closed contact, a normally open contact, and a common terminal connected to ground. Accordingly, the normally closed contacts of the switches are connected through their respective common terminals to ground prior to actuation of the switches. When the foot pedal is depressed to a first position, the Pedal Clamp No. 1 Switch is actuated, such that the switch breaks contact from the normally closed contact and makes contact with the normally open contact, thus connecting the normally open contact to ground through the common terminal, while disconnecting the normally closed contact from ground.

As will be seen below, the control system utilizes the signal from the Pedal Clamp No. 1 Switch in the following manner. When the switch is actuated and the normally open switch contact is connected to ground, the system generates a signal which results in supply of a moderate amount of air pressure from an air source to the air cylinder 274. In turn, the plunger 286 is partially driven from the cylinder 274, thus lowering the locking member 268 and the fabric clamp member 240 to a position against the lower clamp member 238, such that the fabric is retained between the clamps 238 and 240 at this time. However, the forces applied to the clamp frame 254 by the cylinder 274 through the locking member 268 are less than the forces applied to the clamp member 240 by the air cylinder 296 through the piston 298 and ledge 252. Accordingly, the fabric clamp member 240, although engaged against the fabric, remains in its lower first position with the pin 248 located at the lower end of the slot 256, and with the fabric clamp member 240 spaced from the upper label clamp member 300.

Next, the operator may insert the label to be sewn into the cutout 244 of the clamp member 240, such that the label overlies the fabric. The cutout 244 serves as a guide for placement of the label, since their sizes are approximately the same, as previously discussed. After placement of the label, the operator fully depresses the first foot pedal to a second position while overcoming a slight force exerted by spring means in the pedal which serves as an indication to the operator of the pedal configuration between its first and second positions. When the pedal is placed in its second position, the Pedal Clamp No. 2 Switch is actuated, thus connecting the normally open contact of the switch to ground, and disconnecting its normally closed contact from ground.

In response to the signal from the switch, the control system generates a signal which causes full pressure to be developed in the cylinder 274 from the air source. While in this condition, the forces applied by the cylinder plunger 286 through the locking member 268 to the clamp frame 254 are greater than those applied by the air cylinder 296 between the frame 254 and clamp member 240. Accordingly, the clamp frame 254 is driven toward the machine work surface 242 along with the upper clamp member 300, which is attached to the frame 254 by a pair of screws 302, while the ledge 252 of the fabric clamp member 240 bears against the piston 298 and drives the piston 298 back into the cylinder 296.

When the locking member 268 and clamp frame 254 are fully lowered, the label clamp member 300 engages against the fabric clamp member 240, and retains the label in place above the fabric. As shown, the clamp member 300 has a peripheral portion 304 defining a window 306 which has been placed in alignment with the window 241 of the lower clamp member 238 and cutout 244 of the clamp member 240, in order that the fabric and label may be sewn through the window 306. In this configuration, it will be apparent that the fabric clamp member 240 has been placed in its second upper position, with the pin 248 of the clamp tongue 246 located at the upper end of the slot 256, and with the piston 298 being fully depressed into the cylinder 296 by the clamp ledge 252. The above clamping apparatus is fully described in an application Ser. No. 592,833, filed July 3, 1975, now U.S. Pat. No. 4,002,129 and incorporated herein by reference.

At this time the fabric and label are retained in a proper position for initiation of a sewing operation, and the operator may then depress a second pedal to initiate the run. As will be seen in connection with the control system, the operator may or may not release the first pedal at this time, as she prefers, but she must eventually release the first pedal before starting a subsequent sewing operation. When the first pedal has been released, the normally closed contacts of the switches are again connected to ground, while their normally open contacts are disconnected from ground.

The second foot pedal also has a single-pole, double-throw actuatable switch of a known type, which has been termed a Pedal Go Switch. As before, the normally closed contact of the switch is connected through a common terminal to ground. When the pedal is depressed and the switch is actuated, the switch makes contact with the normally open contact while breaking contact with the normally closed contact, thus connecting the normally open contact to ground and disconnecting the normally closed contact from ground.

Assuming that the various clamps are in their proper configuration, as discussed further below, the control system generates a signal responsive to the actuated Pedal Go Switch, and the system automatically enters the homing mode followed by the sewing operation during which the fabric and label are sewn. When the second pedal is released, the Pedal Go Switch assumes its normal condition with its normally closed contact connected to ground, and with its normally open contact disconnected from ground.

As shown in FIG. 1, a Clamp Sense Switch 308 is mounted between the tines 260 of the retaining member 258, with a contact member 310 of the switch resting against a rear surface of the locking member 268. When the locking member 268 and associated clamps are raised by the cylinder 274, the locking member 268 moves the contact member 310 toward the switch 308. In this configuration, the switch breaks contact from a normally open contact, and disconnects the contact from ground. When the locking member 268 is lowered and the label clamp member 300 is driven against the fabric clamp member 240, the contact member 310 is permitted to move away from the switch 308. In this configuration, the switch makes contact with its normally open contact and connects it to ground.

Accordingly, it will be seen that the signal from the switch 308 provides an indication of whether or not the various clamps are in their proper configuration for performing a sewing operation. Since it is undesirable to begin the operation while the machine is in a condition with the clamps not fully locked into place, the control system utilizes the signal from the switch 308 to prevent initiation of the sewing operation unless the clamps are in their proper configuration. Due to a time delay associated with placement of the clamps after actuation of the Pedal Clamp Switches in the first foot pedal, it is possible that the operator may actuate the Pedal Go Switch in the second foot pedal before the clamps are locked into place. Additionally, the control system prevents initiation of the sewing cycle in the event that the clamps are never properly locked, due to a possible malfunction in the machine.

Accordingly, necessary conditions for initiation of a sewing operation are that the Pedal Go Switch has been actuated through use of the second pedal, and that the clamps are fully locked in place as determined by the Clamp Sense Switch 308. Of course, the first condition will never be satisfied unless the Pedal Clamp Switches are actuated prior to actuation of the Pedal Go Switch, since the clamps will not be lowered into place and the resulting signal from the switch 308 will prevent a run. In the event that the Pedal Go Switch has been actuated before the clamps are completely locked in place, the control system delays until the clamps are fully locked, as indicated by the switch 308, at which time the homing mode will be entered and the sewing operation will be initiated without further actuation of the Pedal Go Switch.

As illustrated in FIG. 1, a Thread Break Sensor 312 is mounted on the sewing machine above the needle 54. The sensor 312 measures the tension on the thread, and provides a signal to the control system which indicates whether or not the thread supplied to the needle has broken.

A thread cutting device generally designated 314 is shown in FIGS. 1 and 2. The device has a double acting air cylinder 316 which is actuated from a source of air by a four-way solenoid. During cutting, air is supplied through a connector 318 to one side of a piston in the cylinder, while air is exhausted through a second connector 320 resulting in movement of the piston in the cylinder toward the left, as viewed in FIG. 1, and movement of an actuating arm 322, which is connected to the piston, away from the cylinder 316. The device has a rocking member 324 pivotally mounted in the device, with a first swinging blade 326 being secured to an upper end of the rocking member 324, and with a lever arm 328 extending from a lower end of the rocking member 324. The lever arm 328 has a ball member 330 depending from the arm 328 adjacent its outer end, with the ball member 330 being pivotally received in the U-shaped portion 332 of the actuating arm 322.

Accordingly, during the cutting phase of the device, the actuating arm 322 driven by the cylinder piston moves the lever arm 328 while the ball member 330 rotates in the U-shaped portion 332 of the actuating arm 322. In turn, the lever arm 328 causes rotation of the rocking member 324 which drives the first blade 326 and thread toward a second blade 334, and the thread is thus cut as the swinging blade passes below the second blade. As seen in FIG. 1, the distance of travel for the piston during the cutting operation, as well as the swinging blade 326, is limited by nuts 336 on a rod 338 which is connected to the remote end of the piston, such that the nuts 336 abut against the cylinder 316 when the blade 326 is located at the desired final position for cutting the thread.

After the thread has been cut, air is introduced through the connector 320 to one side of the piston, while air is exhausted from the other side of the piston through the connector 318. When the piston has been returned to its original position, the swinging blade 326 is placed at its position for initiation of a subsequent cutting operation. As shown in FIG. 1, a continuous force is applied to the actuating arm 322 by a compression spring 340 which extends between a bracket 342 secured to the machine and a connecting rod 344 extending from the arm 322. The spring 340 assures a smooth operation of the blade 326 and the resulting cutting operation, and facilitates return of the connecting arm 322 and blade 326 to their initial position for performing another cut. As will be described in connection with the control system, the cutting device is automatically actuated to cut the thread at the end of a sewing operation, and in the event that the work holder is moved from a first position to a spaced second position while the fabric is not being sewn.

Figure 15:
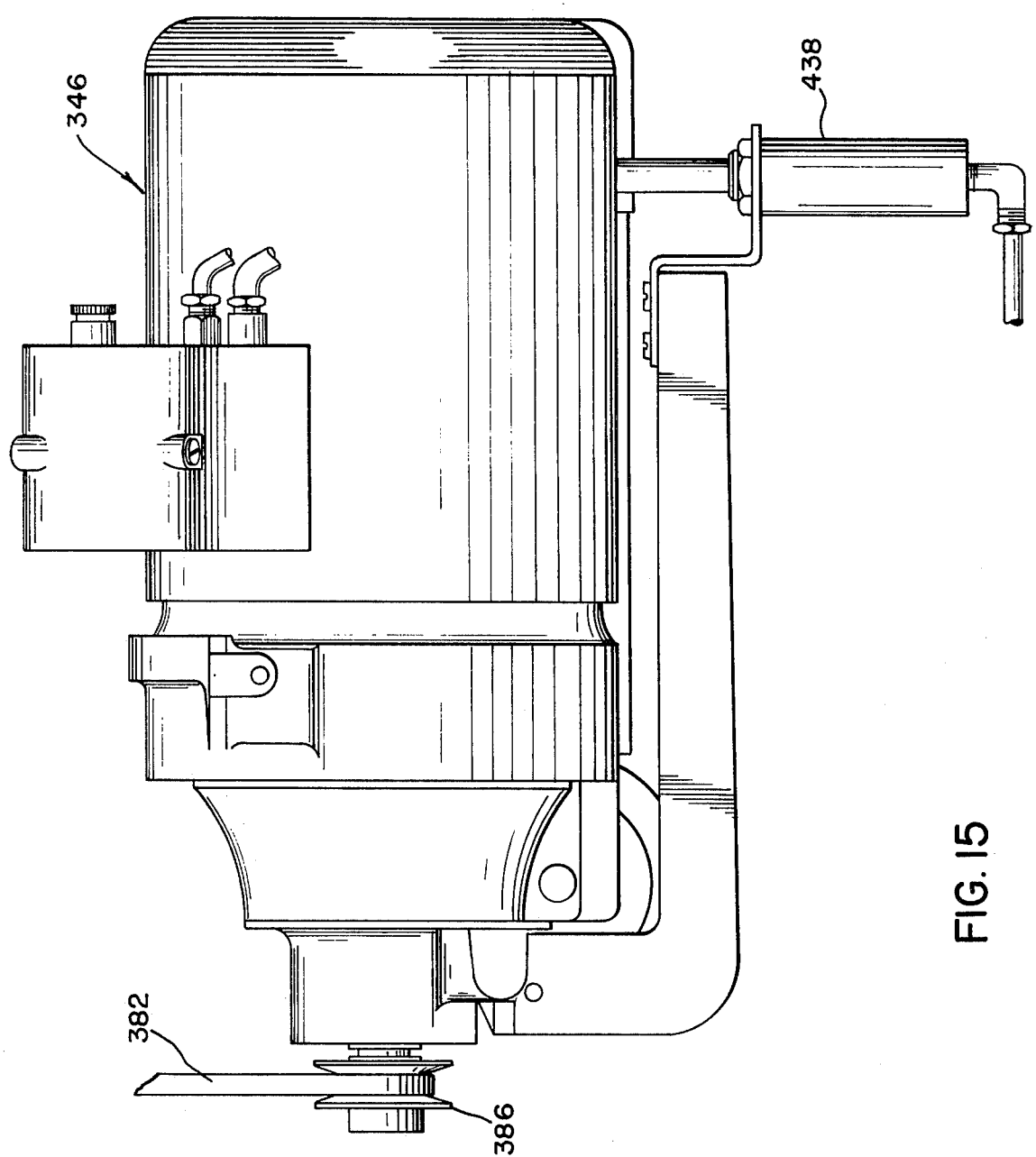
FIG. 15 is a fragmentary elevational view of reciprocating means for a sewing needle in the sewing machine of FIG. 1.

For proper operation of the apparatus, the movement of the work holder must be synchronized to the stitching cycle so that the work holder is moved only when the needle is not in the work piece. Furthermore, the sewing machine must stop at the end of a sewing cycle with the needle in the up position so that the work holder may be moved to the home position and so that the sewn work piece may be removed from the work holder after the clamps are raised. Thread cutting is also done as part of the needle-up sequence. These functions are performed by a commercial apparatus 346, Quick, Model No. 800-ST-362, as shown in FIG. 15, in conjunction with the synchronization unit 62 and the control system.

Figure 16:
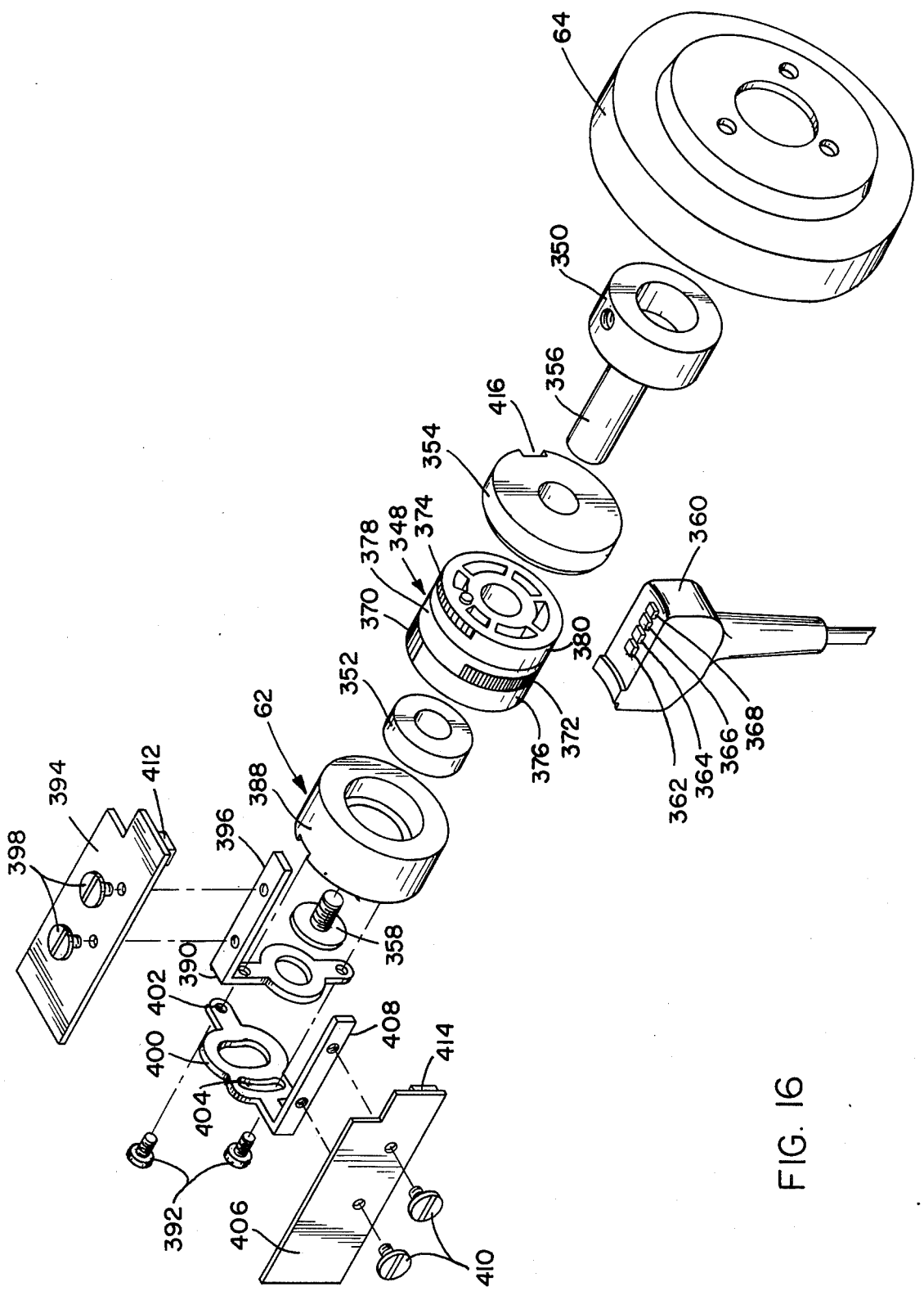
FIG. 16 is an exploded perspective view of a synchronization unit for the sewing machine of FIG. 1.

As shown in FIGS. 1 and 16, the electromechanical synchronization unit 62 has an adapter 350 affixed to the sewing machine hand wheel 64, such that the adapter rotates with the hand wheel. A bearing 352, a rotating slip ring assembly 348, and a photocell commutator ring 354 are received on a shaft 356 extending from the adapter 350, and are secured in place by a screw 358 extending into the outer end of the shaft, in order that they rotate with the hand wheel. A stationary connector portion 360 of the assembly 348 includes four electrical brushes 362, 364, 366, and 368. Insulating portions 370, 372, and 374 provide electrical interruptions in three slip rings 376, 378, and 380 when these portions are contacted by the brushes 362, 364, and 368, respectively. The brush 366 is used to supply electrical current to the slip rings from the Quick device 346. Current from the three active slip rings is supplied to the Quick device 346 to synchronize its operation, and separately provide a signal at the needle down position, the needle up position, and for cutting. As will be further described below, the control system and the synchronization unit 62 in conjunction with the Quick device cause the sewing machine (a) to run at fast speed or slow speed; (b) to actuate the thread cutting device 314, as well as a thread tension release solenoid; and (c) to stop the machine with the needle in its up position. As shown in FIGS. 1 and 15, the synchronization unit 62 and sewing machine is driven by the Quick device 346 through an endless belt 382 which passes around pulleys 384 and 386 connected to the unit 62 and device 346, respectively.

As best shown in FIG. 16, a stationary support member 388 is received on the bearing 352. A first bracket 390 is mounted on the end of the support member 390 by suitable means, such as screws 392, and a plate 394 is secured to an upper flange 396 of the bracket 390 by a pair of screws 398. A second bracket 400 is also mounted on the outer end of the support member 388 by a pair of screws (not shown), with the screws passing through an aperture 402 and a slot 404 in the bracket 400. It will be apparent that the bracket 400 may be adjusted to a desired position throughout the range of movement permitted by the slot 404. A second plate 406 is mounted on a flange 408 of the bracket 400 by a pair of screws 410.

As shown, photo-reflective transducers 412 and 414 are mounted on the inner surfaces of the plates 394 and 406, respectively, and in a position of alignment with a notch 416 in the ring 354 as it rotates, the notch 416 having a non-reflective surface coating within its confines. In operation, light emitted by the transducers 412 and 414 strike the surface of ring 354 and is reflected to an optical sensing portion of the transducers 412 and 414, respectively, creating two independent output currents. The output currents of the transducers remain constant except during the time they are aligned with the non-reflective notch 416 of the ring 354, at which time the amount of reflected light is greatly diminished. Accordingly, the output signals change when the edges of the notch reach alignment with the respective transducer, and as will be seen below, the signal change when the notch first reaches alignment with the tranducers is utilized by the control system to provide an indication of the needle position.

During normal operation of the machine, the signal from the primary transducer 414 is connected to the control system, and this signal, termed the Needle Disengage Sensor-P signal, indicates the time at which the needle is about to leave the fabric and when the work holder may be moved without damage to the needle. The position of the transducer 414 may be modified by suitable adjustment to the bracket 400, in order to signal the precise time desired.

During normal operation, the auxiliary transducer 142 is disconnected from the control system as controlled by a Normal/Service Select Switch. However, when a service mode for the machine is entered through use of the switch, during which time the function of the machine may be checked by a serviceman, the signal from the primary transducer 414 is disconnected from the control system, and the signal from the auxiliary transducer 412 is connected to the control system and used as the signal Needle Disengage Sensor-P. Although under program control, during the service mode the machine operates at a slow speed even if a fast speed command has been received. Accordingly, the machine timing is determined by the transducer 414 during the service mode to assure that movement of the work holder takes place while the needle is disengaged from the workpiece.

The Quick device 346, although commercially designed for actuation by a treadle, is made fully automatic herein, and will be further described in connection with FIGS. 15 and 17 to facilitate understanding of the system. The device 346 has a motor 418 which drives a shaft 420, with a flywheel 422 being secured to one end of the shaft 420, and with a pulley 424 being secured adjacent the opposite end of the shaft. The device 346 has another shaft 426 which is slidably and rotably mounted in the housing 428 of the device. The motor pulley 386 which drives the belt 382 is mounted on one end of the shaft 426, while a main clutch and brake disc 430 is secured to the other end of the shaft 426. A worm wheel 432 is rotably mounted on the shaft 426 intermediate the disc 430 and a wall of the housing 428, and defines a main brake surface 434 facing the disc 430, while the flywheel 422 defines a main clutch surface 436 facing the disc 430.

The shaft 426 is movable between a first position with the disc 430 engaged against the clutch surface 436 of the flywheel 422, and a second position with the disc 430 engaged against the main brake surface 434 of the worm wheel 432. Accordingly, in the first position, the shaft 426 is directly coupled through the main clutch assembly to the motor shaft 420, and the shaft 426 and sewing machine are driven at a relatively fast speed. As will be seen below the worm wheel 432 is either driven at a relatively slow speed or is stopped. When the wheel 432 is rotating at its slow speed and the shaft 426 is at its second position, the shaft 426 and sewing machine will be driven at the slow speed. This follows since the disc 430 has been disengaged from the main clutch surface 436 of the flywheel 422, and has been engaged against the main brake surface 434 of the worm wheel 432.

A main clutch/brake solenoid (not shown) is connected to an air cylinder 438, and actuates a lever (not shown) which is connected to the shaft 426. When the clutch/brake solenoid is energized by the control system, the lever is actuated and moves the shaft 426 and disc 430 to its first clutching position for running the machine at fast speed. When the clutch/brake solenoid is deenergized by the control system, the lever is actuated and moves the shaft 426 and disc 430 to its second braking position for slow speed operation and braking of the machine, as well as thread cutting.

A free turning pulley 440 is mounted on a worm shaft 442 which is coupled to the worm wheel 432 by a worm gear 444. An auxiliary clutch/brake disc 446 is splined on the worm shaft 442, and can be moved by a pair of solenoids (not shown) between a first position with the disc 446 engaged against an auxiliary clutch surface 448 on the pulley 440, and a second position with the disc engaged against an auxiliary brake surface 450 on the wall of the housing 428. As shown, an endless belt 452 passes around the pulleys 424 and 440, thus driving the free turning pulley 440.

When the disc 446 is moved to its first clutching position, the pulley 440 drives the disc 446 through the clutch surface 448. Since the disc 446 is splined on the shaft 442, the disc 446 and shaft 442 in turn drive the worm wheel 432 through the worm gear 444, with the speed being suitably reduced relative the motor shaft 420 by the pulleys 424 and 440 and the worm gear arrangement. When the disc 446 is moved to its second braking position rotation of the worm wheel 432 is stopped, since the braking surface 450 stops rotation of the disc 446 which is splined to the worm shaft 442.

Under program control, the control system normally starts the machine at its fast speed responsive to a sequence of fast sew commands contained in program memory. In this configuration, the control system energizes the main clutch/brake solenoid to engage the disc 430 against the clutch surface 436 of the flywheel 422 for operation of the machine at fast speed, as previously described. At the same time, the disc 446 may be engaged against the auxiliary clutch surface 448 of the pulley 440 resulting in rotation of the worm wheel 432, which does not affect operation of the machine since it freely rotates on the shaft 426.

Shortly prior to completion of the sewing operation or prior to movement of the work holder without stitching, the control system operates the machine at the slow speed for a short period of time responsive to a few consecutive slow sew commands in memory. At this time, the control system deenergizes the main brake/clutch solenoid, and the disc 430 engages the brake surface 434 of the worm wheel 432. Since the worm wheel 432 is being driven at slow speed, the shaft 426 and sewing machine in turn is slowed to its slow speed. The Quick device 346 utilizes the needle down position signal from the slip ring assembly 348 of the synchronization unit 62, as previously described, to determine when the machine has been de-accelerated to the desired slow speed. When the machine is operating at its slow speed and when the last signal responsive to a slow speed command has been issued by the control system to the Quick device 346, the device 346 as modified performs the following operations.

The cut signal from the unit 62 changes state during the period of time between the needle down and up position of the machine. Immediately after both slow speed conditions are satisfied, as discussed above, the Quick device 346 awaits the first needle down configuration of the sewing machine, as indicated by one of the signals from the slip ring assembly of the unit 62. When the needle down signal has been received, the Quick device seeks the change of state for the cut signal which occurs before the next needle up position of the machine. When received the Quick device 346 initiates actuation of a tension release solenoid to release tension on the thread, and then actuation of the cutting device 314, described in connection with FIGS. 1 and 2, to cut the thread. When the thread has been cut, an End of Cut Signal is generated for the control system to indicate that the cutting operation has been completed. Meanwhile, the Quick device 346 stops the sewing machine at its needle up position as follows. Shortly after receipt of the cut signal from the unit 62, the Quick device 346 moves the disc 446, shown in FIG. 17, to its second position in engagement against brake surface 450 at the time of the next needle up position of the machine, as determined by the needle up signal from the unit 62, such that reciprocation of the needle is stopped in its needle up position with the needle removed from the workpiece.

As noted above, the addressable storage element which is preferred in this embodiment is a programmable read only memory unit, hereinafter termed a PROM. With the proper equipment, the operator of the automatic sewing machine according to this invention can change or add programs (i.e., instructions or a sequence of instructions) to a PROM. Depending on the information capacity of each storage location and the information content of each instruction, a single instruction may be stored in a single storage location. On the other hand, in the preferred embodiment of the invention, each instruction utilizes more than one storage location. The sequence of instructions stored describes a pattern which the automatic sewing machine work holder will follow. In this particular embodiment, the PROM has a randomly addressable eight binary digit (bit) word in each storage location and a total of 256 such locations.

Each instruction includes a command and work holder positioning data for the X and Y coordinate directions. In the preferred embodiment there are four commands. The first command directs movement of the work holder without stitching; the second directs movement of the work holder while stitching slowly; the third directs movement of the work holder while stitching at a fast rate; and the fourth indicates the end of the sequence of instructions and directs movement of the work holder to its home position. Each of the first three commands recited above utilizes two groups of positioning data to form a complete instruction. Each data group includes directional and stepping information necessary for a different one of the two coordinate directions to determine the next position of the work holder. While there are many possible ways of providing this information, it is preferred to construct each data group as a signed number which indicates the number of steps and the direction in which the work holder is to be moved. Thus, this particular embodiment of the invention utilizes an open loop system, that is, the work holder is removed from place to place during a sewing operation without the necessity of any feedback to indicate its present position. The maximum allowable number of steps in each coordinate direction during each sewing cycle is fifteen per instruction, although the number of steps permitted while operating the machine at its fast speed may be reduced slightly, e.g., twelve, due to possible timing restrictions, as will be seen below.

In this embodiment, each instruction, when written in binary utilizes twelve bits. The designation of the command portion of each instruction requires two bits and the work holder positioning data requires five bits for each coordinate direction, one for the direction (positive or negative) and four bits to designate the number of steps. As further described below, the control system reads three separate four bit words for use as a single twelve bit instruction. Once the PROM has been programmed, that is, once the PROM contains a sequence of instructions in a predetermined order to describe a desired sewing pattern, the sewing machine is ready for operation.

Figure 18:
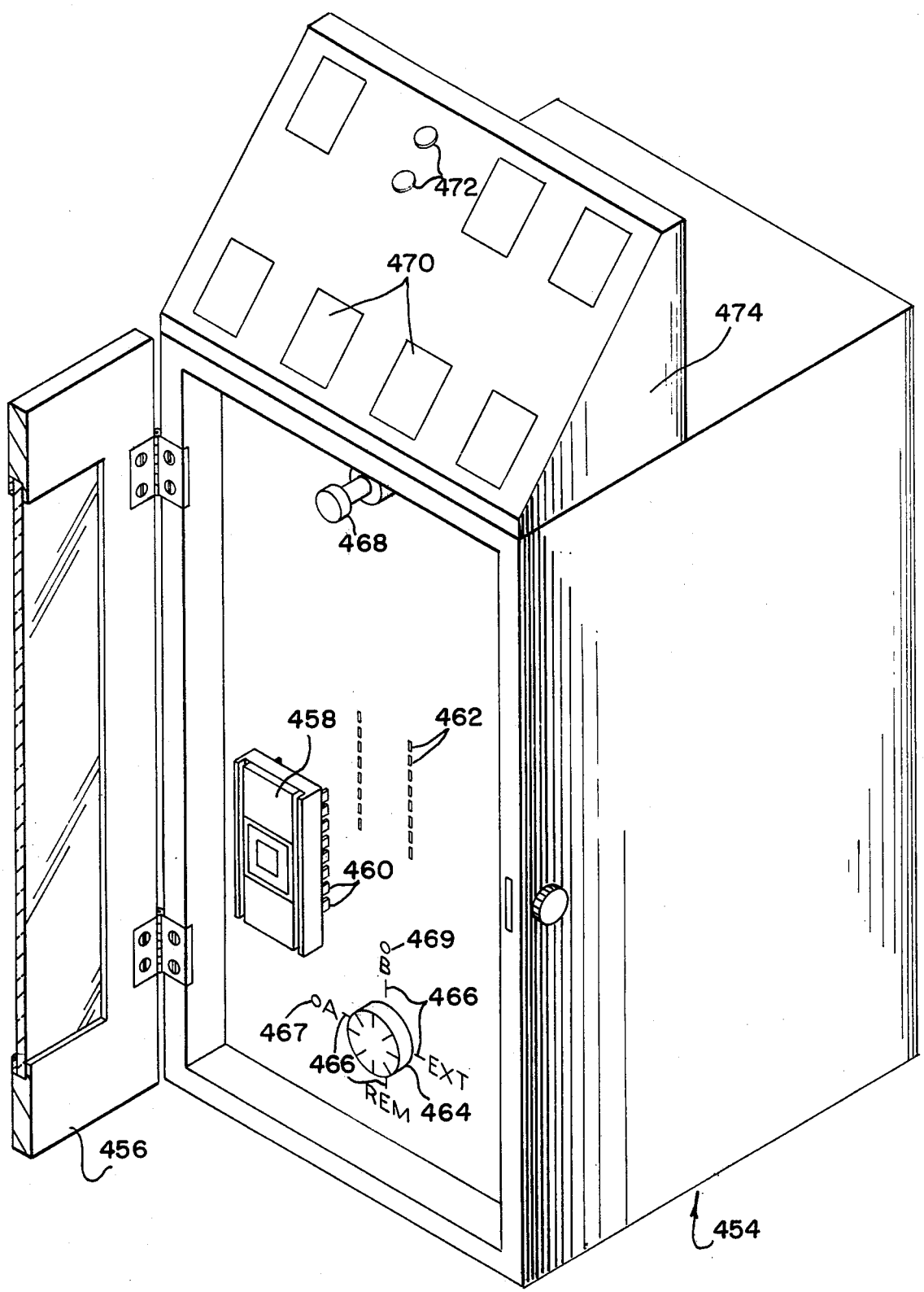
FIG. 18 is a fragmentary perspective view of a cabinet for the control system of the present invention.

Referring now to FIG. 18, there is shown a cabinet 454 for housing the control system of the present invention. As shown, the cabinet 454 may have a swinging door 456 which may be opened for connecting a programmed PROM 458 to the control system with electrical connectors 460 on the PROM being received in the sockets 462. A rotatable Program Select Switch 464 is provided to select the mode of operation for program control by setting the switch 464 at one of a plurality of positions 466, as indicated by suitable indicia on the front panel of the cabinet.

As will be seen below, each PROM may have two banks, termed Banks A and B, containing 256 four bit words. The control system begins reading the four bit words at a low order address in one of the banks, and reads three four bit words from sequential storage locations in the given bank to form the twelve bit instruction during each timing cycle of the sewing machine. In this manner, the control system sequentially reads the data from the bank. If two programs are sufficiently short to be programmed into 256 four bit words, one program may be placed entirely in Bank A, while the other program is located in Bank B. Before starting a sewing operation, the operator may select the desired program by placing the setting for switch 464 at the appropriate position 466, one position being provided for Bank A, and another for Bank B. In this configuration, when a sewing operation has been completed, the control system will remain selected at the chosen bank until the switch setting has been changed. For example, if Bank B had been selected by the switch 464, each sewing operation will be performed as directed by the program contained in Bank B, so long as the switch remains at the Bank B setting. As shown, lights 467 and 469 are provided to indicate the particular program bank being currently utilized by the control system, the light 467 representing Bank A, and the light 469 representing Bank B.

Alternatively, the operator may place the switch 464 at a third position, termed the Remote setting or mode. In this configuration, the operator may change program control between Banks A and B, as desired, by depressing a foot pedal. Assuming that a given sewing operation has been performed as directed by the program contained in Bank A, each subsequent sewing operation will be controlled by the Bank A program until the foot pedal has been depressed, which actuates a Remote Program Select Switch. Accordingly, the next sewing operation will be performed in accordance with the program contained in Bank B. The operator may again select Bank A by depressing the foot pedal, and the banks may be selected to perform sewing operations alternately from the two banks, if desired.

If the program is too long to be retained in a single bank, the first portion of the program is placed in Bank A, while the remainder of the program is located in Bank B. In this case, the operator selects a fourth position 466 by the switch 464, placing the system into an Extended mode. In this configuration, during each sewing operation the control system first reads the portion of the program contained in Bank A. When this part of the program has been completed, the control system automatically begins reading the remainder of the program located in Bank B for completion of the sewing operation. In this manner, a relatively long program may be utilized to perform a lengthy sewing operation without interruption of the sewing sequence. The lights 467 and 469 also indicate which program bank is being used by the control system during the Remote and Extended modes.

Of course, PROMS may be changes between sewing operations to connect different programs to the control system. As a precaution, power is removed from the control system while PROMS are being changed. As shown, an Interlock Switch 468 is provided which is actuated by the door 456. When the door 456 is open while PROMS are being changed, the contracts of the Interlock Switch 468 are also open, and disconnect the power supply from the control system. When the door has been closed after the PROMS have been changed, the switch 468 and its contacts are also closed, thus connecting the power supply to the control system. Accordingly, a necessary condition for operation of the control system is that the door 456 has been closed.

A plurality of suitable switches 470 and lights 472 are also provided on a front panel 474 of the cabinet for controlling and monitoring the operation of the control system and sewing machine. As will be described in further detail below, one of the lights 472 may indicate when an overtemperature condition exists for the stepping motor drive circuits, and the other light may indicate that power for the control system has been turned on.

As will be seen below, actuation of a momentary Reset Switch on the panel initializes the control system for performing a sewing operation, and may be utilized in an emergency situation to terminate a sewing operation prior to its normal completion. Another switch, termed the Clamp Switch, may be utilized to cause mandatory lowering of the clamps, or place them under automatic control of the foot pedals and control system. A third switch may be utilized to override operation of the thread break sensor, in case it is desired to use the machine without thread, e.g., for checkout purposes. A fourth switch, called a Pattern Drive Switch, may be utilized to inhibit operation of the X and Y stepping motors during check-out of the machine. Of course, one of the switches 470 may be utilized to control power turn on and turn off for selectively supplying power to the control system and machine.

A Normal/Service Select Switch has already been described. When this switch is placed in its Normal setting, the control system operates in its normal condition for performing sewing operations while utilizing the signal from the Primary Needle Disengage Sensor 414 of the unit 62 for synchronizing initiation of work holder movement. The Service setting of the Normal/Service Select Switch is utilized by a serviceman during check-out of the machine. In this configuration, the machine does not operate until a Jog Switch on the panel 474 is actuated, at which time the machine performs the sewing operation under program control at slow speed until the Jog Switch has been reset. As previously discussed, the control system utilizes the Auxiliary Needle Disengage Sensor 412 of the unit 62 to synchronize movement of the work holder during the Service mode.

Figure 19:
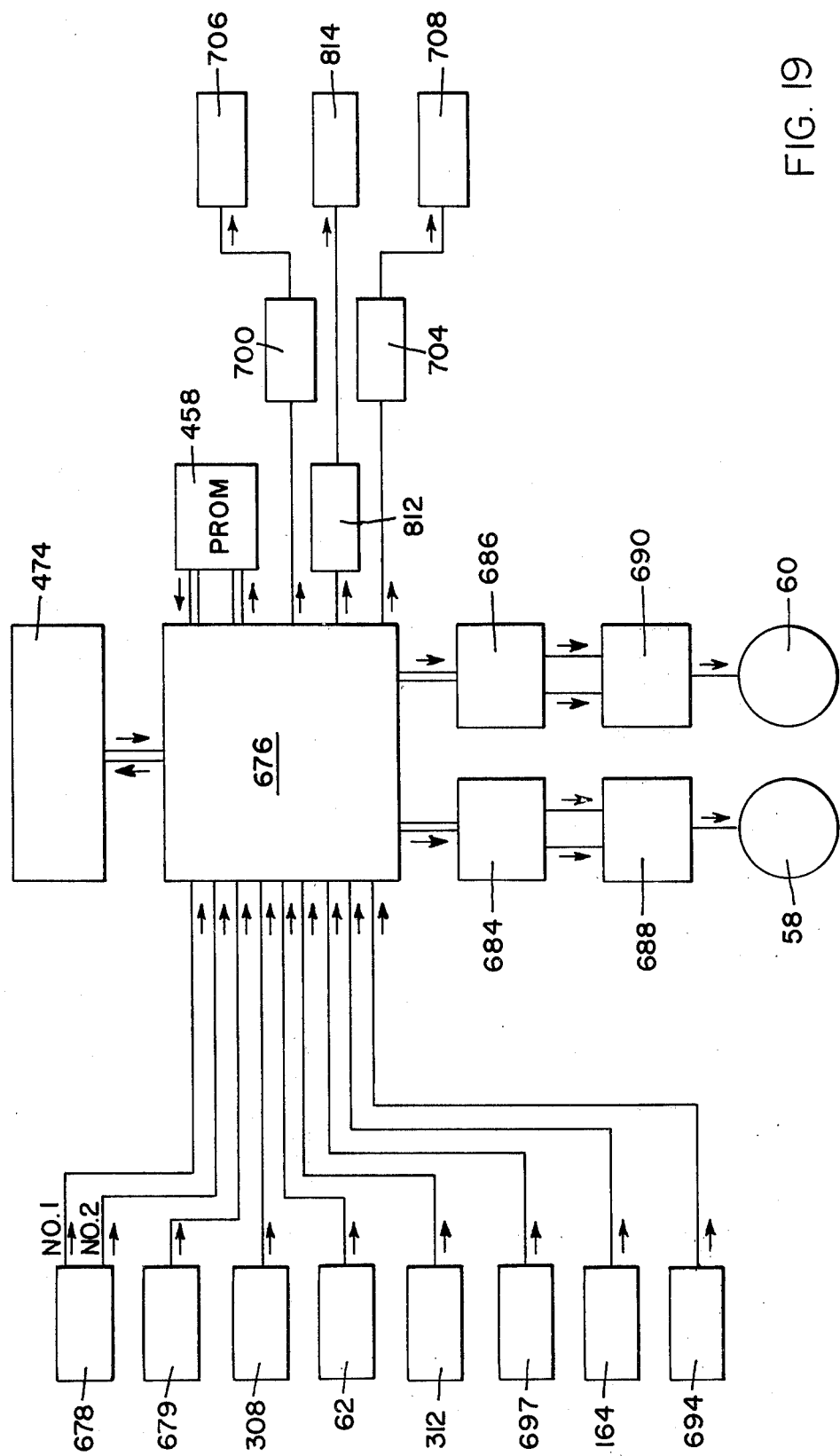
FIG. 19 is a block diagram of the electrical signal flow paths for the sewing machine of FIG. 1.

Referring now to FIG. 19, the operation of the sewing machine is controlled by a central control logic 676. First the operator places a workpiece in the proper position in the work holder 56. Then, when the first foot pedal 678 of the sewing machine is fully depressed by the operator, actuating the Pedal Clamp No. 1 and 2 Switches during placement of the fabric and label in the work holder, as previouly described, the central control logic 676 generates signals to lower the clamps and hold the fabric and label. After the clamp has been lowered, the second foot pedal 679 is depressed by the operator to actuate the Pedal Go Switch, and, if the clamps have been fully closed, as indicated by the clamp Sense Switch 308, automatic operation of the machine begins. In normal operation, a homing cycle is first initiated. Thereafter, the first instruction is read by the logic 676 from the storage element 458, here shown as a PROM, according to the setting of the Program Select Switch 464 on the front panel 474. This logic responds by providing the correct number of pulses for moving the work holder, and, after a signal from the electromechanical synchronization unit 62, transmits these pulses to motor drive logics 684 and 686. The drive logics 684 and 686 drive respectively power drivers 688 and 690 which in turn drive stepping motors 58 and 60 in the desired direction and through the desired rotation.

The pulses to the drive logics 684 and 686 are arranged to be aperiodic to increase the machine cycle rate, and to prevent unwanted oscillations and therefore unwanted feeding of the workpiece against the needle. The workpiece thus moves in a true intermittent motion, the workpiece being stationary when the needle is inserted into it. More particularly, the central control logic 676 includes means for spacing the first three pulses of a series of pulses and the last two pulses of the series further apart than any remaining intermediate pulses. The next instruction is then read and carried out, followed by the one after that, etc., until the last instruction has been implemented. In response to the last instruction which will be a stop command (i.e., End of Program), the central control logic causes the Quick device to halt the sewing machine, causes the thread to be cut, and then initiates a second homing cycle. The homing cycle is controlled by the central control logic, which, in response to the signals from the homing optical sensors 164 and 694, cycles the stepping motors to return the work holder to its radial and rotational home location.

Other inputs to the central logic are from circuitry 697 which generates the End of Cut Signal after the thread has been cut, and the Thread Break Sensor 312 which signals the control logic 676 of a break in the needle thread. Upon receipt of a break signal from the sensor 312, the control logic 676 causes the Quick device to halt the sewing machine, and inhibits any further movement of the work holder by stopping the incrementation of an address counter 772 (FIG. 20) which sequentially addresses the storage element. Thus, the address in address counter 772 is preserved and the control logic 676 waits for a signal from the front panel before starting up again. As will be explained hereafter, once the thread or needle has been repaired and replaced, the operator may restart the machine at the beginning of the sewing pattern or restart it at the instruction following the instruction at which the break occurred.

Depending upon whether an instruction requires slow or fast stitching, the control logic 676, in response to that instruction, will signal, through a driver 700, a control box 706 of the Quick device to cause the machine to stitch at the required speed. If a stop command is read, the control logic 676 deactivates the main brake/clutch valve solenoid 708, associated with the Quick device, through a driver 704 to initiate the stopping sequence of the sewing machine.

Figure 20:
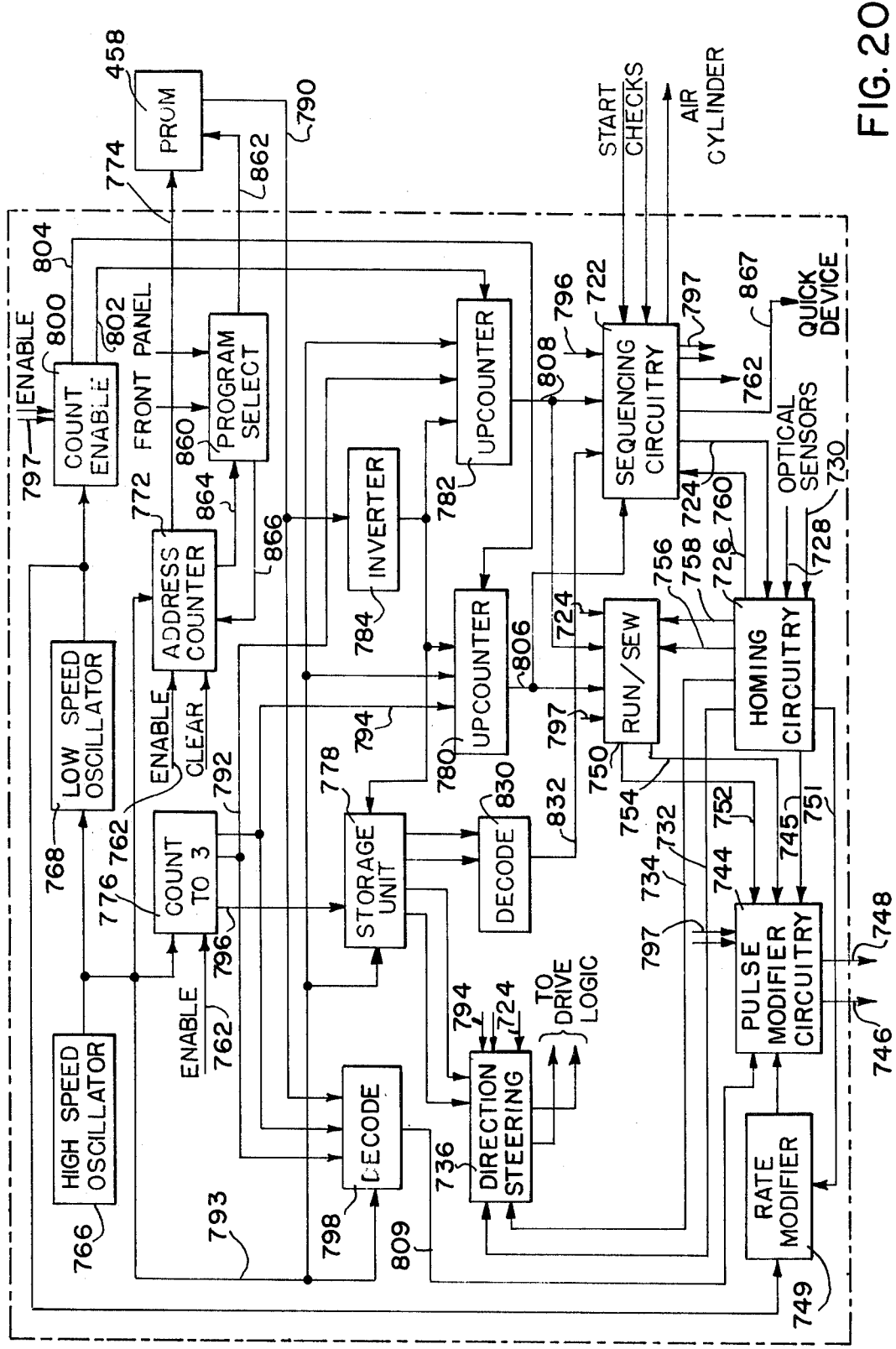
FIG. 20 is a block diagram of the central control logic for the sewing machine of the present invention.

The control logic 676 of FIG. 19 is shown in greater detail in FIG. 20. A sequencing circuitry 722 monitors over the cable labeled CHECKS: (a) inputs from synchronization unit 62; (b) Clamp Sensor 308; (c) Thread Break Sensor 312; (d) cutter circuitry 697; (e) front panel 474; and (f) optical sensors 164 and 694 for both coordinate directions. Signals from the switches in foot pedals 678 and 679 are read over the line labeled START. Gating logic circuits provided within the sequencing circuitry serve to halt machine and work holder operation if the proper operating conditions are not maintained. When the operator depresses the pedal 679 to actuate the Go Pedal Switch, this causes an enabling signal on line 724 to appear and initiate the first homing cycle when the Clamp Sensor indicates the work holder is closed. This homing insures that the work holder will be located at a predetermined initial position at the beginning of a sewing sequence.

Homing circuitry 726 operates together with the homing sensors and assemblies to preset the work holder at the desired locations for sewing in each of the two coordinate directions. As previously discussed, the coordinate directions are called X and Y, corresponding to a rectilinear coordinate system, although in the preferred embodiment the coordinate system is based on polar coordinates modified to approximate a rectilinear system. The homing circuitry, in response to the enabling signal over line 724 from the sequencing circuitry 722, provides output signals over lines 732 and 734 to a direction steering circuitry 736, based upon the inputs from optical sensors 164 and 694 over lines 728 and 730. These output signals indicate the direction in which the stepping motors should be moved. Direction steering circuitry 736 gates the signals on lines 732 and 734 to the motor drive logics 684 and 686 to control the direction of movement of the motors 58 and 60. The homing circuitry 726 also enables a pulse modifier circuitry 744 by a signal over line 745 so it is in condition to be enabled to provide output electrical pulses over lines 746 and 748 from the low speed 768. After the first homing approach, this output is preferably reduced in frequency by a rate modifier circuitry 749 to motor drive logics 684 and 686, as will be explained hereinafter, by the signals over a command line 751 for homing circuitry 726.

Pulse modifier circuitry 744 is enabled to gate these pulses to the motor drive logic by signals from a run-/sew circuitry 750 over lines 752 and 754. Signals on one of these lines control the gating of pulses to one of the motors 58 or 60 while signals on the other control the gating of pulses to the other motor. The signals on lines 752 and 754 are provided by the run/sew circuitry 750 in the homing mode by a set of input signals over lines 756 and 758 from homing circuitry 726 when there exists an enabling signal over line 724 from the sequencing circuitry 722. The absence of signals over one of lines 756 or 758 and thus one of lines 752 or 754 causes the pulse modifier circuitry to inhibit pulsing to the corresponding stepping motor. This occurs whenever the home position for the corresponding coordinate direction has been achieved. For proper operation of the pulse modifier circuitry during the homing cycle, there must be enabling signals over line 745 and one or both of lines 752 or 754.

In all cases, the stepping motors overshoot the home position. When this occurs the optical sensors generate a signal which causes the motor involved to reverse and zero in on the correct home position. This is done by changing the signals over lines 732 and/or 734 according to information from the optical sensors to reverse the direction of one or both stepping motors. The homing circuitry also includes additional logic circuitry for ensuring that the final approach of each motor to its home position is always from the same direction irrespective of the initial position of the work holder prior to homing. In addition, all homing motion after the first home approach in the basic home mode is accomplished at a reduced rate generated by rate modifier circuitry 749. Means in the homing circuitry 726, responsive to the optical sensor outputs, provide the signal over command line 751 for causing the stepping rate to be reduced. This mixture of stepping rates creates an optimally fast and accurate homing cycle.

In this particular embodiment there is always at least one change of direction of approach to the home position for each motor. If, after reversing the motor, the second approach direction during the auxiliary home mode is not the same as an approach direction predetermined in advance, the direction of motor rotation is automatically reversed again by logic in the homing circuitry which senses the direction of approach, and a third and final approach during a subauxiliary home mode is made from the predetermined approach direction for the motor or motors involved. In this way, greater accuracy in positioning the work holder is achieved. As will be seen below, the work holder is moved slightly past the zero crossing position indicated by the homing sensors in both the X and Y directions.

When the first homing cycle has been completed a signal is placed by the homing circuitry on line 760 from the homing circuitry 726 to the sequencing circuitry 722. In response to this signal, the enable level on line 724 is immediately removed by the sequencing circuitry thereby preventing further movement of the work holder at this time. The sequencing circuitry then initiates a memory cycle by generating an enable signal level over a line 762. This signal level allows words from storage element 458 to be addressed and read as follows. The output of a high speed oscillator 766 is reduced by a counter here labeled low speed oscillator 768 whose output is one-tenth the frequency of the high speed oscillator. The low speed oscillator 768 provides periodic pulses which determine the rate at which the stepping motors will be driven. The enable signal on line 762 enables the address counter 772 whose output on line 774 represents the address of the work which will be read from the storage element. The enable signal on line 762 also enables a count to three counter 776 whose outputs determine into which of three receiving units the four bit words are separately placed. The three units comprise a storage unit 778 which receives the command portion of the instruction and the signs of the coordinate directions, upcounter 680 and upcounter 782. The two upcounters and storage unit respectively receive the work holder positioning data for each coordinate direction and command information in one's complement inverted form after it is inverted by an inverter 784 comprising several inverting gates.

In operation, the first clock pulse output of the high speed oscillator 766, after line 762 is enabled, increments address counter 772 resulting in a new four bit word being availble from the storage element over lines 790. The same clock pulse also increments the count to three counter which causes an enabling signal to appear on one of its output lines, namely line 792 corresponding to a count of one. This in turn enables the upcounter 782 to store the four bit word containing Y position data in inverted form. The inverted four bit word is entered into the upcounter 782 by the trailing edge of the same first clock pulse over line 793.

In the same fashion, the next clock pulse from the high speed oscillator increments counters 772 and 776, and causes the inverse of the next addressed four bit word to be read into upcounter 780 as determined by an enabling signal from count to three counter over line 794. This corresponds to a count of two.

The third clock pulse from the high speed oscillator again increments counters 772 and 776 and causes the next addressed four bit word to be read in inverted form into storage unit 778 as determined by an enabling signal from the count to three counter over line 796. This corresponds to a count of three. The enabling signal on line 796 is also provided by a connection to the sequencing circuitry 722 in response to which the enabling signal on line 762 is removed. As a result, the count to three counter 776 is reset to zero, and address counter 772 is not incremented at this time. Accordingly, one complete instruction of twelve bits has been read from the memory and is stored, parts in each of upcounters 780 and 782, and storage unit 778.

All that remains to utilize this instruction is to translate it into movement of the stepping motors 58 and 60 and into motion of the sewing machine, as required. Where the read instruction required a sewing operation, that is accomplished by a signal from the synchronizing unit 62 which is connected to the sequencing circuitry over one of the lines entitled CHECKS, and which causes the sequencing circuitry to provide enabling signals over lines 797 indicating that the needle is clear of the workpiece. Where the read instruction did not require stitching, the equivalent of the Needle Disengage Signal from unit 62 is generated internally by logic means within the sequencing circuitry to produce enabling signals over lines 797 a short time after the new instruction is read into storage. In either instance, the enabling signals over line 797 are connected to the pulse modifier circuitry 744 which allows the stepping motors to be driven in accordance with the outputs of upcounters 780 and 782 whenever appropriate signals are present on lines 752 and 754.

After the enabling signals are provided on lines 797, clock signals from the low speed oscillator increment upcounters 780 and 782 through a count enabling circuitry 800 over lines 802 and 804. At the same time, the same clock signals from the low speed oscillator are connected to pulse modifier circuitry 744. Pulse trains from the pulse modifier circuitry to drive each stepping motor are derived from these low speed clock signals for each coordinate direction.

The outputs of upcounters 780 and 782 determine the number of output pulses there will be to step each motor in a given coordinate direction. The directions are determined by the direction indicating portions of the wood stored in storage unit 778. The direction indicating portions are gated to the stepping motor drive logic by the direction steering logic 736. The number of output pulses to each motor corresponds to the data, the inverse of which was initially stored in the upcounters. The upcounters are constructed so that, when they have been incremented a number of times equal to the number of steps specified in the instruction, a separate carry output appears on lines 806 and 808. The carry outputs are sent to the run/sew circuitry and affect the pulse modifier circuitry 744 by run/sew circuitry 750 response over lines 752 and 754. As noted above, signals over one or the other of lines 752 or 754 indicate that a proper amount of input pulses from the low speed oscillator have been received for a particular coordinate direction. When each or both carry outputs appear (and, of course, they need not appear in the same clock cycle) the sequencing circuitry 722 causes the corresponding enable signals on lines 797 to be removed independent of each other, thereby indicating when the information for each coordinate direction contained in the instruction last read from the memory has been utilized.

The pulse modifier circuitry operates as follows. During the homing cycle where there is the enabling signal on line 745, pulses from the low speed oscillator are applied to the stepping motors in the coordinate direction or directions indicated by the signals on lines 732 and 734. During that portion of the logic operation when there are enabling signals on lines 797 due to a single instruction being utilized, the periodic pulses from the low speed oscillator 768 are gated according to the data stored in the upcounters 780 and 782 to provide pulse trains to the stepping motor drive logics over lines 746 and 748. If the number of steps in a coordinate direction is at least four, the associated upcounter or counters is precounted by one count, after which the pulse train for that direction is derived as follows.

After the enable signals on lines 797 appear, the first clock signal from the low speed oscillator is passed through the pulse modifier circuitry to the drive logic. The second and third clock signals from the low speed oscillator are blocked and an initial delayed pulse is added by the pulse modifier circuitry approximately equidistant between what would originally have been the second and third clock signals. The clock signals from the low speed oscillator after the third clock signal pass through circuitry 744 essentially unchanged as long as there is no change in signal level over whichever one of lines 752 or 754 corresponds to the coordinate direction concerned. After a change in signal level on one of lines 752 or 754 further clock signals from the low speed oscillator are blocked from forming part of the output pulse train for that coordinate direction. Thereafter two additional terminal delayed and spaced pulses are automatically added by the pulse modified to the otherwise terminated output pulse train. These pulses are added at predetermined intervals of time following the last pulse in the train, the time intervals being greater than the time between pulses from the low speed oscillator. As a result, the drive pulses to the stepping motors are aperiodic, having a somewhat lower frequency at both the beginning and end of the pulse train and a higher frequency in the middle of the pulse train. This allows an increased machine cycle rate with smaller oscillations and therefore more accurate positioning.

If the number of steps in a particular coordinate direction is equal to three, this information is stored in decode circuitry 798, and is made available to the pulse modifier circuitry 744 over one of the lines 809. In response, the pulse modifier circuitry 744 alters its normal operation as described above, in order that the upcounter precount of one is inhibited and only one delayed terminal pulse is added upon appearance of the carry pulse for that particular coordinate direction.

When the information from storage element 458 was entered into upcounters 780 and 782, if the number of steps specified for either coordinate direction was one or two, this information was stored in decode circuitry 798 and is made available to the pulse modifier circuitry over line 809. The pulse modifier circuitry in response to this information from decode circuitry 798 alters its normal operation, described above, so that, if only two stepping pulses are required, only the initial delayed pulse is added and if only one pulse is required neither the initial nor the terminal delayed pulses are added.

When the called for number of X and Y steps has been obtained, as indicated by a change in the carry out signals from the upcounters, the associated enable signals 797 are removed. When both enabling signals have been removed, the sequencing circuitry, after a short delay, starts a new memory cycle, and provides an enable signal over line 762 to read the next instruction from memory. The operation of control circuitry 676 then repeats until an end of program signal is encountered.

Storage element 778 stores the command and direction information as described above. Each bit of the command is connected to decode circuitry 830. Each output line of decode circuitry 830 collectively labeled 832 is associated with a particular command. The decode circuitry decodes the command stored in unit 778 and provides an enabling signal pulse on the one of its output lines 832 associated with that command. Output lines 832 are connected to the sequencing circuitry 722 where the commands are latched and amplified before being sent on to the Quick device over line 867 to control the operation of the sewing machine.

The sequencing circuitry utilizes the signals over lines 832 for two purposes. First to diferentiate between stitch and no stitch commands to effect proper operation of the Quick device, and, second, in response to a stop command or an end of program command, to provide normal stopping and thread cutting between tacks of the same program and for end of program sequencing which includes signalling cutter circuitry 697 to cut the thread and return the work to its home position. To accomplish the latter operation, an enabling signal on a line 724 is generated in response to the End of Cut Signal from the cutter circuitry 697 in the presence of an "end of program" signal or command over one of the lines 832. After this second homing cycle is completed, the clamps are raised in response to a signal from central control logic 674 to a solenoid actuated air valve 814 through driver 812 so that the workpiece can be removed.

The Quick device utilizes the signals over lines 867 from the sequencing circuitry 722 to stitch fast or slow, and to initiate a needle up and trim in response to the stop or move without stitching commands.

As shown in FIG. 20, program select circuitry 860 in response to the Program Select Switch has an output over line 862 which indicates to the PROM whether to choose the program from Bank A or B. The program select circuitry 860 and address counter 772 are interconnected by lines 864 and 866 to control switching between memory banks, as will be further described below.

Figure 21A:
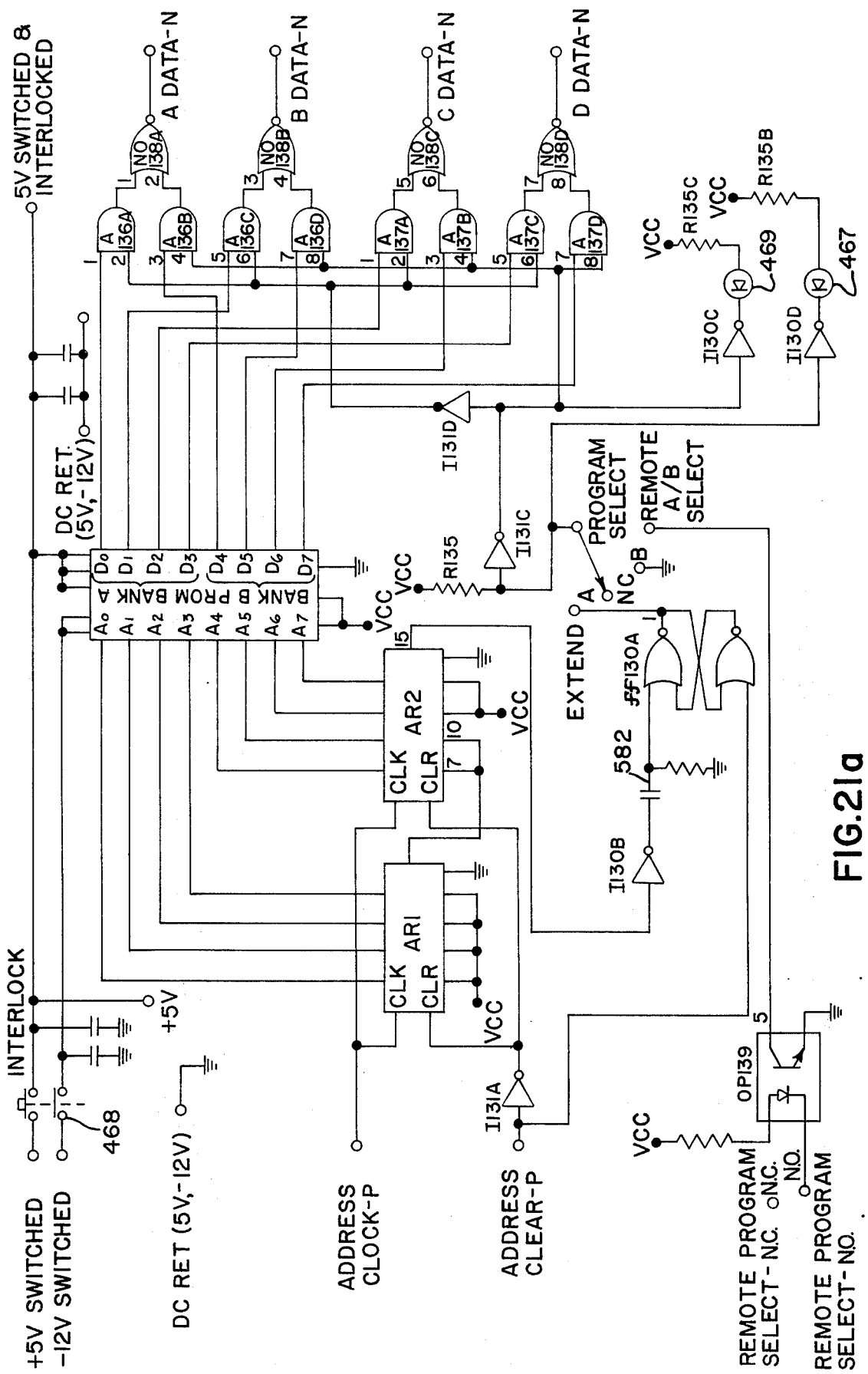
FIG. 21a–21o are schematic views of electrical circuitry for the control system in the sewing machine of the present invention.
Figure 21G:
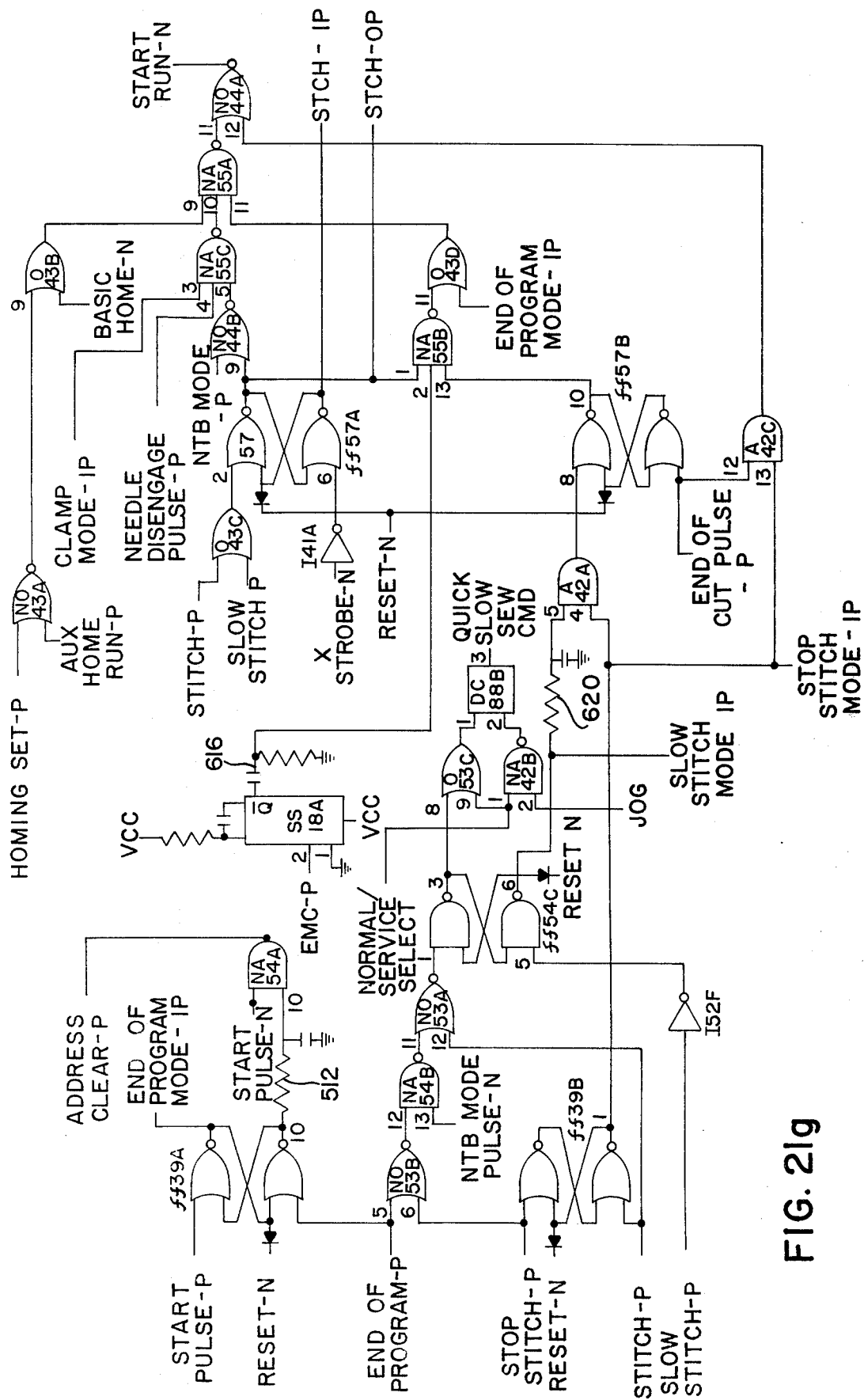
Figures 21H, 21L:
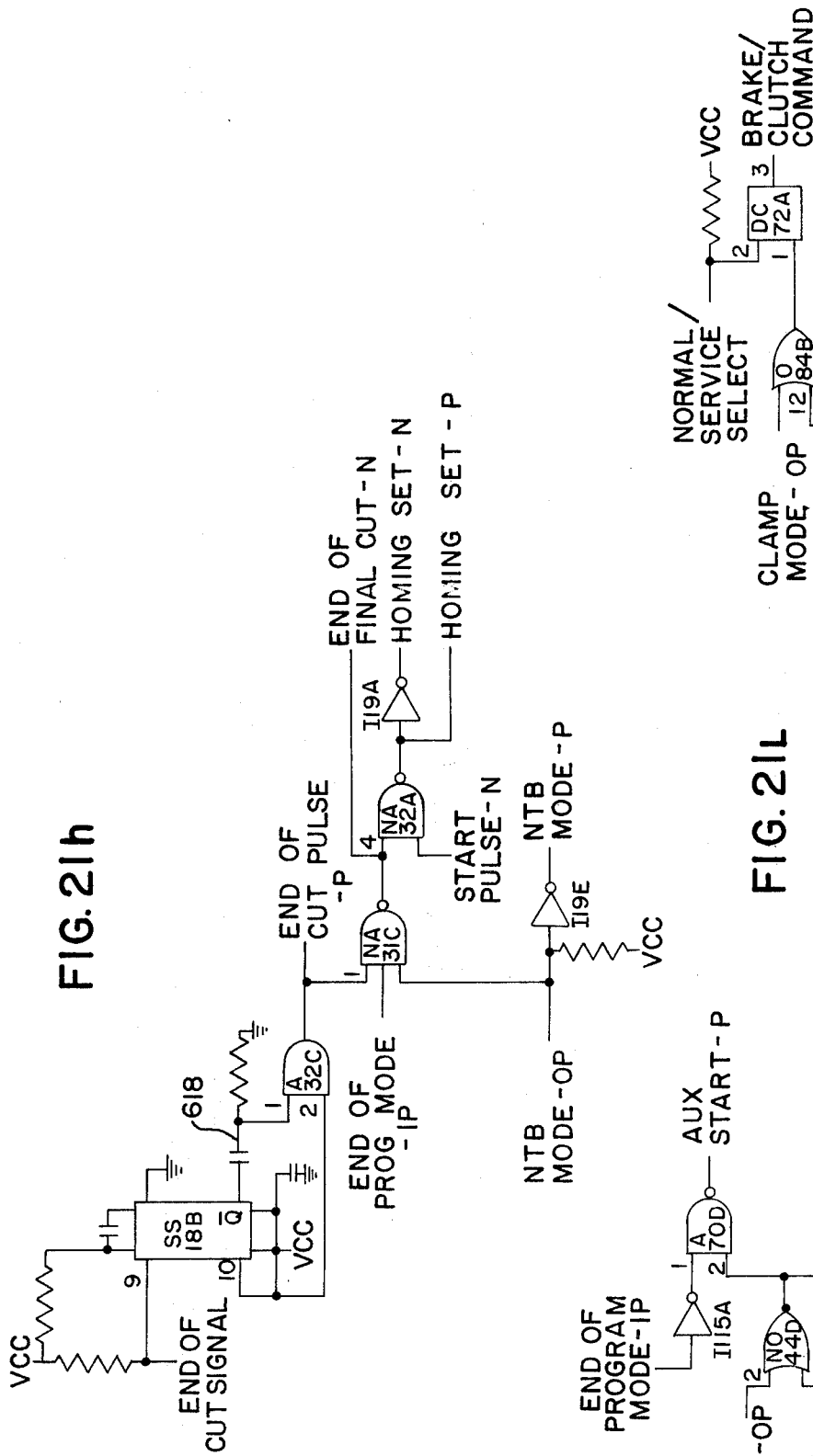
Figure 21J:
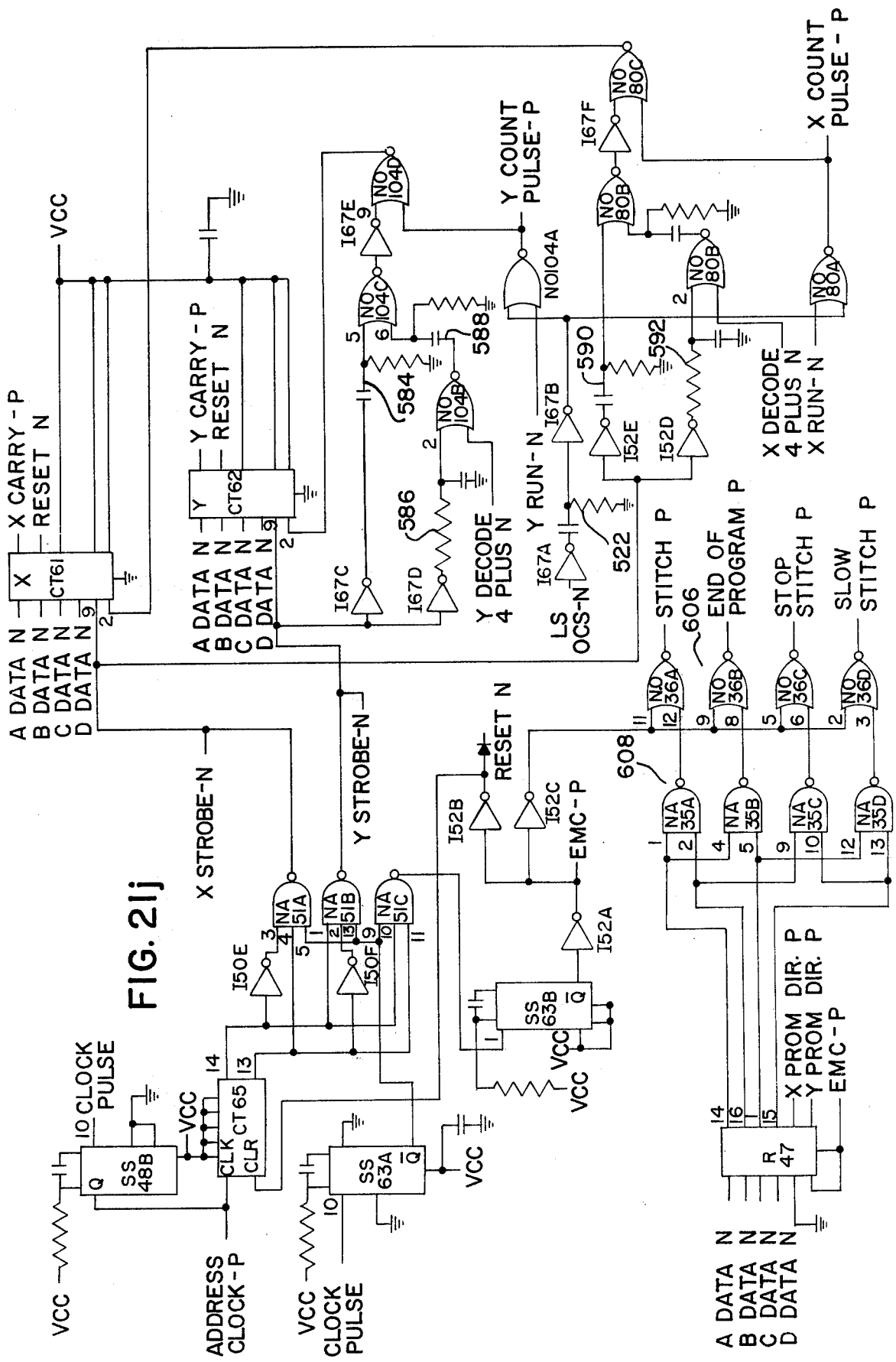
Figure 21K:
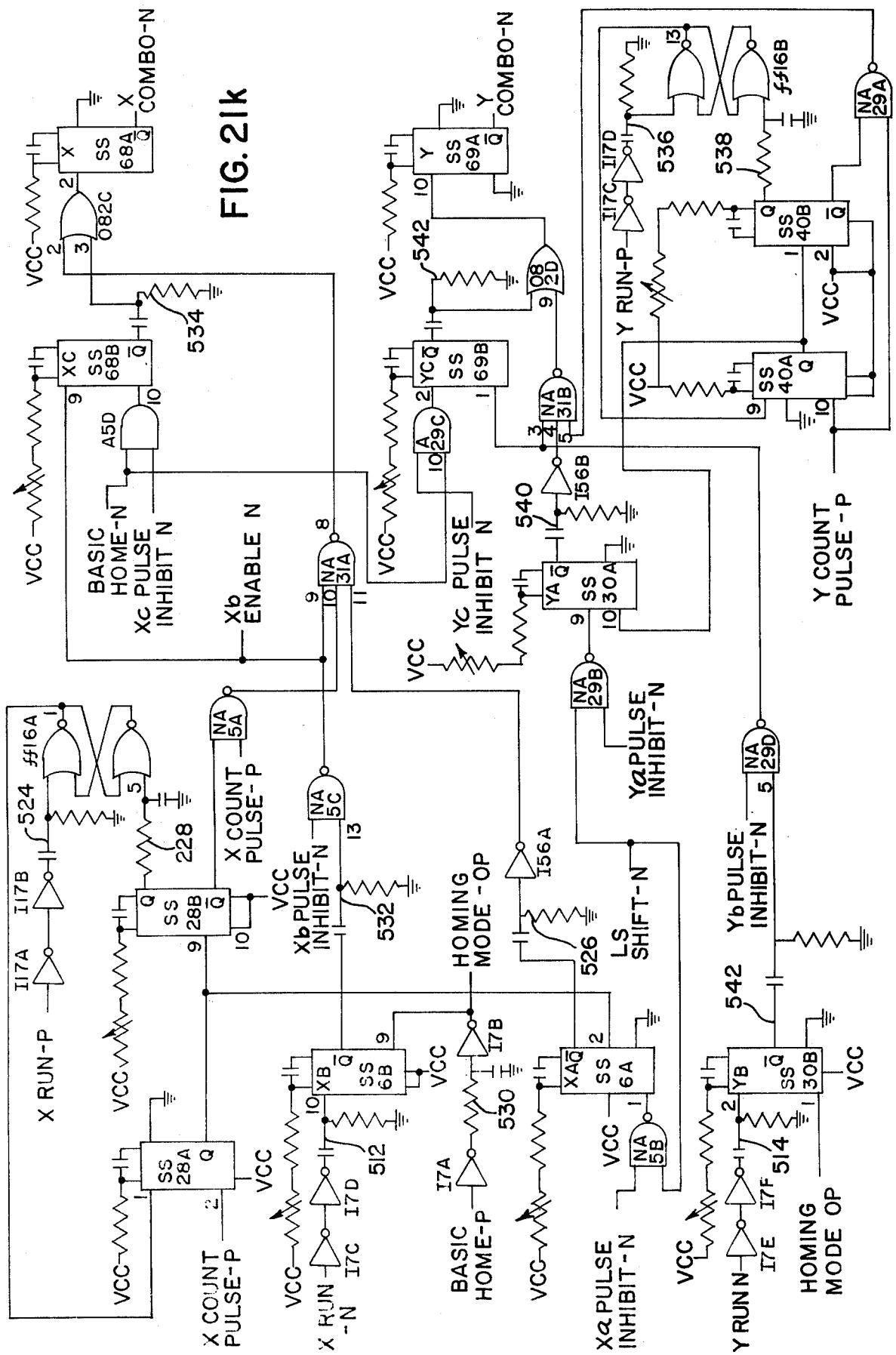
Figure 21M:
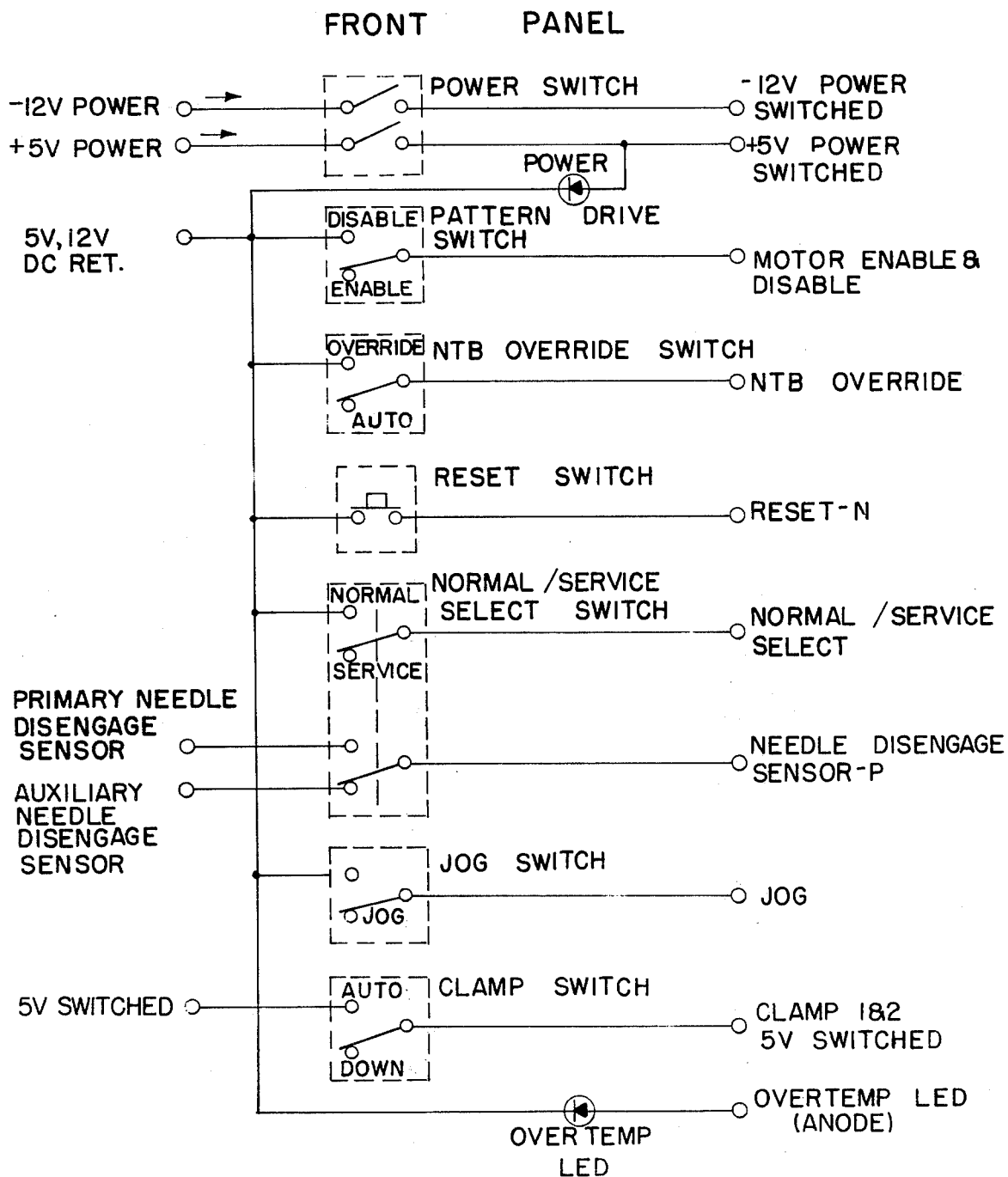

The detailed electrical circuitry of the control system will be described in connection with FIG. 21. As shown in FIG. 21m, the power supply for the sewing machine includes a +5 volts power source and a −12 volts power source. When the Power Switch in the front panel 474 of the cabinet 454 (shown in FIG. 18) is closed, the power sources are connected to the control system as +5 Volts and −12 Volts Switched. When the desired PROM has been placed in the cabinet and the cabinet door has been closed, the Interlock Switch is also closed which connects the power source +5 Volts Switched to the system as +5 Volts Switched and Interlocked, as shown in FIG. 21a. Accordingly, the power sources do not energize the control system until the cabinet door and Interlock Switch are closed. The +5 Volts Switched and Interlocked power source, which will be referred to hereinafter as Vcc, is primarily utilized to energize the electrical circuitry of the control system described as follows. As shown in the drawing, both the +5 volt and −12 volt power sources are returned to ground.

As shown in FIG. 21b, the +5 volt Vcc power source is supplied to a Reed Relay upon power turn-on if the Interlock Switch has previously been closed, or when the Interlock Switch is closed if power has previously been turned on. The Reed Relay may be of the type sold by Sigma Instruments, Inc. of Braintree, Mass., and identified as Part No. 191TE1C6-55. When the source Vcc is initially supplied to the circuit shown in FIG. 21b, the line Reset-N is clamped to ground by the Reed Relay, and energization of the Reed Relay by Vcc is delayed approximately 10 milliseconds by the resistor R74 and the capacitor C109. During this delay, the line or signal Reset-N remains at a ground or lo state. Once the Reed Relay is energized, after the 10 millisecond delay, Reset-N is disconnected from ground, and is set at approximately 3½ to 4 volts by the supply Vcc, the resistor R75 and R76, and the capacitor C108. Thereafter, the signal Reset-N remains at its hi state throughout operation of the system unless the power supply is reapplied to the Reed Relay, through use of the Power or Interlock Switches, or unless the Reset Switch on the front cabinet panel is closed. As shown in FIGS. 21a and m, the Reset Switch is normally open, and may be closed by the operator in the event of an emergency situation, or if it is desired to restart the entire sequence of the control system without turning the power supply off. As shown, the signal Reset-N is grounded during the period of time that the momentary Reset Switch is closed by the operator.

During the period of time that the signal Reset-N is grounded or lo, Reset-N is utilized to initialize various flip flops and other components of the control system. As will be seen in the various circuits described below, Reset-N is isolated from many of the components, particularly the flip flops, by various diodes when the signal Reset-N returns to its hi condition. Reference is made to FIG. 21g for an example of the manner in which the signal Reset-N initializes the control system. As shown, the signal End of Program-P, which is lo at this time, and Reset-N are connected as inputs to a NOR gate in the flip flop ff39A. Accordingly, when the signal Reset-N goes lo, the flip flop is reset, such that the output 10 of the flip flop is reset hi, while the signal End of Program Mode-1P is reset lo.

Figure 22:
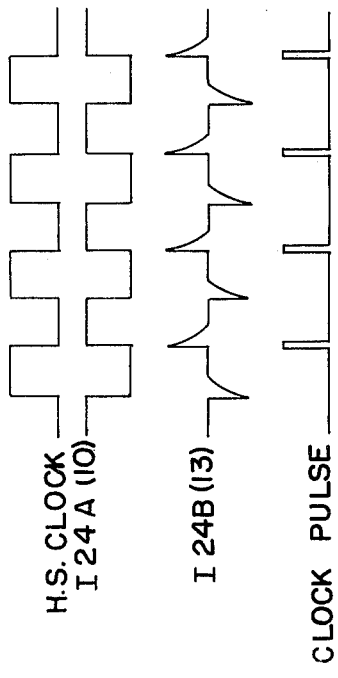
FIG. 22 is a timing diagram of clock signals formed by the control system of the present invention.

As shown in FIG. 21c, a High Speed Oscillator H.S.O. is energized by Vcc through a circuit 500 of various resistors and capacitors. The High Speed Oscillator H.S.O. generates a square wave signal at a rate of 8500 cycles per second as the signal H.S. Clock. The H.S. Clock signal from the oscillator is connected to the inverter I24A which inverts the clock signal at its output I24A(10), as illustrated in FIGS. 21c and 22. The inverted H.S. Clock signal is differentiated by a differentiator circuit 501, comprising a capacitor C86 and resistor R22, the latter of which is connected to ground, such that a train of sharp positive pulses is generated by the differentiator circuit 501 on the leading edge of the signal I24A(10) and passed to the inverter I24B at its input 13. The positive pulses generated by the differentiator circuit 501 are inverted by the inverter I24B and passed to the NOR gate NO38A at its input 12. When the signal Mem Cycle Enable-N later goes lo, the lo pulse train at NO38A(12) is inverted by the gate NO38A, such that the signal Clock Pulse is formed, as shown in FIG. 22. The signal clock Pulse comprises a train of narrow positive pulses which are generated at the trailing edge of the H.S. Clock signal from the high speed oscillator. However, as shown in FIG. 21d, the signal Reset-N resets the signal Mem Cycle Enable-N at its hi state during initialization of the control system. This follows since during the period of time that Reset-N is temporarily in its lo condition, both inputs 5 and 6 of the flip flop ff34A are lo, and Memory Cycle Enable-N is accordingly reset hi. Thus, as shown in FIG. 21c, after initialization the signal Clock Pulse is inhibited and maintained lo by Mem Cycle Enable-N being hi until Mem Cycle Enable-N is later set lo, as will be discussed below.

As further shown in FIG. 21c, the H.S. Clock signal is connected to input 1 of a count-to-ten counter CT2 of known type. The counter has an internal divide by five circuit and an internal divide by two circuit, which may be connected for use in the following manner. As shown in FIG. 21c and 23, the counter output 12, designated CT2(12), changes state corresponding to the trailing edge of every fifth pulse in the signal H.S. Clock. Thus, the counter CT2 acts as a frequency divider at the rate of ten, such that a pulse train of 850 cycles/seconds is formed at the output of the counter CT2. As shown, the divided pulse train is connected to a count-to-two counter CT13 at its input 14 and to a NOR gate NO23A. The output of counter CT13 changes state corresponding to the trailing edge of every pulse from the counter CT2 and every tenth pulse from the signal H.S. Clock. Accordingly, the counters CT2 and CT13 act as a frequency divider at the rate of twenty, to form the pulse train of 425 cycles/second at the output CT13(12) of the counter CT13 which is connected to the inverter I24C.

The low speed pulse train from the counter CT13 is inverted by the inverter I24C, and the inverted pulse train is connected to the NOR gate NO23B at its input 11. As shown in FIG. 21e, the flip flop ff45A of NAND gates is reset at its input 2 by Reset-N during initialization, such that LS Shift-N is reset hi at this time. Accordingly, as shown in FIG. 21c, when the signal LS Shift-N is hi, it inhibits the output of NOR gate NO23B, such that the signal Homing LS Osc-P remains lo until LS Shift-N is later set lo. The signal LS Shift-N is also connected to the inverter I24D, and the input 3 of NOR gate NO23A is thus lo when the signal LS Shift-N is hi. Accordingly, since LS Shift-N is now hi, the modified pulse train of 850 cycles/second is inverted by the NOR gate NO23A and passed to input 5 of the NOR gate NO23C. Since the output of gate NO23B, Homing LS Osc-P, is now lo, the inverted pulse train from gate NO23A is again inverted by the gate NO23C, such that a modified pulse train of 850 cycles/second, corresponding to the output of the counter CT2, is formed at its output as the signal LS Osc-N.

At a later time, when the signal LS Shift-N is set lo, the NOR gate NO23B again inverts the pulse train from the inverter I24C, and forms a low speed pulse train of 425 cycles/second, corresponding to the output of counter CT13, as the signal Homing LS Osc-P at its output. The signal LS Shift-N is inverted by the inverter I24D, and the output of NOR gate NO23A is accordingly set lo when LS Shift-N is lo. Since the signal Homing LS Osc-P is connected to the NOR gate NO23C at its input 6, and since input 5 of gate NO23C is lo, the low speed pulse train Homing LS Osc-P is inverted by NOR gate NO23C and the inverted train is formed by the gate as the signal LS Osc-N, which corresponds to the inverted low speed pulse train of Homing LS Osc-P when LS Shift-N is lo. Accordingly, the signal Homing LS Osc-P is lo and the signal LS Osc-N is the modified pulse train of 850 cycles/second when LS Shift-N is hi, and the signal Homing LS Osc-P is the low speed pulse train of 425 cycles/second and the signal LS Osc-N is an inverted low speed pulse train of 425 cycles/second when LS Shift-N is lo. As previously indicated, the signal LS Shift-N is set hi during initialization, and, accordingly, Homing LS Osc-P is set lo and the signal LS Osc-N corresponds to the modified pulse train from the counter CT2 at this time.

For convenience, the remainder of the circuit in FIG. 21c, concerned with generation of the signal Needle Disengage Pulse-P, will now be described as follows.

As shown in FIG. 21m, when the Normal Service Select Switch on the front panel is selected at its Normal setting, the signal from the Primary Needle Disengage Sensor 414 of unit 62 is connected by a contact in the switch as the signal Needle Disengage Sensor-P, while the signal from the Auxiliary Needle Disengage Sensor 412 is connected by the switch contact as the Needle Disengage Sensor-P signal at the Service setting of the switch. As shown in FIG. 21c, the signal Needle Disengage Sensor-P from the selected photosensor is connected to the base of a transistor T1. When the photosensor or transducer is aligned with the notch 416 of the commutator ring 354, the signal Needle Disengage Sensor-P is set hi, and the output of the transistor T1 at pin 1 of the Schmitt trigger ST37 is set lo. Conversely, when the photosensor is not aligned with the notch 416, the signal Needle Disengage Sensor-P is lo, and the output of the transistor T1 to the Schmitt trigger is hi. Accordingly, when the notch first comes into alignment with the photosensor, the input to the Schmitt trigger changes from a hi to lo condition. The Schmitt trigger ST37 sharpens up and inverts the signal from the transistor at input ST37(1), and the modified output ST37(6) from the Schmitt trigger is connected to the input or pin 2 of a monostable multivibrator or single-shot SS48A of known type.

Figure 24:
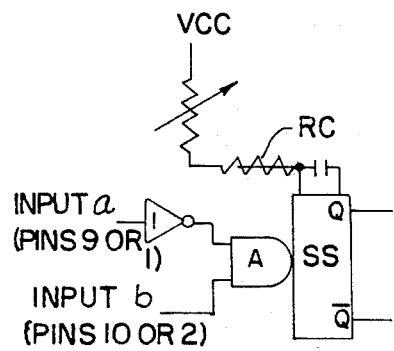
FIG. 24 is a schematic diagram of a component utilized in the electrical circuitry of the present invention.

The operation of the single-shot SS48A, as well as the other single-shots utilized in the control system, is described as follows in conjunction with FIG. 24. Each of the single-shots SS have 2 inputs, input $a$ and $b$, which may be utilized to trigger the single-shot. Input $a$ corresponds to pins 9 or 1 of the single-shot SS, while input $b$ corresponds to pins 10 or 2 of the single-shot. The single-shots SS have an internal inverter I and an AND gate A, with the output of the AND gate A triggering the single-shot SS. The input $a$ is connected to the inverter I, and the output of the inverter I is connected as one of the inputs of the AND gate A, while the input $b$ is connected as the other input of the AND gate A. Since a hi output of the AND gate A triggers the single-shot SS, the single-shot may be triggered by suitable conditions of the input as follows. It will be seen that both a hi state on input $b$ and a low on input $a$ of the gate will trigger the single-shot. If desired, both inputs, input $a$ and input $b$, may be utilized by connecting them to various parts of the circuitry to trigger the single-shot. Alternatively, the input $a$ may be held lo by connecting input $a$ to ground, such that the input to the AND gate A from inverter I will remain hi. In this configuration, the single-shot will be triggered when input $b$ goes from a low state to a hi state, in order that the single-shot may be triggered on a hi signal. Alternatively, the single-shot SS may be triggered by a lo signal at input $a$ by connecting input $b$ to the power source Vcc, such that the input to the AND gate A from input $b$ will always be hi. Accordingly, in this configuration, when input $a$ changes from a hi to lo state, the input from inverter I to AND gate A goes from lo to hi, and the single-shot is triggered.

The output Q of the single-shot SS is normally lo, and the output $\overline{Q}$, hereinafter referred to as Q bar, is normally hi. When the single-shot SS is triggered by the inputs, the output Q of the single-shot immediately goes hi, while the output Q bar immediately goes lo. The triggered outputs of the single-shot remain in the modified state during a period of time which is controlled by the RC circuit connected to the single-shot, and by suitable adjustment of the potentiometer in the circuit.

When the single-shot times out, the Q and Q bar outputs return to their normal lo and hi state, respectively.

Returning now to FIG. 21c, the output from the Schmitt trigger ST37 connected to pin 2 of the single-shot SS48A triggers the single-shot when the signal goes hi, since the other input at pin 1 of the single-shot is connected to ground, in accordance with the discussion above. The Q output of the triggered single-shot SS48A is thus set hi for a period of time and overrides possible fluctuations in the signals from the photosensor and Schmitt trigger. As shown, the Q output of single-shot SS48A is connected to input 4 of a flip flop ff12A and input 12 of NAND gate NA12B which are hi at this time, but return to a lo condition when the single-shot times out. The pulse train signal LS Osc-N is inverted by inverter I1A, and the inverted pulse train from inverter I1A is differentiated by a differentiator circuit 502, comprising capacitor C7 and resistor R25, which generates a series of relatively sharp pulses at the leading edges of the pulses in the inverted pulse train from inverter I1A. Accordingly, when input 12 of NAND gate NA12B is set hi by the single-shot SS48, at least one pulse is inverted by the gate NA12B, and the lo pulse sets the flip flop 12A, such that its output 3 goes hi. As the output ff12A(3) of the flip flop is set hi, the differentiator circuit 504, comprising capacitor C114 and resistor R3, generates a positive pulse which is amplified and inverted twice by the inverters I1B and I1C, resulting in a positive pulse for the signal Needle Disengage Pulse-P. Accordingly, it will be seen that after the photosensor senses the commutator notch, resulting in a hi state for the Needle Disengage Sensor-P signal, and immediately after receipt of the first pulse at NAND gate NA12B, the positive pulse Needle Disengage Pulse-P is formed. This signal is utilized to start movement of the clamps, as will be discussed below. When the single-shot SS48A times out, and its Q output returns lo, the flip flop ff12A is reset by the lo state at input ff12A(4) and the hi condition at the output of NAND gate NA12B connected to flip flop ff12A, such that the output 3 of flip flop ff12A is reset lo.

The circuitry primarily concerned with the pedals and clamps is illustrated in FIG. 21f. During initialization of the system, the signal Reset-N is utilized to reset a number of flip flops in the circuit as follows: flip flp ff92A at input 4; flip flop ff92B at input 12; flip flop ff90A at input 5; and flip flop ff78A at input 12. The circuit of FIG. 21f remains in the initialized state until actuation of the first foot pedal on the sewing machine.

As previously discussed, before the operator depresses the first pedal, the Pedal Clamp No. 1 Switch has its normally closed contact connected to ground, as shown, such that input 2 of an optoisolator or optocoupler OP 94 is connected through the switch to ground. The optoisolator serves as a noise filter, and has a photo-sensitive transistor with a light sensitive base. When radiation falls on the base junction, current is permitted to flow through the collector of the transistor. Accordingly, when the Pedal Clamp No. 1 Switch is in its normally closed position, before the first pedal on the machine is depressed, the output 5 of optoisolator OP94 is in a lo condition, as well as the signal Clamp Switch Off-N which is lo at this time.

As the pedal is depressed by the operator and the switch is actuated, the Pedal Clamp No. 1 Switch breaks contact with the normally closed terminal, and makes contact with its normally open terminal and input 2 of optoisolator OP93. Accordingly, input 2 of optoisolator OP94 is disconnected from ground, and output 5 of optoisolator OP94 and the signal Clamp Switch Off-N is set hi. Conversely, when the Pedal Clamp No. 1 Switch is actuated by the operator, input 2 of optoisolator OP93 is connected to ground, and output 5 of optoisolator OP93 and input 9 of flip flop ff92B is set lo which set the flip flop. Thus, output 8 of flip flop ff92B and input 9 of NOR gate NO90B are both set hi, such that the output of gate NO90B and the inputs of the open collector driver circuit DC89A are set lo. Under this condition, the output signal Clamp No. 1 Cmd from driver circuit DC89A causes application of a moderate amount of pressure to the air cylinder 274 and closure of the fabric clamp 240, as previously described. Contrawise, a hi state at the output of gate NO90B and the input of driver circuit DC89A causes release of the clamp 240. Thus, if the operator releases the first pedal before continuing the procedure, the clamp 240 will be raised, since the flip flop ff92B will be reset by the Pedal Clamp No. 1 Switch.

The operation of the label clamp 300 is very similar to that described in connection with the fabric clamp 240. Before actuation of the Pedal Clamp No. 2 Switch, the input 2 of optoisolator OP77 is connected to ground through the normally closed contact of the switch, and the input 13 of flip flop ff78A from the isolator is thus lo. Upon further depression of the first pedal subsequent to actuation of the Pedal Clamp No. 1 Switch, the Pedal Clamp No. 2 Switch breaks contact with the terminal connected to input 2 of optoisolator OP77, and, accordingly, the input 13 of flip flop ff78A is set hi. In addition, the actuated Pedal Clamp No. 2 Switch makes contact with the terminal connected to input 2 of optoisolator OP76, such that the input 2 of the optoisolator is connected to ground. Thus, the flip flop ff78A is set by a lo condition at its input 9, resulting in a hi state at output 8 of flip flop ff78A and input 12 of NOR gate NO90C. Accordingly, the output of gate NO90C and the corresponding input to an open collector driving circuit DC89B are set lo, resulting in application of full pressure to the air cylinder 274 and closure of the label clamp 300 due to the signal Clamp No. 2 Cmd from the driver circuit DC89B. Conversely, if the input to driver circuit DC89B is set hi, the label clamp 300 is released by the output signal Clamp No. 2 Cmd from the driver circuit DC89B. It will be seen that all inputs to NOR gates NO90B and NO90C are reset in a lo condition by the flip flops ff92B, ff78A, and ff90A during initialization of the control system. Thus, the clamps are raised until the first foot pedal is depressed.

In case only one movable clamp is utilized on the machine, it is not necessary to use the circuitry associated with the Pedal Clamp No. 2 Switch. Thus, only the Pedal Clamp No. 1 Switch is provided, which may be included in the same pedal with the Pedal Go Switch, but it is not necessary to change the circuit, since the part of the circuit which may be connected to the Pedal Clamp No. 2 Switch remains idle. Accordingly, the control system may be used in conjunction with one or two clamps, as desired.

After actuation of both Pedal Clamp Switches, the operator depresses the second pedal to request start of the sewing operation, and the actuated Pedal Go Switch makes contact with the normally open contact connected to input 2 of optoisolator OP96, connecting this terminal to ground through the switch. As a result, the output 5 of optoisolator OP96 and corresponding input 1 of flip flop ff92A are set lo. As discussed above, the signal Clamp Switch Off-N has been set hi through actuation of the Pedal Clamp No. 1 Switch, and both inputs 4 and 5 of the NAND gate in flip flop ff92A are hi, resulting in a lo signal on input 11 of NOR gate NO82A. It is noted at this point that flip flop ff92A is not reset until the operator releases the first pedal after actuation of the Pedal Go Switch, at which time the Pedal Clamp No. 1 Switch is placed in its normal configuration, resulting in a lo state for the signal Clamp Switch Off-N. This condition assures that the operator must release the first pedal before the next sewing operation.

Until the clamps 240 and 300 are fully locked in place, the signal Clamp Sense from the normally open contact of the Clamp Sense Switch 308 is disconnected from ground, and the output of optoisolator OP95 is hi at this time. When both clamps are placed in their proper position, the Clamp Sense Switch connects its normally open contact to ground, and the Clamp Sense Signal becomes lo, resulting in a lo signal at output 5 of optoisolator OP95 and input 12 of NOR gate NO82A. Accordingly, when both the Clamp Sense Switch and Pedal Go Switch are actuated, the output 13 of NOR gate NO82A goes hi, and differentiator circuit 506, comprising a capacitor C110 and resistor R104, generates a positive pulse as an input to inverter I91A and AND gate A66A at its input 1. The inverter I91A inverts the positive pulse to a lo pulse as the signal Cond Go-P.

During initialization, the output 4 of flip flop ff90A and the corresponding signal Clamp Mode-OP were set hi by the signal Reset-N. Accordingly, a hi condition is established at input 2 of AND gate A66A by the Clamp Mode-OP signal which passes through the delay circuit 508.

Referring now to FIG. 21d, initialization of flip flop ff21A by Reset-N resets its output 8 and the signal Basic Home-P to a lo condition. Thus, as shown in FIG. 21f, a lo condition is established at input 5 of the NOR gate NO82B during initialization. As shown, a plurality of temperature sensors or switches S1, S2, S3, and S4 on the motor drive heat sinks are connected in series to the power source Vcc. Accordingly, the power source Vcc is connected through the switches S1-S4 and resistor R100 to the inverter I91B. The normal state at the input of the inverter I91B is thus hi, resulting in a lo state at input 6 of NOR gate NO82B and as the signal Overtemp-P. The sensors S1-S4 monitor the temperature of the power transistors which feed the motor coils, and are utilized to save the drive circuits in the event of an out of temperature condition. If an out of temperature condition exists for any of these sensors, the contact of the sensor opens, thus disconnecting the power source Vcc from the resistor R100, such that the input to inverter I91B goes lo and resulting in a hi signal for Overtemp-P. The hi condition at the input of the driver circuit DC88A results in a hi state for the signal Overtemp LED which lights the Overtemp LED lamp on the front panel, as shown in FIG. 21m. The signal Overtemp-P is utilized to protect the system, as will be described below.

Assuming that the temperature sensors indicate a satisfactory temperature condition, then both inputs 5 and 6 of NOR gate NO82B will be lo, and the output signal from NOR gate NO82B, which passes through delay circuit 510, is hi, as well as input 13 of AND gate A66A. Thus, both inputs 2 and 13 of AND gate A66A are in a hi condition, and the positive pulse at input 1 of the AND gate is passed through the gate to input 1 of NAND gate NA78B. The signal NTB Mode-OP indicates the condition of the Needle Thread Break Sensor 312, and is set low in the event of a broken thread, such that the output of NAND gate NA78B is held hi. Conversely, if the thread has not broken, the signal NTB Mode-OP is hi to indicate a proper condition for the thread, and the positive pulse at input 1 of NAND gate NA78B is passed through and inverted by the gate. Thus, a lo pulse is formed as the signal Start Pulse-N, and the lo pulse is again inverted by the inverter I91C to a positive pulse as the signal Start Pulse-P. The positive or hi pulse presented at input 6 of flip flop ff90A sets the flip flop with its output 4 being set lo and its output 1 set hi. Accordingly, the signal Clamp Mode-OP is set to a lo condition, and after a delay through delay circuit 508, the signal establishes a lo condition at input 2 of AND gate A66A to inhibit the gate at this time. Since the signal Clamp Mode-1P has been set to a hi condition, the outputs of NOR gate NO90B and NO90C are retained lo, and the fabric and label clamps are maintained in their locked position by the current setting of the flip flop ff90A.

The signal Overtemp-P is connected to input 5 of AND gate A78C, while the signal Clamp Mode-OP is connected to input 4 of the same gate. As noted above, the signal Clamp Mode-OP was set lo by the flip flop ff90A, and remains in a lo condition until the signal End of Final Cut-N goes lo at a later time. Accordingly, the input to the driver stage Q2 is lo during the current setting of the flip flop ff90A. The driver stage Q2 handles a bus in the drive circuits which may disenable the predrivers and final drivers of the motors. If an over temperature condition is sensed by switches S1-S4, the signal Overtemp-P is set hi, as discussed above. Once the input to the driver stage Q2 is set hi, the Drive Signal Grd-N is essentially grounded to disenable the predrivers and final drivers of the motors. However, it is desired to finish the current sewing operation before disenabling the motors, and the signal Clamp Mode-OP is not set hi until the End of Final Cut-N signal is received, which resets the flip flop ff90A. Thus, when the signal Clamp Mode-OP is set hi by flip flop ff90A, the output of AND gate A78C and the corresponding input to the driver stage Q2 go hi to disenable the predrivers and final drivers of the motors and prevent damage to the motors in an overtemperature condition. At the same time, the change of state of flip flop ff90A releases both clamps, assuming that the operator has removed her foot from the first pedal, since all the inputs to NOR gates NO90B and NO90C are lo, and the inputs to driver circuits DC89A and DC89B are thus hi.

As shown in FIG. 21g, during initialization Reset-N resets flip flop ff39A, such that output 10 of the flip flop is reset hi, and the signal End of Program Mode-1P is reset lo. The hi signal at output 10 of flip flop ff39A passes through delay circuit 512 and establishes a hi condition at input 10 of NAND gate NA54A. As discussed above, the signal Start Pulse-N is initially hi, and the signal Address Clear-P is thus initially lo after initialization of the system. However, the lo pulse for the signal Start Pulse-N causes a positive or hi pulse to be formed at the output of gate NA54A as the signal Address Clear-P. Of course, the signal Start Pulse-N returns to its hi condition momentarily. The signal Start Pulse-P presented to flip flop ff39A is a positive pulse, and does not change the state of the flip flop at this time. Accordingly, a hi pulse is formed as the signal Address Clear-P, both inputs to NAND gate NA54A are then hi, and the signal Address Clear-P is then held lo.

As illustrated in FIG. 21a, the positive pulse for the signal Address Clear-P resets flip flop ff130A, such that the extend terminal is reset to a hi condition. Also, the signal Address Clear-P is inverted by inverter I131A in order that a lo pulse is presented at the Clear inputs of address registers or counters AR1 and AR2 to clear the registers to zero. As noted above, the signal Address Clear-P then returns to a lo state.

The signal Start Pulse-N is also utilized to start operation of the homing mode. As shown in FIG. 21h, since the signal End of Program Mode-1P has been set lo, the signal End of Final Cut-N and input 4 of NAND gate NA32A is hi. Initially, the signal Start Pulse-N was hi, and, accordingly, the signal Homing Set-P from gate NA32A was initially lo, while the inverted signal Homing Set-N was initially hi. However, the lo pulse for the signal Start Pulse-N results in a positive or hi pulse as the signal Homing Set-P, and the inverter I19A forms a lo pulse as the signal Homing Set-N. When the signal Start Pulse-N returns to hi, the signals Homing Set-P and Homing Set-N returns to their lo and hi states, respectively.

As shown in FIG. 21e, the lo pulse Homing Set-N triggers single-shot SS22A, and the single-shot times out after a delay which is longer than that required to complete the homing mode unless a fault should occur. When the single-shot times out, the Q bar output of the single-shot goes from lo to hi, and the differentiator circuit 514 generates a positive pulse which is input to NOR gate NO9A. A lo pulse is formed at the output of this gate as the signal Homing Clear-N, which is utilized to initialize the homing circuitry. Thus, in the event that a mishap should occur during the homing mode and the homing mode is not completed, the Homing Clear-N signal will stop the homing mode and prevent possible damage to the system or machine.

The lo pulse Homing Set-N is utilized to start the basic homing mode as follows. As shown in FIG. 21d, the signal Homing Set-N sets flip flop ff21A with its outputs Basic Home-P hi and Basic Home-N lo. The signal Basic Home-N is inverted by inverter I19B, and when the inverted signal goes from lo to hi upon setting of flip flop ff21A by Homing Set-N, a positive pulse is generated by differentiator circuit 516. The positive pulse is inverted by inverter I19A as a lo pulse for the signal Pri Home Dir Set-N. As illustrated in FIG. 21e, the lo pulse signal Pri Home Dir Set-N is connected to the inputs of NAND gates NA100A and NA100B, such that hi pulse signals are output from the gates to the D-type flip flops ff99A and ff99B, respectively. The flip flops ff99A and ff99B are utilized to establish direction for the X and Y coordinates, as will be described in detail below.

As shown in FIG. 21f, the positive signal Basic Home-P is connected to input 5 of NOR gate NO82B, such that a delayed lo condition will be obtained at input 13 of AND gate A66A. As discussed above, when either of the inputs of AND gate A66A go lo, the signal Start Pulse-N returns to hi, and the signal Start Pulse-P returns to lo. However, delays are associated with each of the hi inputs to AND gate A66A. The decay of the positive pulse at input 1 of gate A66A is sufficiently long, and the delays in circuits 508 and 510 are sufficiently long, such that the inputs of gate A66A do not immediately return to lo, and the signal Start Pulse-N, although termed a pulse, remains lo for a selected period of time. The period of time selected is sufficiently long for the signal Homing Set-P, which was formed responsive to the lo pulse Start Pulse-N, to remain hi while the signal Basic Home-N is set lo by flip flop ff21A in FIG. 21d. Accordingly, the signal Homing Set-P is hi and the signal Basic Home-N is lo during a period time until Start Pulse-N returns to its hi condition and Homing Set-P returns to lo.

Accordingly, as shown in FIG. 21g, during this time the hi value for the signal Homing Set-P, which is input to NOR gate NO43A, results in a lo condition at input 9 of OR gate O43B. Also, the signal Basic Home-N is lo at this time, and the simultaneous lo signals input to this OR gate cause a lo condition at input 9 of NAND gate NA55A. Thus, the input 11 of NOR gate NO44A is hi, resulting in a low condition or pulse as the signal Start Run-N. At this time the signal Aux Home Run-P is lo, and, accordingly, when the signal Homing Set-P returns to its lo condition, the input 9 of gate O43B goes hi, the input 9 of gate NA55A goes hi, the input 11 of gate NO44A goes lo, and the signal Start Run-N returns to its hi condition. It may be readily determined that the remaining inputs to gate NA55A are hi and the other input to the gate NO44A is lo at this time.

As illustrated in FIG. 21d, during initialization the signal Reset-N resets the X and Y run flip flops ff21B and ff32B, respectively, with the signals X Run-N and Y Run-N in a hi condition, and with the signals X Run-P and Y Run-P in a lo condition. When the lo pulse is formed as the signal Start Run-N, the pulse is inverted by inverter I19C, such that a hi pulse is presented at input 2 of NOR gate NO20A and input 5 of NOR gate NO20B. The signals X Run Set-P and Y Run Set-P are lo at this time, and a lo pulse is thus output from the gates NO20A and NO20B to the flip flops ff21B and ff32B, respectively, to set the flip flops with the signals X Run-N and Y Run-N being lo and the signals X Run-P and Y Run-P hi.

As illustrated in FIG. 21i, during initialization the lo signal for Reset-N is inverted by inverter I24F, and the resulting hi signal is connected to an input of a NOR gate in each of the following X and Y pulse inhibit flip flops: ff3A, ff3B, ff4A, ff4B, ff15A, ff15B, ff27A and ff27B. Accordingly, each of the above flip flops are reset by the positive signal, such that the following corresponding signal outputs of the various flip flops are set hi: X Decode 4 Plus-N, YC Pulse Inhibit-N, XB Pulse Inhibit-N, Y Decode 4 Plus-N, XC Pulse Inhibit-N, YB Pulse Inhibit-N, XA Pulse Inhibit-N, and YA Pulse Inhibit-N. It may be determined that the other inputs to the X and Y inhibit flip flops are low at this time, by tracing the signals from the differentiator circuits 518 and 520, through inverters I50B and I50D, and the NOR gates NO14A, NO14B, NO14C, NO14D, NO26A, NO26B, NO26C, and NO26D to the flip flops ff3A, ff3B, ff4A, ff4B, ff15A, ff15B, ff27A, and ff27B.

As previously discussed in connection FIGS. 21e and 21c, the signal LS Shift-N was initialized in a hi condition, such that the square wave signal LS Osc-N is at the relatively fast rate of 850 cycles per second. As illustrated in FIG. 21j, the signal LS Osc-N is inverted by the inverter I67A, and the inverted signal is differentiated by the differentiator circuit 522. Accordingly, a series of pulses are generated by the circuit 522 at the leading edge of the square pulses in the inverted signal from inverter I67A. The generated hi pulses are then inverted by inverter I67B to form a train of lo pulses. Since the signals X Run-N and Y Run-N were set lo by the X and Y run flip flops, the lo pulse train from inverter I67B is passed through the NOR gates NO80A and NO104A and inverted by the gates to trains of narrow positive pulses as the signals X Count Pulse-P and Y Count Pulse-P. Thus, the signals X Count Pulse-P and Y Count Pulse-P are each a series of narrow positive pulses which correspond in time to the trailing edge of the square wave signal LS Osc-N, and at the relatively fast speed of 850 cycles/second.

Since formation of the signals X Combo-N and Y Combo-N, which are utilized for driving the X and Y stepping motors, will be described in detail below when describing operation of the machine under program control, the generation of these signals during the homing mode will be only briefly described at present. As shown in FIG. 21k, the pulse train X Count Pulse-P is connected to pin 2 of single-shot SS28A and as one input to NAND gate NA5A, while the pulse train Y Count Pulse-P is connected to pin 10 of single-shot SS40A and as one input to NAND gate NA29A.

The signal X Run-P is inverted twice by inverters I17A and I17B. When the signal X Run-P goes from lo to hi, the corresponding signal output from inverter I17B is differentiated by differentiator circuit 524 to generate a positive pulse and set flip flop ff16A with its output 1 lo. Accordingly, pin 1 of the single-shot SS28A is set lo by the flip flop to enable the single-shot. The single-shot SS28A will then be triggered by the first positive pulse for the single X Count Pulse-P on pin 2 of the single-shot, and the Q output of the single-shot immediately goes hi. Until the single-shot SS28A times out, the Q bar output of single-shot SS28B remains hi, and the same positive pulse in the signal X Count Pulse-P is passed through the NAND gate NA5A and is inverted by the gate to form a lo pulse at input 10 of NAND gate NA31A. This lo pulse at the input of gate NA31A may be designated X Pulse No. 1 of the signal X Count Pulse-P.

As previously discussed, both signals XA Pulse Inhibit-N and LS Shift-N were initialized in a hi condition, and the input to pin 1 of single-shot SS6A from NAND gate NA5B is lo to enable this single-shot. Accordingly, when the single-shot SS28A is first triggered and its Q output goes hi, the single-shot SS6A is triggered at pin 2 by the signal. The Q bar output of single-shot SS6A is thus set lo, and when the single-shot times out its Q bar output goes from lo to hi, and a positive pulse is generated by the differentiator circuit 526. The delay time for the single-shot SS6A and the corresponding time for generation of the pulse by circuit 526 is selected at a predetermined time after pulse No. 1 of X Count Pulse-P. The pulse generated by differentiator circuit 526 is inverted by inverter I56A to form a lo pulse at input 11 of NAND gate NA31A, and will be designated an XA Pulse.

Before the single-shot SS6A times out, the single-shot SS28A, which triggered the single-shot SS6A, times out, and the resulting lo signal on its Q output triggers single-shot SS28B at its pin 9. The Q output of the triggered single-shot SS28B, which is set hi and is delayed slightly by delay circuit 228, resets flip flop ff16A which forms a hi signal at its output 1 to inhibit the single-shot SS28A at pin 1 and prevent further triggering of this single-shot by the signal X Count Pulse-P at this time. Meanwhile, the Q bar output of triggered single-shot SS28B goes lo and inhibits pulses from the signal X Count Pulse-P from passing through NAND gate NA5A until single-shot SS28B times out. The delay associated with single-shot SS28B is such that the second and third pulses of the signal X Count Pulse-P are inhibited, and the pulse XA Pulse occurs during this time. Subsequently, when the single-shot SS28B times out and its Q bar output goes hi, the later pulses from X Count Pulse-P are passed through and inverted by NAND gate NA5A as lo pulses at input 10 of NAND gate NA31A. Accordingly, the lo pulses formed at inputs 10 and 11 of gate NA31A are the X Pulse No. 1 of the signal X Count Pulse-P, the pulse XA Pulse, which occurs during the time of the inhibited second and third pulses of the signal X Count Pulse-P, and the fourth pulse and subsequent pulses of the signal X Count Pulse-P.

The hi signal Basic Home-P is inverted by inverter I7A, the output of inverter I7A passes through delay circuit 530, and the delayed signal is again inverted by inverter I7B to form the hi signal Homing Mode-OP which is connected to pin 9 of single-shot SS6B. The hi signal Homing Mode-OP thus inhibits this single-shot, and its Q bar output remains hi so long as the signal Basic Home-P is hi. Accordingly, the signal from differentiator circuit 532 to input 13 of NAND gate NA5C remains lo, and the output of gate NA5C to input 9 of NAND gate NA31A remains hi during this time to inhibit formation of an XB Pulse.

The other lo pulses formed at inputs 10 and 11 of gate NA31A, as previously discussed, are inverted by the gate, and are supplied as a hi pulse train at input 2 of OR gate O82C, and are passed through the OR gate as positive pulses at pin 2 of single-shot SS68A. Each of the positive pulses at input 2 of this single-shot triggers the single shot. The single-shot SS68A regenerates each of the positive pulses, and forms a corresponding train of lo regenerated or wider pulses at its Q bar output to form the signal X Combo-N, which comprises a series of regenerated lo pulses utilized to direct movement of the X stepping motor.

Since the signal Basic Home-N was set lo, the output of AND gate A5D at pin 10 of single-shot SS68B is lo, thus inhibiting this single-shot. Accordingly, the signal from differentiator circuit 534 to input 3 of OR gate O82C is lo during the period of time that Basic Home-N is lo, thus preventing formation of an XC Pulse at pin 2 of single-shot SS68A.

Thus, the lo pulse train X Combo-N has been formed for the X stepping motor during the basic home mode. This signal comprises the regenerated X Pulse No. 1 of the signal X Count Pulse-P, the XA Pulse, and the fourth and subsequent pulses of the signal X Count Pulse-P. The formation of the signal Y Combo-N for control of the Y stepping motor is very similar, and thus will only be described briefly.

As noted above, the signal Y Count Pulse-P is connected to pin 10 of single-shot SS40A and the NAND gate NA29A. The hi signal Y Run-P is inverted twice by the inverters I17C and I17D, and the signal change from inverter I17D is differentiated by differentiator circuit 536 to generate a pulse and set flip flop ff16B with its output 13 lo to enable single-shot SS40A at its pin 9 on receipt of the first pulse on Y Count Pulse-P. The Q output of triggered single-shot SS40A triggers the single-shot SS30A at pin 10 for generation of a YA Pulse. The pulse of the single Y Count Pulse-P which triggers single-shot SS40A is passed through and inverted by NAND gate NA29A, and is presented as a lo pulse at input 5 of NAND gate NA31B, identified as Y Pulse No. 1. As previously described in connection with the X portion of the circuit, the single-shot SS40B is triggered at pin 1 when the single-shot SS40A times out. The Q output of triggered single-shot SS40B passes through delay circuit 538 and resets flip fop ff16B to inhibit the single-shot SS40A at pin 9. The Q bar output of triggered single-shot SS40B inhibits the NAND gate NA29A during the time of the second and third pulses of the signal Y Count Pulse-P to prevent passage of pulses through the gate at this time, but permits the fourth and subsequent pulses of the signal Y Count Pulse-P to pass through the gate, while inverting the pulses, when the single-shot SS40B times out, as previously described.

When the triggered single-shot SS30A times out and its Q bar output goes hi, the differentiator circuit 540 genertares a hi pulse which is inverted by inverter I56B and presented as a lo pulse, identified as a YA Pulse, at input 4 of NAND gate NA31B. Thus, the lo pulses formed at inputs 4 and 5 of gate NA31B are inverted and passed through the gate to input 9 of OR gate O82D. The positive pulses are passed through the OR gate to pin 10 of single-shot SS69A, where the pulses are regenerated and formed as a train of corresponding lo pulses at the Q bar output of the single-shot as the signal Y Combo-N for control of the Y stepping motor.

The single-shot SS30A, which forms the YA Pulse, was enabled by the hi conditions of the signals LS Shift-N and YA Pulse Inhibit-N which are connected to the inputs of NAND gate NA29B, thus forming a lo signal at pin 9 of single-shot SS30A. However, formation of YB and YC Pulses are inhibited at this time, in a manner as previously described. The lo signal Basic Home-N is connected to input 10 of AND gate A29C, resulting in a lo input at pin 2 of single-shot SS69B. Accordingly, the Q Bar output of single-shot SS69B remains hi, and the differentiator circuit 542 is prevented from forming a YC Pulse which would otherwise pass through OR gate O82D to pin 10 of the single-shot SS69A.

As previously discussed, the signal Homing Mode-OP was set hi resulting from a hi signal Basic Home-P. The signal Homing Mode-OP is connected to pin 1 of single-shot SS30B to inhibit this single-shot. Accordingly, the Q bar output of single-shot SS30B remains hi, and the differentiator circuit 542 is prevented from forming a pulse for NAND gate NA29D, which would otherwise pass a lo YB Pulse to input 3 of NAND gate NA31B.

Accordingly, the pulse trains for the signals X Combo-N and Y Combo-N during the homing mode are based primarily on the signals X Count Pulse-P and Y Count Pulse-P, respectively, except for modification of the pulse train by the XA and YA Pulses. The pulse trains X Combo-N and Y Combo-N are separately supplied to the X and Y stepping motors, respectively, until crossings in the X and Y directions, as described below.

As illustrated in FIG. 21e, the X Homing Sensor Signal from the homing sensor on the X axis is connected to a Schmitt trigger ST98A. The Schmitt trigger sharpens the edges of the sensor signal and inverts the signal, after which it is presented at the D input of the D-type flip flop ff99A and input 2 of the exclusive OR gate EO101A. The flip flop ff99A operates as follows. When the CLK input of the flip flop goes hi, the Q output of the flip flop is set continuously equal to the signal at its D input during the time that the CLK input remains hi. When the CLK input returns to lo further change of the Q output is prevented until the CLK input again returns to hi. Accordingly, when the CLK input goes lo, the Q output of the flip flop is set equal to the last value of its D input at the time the CLK input goes lo. Conversely, the Q bar output of the flip flop is set equal to the last inverted D input value at the time the CLK input goes lo.

As previously discussed, during initialization of the basic homing mode, the signal Pri Home Dir Set-N was formed as a lo pulse which resulted in formation of a positive pulse at the CLK input of flip flop ff99A. Accordingly, when the signal Pri Home Dir Set-N returns to its hi condition, and the CLK input of the flip flop returns from hi to lo, the Q output of the flip flop is set at the last value of the D input which is indicative of the present location in the X direction as sensed by the X Homing Sensor. Thus, for example, if the X Homing Sensor Signal was lo when the lo pulse Pri Home Dir Set-N is received, the inverted output from Schmitt trigger ST98A to the D input of flip flop ff99A is hi, thus resulting in a setting of the Q output of the flip flop hi and of the Q bar output lo. The Q and Q bar outputs of the flip flop will remain in this condition until another positive pulse is received at the CLK input.

The signal X Home Dir-P from the Q output of flip flop ff99A is utilized to specify the direction which the X stepping motor must be driven to move the work holder to its home position in the X direction. The signal X Home Dir-P is connected to input 4 of AND gate A133B, whereas the signal Basic Home-P is connected to input 3 of the same gate. Since the signal Basic Home-P is hi during this time, the signal X Home Dir-P will be reflected at input 6 of NOR gate NO134C. The lo signal Basic Home-N is connected to input 2 of the AND gate A133A, such that input 5 of NOR gate NO134C is also lo. Thus, the signal at input 6 of NOR gate NO134C is inverted as the signal X Direction. If the signal X Home Dir-P is hi, the signal X Direction is lo, and, conversely, if the signal X Home Dir-P is lo, the signal X Direction is hi. It will be apparent that the polarity of the signal X Direction is indicative of the signal from the X Homing Sensor at the time the basic homing mode was initialized, and is thus utilized for the X stepping motor to control the correct direction for driving the X stepping motor to the home position along the X axis during the basic home mode.

As shown, the Q bar output of flip flop ff99A is connected to input 1 of the exclusive OR gate EO101A. As previously noted, the output from the Schmitt trigger ST98A is connected to input 2 of the same gate. When the Q and Q bar outputs are set by the CLK input of the flip flop, the inverted Q bar output of the flip flop will be the inverse of input 2 of exclusive OR gate EO101A. Accordingly, when the outputs of the flip flop are set, the two inputs of the exclusive OR gate are set at opposite logic levels. The exclusive OR gate EO101A has a hi output so long as its inputs are at opposite logic levels, but the output of this gate goes lo when its inputs are the same.

Thus, the inputs of the exclusive OR gate will remain of opposite logic levels as the clamp is being driven toward its home position and until the output of the Schmitt trigger ST98A reverses its logic level at the time of crossing on the X axis, as sensed by the X Homing Sensor, at which time both inputs to the exclusive OR gate become the same. At this point in time, the output of exclusive OR gate EO101A goes lo. Since the signal Basic Home-N is lo at one input of NOR gate NO71A and the other input from the exclusive OR gate now goes lo, the output of NOR gate NO71A goes from lo to hi, and the differentiator circuit 544 generates a positive pulse.

As previously discussed, during initialization the signal LS Shift-N of flip flop ff45A is set hi by the signal Reset-N. The output 6 of flip flop ff45A is lo, since both inputs 4 and 5 of the flip flop are hi. The hi signal at input 5 of the flip flop results from the lo signal from differentiator circuit 546 which is inverted by inverter I46A. The lo output from flip flop ff45A is inverted to a hi condition by inverter I46B, such that input 5 of NOR gate NO71B and input 2 of NAND gate NA60A are both hi. The hi signal at input 5 of NOR gate NO71B prevents setting of flip-flop ff71C by the positive pulse from differentiator circuit 544. However, the differentiator circuit 544 is connected to input 1 of NAND gate NA60A, and the positive pulse is inverted by this NAND gate, since input 2 of the gate is hi at this time and the resulting lo pulse is presented at input 10 of NAND gate NA73A. The NAND gate NA73A in turn inverts the lo pulse to a positive pulse which is presented at input 1 of NAND gate A132A. Since the signal Basic Home-P, which is hi, is connected to input 2 of AND gate A132A, the positive pulse is presented at input 1 of NOR gate NO134A. The signal Basic Home-N, which is lo, is connected to input 4 of AND gate A132B, and the other input 2 of NOR gate NO134A is thus lo. Accordingly, the NOR gate NO134A inverts the positive pulse at its input 1, and forms a lo pulse as the signal X Stop-N.

As shown in FIG. 21*d*, the signal X Stop-N is connected to the X run flip flop ff21B, and the lo pulse X Stop-N resets the flip flop with its output signals X Run-N hi and X run-P lo. As shown in FIG. 21*j*, the hi signal X Run-N sets the output of NOR gate NO80A lo. Accordingly, the signal X Count Pulse-P, which was utilized to form the pulse train as the signal X Combo-N for control of the X stepping motor, goes lo thus stopping the X stepping motor. Since the motors are driven in the basic home mode at the relatively fast rate of 850 cycles/second, the work holder is moved slightly past its home position in the basic home mode, by several motor steps due to the abrupt termination of this high stepping rate, before being stopped.

The operation of the system for control of the work holder in the Y direction is very similar to that described in connection with the X direction. Thus, as shown in FIG. 21*e*, a signal indicative of the position in the Y direction is developed by Schmitt trigger ST98B at the D input of flip flop ff99B from the Y Homing Sensor Signal of the Y Homing Sensor. The lo pulse Pri Home Dir Set-N is passed through NAND gate NA100B as a hi pulse to the CLK input of the flip flop ff99B to establish the Q and Q bar outputs of the flip flop during initialization according to the last state of the D input. The Q output of the flip flop, designated Y Home Dir-P, is connected to input 8 of the AND gate A133D, and since the input 7 of this gate is connected to the hi signal Basic Home-P, the NOR gate NO134D inverts the signal from Y Home Dir-P as the signal Y Direction. The other AND gate A133C is connected to the lo signal Basic Home-N, and, accordingly, the input 7 of NOR gate NO134D is also lo at this time. The signal Y Direction is utilized to control the direction in which the Y stepping motor moves the work holder in the Y direction, in a manner similar to that described in connection with the signal X Direction used for direction control of the X stepping motor.

When the output from the Schmitt trigger ST98B changes state at the time of crossing along the Y axis, the inputs to the exclusive OR gate EO101B become the same, and a lo condition is established at input 3 of NOR gate NO86A. Since the signal Basic Home-N is lo, the output of NOR gate NO86A goes from lo to hi, and a positive pulse is generated at input 2 of NAND gate NA73B by differentiator circuit 548. Since the input 1 of NAND gate NA73B connected to the output of inverter I46B is hi, a lo pulse is formed at input 4 of NAND gate NA73C. This gate inverts the pulse, and a positive pulse is formed at input 8 of the AND gate A132D. Since the other input 7 of this is connected to the hi signal Basic Home-P, the positive pulse is inverted by NOR gate NO134B as a lo pulse for the signal Y Stop-N. The input 6 of AND gate A132C is connected to the lo signal Basic Home-N, and the other input 3 of NOR gate NO134B is lo at this time.

As shown in FIG. 21*d*, the lo pulse Y Stop-N is connected to the Y run flip flop ff32B, and resets this flip flop with its output signals Y Run-P lo and Y Run-N hi. As illustrated in FIG. 21*j*, the hi signal Y Run-N connected to NOR gate NO104A results in formation of a lo condition for the signal Y Count Pulse-P to stop the Y stepping motor. Of course, the Y stepping motor may be stopped prior to, subsequent to, or at the same time as the X stepping motor depending on the respective times of crossing in the X and Y axes.

When a change of direction is indicated by the X and Y Homing Sensor Signals, and both X and Y run flip flops are reset, resulting in discontinued movement of the clamps in the X and Y directions, both inputs to NOR gate NO20C are reset lo, as shown in FIG. 21*d*. As the second of the inputs to gate NO20C goes lo, the output of this gate goes hi and differentiator circuit 550 generates a positive pulse, which is inverted to a lo pulse by inverter I19D with the lo pulse being presented at input 12 of NOR gate NO20D. Since the signal Basic Home-N is lo, the gate NO20D inverts the pulse at its output as a positive pulse for the signal Mode Pulse-P, which is utilized to select the auxiliary and subauxiliary homing modes.

As shown in FIG. 21*e*, the signal Mode Pulse-P is connected to input 12 of NAND gate NA73D and input 9 of NAND gate NA45B. As shown, the output of inverter I46B, which is hi, is connected to input 13 of NAND gate NA73D, while the output of inverter I46C, which is lo, is connected to input 10 of NAND gate NA45B. Since the input 10 to gate NA45B is lo at this time, the output of this gate to pin 9 of single-shot SS33A is hi, and this single-shot is not triggered at this time.

However, since the input 13 to NAND gate NA73D is hi, the hi pulse for signal Mode Pulse-P is passed through and inverted by the gate. The corresponding lo pulse from the output of gate NA73D is presented at pin 1 of the single-shot SS33B which triggers the single-shot. When the single-shot times out and its Q bar output goes hi, a positive pulse is generated by differentiator circuit 546. The pulse is inverted by the inverter I46A as a lo pulse to set the flip flop ff45A with its output signal LS Shift-N lo and its output 6 hi. The hi signal at output 6 of the flip flop is delayed by delay circuit 552, and is then inverted by inverter I46B to a lo state. The lo output of inverter I46B is inverted by inverter I46C, and as the output from the latter inverter goes hi, the differentiator circuit 554 generates a positive pulse which triggers the single-shot SS59A at its pin 2.

The positive pulse generated by differentiator circuit 554 is inverted by inverter I46D, and the corresponding lo pulse from this inverter is presented at inputs of the NAND gates NA100A and NA100B as the signal Aux Set Pulse-N. The corresponding positive pulses formed at the outputs of the NAND gates actuate the flip flops ff99A and ff99B at their CLK inputs to obtain new X and Y position data for the Q and Q bar outputs of the flip flops, as previously described.

The RC circuit associated with the single-shot SS59A is such that the triggered single-shot undergoes a ten millisecond delay before it times out. This delay is utilized to permit settling out of the X and Y stepping motors, and assures that the positional information is clocked into the flip flops ff99A and ff99B. When the single-shot SS59A times out, the Q bar output of the single-shot goes hi, and differentiator circuit 556 generates a positive pulse as the signal Aux Home Run-P. This signal initiates the auxiliary home mode of the system during which the X and Y stepping motors are driven in the opposite direction as they were driven during the basic home mode, since the Q outputs of flip flops ff99A and ff99B are of different logic levels than when in the basic home mode, due to the crossings which took place along the X and Y axes during the basic home mode.

As shown in FIG. 21g, the positive pulse for the signal Aux Home Run-P connected to NOR gate NO43A results in formation of a lo pulse at input 9 of OR gate O43B. Since the signal Basic Home-N is lo, a lo pulse is presented at input 9 of NAND gate NA55A, resulting in formation of a positive pulse at input 11 of NOR gate NO44A and a lo pulse as the signal Start Run-N.

As illustrated in FIG. 21d, the lo pulse Start Run-N sets the X and Y run flip flops ff21B and ff32B with their outputs X Run-N and Y Run-N lo and with X Run-P and Y Run-P hi, as previously described. As illustrated in FIG. 21c, the signal LS Shift-N is now lo, and the signal LS Osc-N is thus a square wave signal at the relatively low speed of 425 cycles/second. As discussed above, the low speed clock signal is utilized during the auxiliary and subauxiliary modes to permit a more precise final positioning of the work holder at the home position.

As shown in FIG. 21j, since the signals X Run-N and Y Run-N have been set lo, the pulse trains X Count Pulse-P and Y Count Pulse-P are again formed from the signal LS Osc-N, as described above, except that the pulse trains formed are now at the relatively low speed of 425 cycles or pulse/second. As described above in connection with FIG. 21k, the regenerated lo pulse trains X Combo-N and Y Combo-N for control of the X and Y stepper motors are again formed from the signals X Count Pulse-P And Y Count pulse-P. However, since the signal LS Shift-N is now lo, the outputs from NAND gates NA5B and NA29B to the single-shots SS6A and SS30A are hi, thus inhibiting both single-shots. Accordingly, the XA and YA Pulses are not formed during the auxiliary homing mode, as well as the subauxiliary homing mode, and are inhibited by the signal LS Shift-N. As before, the signals X Run-P and Y Run-P trigger the single-shots which inhibit the second pulse of the signals X Count Pulse-P and Y Count Pulse-P at the NAND gates NA5A and NA29A, respectively, since the timing of the single-shots remain the same while using the relatively slow pulse rates. Accordingly, the pulse train which is regenerated and formed by the single-shots SS68A and SS69A as the signals X Combo-N and Y-Combo-N reflect the first pulse of the signals X Count Pulse-P and Y Count Pulse-P and the third and subsequent pulses of these signals, with the second pulse being inhibited. The XB, XC, YB, and YC Pulses are inhibited during the auxiliary homing mode, as accomplished during the basic home mode.

Referring to FIG. 21e, when the direction indication from Schmitt trigger ST98A for the X direction changes to indicate a crossing in the X direction, the inputs to the exclusive OR gate EO101A become the same, and result in a positive pulse being generated by differentiator circuit 544, as previously described. It is noted that the signal Basic Home-N remains lo at this time. Since the output from inverter I46B is now lo, the output of NAND gate NA60A connected to input 10 of NAND gate NA73A is hi at this time, and the pulse is not passed through gate NA60A. However, the positive pulse from differentiator circuit 544 is inverted by inverter I46D, and a lo pulse is formed at input 6 of NOR gate NO71B. Since the input 5 of gate NO71B from the output of inverter I46B is lo, the lo pulse formed at input 6 of this gate is inverted by the gate, and the positive pulse formed sets the flip flop ff71C with its output 13 in a lo condition.

The output QD of the four bit counter CT58 is normally lo. A hi signal from output 13 of flip flop ff71C clears the four bit counter to zero, and holds it in its cleared state with the output QD lo. When the output 13 of flip flop ff71C goes lo, the hold is released on the counter CT58. At this time, the CLK input of the counter, which is connected to the signal Homing LS Osc-P, is utilized to count the counter. As previously described in connection with FIG. 21c, since the signal LS Shift-N is now lo, the signal Homing LS Osc-P is a square wave at the relatively low rate of 425 cycles/second. When the counter CT58 is counted by four pulses of the signal Homing LS Osc-P at the slow rate, the output QD of the counter goes from lo to hi, and a positive pulse is generated by the differentiator circuit 558.

The positive pulse from circuit 558 is inverted by inverter I46F with the portion of the pulse beyond the threshold level being clipped, such that a narrow lo pulse is formed at input 9 of NAND gate NA73A. The positive going edge of the narrow pulse is differentiated by differentiator circuit 560, such that a positive pulse, which is later in time than the positive going edge of differentiator circuit 558, is generated by the circuit 560 which resets the flip flop ff71C with its output 13 hi. Accordingly, the hold flip flop ff71C again clears the counter CT58, and holds the counter in its cleared state with output QD lo until the flip flop is again set. Since the input 10 of NAND gate NA73A is hi, the narrow lo pulse at input 9 of the gate is inverted by the gate to a positive pulse which is passed through AND gate A132A to input 1 of NOR gate NO134A. It is noted that the signal Basic Home-P connected to the other input of AND gate A132A is still hi at this time. The NOR gate NO134A inverts the positive pulse to a lo pulse for the signal X Stop-N. As previously described in connection with FIG. 21d, the lo pulse X Stop-N resets the X run flip flop ff21B resulting in a hi signal X Run-N and a lo signal X Run-P. As described in connection with FIG. 21j, the hi condition of X Run-N results in a lo value for the signal X Count Pulse-P, and movement of the clamps in the X direction is stopped.

It will be apparent that since movement in the X direction is not terminated until four clock pulses after a change of direction or crossing as sensed by the X Homing Sensor, as accomplished by the counter CT58 described in connection with FIG. 21e, the clamps are moved in the X direction four steps past the location at which the sensor indicated a change in direction. This follows since the signals X Count Pulse-P and Homing LS Osc-P are both synchronized at the slow rate of 425 pulses/second. The final location for the clamps in the X direction is thus precisely determined at the relatively slow rate and at precisely the four counts or steps past the location of crossing determined by the X Homing Sensor. Thus, the clamps are located at a position to prevent possible ambiguity of direction by the sensor in the event that it is necessary to move the clamps in the X direction during the subauxiliary homing mode. It will be apparent from the description which follows that after the combination of auxiliary and subauxiliary homing modes, the clamps will always be located at the same home position for a given adjustment of the X and Y Homing Sensors.

The operation of the control system in terminating movement of the clamps in the Y direction is similar to that described above in connection with X direction. As illustrated in FIG. 21e, when a change of direction is indicated by the Y Homing Sensor and the Schmitt trigger ST98B, such that both inputs to the exclusive OR gate EO101B become the same, a positive pulse is generated by the differentiator circuit 548. Since the output of inverter I46B is lo at this time, the output of NAND gate NA73B at input 4 of NAND gate NA73C is hi. The positive pulse generated by circuit 548 is inverted by the inverter I83A, and is presented as a lo pulse at input 11 of NOR gate NO86B. Since the input 12 of gate NO86B from inverter I46B is lo, the lo pulse at input 11 is inverted by the gate to a positive pulse which sets flip flop ff86C. The resulting lo condition at output 4 of this flip flop releases the clear hold on the four bit counter CT87, and the signal Homing LS Osc-P counts the counter to 4 at which time the output QD of the counter goes hi. In response, the differentiator circuit 562 generates a positive pulse which is inverted and clipped by the inverter I83B to form a narrow lo pulse at input 5 of NAND gate NA73C. The positive going edge of the lo pulse is differentiated by differentiator circuit 564, and a positive pulse is formed by the circuit which is later in time than the positive going edge of differentiator circuit 562 which resets flip flop ff86C with its output 4 hi to hold and clear the counter CT87. The narrow lo pulse at input 5 of gate NA73C is inverted by the gate, and is then passed through AND gate A132D to input 4 of NOR gate NO134B. The gate NO134B again inverts the pulse as a lo pulse for the signal Y Stop-N. As previously described in connection with FIG. 21d, the lo pulse Y Stop-N resets the Y run flip flop ff32B, and resets the signals Y Run-P lo and Y Run-N hi. As discussed in connection with FIG. 21j, the hi condition of signal Y Run-N presented at NOR gate NO104A clears the signal Y Count Pulse-P, and stops movement of the clamps in the Y direction. Accordingly, movement of the clamps in the subauxiliary homing mode have been stopped in both directions. As previously discussed, it is irrelevant whether the clamps are stopped first in the X or the Y direction.

As discussed above, positioning of the clamps along the X or Y axes is not completed during the auxiliary homing mode unless the position was approached from a specified direction in the auxiliary mode. If the clamps were moved from the incorrect direction during the auxiliary mode for a given axis, a subauxiliary mode is entered for that axis or coordinate during which the clamps are moved in the specified direction to the final home position. Accordingly, if the clamps were moved along both the X and Y coordinate directions during the auxiliary homing mode in the specified directions, the subauxiliary mode is not entered for either of the axes, and the clamps have been placed in their correct home position during the auxiliary mode. Thus, in this case, the clamps have been moved by the stepping motors four steps past the location at which the sensors indicated a correct change of direction for both reference axes. If the clamps were moved along either axis in the unspecified direction, the subauxiliary mode is entered for that axis. If the clamps were moved along both coordinate directions in the unspecified directions during the auxiliary homing mode, the subauxiliary homing mode is entered for both axes to move the clamps along both axes in the specified directions to the final home position.

A discussion of the transition from the auxiliary homing mode to subauxiliary homing mode, if any, is described as follows. When both stepping motors have been stopped in the auxiliary homing mode and both X and Y run flip flops ff21B and ff32B have been reset by the signals X Stop-N and Y Stop-N, as shown in FIG. 21d, the flip flops form a lo signal at both inputs of NOR gate NO20C. As previously described, when both inputs of the gate go lo, a positive pulse is generated as the signal Mode Pulse-P.

Referring now to FIG. 21e, since the output of inverter I46B is lo at this time, the output of NAND gate NA73D to the single-shot SS33B is hi, thus inhibiting the single-shot and preventing the signal Mode Pulse-P from triggering this single-shot. However, the output of inverter I46C is now hi, and the positive pulse Mode Pulse-P is inverted by NAND gate NA45B, such that the lo pulse formed at the gate output triggers single-shot SS33A at pin 9. The triggered single shot then undergoes a delay of 10 milliseconds. As previously described, the 10 millisecond delay permits the stepping motors to settle out, for if the stepping motors are driven in an opposite direction while still undergoing relatively large oscillations, they may move in an incorrect direction when driven again. When the single-shot SS33A times out and its Q bar output goes hi, the differentiator circuit 566 generates a positive pulse. The positive pulse is presented at input 9 of AND gate A11A, and the pulse is also inverted by inverter I10B, with a lo pulse being formed at input 2 of NOR gate NO9B.

It is apparent that both the input 10 to AND gate A11A and input 3 of NOR gate NO9B are lo at this time. This follows since both flip flops ff60B and ff85A were reset during initialization by the signal Reset-N, resulting in hi signals at the inputs of NAND gate NA60C. Thus, the output of NAND gate NA60C is lo, and input 10 of gate A11A and input 3 of gate NO9B are both lo. Accordingly, the hi pulse from differentiator circuit 566 is blocked at the AND gate A11A by its lo input 10. However, the lo pulse at input 2 of NOR gate NO9B is inverted and passed through the gate. The resulting positive pulse is formed at input 1 of NAND gate NA85B, input 4 of NAND gate NA85C, and pin 10 of the single-shot SS59B.

It will be seen that the Q bar output of flip flop ff99A is connected through delay circuit 568 to input 2 of NAND gate NA85B, while the Q bar output of flip flop ff99B is connected through delay circuit 570 to input 5 of NAND gate NA85C. As discussed above, the Q bar outputs of both flip flops were set at the beginning of the auxiliary homing mode, and provides a reference for the direction in which the X and Y stepping motors were driven during the auxiliary mode. It is also noted that the flip flops ff99A and ff99B have not been reset since the auxiliary homing mode was entered.

If the Q bar output of flip flop ff99A is hi, the positive pulse at input 1 of NAND gate NA85B is passed through the gate and inverted to a lo pulse which sets flip flop ff60B and initializes the start of a subauxiliary homing mode for the X axis. Contrawise, if the Q bar output of the flip flop ff99A is lo, the positive pulse is prevented from passing through gate NA85B, and the output of the gate remains hi, thus preventing initialization of the subauxiliary homing mode for the X axis.

Similarly, if the Q bar output of flip flop ff99B is hi, the positive pulse at input 4 of NAND gate NA85C is passed through and inverted by the gate, and the corresponding lo pulse sets flip flop ff85A to initialize a subauxiliary homing mode on the Y axis. Contrawise, if the Q bar output of flip flop ff99B is lo, the positive pulse is blocked at NAND gate NA85C, thus preventing initialization of the subauxiliary homing mode by the flip flop ff85A for the Y axis.

Accordingly, a lo Q bar output of flip flop ff99A indicates that the clamps approached the home position from the correct direction. Thus, no further movement of the clamps in the X direction is needed, and the subauxiliary mode for the X axis is not entered. Alternatively, if the Q bar output of flip flop ff99A is hi, this provides an indication that additional movement of the clamps along the X axis is necessary to obtain the correct home position in the X coordinate direction, and the subauxiliary mode for the X axis is then entered. Similarly, for the Y axis, a lo Q bar output of the flip flop ff99B indicates that the clamps were driven in the correct direction during the auxiliary mode, and the subauxiliary homing mode is not entered. Alternatively, if the Q bar output of flip flop ff99B is hi, the clamps were not moved during the auxiliary mode in the correct direction, and the subauxiliary mode is entered for the Y axis.

Assuming first, for purposes of description, that the Q bar outputs of both flip flops ff99A and ff99B are lo, indicating that the clamps are at their correct home position and that the subauxiliary homing mode will not be entered for either axis, neither of the flip flops ff60B nor ff85A are set. Accordingly, output 11 of flip flop ff60B and output 8 of flip flop ff85A remain in their initialized hi state, and both inputs 4 and 5 of NAND gate NA60C and the inputs 3 and 4 of AND gate A100C are all hi. The single-shot SS59B, which is triggered at pin 10 by the positive pulse from NOR gate NO9B, undergoes a 6 microsecond delay before it times out to allow sufficient time for the flip flops ff60B and ff85A to be set in the event that the subauxiliary mode will be entered on one or more axes. When the Q bar output of single-shot SS59B times out and goes hi, the differentiator circuit 572 generates a positive pulse which is passed through AND gate A100C as a positive pulse due to the high conditions at inputs 3 and 4 of this gate. The positive pulse is inverted by NOR gate NO9C to form a lo pulse as the signal End Homing-N. The use of the signal End Homing-N at the end of the homing mode will be described in detail below.

The lo pulse from NOR gate NO9C is inverted by inverter I10C, and the corresponding positive pulse is inverted by NOR gate NO9A as a lo pulse for the signal Homing Clear-N, which is utilized to initialize the system for a subsequent homing mode. Thus, the lo pulse signal Homing Clear-N resets the following flip flops: ff60B(FIG. 21e), ff85A(FIG. 21e), ff45A(FIG. 21e), and ff21A(FIG. 21d). As shown in FIG. 21d, resetting of the flip flop ff21A by the signal Homing Clear-N resets its output signals Basic Home-P lo and Basic Home-N hi. As illustrated in FIG. 21e, resetting of flip flop ff45A results in a hi condition for the signal LS Shift-N, which results in operation of the system again at the fast clock rate of 850 cycle/second, and a lo signal at the input of inverter I46B. The remaining flip flops of the homing circuitry have been previously reset. Continuation of the system after the homing mode is dependent upon the signal End Homing-N, described below.

Next, it is assumed that the clamps have not been positioned correctly along the X axis during the auxiliary homing mode, and that a subauxiliary homing mode is necessary for the X axis. In this condition, the Q bar output of flip flop ff99A is hi, as discussed above in connection with FIG. 21e, the positive pulse at input 1 of NAND gate NA85B is inverted by the gate, and the corresponding lo pulse output from the gate sets flip flop ff60B. Also, the lo pulse signal X Axis Sub Aux Set Pulse-N is connected to input 10 of NAND gate NA100A resulting in a positive pulse at the CLK input of flip flop ff99A. Accordingly, the positional information from the X Homing Sensor Signal is established at the Q and Q bar outputs of the flip flop at this time, as previously described. It is noted that the circuitry for the X and Y parts of the subauxiliary homing mode is relatively independent. Thus, if the Y subauxiliary homing mode is not entered, positional information is not established in the flip flop ff99B.

When the flip flop ff60B is set, a lo condition is established at input 5 of NAND gate NA60C and input 3 of AND gate A100C. Although the single-shot SS59B is still triggered by the positive pulse at its pin 10, the lo condition at input 3 of AND gate A100C prevents the positive pulse generated by differentiator circuit 572 from passing through this gate. It will be recalled that the single-shot SS59B times out after a 6 microsecond delay to permit sufficient time for the flip flop ff60B (or flip flop ff85A) to be set and the gates NA60C and A100C to be conditioned. Thus, the lo pulse signals End Homing-N and Homing Clear-N are not received at this time.

When the flip flop ff60B is set and its output 8 goes from lo to hi, the differentiator circuit 574 generates a positive pulse as the signal X Run Set-P. Referring to FIG. 21d, the positive pulse signal X Run Set-P is inverted by NOR gate NO20A and the resulting lo pulse sets the X run flip flop ff21B. Thus, the flip flop output signal X Run-N is set lo and the signal X Run-P is set hi. Referring to FIG. 21j, the lo signal X Run-N starts the pulse train X Count Pulse-P, which is formed from the signal LS Osc-N, as previously described. It should be noted that at this time, the signal LS Shift-N remains lo, and that the square wave signal LS Osc-N, and thus the pulse train X Count Pulse-P, is still at the low rate of 425 cycles/second. As described in connection with FIG. 21k, the hi signal X Run-P and the pulse train X Count Pulse-P result in formation of the lo pulse train X Combo-N for driving the X stepping motor. As in the auxiliary homing mode, the XA Pulse is inhibited since the signal LS Shift-N is lo at this time.

Referring to FIG. 21e, when the X Homing Sensor senses a crossing along the X axis, and a change of state is obtained at input 2 of exclusive OR gate EO101A, the positive pulse is again generated by differentiator circuit 544. Since input 5 of NOR gate NO71B remains lo, the positive pulse is inverted twice by inverter I46D and gate NO71B, and the resulting hi pulse sets the flip flop ff71C. The resulting lo output 13 of the flip flop releases the hold on counter CT58, and the counter begins its count to four, as actuated at the CLK input by the signal Homing LS Osc-P, which is still at the low speed of 425 cycles/second. When the counter counts to four and its QD output goes hi, the flip flop ff71C is reset by a positive pulse from differentiator circuit 560, and a lo pulse is developed from gate NO134A for the signal X Stop-N, as previously described. The signal X Stop-N resets flip flop ff21B, as previously described in connection with FIG. 21d, resulting in a hi condition for the signal X Run-N. As described in connection with FIG. 21j, the hi signal X Run-N sets the signal X Count Pulse-P lo, thus terminating the X stepping motor. Accordingly, the clamps have been moved in the X coordinate direction four steps or pulses past the location at which the X Homing Sensor indicated a change of direction, and the clamps have now been positioned at their correct home location in the X subauxiliary homing mode, with movement having taken place from the proper direction.

Referring back to FIG. 21d, when the X run flip flop ff21B has been reset by the signal X Stop-N, a lo condition is established at input 9 of NOR gate NO20C by the flip flop. The operation of the circuitry responsive to such a signal will be explained after a description of the Y subauxiliary homing mode.

The operation of the Y subauxiliary homing mode is similar to that described in connection with the X subauxiliary homing mode. Referring to FIG. 21e, if the Q bar output of flip flop ff99B is hi, which was set at the beginning of the auxiliary homing mode, which indicates that a subauxiliary homing mode for the Y axis should be entered, the flip flop ff85A is set, as previously described, by the lo pulse from the output of NAND gate NA85C. The lo pulse for the signal Y Axis Sub Aux Set Pulse-N is inverted by the NAND gate NA100B, and is utilized to clock Y position data into the flip flop ff99B, as previously described. The output 8 of the set flip flop ff85A goes lo, thus resulting in a lo signal at both input 4 of NAND gate NA60C and input 4 of AND gate A100C. The lo condition at input 4 of AND gate A100C prevents passage of the positive pulse generated by circuit 572, as previously described in connection with the X subauxiliary homing mode. Accordingly, if either or both of the X and Y subauxiliary homing modes are entered, the positive pulse from differentiator circuit 572 is not passed through the AND gate A100C, and the homing mode is not ended at this time.

When the output 11 of the set flip flop ff85A goes hi, the differentiator circuit 576 generates a positive pulse as the signal Y Run Set-P. Referring to FIG. 21d, the positive pulse Y Run Set-P is inverted by the NOR gate NO20B, and the corresponding lo pulse sets the Y run flip flop ff32B. Accordingly, the flip flop output Y Run-N is set lo, and, as described in connection with FIG. 21j, the lo signal Y Run-N results in formation of the pulse train Y Count Pulse-P from the signal LS Osc-N, which is at its low speed of 425 cycles/second. Referring to FIG. 21k, the hi signal Y Run-P and the pulse train Y Count Pulse-P result in formation of the lo pulse train Y Combo-N for moving the Y stepping motor. As noted above, the signal LS Shift-N is lo at this time, and thus the YA Pulse is inhibited.

Referring back to FIG. 21e, when the Y Homing Sensor Signal indicates a change of direction, the signal at input 12 of exclusive OR gate EO101B changes state, the differentiator circuit 548 generates a positive pulse, and the resulting positive pulse formed at input 5 of flip flop ff86C sets the flip flop, which releases the hold on counter CT87. It is noted in this regard that the input 12 of NOR gate NO86B is lo at this time. When the counter CT87 counts to four and its QD output goes hi, the flip flop ff86C is reset by the pulse generated by circuit 564, and a lo pulse is developed as the signal Y Stop-N at the output of NOR gate NO134B, as previously described. As described in connection with FIG. 21d, the signal Y Stop-N then resets the Y run flip flop ff32B, resulting in a hi output signal Y Run-N. The hi signal Y Run-N, as described in connection with FIG. 21j, causes the signal Y Count Pulse-P to go lo, and terminates movement of the Y stepping motor. Thus, the clamps have been moved four pulses or steps past the position at which the Y Homing Sensor indicated a change of state, and the clamps have been positioned at the desired home location along the Y axis during the Y subauxiliary homing mode, and while the clamps have been moved from the correct direction.

It is noted at this time that the proper direction for movement of the X and Y stepping motors has been determined throughout the basic homing mode, the auxiliary homing mode, and the subauxiliary homing mode by the signals X Direction and Y Direction, as shown in FIG. 21e. As previously discussed, the X Direction and Y Direction signals are determined by the signals X Home Dir-P and Y Home Dir-P, respectively, from the Q outputs of the flip flops ff99A and ff99B. Accordingly, irrespective of the particular homing mode involved, the Q outputs of the flip flops are set in the appropriate condition to obtain proper control of the X and Y stepping motors and movement of the clamps in the desired direction.

Referring back to FIG. 21d, when the Y run flip flop ff32B has been reset in the subauxiliary homing mode, the signal Y Run-P is reset lo. Accordingly, the input 8 of NOR gate NO20C is lo when movement in the Y direction during the subauxiliary homing mode has been completed. Thus, if both the X and Y subauxiliary homing modes were entered, the output of NOR gate NO20C goes hi when both X and Y run flip flops ff21B and ff32B are reset by the signals X Stop-N and Y Stop-N, respectively. If only the X subauxiliary homing mode was entered, the Y run flip flop ff32B was not set by the signal Y Run Set-P, and the input 8 to NOR gate NO20C remains low during the X subauxiliary homing mode. Accordingly, in this case, the output of NOR gate NO20C goes hi when the X run flip flop ff21B is reset by the signal X Stop-N. Similarly, if only the Y subauxiliary homing mode was entered, the X run flip flop ff21B was not set by the signal X Run Set-P, and the input 9 of NOR gate NO20C remains lo throughout the Y subauxiliary homing mode. Thus, when the Y run flip flop ff32B is reset by the signal Y Stop-N, the output of gate NO20C goes hi at that time. Accordingly, the output of gate NO20C is only set hi until completion of all subauxiliary homing modes entered, whether it be X, Y, or X and Y. At this time, the differentiator circuit 550 generates a positive pulse resulting in formation of the positive pulse as the signal Mode Pulse-P at the output of NOR gate NO20D. Accordingly, the positive pulse Mode Pulse-P will be generated irrespective of whether one or both of the subauxiliary homing modes had been entered.

Referring now to FIG. 21e, the signal Mode Pulse-P is connected to input 12 of NAND gate NA73D and input 9 of NAND gate NA45B. Since the input 13 of gate NA73D is lo, the single-shot SS33B is inhibited, as described in connection with the auxiliary homing mode. However, since the output of inverter I46C to input 10 of NAND gate NA45B gate NA45B is hi, the positive pulse Mode Pulse-P is passed through the gate NA45B and is inverted to trigger the single-shot SS33A at pin 9 of the single-shot. As before, the single-shot SS33A undergoes a 10 millisecond delay, and when the single-shot times out the differentiator circuit 566 generates a positive pulse. Since either one or both of the flip flops ff60B or ff85A was set during the start of the subauxiliary homing mode, either one or both of the inputs 4 or 5 at NAND gate NA60C is lo at this time. Accordingly, the output of gate NA60C and the input 3 of NOR gate NO9B is hi, and the lo pulse formed at input 2 of NOR gate NO9B is prevented from passing through the gate by the hi signal at input 3 of this gate. However, since the input 10 of AND gate A11A is also hi, as determined by the output of gate NA60C, the positive pulse generated by circuit 566 is passed through the gate to input 6 of NOR gate NO9C. The positive pulse is inverted and passed through gate NO9C, such that a lo pulse is formed as the signal End Homing-N. The lo pulse at the output of gate NO9C is also inverted by inverter I10C, and the corresponding positive pulse from the inverter is inverted by the NOR gate NO9A as a lo pulse for the signal Homing Clear-N, which is utilized to reset the flip flops of the homing circuitry for a subsequent homing operation. Accordingly, at this point the homing mode has been completed irrespective of whether one or more subauxiliary homing modes were entered.

Referring now to FIG. 21d, irrespective of the state of the signal Basic Home-P from flip flop ff21A, the input 1 of NAND gate NA11B is hi at this time, since the input 3 of OR gate O8C goes hi when the pulse generated by differentiator circuit 550 decays. Accordingly, the lo pulse End Homing-N is inverted and passed through the NAND gate NA11B as a positive pulse which triggers the single-shot SS22B at its pin 10. The single-shot SS22B undergoes a five millisecond delay, and when the single-shot times out and its Q bar output goes hi, the differentiator circuit 578 generates a positive pulse. The NAND gate NA11C inverts the positive pulse, since the signal NTB Mode-OP is hi in the absence of a thread break indication from the Thread Break Sensor, as discussed above. The signal Clamp Mode-OP was set lo before the homing mode was entered, and, accordingly, the lo pulse formed at input 11 of NOR gate NO34B is inverted by the gate and is passed as a hi pulse to input 1 of NOR gate NO135A. Since the signal Aux Start-P is normally lo, the positive pulse at input 1 of NOR gate NO135A is inverted by the gate and again by inverter I31B, such that a positive pulse is formed at input 6 of the flip flop ff34A which sets the flip flop. The output of this flip flop Mem Cycle Enable-P is set hi, while the output Mem Cycle Enable-N is set lo to initiate the first memory cycle under program control of the system.

Under program control, the needle may be reciprocated at either fast or slow speed. At fast speed, the sewing machine is driven at a rate of approximately 3000 revolutions/minute by the Quick device, such that the needle reciprocates at the same rate. Accordingly, the basic timing cycle for the machine at the first rate is 20 milliseconds/cycle, and at this rate the needle enters the fabric once every 20 milliseconds. At the slow speed, the machine is driven at approximately 200 revolutions/minute, such that the timing cycle at the slow speed is approximately 300 milliseconds, with the needle entering the fabric once every 300 milliseconds.

Figure 25:
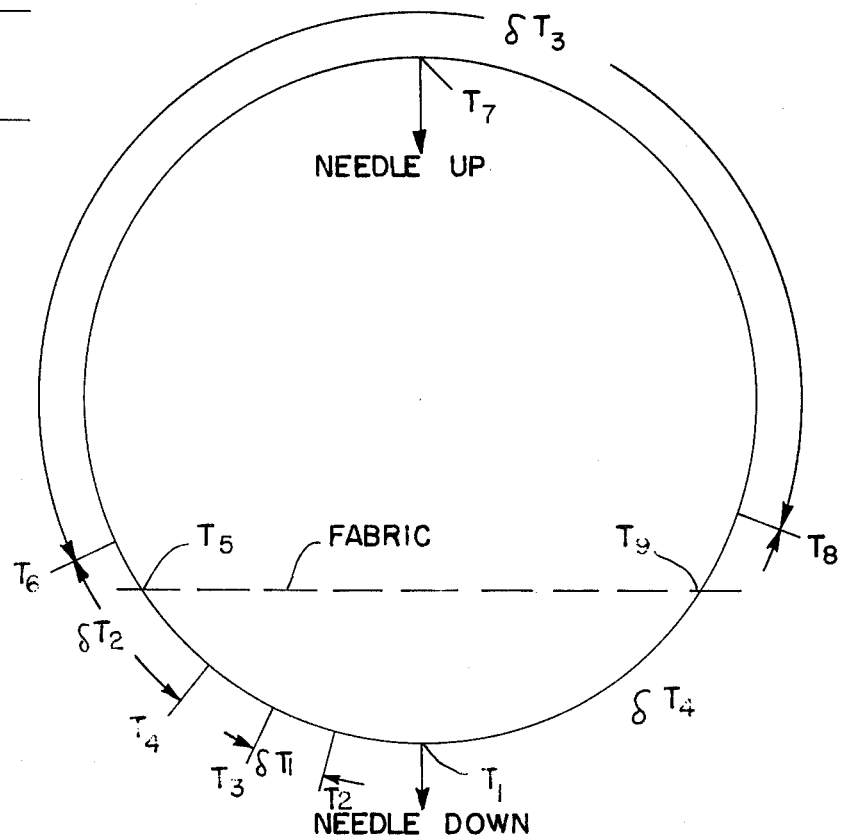
FIG. 25 is a timing diagram for a machine cycle during normal operation of the sewing machine.

A schematic illustration for the timing cycle at the fast speed of 20 milliseconds is illustrated in FIG. 25. At the time T1 the needle is in its down position in the fabric, and at time T2 the memory cycle is initiated. The time period represented by delta T1 occurs during the memory cycle while information is read from the PROM and is decoded. The time required by the memory cycle (delta T1) is approximately three-tenths of 1 millisecond and the memory cycle ends at time T3. The time T4 represents the time at which a positive pulse is formed as the signal Needle Disengage Pulse-P responsive to the photosensor in the unit 62, which indicates that energization of the motors may be initiated. When the pulse Needle Disengage Pulse-P is received, movement of the stepping motors is initiated during the period of time delta T2. Although the needle does not actually leave the fabric until a later time T5, energization of the motors may be started at the time T4 due to a lag time associated with the motors and inertia in the work holder. Also, the clamps, which are driven by the stepping motors, may move about one motor step before the time T6, due to the resilience of the work piece and flexibility of the needle, which is after the time T5 when the needle leaves the fabric. It is noted that the period of time delta T2 may represent the worst lag time at the slow speed of the machine to prevent movement of the clamps at the slow speed before the needle leaves the fabric. Alternatively, the slow speed commands may be programmed to result in little or no movement of the clamps, as desired.

The period of time designated as delta T3 represents the period of time which may be required to actually move the clamps during the maximum amount of movement permitted as programmed in memory. The needle is in its up position at the time T7. Accordingly, the maximum amount of movement of the clamps is limited at fast speed due to the constraints of the time period delta T3, such that clamp movement is completed at approximately time T8 before the needle again enters the fabric at time T9. The time elapsed during time period delta T4 is a 5 millisecond delay after movement of the clamps and before the next memory cycle is initiated at the time T2. At this time, one cycle of the machine has been completed during which the needle is reciprocated once, assuming that the system is in a stitch mode. During each timing cycle, information is read from the PROM and is decoded, and the clamp is moved as specified during the cycle. The program in the PROM results in a sequence of such cycles during a sewing operation, such that the clamp is moved in a series of steps, as will be described below.

During the memory cycle the control system reads information from the memory of the PROM, and utilizes the data in a decoded form to perform an operation by the sewing machine. Referring now to FIG. 26, each of the PROMs have 256 eight bit words, with each of the words being designated 1, 2, 3, ... 255, and 256. The separate bits in each word are designated $b1, b2, \ldots b7$, and $b8$, with the bit $b1$ being the low order bit, and the bit $b8$ being the high order bit. As indicated, all of the eight bit words are separated into two banks, bank A and bank B, with the low order bits $b1, b2, b3$, and $b4$ of each of the 256 words being located in bank A, while the high order bits $b5, b6, b7$, and $b8$ are located in bank B. Accordingly, the bank A comprises 256 four bit words of the low order bits, while the bank B comprises 256 four bit words of the high order bits. The corresponding address for each of the eight bit words or storage locations is set forth at the left in the drawings. Since 256 words are included in memory, the address for the first eight bit word is the binary configuration 00000000, while the binary configuration of the address for the 256th eight bit word is 11111111. The memory cycle involved with each of the words is also specified in the drawing, and will be further described below.

Referring now to FIG. 21a, the machine operator may select various program modes by the four way Program Select switch, as previously described in connection with FIG. 18. For the selection A, an entire program is located in bank A of the PROM, and comprises a separate program in itself. Similarly, if the operator selects the B setting of the switch, an entire program is utilized in bank B. For the setting Remote A/B Select, the operator may switch banks to obtain separate programs in banks A and B by actuation of a switch in a foot pedal, as described. For the Extend setting of the Program Select Switch, the control system first utilizes a portion of the program located in bank A, and then automatically switches to the remainder of the program located in bank B.

Returning now to FIG. 26, the memory layout in the PROM for the A, B, or Remote A/B Select settings of the Program Select Switch are illustrated in this drawing. In this configuration, a complete program should be placed in one or more of the two banks. Thus, if the bank A has been selected by the operator, a complete program should be contained in bank A, and the data necessary for this program must be sufficiently small to permit placement of the program in this bank. Similarly, if bank B has been selected by the operator, a separate program must be contained in bank B, and should be sufficiently small to permit placement in this bank. Of course, it is desirable to place two separate programs in the memory, if possible, to make maximum use of the PROM. Thus, the operator can select the desired program by the setting of the Program Select Switch for operation of the machine. Also, for the Remote A/B Select setting of the Program Select Switch, a program should be located in each of the banks, and after completion of a program in one bank, the operator may select a program in the other bank by depressing the foot pedal. Thus, after completion of the program in one bank, the operator may depress the foot pedal, and the program in the other bank may be started. When the program in the second bank is completed, the operator may initiate the program in the first bank by again depressing the foot pedal, or may continue with the same program, as desired.

Accordingly, a separate program may be placed in both of the banks, and either of the programs may or may not occupy the entire 256 four bit words of the bank. During each memory cycle for one sequence of the machine, three four bit words are utilized from each bank for the sequence. Thus, assuming that a program is started in bank A, the control system initiates the program at word 2 and at address 00000001 during the first memory cycle, with the first four bit word from bank A being skipped at storage location or address 00000000. The system first reads in and decodes the Y data from bank A which is located in the lower bit portion of word 2. After decoding the Y data, the system reads in the four bits of X data located in word 3 of bank A, corresponding to the address 00000010. After decoding the X data, the control system then reads the four bit control or command word from the four lower order bits in bank A of word 4, corresponding to the address 00000011, after which the system decodes this information for a single sequence of the machine.

Thus, the complete information of twelve bits has been read from the PROM during the first memory cycle at this time, and further information is not read from the PROM until the next memory cycle, which is approximately 20 milliseconds later during fast speed operation of the machine. During the second memory cycle, the system reads the Y data from word 5 of bank A, the X data from word 6 of bank A, and the control word 7 of bank A, as the address registers are incremented, with the information being decoded between readings. Accordingly, during each subsequent memory cycle the system continues to read three four bit words from bank A until the program has been completed. Assuming that the program occupies all of the memory in bank A, the last memory cycle will be number 85, as shown, and during this memory cycle the system will read the Y data from word 254 of Bank A, the X data word 255 of Bank A, and finally the control word from word 256 of Bank A, which corresponds to the address 11111111. At this point, the program must be completed since the program in question is entirely contained in bank A, and the control word in word 256 must therefore be an End of Program Command. Of course, the program may be terminated at some memory cycle before the 85th memory cycle, if it is not necessary to utilize the entire memory of the bank.

The same operation takes place in reading a program from bank B. During the first memory cycle the system sequentially reads the four bit data contained in words 2-4 of bank B, with the first word being skipped at address 00000000. Thus, the system reads the Y data from word 2 of bank B corresponding to address 00000001, the X data in word 3 of bank B corresponding to address 00000010, and the control word in word 4 of bank B corresponding to address 00000011. During the second memory cycle the three four bit words are read from words 5-7 of bank B. The reading sequence continues until the program has been completed, and if the program occupies the entire bank B, the final three four bit words are read from words 254-256.

The configuration of the PROM memory for the Extend setting of the Program Select Switch is illustrated in FIG. 27. As noted above, this mode of the Select Switch will be utilized when the program is too large to be contained in one bank of the PROM. During the first memory cycle, the control system obtains the first four bit word, containing Y data, from word 2 of bank A corresponding to the address 00000001. The system continues to read the next two four bit words in words 3 and 4 of Bank A. During the second memory cycle the program reads three four bit words from words 5-7 in bank A. The system sequentially reads three four bit words during each memory cycle until the information from words 254–256 has been obtained from bank A during memory cycle No. 85, at which point the reading of information from the PROM is automatically switched by the system to bank B. During the 86th memory cycle, the program first reads the Y data contained in word 1 of bank B corresponding to the address 00000000. Thus, the address 00000000 is not skipped in bank B of the Extend mode. As shown, the second and third four bit words during memory cycle 86 are obtained from words 2 and 3, respectively, of bank B. The system continues reading information from bank B during each of the memory cycles until the program has completed. If the program occupies the entire memory of bank B, in addition to bank A, the last memory cycle will be 170, and the last four bit word will be obtained from word 255 of bank B corresponding to the address 11111110. In the Extend mode, the 256th word corresponding to the address 11111111 is not used. It is apparent that since the number 256 is not divisible by three, there will always be one four bit word in each bank which will not be used.

As illustrated in FIGS. 28, the Y data word comprises four bits irrespective of the bank in which it is located, and is utilized as positional information for movement of the clamps. As described, in bank A the four bits are contained in the low order bits $b1$, $b2$, $b3$, and $b4$, while in bank B the four Y data bits are contained in the high order bits $b5$, $b6$, $b7$, and $b8$. A typical word is shown in its binary configuration, and comprises the decimal number 3. For this information of the Y data word, the control system will direct the stepping motors to move the clamps three steps in the Y direction. Similarly, in connection with FIG. 29, the X data word comprises four bits which is contained as the four low order bits in bank A, and as the four high order bits in bank B. In this particular example, the X data information is equal to five steps in the X direction as coded in binary form.

The format of the four bit control word for both the X and Y positional information is illustrated in FIG. 30. If the control word is stored in bank A, it is positioned in the low order bits $b1$, $b2$, $b3$, and $b4$, while if in bank B, it is contained in the high order bits $b5$, $b6$, $b7$, and $b8$. Whether the word is located in bank A or bank B, the format is the same. The low order bit of the four bit word is a binary bit which designates the direction of movement desired in the Y direction. As indicated, if the bit $b1$ or $b5$ is a binary 1, this specifies that the clamps should be moved relative the needle in the $+Y$ direction. Accordingly, the clamps will be moved in the $+Y$ the magnitude of movement as indicated in the corresponding Y data word. If the binary bit $b1$ or $b5$ is zero, this indicates that the clamps should be moved in the $-Y$ direction the magnitude of movement contained in the Y data word. The directional information for movement in the X direction is specified in the second low order bit $b2$ or $b6$ of the four bit control word. If the bit is a binary 1, a movement in the $+X$ direction is indicated, while the clamp is moved in the $-X$ direction if the bit is a binary 0. Accordingly, the clamps are moved in the specified direction as indicated by this bit, while the magnitude of direction is indicated in the X data word.

The two high order bits in the control word designate the particular sewing mode to be undertaken corresponding to this memory cycle. As indicated, if the Mode Code or Command bits have a binary configuration of 00, the Stop Stitch Mode will be entered. In this mode, the reciprocation of the sewing needle is stopped, and the clamps are moved without stitching. Although the fabric is not being stitched during this mode, the direction and magnitude of movement in the X and Y directions is specified by the X and Y direction bits and by the X and Y data words, as described above. As indicated, if the Mode Code in the two high order bits has a binary configuration of 01, the Stitch Mode will be commanded to the machine. In this configuration, the machine is operated at its fast speed. If the two high order bits have a configuration of 10, the Slow Stitch Mode will be entered, and the sewing machine operates at its slow speed. During the Stitch and Slow Stitch Modes, the X and Y directional information and X and Y data words are used as positional information for the clamps, as described. This Slow Stitch mode is normally entered toward the end of a program or before the Stop Stitch Mode, and may be used to slow the machine immediately prior to stopping reciprocation of the needle. Finally, if the Mode Code has a binary configuration of 11, the End of Program Mode is entered, instructing the sewing machine to stop reciprocation of the needle, and automatically resulting in a homing mode to position the clamps at the correct home position relative the needle. The End of Program Command or Mode will only occur once in a program, and is the last command used in the program to end the sewing operation.

By programming a sequence of control words and their associated X and Y data words, a program for operation of the machine is obtained. For example, the Mode Code in the first control word may be a Stop Stitch Command to move the clamps from their home location to a spaced position where sewing will commence, after which the Stitch Mode is entered to sew the fabric at fast speed. Alternatively, the Mode Code in the first control word may be a Stitch Command, such that during the first timing cycle of the machine the fabric is stitched at fast speed in the direction as indicated by the X and Y Directions in the same control word, and with magnitudes as indicated in the corresponding X and Y data words. It may be desirable to use a consecutive sequence of control words which command the Stitch Mode, such that the machine continuously stitches at its fast speed while moving in the respective directions and magnitudes as specified in the associated data. At some point it may be desirable to move the clamps without stitching from a first stitched location to another spaced location where stitching again begins, for example, while moving different corners of the label into alignment with the needle to stitch corners of the label to the fabric. In this case the Slow Stitch Commands may be used to slow the machine. Then the Stop Stitch Mode is entered by using the proper information in the Mode Code bits of the control word, at which time the thread will be automatically cut, and the clamps will be moved according to the direction and magnitude information associated with the particular Stop Stitch Command. Of course, a consecutive sequence of Stop Stitch Commands may be utilized to continuously move the clamps without stitching. When the clamps have been positioned during the Stop Stitch Mode, as desired, the Stitch Mode may be entered again, after which the machine is operated at its fast speed. Finally, when it is desired to end the stitching pattern, the Slow Stitch Mode may be entered for a few commands to slow the machine to its slow speed before entering the End of Program Mode. When the End of Program Mode has been commanded, reciprocation of the needle is stopped, the thread is automatically cut, and the clamps are returned to their home position by the control system. At this time, the program and sewing operation have been completed.

It will be seen that the program and control system may command the machine to stitch a first pattern comprising a sequence of commands and steps, to move the clamps without stitching to a second spaced location on the fabric, and then to sew a second pattern comprising a sequence of stitching steps after which the program may be terminated. Or, if desired, a number of spaced stitch patterns may be sewn after moving the clamps without stitching between the sewing sequences to form a number of spaced stitch patterns.

The control system operates during the first and subsequent memory cycles as follows. When the flip flop ff34A, shown in FIG. 21d, is set, and the signal Mem Cycle Enable-P goes hi, the differentiator circuit 580, which is illustrated in FIG. 21i, generates a positive pulse. The pulse is inverted twice by inverters I24E and I24F, and the flip flops ff3A, ff3B, ff4A, ff4B, ff15A, ff15B, ff27A, and ff27B are reset by the positive pulse at their inputs. These flip flops are thus initialized at the start of the memory cycles for later decoding of X and Y positional information.

As shown in FIG. 21c, when the signal Mem Cycle Enable-N goes lo, responsive to the setting of the memory cycle flip flop ff34A of FIG. 21d, the pulse train at input 12 of NOR gate NO38A is inverted and passed through the gate as the signal Clock Pulse, as previously described. Thus, the first pulse after the signal Mem Cycle Enable-N goes lo is passed through the gate NO38A. Although the nature of the signal Clock Pulse has been previously described, the associated clock signals may be better understood in connection with the illustrations of the signals in FIG. 31. As shown, the signal Clock Pulse comprises a pulse train of narrow pulses, with the leading edge of each of the pulses corresponding to the trailing edge of the output H.S. Clock from the High Speed Oscillator. Accordingly, the pulse train Clock Pulse is formed at the clock rate of the High Speed Oscillator, corresponding to the rate of 8500 pulses/second.

Figure 31:
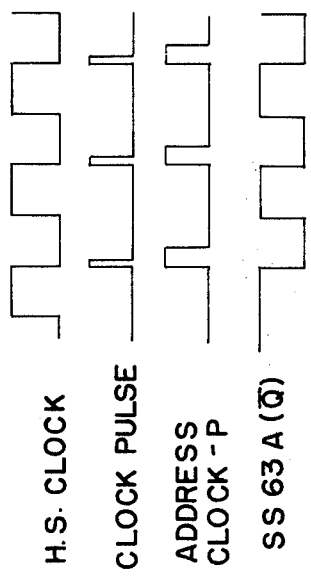
FIG. 31 is a timing diagram of signals formed by the control system of the present invention.

As shown in FIG. 21j, the signal Clock Pulse is connected to pin 10 of single-shot SS48B, and each of the pulses triggers this single-shot. Since the pulses in the signal Clock Pulse are relatively narrow, the single-shot SS48B is utilized to regenerate the pulse, resulting in a corresponding pulse train Address Clock-P of widened pulses at the Q output of the single shot, as shown in FIGS. 21j and 31. As shown in FIG. 21j, the signal Address Clock-P is connected to CLK input of the strobe counter CT65. The counter CT65 is a four bit counter, but only the two lower order bits are utilized by the system. The counter is cleared to its zero state by the signal Reset-N during initialization of the control system at its CLR input. The counter is triggered at the trailing edge of each of the pulses in the signal Address Clock-P, with the output 14 of the counter reflecting the low order bit, and with the output 13 reflecting the next higher order bit. Accordingly, the trailing edge of the first pulse received from the signal Address Clock-P increments the two low order bits of the counter by one count to the binary configuration of 01, such that output 14 of the counter goes hi, while the output 13 remains lo. This particular output is utilized to decode the Y data, as will be seen below.

Since the strobe counter CT65 had previously been cleared to zero by the signal Reset-N, the outputs 14 and 13 of the counter were initially lo, before the counter was incremented. Accordingly, input 4 of NAND gate NA51A, input 1 of NAND gate NA51B, and inputs 10 and 11 of NAND gate NA51C were lo after initialization, and the outputs of the gates NA51A, NA51B, and NA51C were hi before the counter was incremented.

When the counter is incremented the first time, with the output 14 of the counter being hi and with the output 13 being lo, the hi output 14 of the counter is inverted by inverter I50E, such that inputs 3 and 4 of NAND gate NA51A are both lo, and the output of the gate NA51A remains hi. However, for NAND gate NA51B, the lo output 13 of the counter is inverted by inverter I50F, such that input 2 of this gate is set hi. Since output 14 of the counter is connected to input 1 of the gate, the input 1 of gate NA51B is also hi, and the gate has been conditioned for use at its input 13. Since the lo output 13 of the counter CT65 is connected to input 11 of NAND gate NA51C, the output of gate NA51C remains hi. As shown, the Q bar output of the single-shot SS63A is connected as an input to all three of the gates NA51A, NA51B, and NA51C. As described below, the Q bar output of this single-shot is set lo until after the counter CT65 has been incremented, such that the single-shot inhibits all three gates NA51A, NA51B, and NA51C with their outputs hi until the single-shot times out and its Q bar output goes hi.

As shown in the drawing, the pulse train Clock Pulse is connected to pin 10 of the single-shot SS63A, and the single-shot is triggered by each of the pulses. As shown in FIG. 31, the Q bar output of the triggered single-shot SS63A goes lo at the time of the leading edge of the pulses in the signal Address Clock-P, but the delay associated with the single-shot is longer than the pulses in the pulse train Address Clock-P. Thus, the single-shot times out after the trailing edge of the pulses in the signal Address Clock-P, with the counter CT65 being incremented on the trailing edge of the pulses Address Clock-P. The counter CT65 thus conditions the gates NA51A, NA51B, and NA51C before the single-shot SS63A times out, and its Q bar output returns to hi. When the single-shot SS63A times out, a hi condition is then established at input 5 of gate NA51A, input 13 of gate NA51B, and input 9 of gate NA51C.

As previously discussed, when the counter CT65 is incremented the first time, the outputs of gates NA51A and NA51C are held hi by the outputs of the counter. However, when the single-shot SS63A times out, all the inputs to NAND gate NA51B are then hi, resulting in a change of the gate output from hi to lo. Accordingly, the signal Y Strobe-N changes from a hi to lo state, and as shown in FIG. 21i, this signal is inverted by inverter I50C, such that the output of the inverter goes from lo to hi at this time. In response, the differentiator circuit 520 generates a positive pulse at the input of the inverter I50D. The use of this pulse for decoding Y information will be discussed in detail below.

Referring to FIGS. 21j and 31, at the time of the next pulse in the pulse train Clock Pulse, the single-shot SS63A is again triggered, the next regenerated pulse in the signal Address Clock-P is formed, and the counter CT65 is incremented again at the trailing edge of Address Clock-P pulse. The counter thus undergoes a change in its two lower order bits to a binary configuration of 10, with its output 14 being lo, and with output 13 being hi. Since input 1 of gate NA51B and input 10 of gate NA51C are both lo, the outputs of these two gates are held hi by output 14 of the counter CT65 at this time. However, the output 14 of counter CT65 is inverted by inverter I50E, such that a hi condition is established at input 3 of NAND gate NA51A. Also, since output 13 of counter CT65 is hi, the input 4 of gate NA51A is also hi. When the single-shot SS63A again times out and its Q bar output goes hi, a hi condition is established at input 5 of gate NA51A. Accordingly, the output X Strobe-N of gate NA51A goes from hi to lo at this time, and, as shown in FIG. 21i, the signal X Strobe-N is inverted by inverter I50A, such that the inverter output goes from lo to hi when the single-shot SS63A times out. In response, the differentiator circuit 518 generates a positive pulse which is presented at the input of inverter I50B. The use of this pulse to decode the X data information will be described in detail below.

Referring to FIG. 21j and 31, at the time of the third pulse in the pulse train Clock Pulse, the single-shot SS63A is triggered, the Address Clock-P pulse is formed, and the counter CT65 is again incremented at the trailing edge of the Address Clock-P pulse. The incremented counter CT65 assumes a binary configuration of 11, with both outputs 14 and 13 being set hi. Since the output 14 of counter CT65 is inverted by inverter I50E, input 3 of gate NA51A is lo, and this gate is inhibited. Similarly, since the hi output 13 of counter CT65 is inverted by inverter I50F, input 2 of NAND gate NA51B is lo, and this gate is also inhibited with its output hi. However, the hi counter outputs 14 and 13 are connected to inputs 10 and 11 of NAND gate NA51C, thus conditioning this gate. When the single-shot SS63A times out, all three inputs to the gate NA51C are hi, resulting in a change of condition at the output of the gate from hi to lo, and the lo signal triggers the single-shot SS63B at its pin 1.

As shown, the Q bar output of single-shot SS63B is inverted by inverter I52A, and when the single-shot is triggered the signal EMC-P is set hi, resulting in completion of the memory cycle, as will be seen below. The signal EMC-P is inverted by inverter I52B, and the lo inverter output is presented at the CLR input of the counter CT65 to clear the counter to zero for use of the counter during a subsequent memory cycle. As shown in FIG. 21d, the hi signal EMC-P resets the memory cycle flip-flop ff34A, with its output Mem Cycle Enable-P being reset lo, and with its output Mem Cycle Enable-N being reset hi. The signal EMC-P is also used elsewhere in the circuitry, as will be discussed below. Referring to FIG. 21j, the signal EMC-P returns to its normal lo condition when the single-shot times out shortly after being triggered.

Thus, there has been described above the manner in which three consecutive pulses of the Clock Pulse signal have been used to sequence the circuitry through a memory cycle. It is noted in this regard that since the pulses in the pulse train Clock Pulse occur at the trailing edge of the pulses in the signal H.S. Clock from the High Speed Oscillator, the signals Y Strobe-N, X Strobe-N, and EMC-P are formed responsive to the trailing pulse edges of the H.S. Clock signal.

The manner in which information is obtain from the memory of the commercially available PROMs is described in connection with FIG. 21a. The internal gating of the PROMs is such that the eight bits of a given memory word are presented as the output signals D0, D1, ..., D6, and D7 of the PROM when an address for the word is presented at the inputs A0, A1, ... A6, and A7 of the PROM. The address has eight bits since there are 256 eight bit words in the PROM, and the eight bit address may form 256 unique binary configurations to address each eight bit word in the PROM. When a storage location is addressed in the PROM, the low order four bits of the addressed word in bank A are presented as the output signals D0, D1, D2, and D3, while the high order four bits of the word in bank B are presented as the outputs D4, D5, D6, and D7. Thus, the output D0 represents the lowest order bit of the word, while the output D7 represents the highest order bit.

As previously discussed, the hi pulse for the signal Address Clear-P which was formed before entering the homing mode, was utilized to clear both address registers AR1 and AR2 to zero. The two registers AR1 and AR2 are four bit counters which are cascaded to obtain the necessary eight bit address, with the register AR1 containing the four low order bits of the address, and the register AR2 containing the four high order bits of the address.

It will be recalled that each of the pulses in the pulse train Address Clock-P were formed at the time of each of the pulses of the pulse train Clock Pulse as illustrated in FIG. 31. Referring again to FIG. 21a, the signal Address Clock-P is connected to the CLK input of the address register AR1 containing the four low order bits of the address, and the address register AR1 is incremented at the leading edge of each of the pulses in the pulse train Address Clock-P. When the address register AR1 has been counted a sufficient number of times to be full, it assumes a binary configuration of 1111, and a hi carry out signal is issued by the register to pins 7 and 10 of the address register AR2. The hi carry out signal enables the register AR2, and the register AR2 will be incremented by the next pulse received at its CLK input from the signal Address Clock-P. The same pulse also increments the low order register AR1, and it returns to its zero condition, with a binary configuration of 0000. At this time the carry out signal from register AR1 goes lo, and remains in its lo condition until the register AR1 is again full. In this manner, the high order register is incremented once every sixteen counts of the low order register AR1, and the signal Address Clock-P increments the registers through their range of 256 binary configurations. The outputs of the registers AR1 and AR2 are utilized as signals for the current address at the inputs A0, A1, ... A6, and A7 of the PROM. Thus, as the address registers are counted, signals for the eight bit word in the PROM corresponding to the address will be formed at the outputs of the PROM.

Accordingly, during the first memory cycle of the program, when the first pulse from the signal Address Clock-P is received at the CLK input of the address register AR1, the address register is incremented by one count such that its low order bit is 1, while the three high order bits remain zero. Also, since the address register AR2 had been previously cleared to zero and is not incremented by the first pulse, all four bits in the address register AR2 remain zero at this time. Accordingly, the address 00000001 is formed by the registers at the inputs of the PROM, with the binary 1 being formed at input A0 of the PROM, and the registers thus signal the PROM to present the eight bit word corresponding to this address at the outputs of the PROM. It may be seen that during the first memory cycle, the address 00000000 is not used. When the address register AR1 is again incremented by the signal Address Clock-P, the address 00000010 is formed at the outputs of the registers, and the PROM selects the corresponding eight bit word in memory, and forms the word at its outputs. When the register AR1 is incremented the third and final time during the first memory cycle, the PROM again forms its output signals as based upon the output signals of the registers. Thus, during each memory cycle the address registers are incremented three times, resulting in three separate outputs from the PROM. In this manner, the address registers are sequentially incremented to obtain the information in memory at the outputs of the PROM, with three output words being formed during each memory cycle.

Four selected bits in each eight bit word at the output of the PROM is formed into inverted information as the signals A Data-N, B Data-N, C Data-N, and D Data-N, as described below. Assuming first that the Program Select Switch has been set at the terminal A, the information is obtained from bank A of the PROM corresponding to the low order bits at the PROM outputs D0, D1, D2, and D3. Since the terminal A is open, a hi condition is established by the power source at the input of the inverter I131C through the resistor R135. The hi signal is inverted twice by inverters I31C and I31D, and a hi signal is formed at input 2 of AND gate A136A, input 6 of AND gate A136C, input 2 of AND gate A137A, and input 6 of AND gate A137C. The hi signal conditions these gates for passage of data from the four low order bits of the PROM to the NOR gates NO138A, NO138B, NO138C, and NO138D, as will be seen below.

The lo output from inverter I31C is connected to input 4 of AND gate A136B, input 8 of AND gate A136D, input 4 of AND gate A137B, and input 8 of AND gate A137D. Accordingly, input 2 of NOR gate NO138A, input 4 of NOR gate NO138B, input 6 of NOR gate NO138C, and input 8 of NOR gate NO138D are lo at this time.

It will be seen that output D0 of the PROM is connected to input 1 of AND gate A136A. Since input 2 of AND gate A136A is hi, if the output D0 is hi, input 1 of NOR gate NO138A is also hi, and the NOR gate NO138A inverts the hi signal to a lo condition as the signal A Data-N due to the lo signal at input 2 of NOR gate NO138A. Contrawise, if the PROM output D0 is lo, input 1 of NOR gate NO138A is also lo, and the NOR gate inverts the signal to a hi condition as the signal A Data-N. Thus, the output D0 from the PROM is inverted as the signal A Data-N. The output D1 of the PROM is connected to input 5 of the AND gate A136C, and it will be apparent that the binary state of the output D1 will be inverted by the NOR gate NO138B as the signal B Data-N. Similarly, the output D2 of the PROM is connected to input 1 of AND gate A137A, and results in an inverted signal C Data-N. Finally, the PROM output D3 is connected through AND gate A137C to the NOR gate NO138D, and this output of the PROM is inverted as the signal D Data-N.

The four PROM high order outputs D4, D5, D6, and D7 of bank B are connected respectively to the AND gates A136B, A136D, A137B, and A137D. Since the other inputs to these gates are lo, the condition of the bank B PROM outputs will have no effect upon the formation of the signals A Data-N, B Data-N, C Data-N, and D Data-N at the current setting of the Program Select Switch. Thus, when the Program Select Switch is set to bank A, the four low order bits, presented at the output of the PROM, are inverted and are formed into the signals A Data-N, B Data-N, C Data-N, and D Data-N. As the address registers are counted and the corresponding eight bit words in memory are sequentially presented at the outputs of the PROM, only the four low order bits are utilized in forming the Data-N signals.

If the Program Select Switch is moved to the B terminal to select bank B, the terminal B and contact of the switch are connected to ground, resulting in a lo input to the inverter I131C. The lo signal is inverted twice by the inverters I131C and I131D, resulting in a lo condition at one of the inputs of the following AND gates: A136A, A136C, A137A, and A137C. Hence input 1 of NOR gate NO138A, input 3 of NOR gate NO138B, input 5 of NOR gate NO138C, and input 7 of NOR gate NO138D are lo, and the four low order PROM output bits D0, D1, D2, and D3, which are connected to the other inputs of the AND gates in question, will have no effect on the formation of the Data-N signals.

However, since the output of inverter I131C is now hi, input 4 of AND gate A136B, input 8 of AND gate A136D, input 4 of AND gate A137B, and input 8 of AND gate A137D are all hi at this time. Since the four high order PROM output signals D4, D5, D6, and D7 are connected to the other inputs of these AND gates, the NOR gates NO138A, NO138B, NO138C, and NO138D invert the PROM outputs as the signals A Data-N, B Data-N, C Data-N, and D Data-N. The inverted output D4 of the PROM corresponds to the signal A Data-N, the inverted output D5 of the PROM corresponds to the signal B Data-N, the inverted output D6 of the PROM corresponds to the signal C Data-N, and the inverted PROM output D7 corresponds to the signal D Data-N. Accordingly, when the Program Select Switch is selected to read from bank B of the PROM, the four high order PROM outputs are inverted and are formed as the Data-N signals. As the address registers AR1 and AR2 sequence the PROM through the eight bit words in memory, a corresponding sequence of Data-N signals are formed from the high order bits of the PROM. Thus, whether the Data-N signals are formed from the low or high order four bits of the PROM depends on the setting of the Program Select Switch for reading from bank A or Bank B of the PROM.

As described in connection with FIG. 18, the lamps 467 and 469 are provided on the front panel of the cabinet to indicate the current bank of the PROM from which the system obtains information. If the contact of the Program Select Switch has been set at its terminal A to read data from PROM bank A, the input to inverter I130D is hi, the inverter output is lo, and the lamp 467 is lit by the power source Vcc which is connected through a resistor R135B to the lamp, thus indicating that the system is reading from Bank A of the PROM. At the same time, the output of inverter I130C is hi, and lamp 469 is not lit. If the Program Select Switch has been set at the B terminal, the output of inverter I131C is hi, and the output of inverter I130C is thus lo. The lamp 469 is lit by the power source Vcc which is connected to the lamp through resistor R135C. The lamp 467 will not be lit at this time since the output of inverter I130D is hi.

As previously discussed, the Program Select Switch may be set to the Extend mode, such that the control system first reads data from bank A of the PROM, and automatically switches to bank B to obtain the remainder of the program. It will be recalled that the signal Address Clear-P was used to reset the flip flop ff130A before the system entered the homing mode, such that output 1 of the flip flop and the Extend terminal of the Program Select Switch are reset to a hi condition. Accordingly, if the contact of the Program Select Switch is set to the Extend terminal, the input of the inverter I131C is hi, and the four low order outputs of the PROM bank A are decoded as the Data-N signals, as previously described in connection with the terminal setting of the Program Select Switch at terminal A. However, as the address registers are incremented through their various states and finally become full, with both registers AR1 and AR2 containing a binary configuration of all 1's, and with the last word from bank A being formed at the outputs of the PROM, the carry output 15 of register AR2 goes hi. The inverter I130B inverts the carry out signal from register AR2, and forms a lo signal at its output. When the next pulse from the signal Address Clock-P is received and both registers change to the binary configuration of all zeros, the carry output 15 of registers AR2 goes lo, and the corresponding output of inverter I130B goes hi. Accordingly, the differentiator circuit 582 generates a positive pulse which sets flip flop ff130A with its output 1 and the Extend terminal in a lo condition, thus switching the PROM output bits which are used to form the Data-N signals to the four high order bits in bank B. Accordingly, at this time the Data-N signals correspond to the inverted information obtained from address 00000000 in bank B of the PROM. As the address registers are subsequently incremented, the later information will also be obtained from bank B of the PROM. It will be apparent that the lamps 467 and 469 will provide an indication of the current PROM bank being used during the Extend program mode.

It was previously noted that the operator may set the Program Select Switch to the Remote A/B Select terminal in order to select the program bank being used through use of a third foot pedal. Each time the third foot pedal is depressed, the Remote Program Select Switch is actuated, and alternately connects its normally closed (N.C.) and normally open (N.O.) terminals to ground. When the N.O. terminal is disconnected from ground, the output 5 of optoisolator OP139 will be hi. Accordingly, the input of inverter I131C, which is connected through the contact of the Program Select Switch to the output of the optoisolator OP139, is thus hi at this time, and the low order outputs from bank A of the PROM are used to form the Data-N signals. After completion of the program in bank A, the operator may depress the pedal to actuate the Remote Program Select Switch, and connect the N.O. contact to ground. In this case, the output 5 of optoisolator OP139 will be lo, resulting in a lo input to inverter I131C, and a selection of information from bank B of the PROM. After completion of the program in bank B, the operator may again depress the pedal to select the separate program in bank A. Alternatively, the operator may use a program from the same bank a number of times without switching to the other bank, if desired. Again, the lamps 467 and 469 indicate the program bank currently being used, and prevent possible confusion about the bank when the foot pedal is used.

It will be recalled in connection with FIGS. 21j and 31 that the first pulse from the pulse train Clock Pulse during the memory cycle results in formation of the signal Y Strobe-N. However, this signal is not formed until the single-shot SS63A times out, and is sometime after the signal Address Clock-P increments the address registers AR1 and AR2 of FIG. 21a. Accordingly, the signals A Data-N, B Data-N, C Data-N, and D Data-N are formed from the Y data word for the new setting of the address registers before the lo signal Y Strobe-N is received. Similarly, when the second pulse in the signal Clock Pulse is received for use in connection with the X data, the address registers have already been incremented by the signal Address Clock-P to form the Data-N signals from the X data word before the lo signal X Strobe-N is received. Finally, when the third pulse in the signal Clock Pulse is received, the address registers have already been incremented before the single-shot SS63B of FIG. 21j is triggered and the hi signal EMC-P is formed. Accordingly, the control word is formed as the Data-N signals before the hi signal EMC-P is received.

As shown in FIG. 21j, the signals A Data-N, B Data-N, C Data-N, and D Data-N are connected to both X and Y preset counters CT61 and CT62. The counters CT61 and CT62 are utilized as four bit up counters, and are cleared during initialization by the signal Reset-N. Both counters operate in a manner such that the information in the Data-N signals is loaded into the counters if a lo condition is present at pin 9 of the counters, and at the time of a rising edge at pin 2 of the counters.

As previously discussed, responsive to the first pulse in the signal Clock Pulse, the signal Y Strobe-N goes lo after the Y data word in the PROM has been formed as the Data-N signals. Accordingly, the signal at pin 9 of the Y counter CT62 is lo at this time. Thus, the Data-N signals will be loaded into the Y counter CT62 when a rising edge is obtained at pin 2 of the counter. The signal Y Strobe-N is also connected to the input of inverter I67C. When the signal Y Strobe-N goes lo, the output of inverter I67C goes hi, and differentiator circuit 584 generates a positive pulse at input 5 of NOR gate NO104C. The pulse is inverted twice by NOR gate NO104C and inverter I67E forming a positive pulse of narrow width at input 9 of NOR gate NO104D. The gate NO104D inverts the pulse again to a lo pulse of narrow width which is presented at pin 2 of counter CT62. On the rising edge of the lo pulse at pin 2, the signals A Data-N, B Data-N, C Data-N, and D Data-N are strobed into the counter CT62 for later use. It will be recalled that the signal A Data-N is the low order bit and D Data-N is the high order bit, and that the Data-N signals are in inverted form. Accordingly, the counter CT62 will be utilized to increment the inverted data toward a binary configuration of all 1's.

As will be seen below, the data contained in the Y counter indicates the number of steps the Y stepping motor should be driven, and the Y counter is used to count these steps. The pulse train Y Combo-N is formed for driving the Y stepping motor, and will contain the proper number of pulses the stepping motor should be moved. However, this pulse train may be modified to obtain better control over the stepping motor, and the manner in which the pulse train is changed depends upon the number of pulses or steps the motor will be driven. If four or more pulses will be used in the signal Y Combo-N during a given timing cycle of the machine, an early pulse will be removed from the pulse train, and will be automatically added to the end of the pulse train without use of the Y counter. Accordingly, in this case the data in the counter should be modified to reflect the missing or removed pulse, and since the counter data is in inverted form, the counter will be incremented by one count to obtain correspondence between the counter and the counted part of the pulse train Y Combo-N.

So long as the signal at pin 9 of Y counter CT62 remains lo, information may be loaded into the counter by the Data-N signals, as previously described, but the counter may not be incremented at this time. However, once the signal at pin 9 of the counter goes hi, the counter may be incremented one count by the rising edge of a signal at pin 2 of the counter. The hi condition does not occur at the counter pin 9 until the signal Y Strobe-N goes hi, which takes place when the single-shot SS63A is triggered the second time during the memory cycle. At this time, the Q bar output of the single-shot goes lo, and the signal Y Strobe-N returns hi.

As will be seen below, the Y data word is decoded to form the modified pulse train to the Y stepping motor. If the decoded data indicates that four or more pulses should be issued to the Y stepping motor, the signal Y Decode 4 Plus-N is set lo. If less than four pulses will be formed in the pulse train to the motor, the signal Y Decode 4 Plus-N remains hi, in which case the NOR gate NO104B of FIG. 21j is inhibited with a lo signal at its output, and the counter CT62 will not be incremented. However, if the Y stepping motor will be stepped four or more pulses, and the signal Y Decode 4 Plus-N is set lo, the Y counter CT62 will be incremented by one count, as described below.

Figure 32:
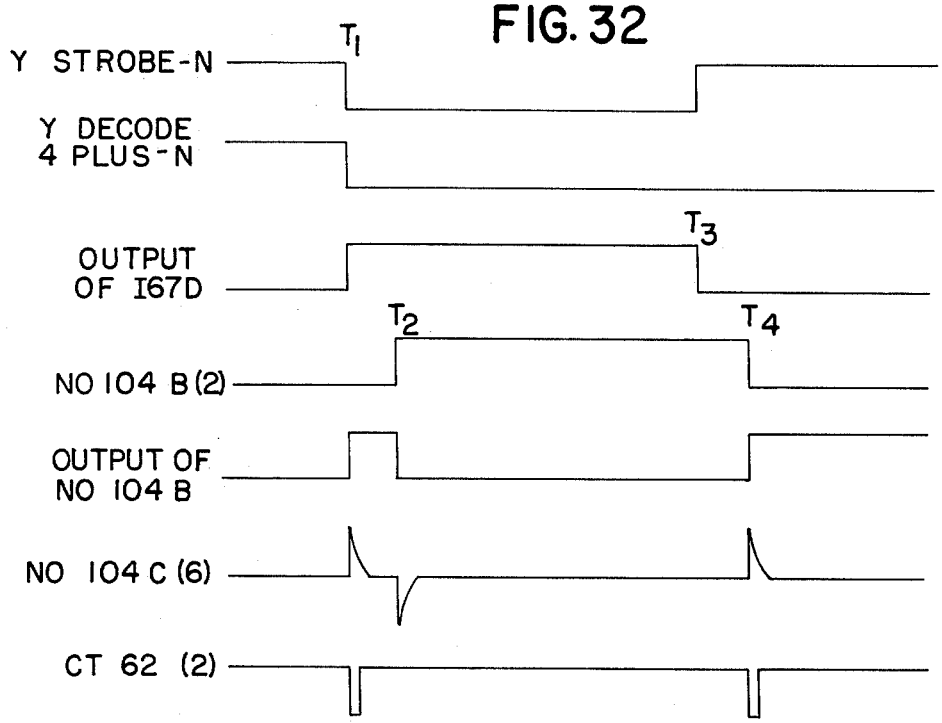
FIG. 32 is a timing diagram of various signals formed by the control system of the present invention.

Referring to FIGS. 21j and 32, the signal Y Decode 4 Plus-N is set lo at approximately the same time T1 that the signal Y Strobe-N goes lo. The lo signal Y Strobe-N is connected to the input of inverter I67D where it is inverted to a positive signal at its output, which remains hi until the signal Y Strobe-N returns hi at time T3. The inverted signal from the output of inverter I67D is delayed by delay circuit 586, and the delayed signal is formed at the input 2 of NOR gate NO104B (shown in FIG. 32 as NO104B (2) ).

As shown, the delayed signal goes hi at time T2 and returns lo at time T4. Between the times T1 and T2 both inputs to the NOR gate NO104B are lo, and the output of this gate goes hi until time T2 when it again returns lo, since the delayed signal at input 2 of gate NO104B then goes hi. The delayed signal at input 2 of NOR gate NO104B again goes lo at time T4, resulting in two lo signals at the inputs of the gate. Accordingly, the output of gate NO104B again goes hi at time T4. Thus the differentiator circuit 588 generates a positive pulse at both times T1 5and T4 when the output of gate NO104B goes hi. The positive pulses are inverted by NOR gate NO104C, inverter I67E, and NOR gate NO104D, and narrow lo pulses are formed at pin 2 of Y counter CT62 at times T1 and T4. When the lo pulse at pin 2 of the counter is formed at time T1 the signal Y Strobe-N is still lo, and, as previously noted, the lo signal at pin 9 of the counter CT62 only effects loading of information into the counter. However, when the second lo pulse appears at pin 2 of the counter CT62 at time T4, the signal Y Strobe-N has already returned to its hi condition at pin 9 of the counter. The second lo pulse thus increments the previously loaded data in the Y counter by one count responsive to the rising edge of the pulse at pin 2 of the counter.

The operation of the X counter CT61 in loading the signals A Data-N, B Data-N, C Data-N and D Data-N into the counter responsive to the signal X Strobe-N is very similar to that described in connection with loading of information from the Data-N signals into the Y counter CT62. Also, the loaded information is incremented by one count responsive to a lo condition for the signal X Decode 4 Plus-N in a manner similar to that described in connection with the Y counter CT62.

When the signal X Strobe-N goes lo, the X data word has already been formed as the Data-N signals. The signal X Strobe-N is inverted by inverter I52E, and when the output of this inverter goes hi the differentiator circuit 590 generates a positive pulse which results in formation of a narrow lo pulse at the output of NOR gate NO80C. Since the input to pin 9 of X counter CT61 is lo, the positive going edge of the lo pulse results in the information from the Data-N signals being loaded into this counter. Again, this information is in an inverted form with the low order bit corresponding to the signal A Data-N. If the decoded X data indicates that the X stepping motor will be moved less than four pulses, the signal X Decode 4 Plus-N remains hi throughout the memory cycle inhibiting gate NO80B, and the Y counter CT61 will not be incremented. However, if the X stepping motor will be driven four or more pulses, the signal X Decode 4 Plus-N goes lo. Accordingly, the signal X Decode 4 Plus-N and the delayed signal formed by the delay circuit 592 at input 2 of NOR gate NO80B result in formation of two narrow lo pulses at the output of NOR gate NO80C and at pin 2 of the X counter CT62. Since the first lo pulse occurs while the signal X Strobe-N is lo, the counter is not incremented at this time. However, the second lo pulse occurs after the signal X Strobe-N goes hi, i.e., when the single-shot SS63A is triggered again by the third again by the third pulse in the signal Clock Pulse, and the information which was loaded into the counter CT61 is incremented by one count, as described in connection with the Y counter CT62. Accordingly, the data in the X counter has been modified to reflect the change in the pulse train to the X stepping motor.

When the hi signal EMC-P is received, responsive to the third pulse during the memory cycle in the pulse train Clock Pulse, the control word has already been formed as the signals A Data-N, B Data-N, C Data-N and D Data-N. As shown in FIG. 21j, the Data-N signals are connected to the register R47, which may comprise four D-type flip flops. The signal EMC-P is connected to the register R47, and when this signal goes hi, the signals A Data-N, B Data-N, C Data-N, and D Data-N are decoded by the register at its outputs in a manner described below.

In review, when the first pulse in the signal Clock Pulse has been received and the signal Y Strobe-N later goes lo, the information from the four bit Y data words is loaded into the Y counter CT62. When the next pulse in the pulse train Clock Pulse is received and the signal X Strobe-N later goes lo the information from the X data word is loaded into the X counter CT61. In both cases, the information which is loaded into the Y and X counters may be incremented by one count in the event that either or both of the signals X Decode 4 Plus-N or Y Decode 4 Plus-N went lo. Finally, after receipt of the third pulse in the pulse train Clock Pulse during the memory cycle, the information from the control word is decoded by the register R47 for use in setting the directions of the X and Y stepping motors and for indicating the particular mode or command involved.

The signals A Data-N, B Data-N, C Data-N and D Data-N are also decoded for use in controlling the pulse train which is issued to the X and Y stepping motors.

Although the particular nature of the pulse train depends upon the number of pulses involved, generally, it is desirable to start and stop both the X and Y stepping motors at a gradual rate to prevent undue oscillation of the motors. Both the X and Y information from the X and Y data words is decoded for use in performing this ramping function as follows.

Since the X and Y data words each contain four bits, there are 16 possible binary configurations for each of the data words, as shown in FIG. 33. If it is desired to output one pulse to the X stepping motor, the X data word as coded in the PROM will have binary configuration 0001, as shown. Similarly, if it is desired to output 15 pulses to the Y stepping motor, the Y data word will have a binary configuration of 1111. The corresponding inverted word for the X data or Y data words, which is formed as the signals A Data-N, B Data-N, C Data-N, and D Data-N, is also set forth in the drawing. As indicated, the Data-N signals for the above examples of one pulse and 15 pulses would have an inverted binary representation of 1110 and 0000, respectively, and are in 1's complement form. The Data-N signals of the inverted word are decoded to form signals which are utilized in forming the pulse train to the stepping motors, as described below.

As shown in FIG. 21i, the current state of the signals A Data-N, B Data-N, C Data-N, and D Data-N are reflected at the inputs of the AND gate A49B, NOR gate NO39B, NAND gates NA66B and NA66C, and the inverters I64B and I64C. It may be seen from FIG. 33, if four or more pulses are contained in the X data or Y data words, either one or both of the corresponding signals C Data-N and D Data-N will be lo or zero. Conversely, if the number of pulses coded in the data words is less than four, the signals C Data-N and D Data-N will both be hi or one.

If the Y data word is coded for driving the Y stepping motor four or more pulses, the corresponding Data-N signals are decoded as follows. Since one or both of the signals C Data-N or D Data-N is lo, the output of AND gate A49B will also be lo. Accordingly, input 9 of NOR gate NO14A and input 5 of NOR gate NO14D are lo. Since the output of AND gate A49B is also connected to input 4 of AND gate A49C, the input 9 of NOR gate NO39C is also lo. The lo output of gate A49B is also formed at input 5 of NAND gate NA66B and input 11 of NAND gate NA66C, and, accordingly, the output of both NAND gates will be hi. It will be seen that the input 11 of NOR gate NO26C and input 9 of NOR gate NO26D are hi, since they are connected to the output of gate NA66C. Since both inputs of NAND gate NA49A are hi, its output will be lo. Thus, the NOR gate NO39C has two lo inputs, resulting in a hi condition at input 11 of NOR gate NO14B and input 5 of NOR gate NO26A. The lo output from NAND gate NA49A is inverted by inverter I64A, such that input 2 of NOR gate NO14C and input 3 of NOR gate NO26B are both hi. Accordingly, among the NOR gates on chips 594 and 596, only gates NO14A and NO14D have lo inputs from the signals described.

As previously discussed, after formation of the Data-N signals for the Y data word, the Y Strobe-N signal goes lo, resulting in generation of a pulse by differentiator circuit 520. The positive pulse is inverted by inverter I50D, resulting in a lo pulse at input 12 of gate NO14B, input 6 of gate NO14D, input 2 of gate NO26B, and input 8 of gate NO26D. It should be noted that the other inputs to these gates have been formed before the signal Y Strobe-N goes lo, and before the pulse is generated by circuit 520. Since input 11 of gate NO14B, input 3 of gate NO26B, and input 9 of gate NO26D are all hi, the outputs of these gates will remain lo in spite of the lo pulse received at the other input of these gates. However, since input 5 of NOR gate NO14D is lo, when the lo pulse is received at input 6 of this gate, a positive pulse is formed at its output which sets flip flop ff4B, thus setting the signal Y Decode 4 Plus-N lo. As previously discussed in connection with FIG. 21j, this condition for the signal Y Decode 4 Plus-N causes the counter to be incremented by one count when the signal Y Strobe-N returns hi.

Accordingly, when the Y Strobe-N signal is received during the first portion of the memory cycle responsive to the first clock pulse received, the signal Y Decode 4 Plus-N is set lo. The remaining outputs of the flip flops on chips 598, 600, 602, and 604 are hi at this time, since they were reset by the signal Mem Cycle Enable-P at the start of the memory cycle, and since the only gate on chips 594 and 596 which had been conditioned lo at one input and had been strobed with a lo pulse at its other input was gate NO14D.

The X data word is formed as the Data-N signals during the second phase of the memory cycle, and after formation of the pulse by differentiator circuit 520. If the X data word has been programmed to drive the X stepping motor four or more pulses, the corresponding Data-N signals are decoded as follows. After the Data-N signals have been formed, they are decoded as signals for the gates on chip 594 and 596 in the same manner discussed above. Thus, input 9 of gate NO14A, and input 5 of gate NO14D are conditioned lo, while input 11 of gate NO14B, input 2 of gate NO14C, input 5 of gate NO26A, input 3 of gate NO26B, input 11 of gate NO26C, and input 9 of gate NO26D are conditioned lo. When the signal X Strobe-N goes lo, the differentiator circuit 518 generates a positive pulse which is inverted by inverter I50B. Accordingly, a lo pulse is presented at input 8 of the gate NO14A, input 3 of gate NO14C, input 6 of gate NO26A, and input 12 of gate NO26C. Since input 9 of gate NO14A is lo, a positive pulse is formed at the output of this gate which sets flip flop ff3A, with its output signal X Decode 4 Plus-N set lo. The outputs of the remaining gates on chips 594 and 596 remain lo at this time, and the other flip flops on chips 598, 600, 602, and 604 are not set responsive to the signal X Strobe-N under the case at hand, i.e., four or more counts in the X data word. As previously discussed in connection with FIG. 21j, this lo signal X Decoder 4 Plus-N results in the X counter CT61 being incremented by one count.

In review, the signal Y Decode 4 Plus-N is set lo responsive to four or more pulses programmed into the Y data word, and, similarly, the signal X Decode 4 Plus-N goes lo if four or more pulses are decoded in the X data word. It should be noted that for convenience the condition of four or more pulses for both data words are being discussed together. However, either of the data words, or both, may contain less than four counts, and the setting of the signals Y Decode 4 Plus-N and X Decode 4 Plus-N are independent of each other and are dependent on the respective data word.

As previously discussed in connection with FIG. 33, if the X or Y data words are coded with less than four counts or pulses, the C Data-N and D Data-N signals formed responsive to the X and Y data words are both 1 or hi. As shown in FIG. 21e, since both the signals C Data-N and D Data-N are hi, the output of AND gate A49B will also be hi, and input 9 of NOR gate NO14A and input 5 of NOR gate NO14D will both be hi. Accordingly, the outputs of gates NO14A and NO14D will remain lo when the lo signals Y Strobe-N and X Strobe-N are received, the flip flops ff3A and ff4B will be set, and the signals Y Decode 4 Plus-N and X Decode 4 Plus-N will remain hi. Thus, if the Y data word is less than four, the signal Y Decode 4 Plus-N will not be set lo. Similarly, if the X data word contains less than four counts, the signal X Decode 4 Plus-N will not be set lo. Accordingly, the signals Y Decode 4 Plus-N and X Decode 4 Plus-N are set lo if, and only if, the corresponding Y and X data words are greater than or equal to four counts. At this point, the possible states for the signals C Data-N and D Data-N have already been discussed, and it has been shown that both signals will be in a hi condition during the following discussion, pertaining to less than four counts in the data words. Also, in this case, input 4 of AND gate A49C, input 5 of NAND gate NA66B, and input 11 of NAND gate NA66C are hi, since the output of AND gate A49B will be hi.

Next, it is assumed that zero counts have been coded into the X data or Y data words. As shown in FIG. 33, the signals A Data-N or B data-N which are formed from such a data word are both hi. Referring to FIG. 21*i*, since the inputs of NOR gate NO39B are hi, input 5 of AND gate A49C is lo, and input 9 of NOR gate NO39C is also lo. Since the input to inverter I64B from the signal B Data-N is hi, the inverted signal at input 4 of NAND gate NA66B is lo, and the output of this gate is hi. Similarly, the input to inverter I64C is hi, and the output of the inverter at input 9 of NAND gate NA66C is lo, resulting in a hi condition at the output of this gate. It will be seen that input 11 of NOR gate NO26C and input 9 of NOR gate NO26D are both hi. Also, both inputs of NAND gate NA49A are hi, resulting in a lo output of this gate. Since both inputs to NOR gate NO39C are lo, the signals at input 11 of NOR gate NO14B and input 5 of NOR gate NO26A are both hi. The lo signal from gate NA49A is inverted by inverter I64A, resulting in a hi condition at input 2 of NOR gate NO14C and input 3 of NOR gate NO26B. As previously discussed, input 9 of NOR gate NO14A and input 5 gate NO14D are also hi. Thus, all of the NOR gates on chips 594 and 596 have a hi input when the corresponding X or Y data word has zero counts. When the corresponding Y Strobe-N or X Strobe-N signals goes lo, the outputs from the NOR gates on chips 594 and 596 remain lo, and none of the flip flops on chips 596–604 are set. Since these flip flops were previously reset during initialization of the memory cycle by the signal Mem Cycle Enable-P, none of the corresponding outputs of the flip flops are set lo. Thus, if the Y data word is zero, the signals YA Pulse Inhibit-N, YB Pulse Inhibit-N, YC Pulse Inhibit-N, and Y Decode 4 Plus-N from the flip flops remain hi. Similarly, if the X data word represents zero pulses, the signals XA Pulse Inhibit-N, XB Pulse Inhibit-N, XC Pulse Inhibit-N, and X Decode 4 Plus-N all remain hi.

The next condition discussed is the case when the X or Y data word has one count, such that the A Data-N signal formed is lo and the signal B Data-N is hi, as shown in FIG. 33. In this case, the input 2 of NOR gate NO39B is hi, resulting in a lo signal at input 5 of AND gate A49C. Accordingly, input 9 of NOR gate NO39C is also lo. Since the input to inverter I64B is hi, input 4 of NAND gate NA66B is lo and the output of this gate is hi. The lo input of inverter I64C is inverted to a hi condition at input 9 of NAND gate NA66C. Input 10 of NAND gate NA66C is also hi since connected to the signal B Data-N. It will be recalled that input 11 of NAND gate NA66C is also hi at this, since connected to the hi output of AND gate A49B, which resulted from the hi conditionsfor the signals C Data-N and D Data-N. Since all inputs of NAND gate NA66C are hi, its output is lo. Thus, input 11 of NOR gate NO26C is lo, and input 9 of NOR gate NO26D is also lo. Since input 13 of NAND gate NA49A is lo, its output is hi. Since input 8 of NOR gate NO39C is hi, its output is lo, resulting in lo signals at input 11 of NOR gate NO14B and input 5 of NOR gate NO26A. The hi output from NAND gate NA49A is inverted by inverter I64A, resulting in a lo signal at input 2 of NOR gate NO14C and input 3 of NOR gate NO26B.

Accordingly, all of the above discussed inputs to the NOR gates on chips 594 and 596 will be lo, except input 9 of gate NO14A and input 5 of gate NO14D which are hi. If the conditioned gates on chips 594 and 596 represent the Y data word, when the lo Y Strobe-N signal is received, the following flip flops are set: ff27B, ff15B, and ff3B. Thus, the signals YA Pulse Inhibit-N, YB Pulse Inhibit-N, and YC Pulse Inhibit-N are set lo. If the conditioned gates on the chips 594 and 596 represent the X data word, when the lo X Strobe-N signal is received, the following flip flops are set: ff27A, ff15A, and ff4A. Accordingly, the signals XA Pulse Inhibit-N, XB Pulse Inhibit-N, and XC Pulse Inhibit-N are set lo at this time.

Thus, it has been seen that when the Y data word has one count, all of the Y pulse inhibit flip flops are set except the flip flop ff4B having the signal Y Decode 4 Plus-N. Similarly, when the X data word represents one pulse, all of the X pulse inhibit flip flops are set except the flip flop ff3A having the output signal X Decode 4 Plus-N. The configuration of the inhibit signals from these flip flops corresponding to one pulse in the X data or Y data word is shown in the right hand portion of FIG. 33.

It is next assumed that the X data or Y data words contain two counts. As shown in FIG. 33, in this case the corresponding A Data-N signal is hi, while the B Data-N signal is lo. Since input 3 of NOR gate NO39B is hi, input 5 of AND gate A49C is lo, and input 9 of NOR gate NO39C is also lo. Since the input to inverter I64B is lo, input 4 of NAND gate NA66B is hi. Also, input 3 of gate NA66B is hi, since it is connected to the A Data-N signal. As previously discussed, input 5 of NAND gate NA66B is also hi since connected to the output of AND gate A49B, which has its inputs connected to the hi C Data-N and D Data-N signals. Accordingly, the output of NAND gate NA66B at input 12 of NAND gate NA49A is lo. Thus, the output of gate NA49A is hi, and the output of NOR gate NO39C is lo. Thus, input 11 of NOR gate NO14B and input 5. of NOR gate NO26A are both lo. The hi signal from NAND gate NA49A is inverted by inverter I64A, resulting in a lo condition at input 2 of NOR gate NO14C and input 3 of NOR gate NO26B. Since input 10 of NAND gate NA66C is lo, the output of this gate is hi, and input 11 of NOR gate NO26C and input 9 of NOR gate NO26D are both hi. Corresponding to the Y data word, when the signal Y Strobe-N goes lo, the following flip flops are set: ff15B, and ff3B. Thus, only the signals YB Pulse Inhibit-N and YC Pulse Inhibit-N are set lo at this time, as indicated in FIG. 33. For the case of the X data word, when the signal X Strobe-N goes lo, the following flip flops are set: ff4A, and ff15A. Thus, only the signals XB Pulse Inhibit-N and XC Pulse Inhibit-N are set lo at this time, as indicated in FIG. 33. The remaining outputs of the flip flops, which were reset at the start of the memory cycle by the signal Mem Cycle Enable-P, remain hi.

Finally, the case in which the X data or Y data words contain 3 counts is discussed. As shown in FIG. 33, the resulting signals A Data-N and B Data-N are both lo or zero. Referring to FIG. 21, input 3 of NAND gate NA66B and input 10 of NAND gate NA66C are both lo, resulting in hi signals at the outputs of both of these gates. Thus, input 11 of NOR gate NO26C and input 9 of NOR gate NO26D are both hi. Since both inputs to NAND gate NA49A are hi, its output is lo. The lo signal is inverted by inverter I64A, and input 2 of NOR gate NO14C and input 3 of NOR gate NO26B are both conditioned hi. Also, input 8 of NOR gate NO39C is lo at this time. Since both inputs to NOR gate NO39B are lo, its output is hi. As previously discussed, the output of AND gate A49B is hi, since its inputs are connected to the hi signals C Data-N and D Data-N. Thus, the output of AND gate A49C is hi, resulting in a lo signal at the output of NOR gate NO39C. Accordingly, input 11 of NOR gate NO14B and input 5 of NOR gate NO26A are both lo.

For the case of the Y data word, when the Y Strobe-N signal goes lo, only flip flop ff3B is set, resulting in a lo condition for the signal YC Pulse Inhibit-N. Similarly, when the gates on chips 594 and 596 are conditioned for the X data word and the X Strobe-N signal later goes lo, only flip flop ff15A is set, resulting in a lo condition for the signal XC Pulse Inhibit-N. As previously noted, all of the flip flops were reset by the signal Mem Cycle Enable-P at the start of the memory cycle, and the other outputs of the X or Y pulse inhibit flip flops remain hi.

At this point, the configurations of the X and Y pulse inhibit flip flops corresponding to the various counts of the X and Y data words have been discussed. As previously noted, the outputs of the inhibit flip flops ff3A, ff3B, ff4A, ff4B, ff15A, ff15B, ff27A, and ff27B may be determined from the data words by making reference to the inhibit signals listed in FIG. 33.

It will be recalled that during the third phase of the memory cycle, responsive to the third pulse in the pulse train Clock Pulse, the control word from the PROM is formed as the inverted signals A Data-N, B Data-N, C Data-N, and D Data-N. Referring to FIG. 30, the control word is formed as the Data-N signals as follows. The low order bit specifying the direction for the Y stepping motor is inverted, such that a lo condition for the signal A Data-N indicates a +Y direction, while a hi signal indicates a −Y direction. Similarly, if the signal B Data-N is hi, it specifies a −X direction for the X stepping motor, while a lo state for B Data-N indicates a +X direction for this stepping motor. The two high order bits for the Mode Code are inverted as the signals C Data-N and D Data-N. Thus, if both signals C Data-N and D Data-N are hi, a Stop Stitch Mode has been commanded. If the C Data-N signal is low and the D Data-N signal is hi a Stitch Mode was programmed in the control word. If the C Data-N signal is hi and the D Data-N signal is lo a Slow Stitch Mode was commanded, while if both of the Data-N signals are lo, an End of Program Mode was selected.

As previously discussed in connection with FIG. 21j, the Data-N signals are decoded by register or circuitry R47 in response to the leading edge of the hi signal EMC-P. If a Stop Stitch Mode has been commanded by the control word, as reflected by the inverted C Data-N and D Data-N signals, the following configuration is formed at the outputs of the register R47: output 14 is lo, output 16 is hi, output 1 is lo, and output 15 is hi. Thus, input 1 of NAND gate NA35A and input 4 of NAND gate NA35B are both lo, and the outputs of both of these gates are hi. Accordingly, input 12 of NOR gate NO36A and input 8 of NOR gate NO36B are both hi. Also, input 12 of NAND gate NA35D is lo, and the output of this gate is hi, resulting in a hi signal at input 3 of NOR gate NO36D. However, it may be seen that inputs 9 and 10 of NAND gate NA35C are both hi, resulting in a lo condition at input 6 of NOR gate NO36C. As previously discussed, the normal condition for the signal EMC-P is lo, such that the output of inverter I52C is hi. It follows that the outputs of the four NOR gates on chip 606 are normally lo. However, when the signal EMC-P goes hi and the output of inverter I52C goes lo, a lo signal is formed at input 11 of NOR gate NO36A, input 9 of NOR gate NO36B, input 5 of NOR gate NO36C, and input 2 of NOR gate NO36D. The Data-N signals are decoded by register R47 at the time the signal EMC-P goes hi, and the NOR gates on chip 606 are conditioned by the pulse EMC-P before the single-shot SS63B times out, and before the signal EMC-P returns lo. In the case under discussion, input 6 of NOR gate NO36C has been set lo, and, since this input is in a lo condition while the signal at input 5 of gate NO36C is still lo, i.e., before the signal EMC-P returns to its lo state, a positive pulse is formed at the output of this gate as the signal Stop Stitch-P. Since one of the inputs to the remaining gates on chip 606 are hi, their outputs Stitch-P, End of Program-P, and Slow Stitch-P remain lo. The pulse Stop Stitch-P is used to set the control system in the Stop Stitch Mode, as will be seen below.

Next, it is assumed that the C Data-N and D Data-N signals indicate that a Stitch Command for fast speed of the machine has been programmed in the control word. The resulting output configuration of the register R47 when set by the leading edge of the hi pulse EMC-P is as follows: output 14 is hi, output 16 is hi, output 1 is lo, and output 15 is lo. Thus, input 5 of NAND gate NA35B, input 10 of NAND gate NA35C, and inputs 12 and 13 of NAND gate NA35D are all lo, resulting in hi output signals from these gates. It will be seen that input 8 of NOR gate NO36B, input 6 of NOR gate NO36C, and input 3 of NOR gate NO36D are all hi, and these gates are inhibited with their output signals End of Program-P, Stop Stitch-P, and Slow Stitch-P being lo. However, both inputs to NAND gate NA35A are hi, resulting in a lo signal at input 12 of NOR gate NO36A, and a positive pulse for the signal Stitch-P before the signal EMC-P goes lo. The pulse Stitch-P results in the Stitch Mode of the control system and machine, as will be discussed below.

Next, it is assumed that the C Data-N and D Data-N signals reflect a Slow Stitch Command, resulting in an output configuration for the register R47 as follows: outputs 14 and 16 are lo, and outputs 1 and 15 are hi. Thus, inputs 1 and 2 of NAND gate NA35A are both lo, input 4 of NAND gate NA35B is lo, and input 9 of NAND gate NA35C is lo, resulting in hi output signals for these three gates. Accordingly, input 12 of NOR gate NO36A, input 8 of NOR gate NO36B, and input 6 of NOR gate NO36C are all hi, resulting in a low condition for the signals Stitch-P, End of Program-P, and Stop Stitch-P. However, both inputs to NAND gate NA35D are hi, resulting in a lo signal at input 3 of NOR gate NO36D, and a hi pulse for the signal Slow Stitch-P at which time the system enters the Slow Stitch Mode, as will be discussed in detail below.

Finally, it is assumed that the C Data-N and D Data-N signals reflect an End of Program Command in the control word. The resulting output configuration of the register R47 is as follows: outputs 14 and 1 of the register are hi, while outputs 16 and 15 of the register are lo. Thus, input 2 of NAND gate NA35A is lo, inputs 9 and 10 of NAND gate NA35C are lo, and input 13 of NAND gate NA35D is also lo, resulting in hi output signals for these three gates. Accordingly, input 12 of NOR gate NO36A, input 6 of NOR gate NO36C, and input 3 of NOR gate NO36D are all hi, resulting in lo conditions for the signals Stitch-P, Stop Stitch-P, and Slow Stitch-P. However, both inputs to NAND gate NA35B are hi, resulting in a lo signal at input 8 of NOR gate NO36B, and formation of a positive pulse for the signal End of Program-P. In response, the system enters the End of Program Mode, as will be seen below.

The A Data-N and B Data-N signals are also decoded by register R47 responsive to the pulse EMC-P to form the signals X Prom Dir-P and Y Prom Dir-P for use in controlling the direction of the X and Y stepping motors. As shown in FIG. 21e, the signal X Prom Dir-P is connected to input 1 of AND gate A133A. The other input 2 of this gate is connected to the signal Basic Home-N which is hi at this time. Thus, if the signal X Prom Dir-P is hi, input 5 of NOR gate NO134C is also hi, while if the signal X Prom Dir-P is lo, input 5 of gate NO134C is lo. The input 3 of AND gate A133B is connected to the signal Basic Home-P which is lo at this time, and, accordingly, input 6 of NOR gate NO134C is also lo. Thus, the NOR gate NO134C inverts the signal at its input 5 as the signal X Direction for use in controlling the direction of the X stepping motor.

The use of the signal Y Prom Dir-P is very similar. As shown, this signal is connected to input 5 of AND gate A133C, while the other input of this gate being connected to the hi signal Basic Home-N. The input 7 of AND gate A133D is connected to the signal Basic Home-P which is lo, resulting in a lo signal at input 8 of NOR gate NO134D. Accordingly, it will be seen that the signal Y Prom Dir-P is inverted by the NOR gate NO134D to form the signal Y Direction which is utilized to control the direction of the Y stepping motor.

As previously indicated, the register R47 may comprise any suitable device for decoding the Data-N signals, such as four D-type flip flops of the type discussed in connection with FIG. 21e. As shown in FIG. 21n, the signal EMC-P may be connected to the CLK inputs of each of the flip flops, such that the flip flop outputs reflect their corresponding D inputs when the signal EMC-P goes hi. The first flip flop ff120A may have its D input connected to the signal C Data-N. Its Q output may be used as output 14 of register R47, and its Q bar output may be utilized as output 15 of the register. The second flip flop ff120B may have its D input connected to the signal D Data-N, with its Q output being used as output 1 of register R47, and with its Q bar output being utilized as output 16 of the register. In this manner, the flip flops ff120A and ff120B may be utilized to decode the signals C Data-N and D Data-N when the signal EMC-P goes hi, as described above. Similarly, the signals A Data-N and B Data-N may be connected to the D inputs of the flip flops ff120C and ff120D, respectively, with the Q or Q bar outputs of these flip flops being used as the signals Y Prom Dir-P and X Prom Dir-P, depending upon the direction relationship between the signals X and Y Direction and the corresponding direction information in the control word for the stepping motors.

Since the most usual Mode Code utilized in the control words during operation of the sewing machine is the Stitch command, during which the machine operates at fast speed, the corresponding Stitch Mode will be discussed first. It will be recalled that a positive pulse is formed for the signal Stitch-P responsive to this command. As Shown in FIG. 21g, the signal X Strobe-N is inverted by inverter I41A, and the inverted signal is connected to input 6 of flip flop ff57A. Since the X Strobe-N is normally hi, the inverted signal at the flip flop is lo. Before the control word has been decoded, when the signal X Strobe-N goes temporarily lo, the inverted hi signal resets the flip flop with its output Stch-1P lo, and with output Stch-OP hi. At a later time, the pulse Stitch-P is passed through OR gate O43C to input 2 of flip flop ff57A, thus setting this flip flop. As previously discussed, the other input to OR gate O43C, the signal Slow Stitch-P, is lo at this time. The outputs of flip flop ff57A are set as follows: the signal Stch-1P is set hi, and the signal Stch-OP is set lo.

Turning now to FIG. 21l, if either of the inputs to NOR gate NO44D are hi, the output of this gate is lo. As previously discussed, the normal condition for the signal NTB Mode-OP is hi, and, accordingly, the input 2 of AND gate A70D is normally lo, while input 4 of NAND gate NA70C is also normally lo. Accordingly, the signal Aux Start-P at the output of AND gate A70D is normally lo. The normal condition for the signal Cond Go-P is hi, and only if both inputs to NOR gate NO44D are lo, will the signal Aux Start-P and input 4 of NAND gate NA70C be hi.

Assuming the normal condition, since input 4 of NAND gate NA70C is lo, input 9 of NAND gate NA70B is hi. When the positive pulse Stitch-P is received, the pulse is inverted by inverter I83D, and a lo pulse is formed at input 10 of NAND gate NA70B. Accordingly, a hi pulse is formed at the output of NAND gate NA70B, thus setting flip flop ff84A at its input 2, with its output 1 being set lo and with its output 4 being set hi, resulting in a hi condition for the signal Stitch Mode-P which indicates the system is in the Stitch Mode.

It is noted that the stitch flip flop ff84A is reset during initialization by the signal Reset-N, with its output 1 being set hi, and with the signal Stitch Mode-P being set lo. When the stitch flip flop is set, its input 6 is lo, which may be determined as follows. Both of the signals Slow Stitch-P and End of Program-P, which are connected to the input of NOR gate NO44C, are lo, resulting in a hi condition at input 13 of NAND gate NA70A. Referring to FIG. 21h, the signal NTB Mode-OP is normally hi, and only goes lo in case of a thread break as determined by the Thread Break Sensor. Accordingly, the signal NTB Mode-P at the output of inverter I19E is normally lo. When the Thread Break Sensor detects a thread break, and the signal NTB Mode-OP goes lo, the signal NTB Mode-P goes hi. At this time the differentiator circuit 610 of FIG. 21l generates a positive pulse at the input of inverter I83C, resulting in a lo pulse at input 12 of NAND gate, and as the signal NTB Mode Pulse-N, which would result in a hi pulse at input 6 of flip flop ff84A, thus resetting this flip flop. In the absence of a thread break, the condition of the signal at the input of inverter I83C is lo, resulting in a hi condition at input 12 of NAND gate NA70A. Accordingly, the output of gate NA70A and the input 6 of flip flop ff84A is normally lo.

After the stitch flip flop ff84A has been set, responsive to the pulse Stitch-P, a lo signal is established at input 12 of OR gate 084B. As previously discussed, the signal Clamp Mode-OP was set lo before entering the homing mode, and, accordingly, input 1 of the driver circuit DC72A is lo at this time. As shown in FIG. 21m, the signal Normal/Service Select, and input 2 of driver circuit DC72A, will be lo if the Normal/Service Select Switch is set at its Normal terminal, while the signals will be hi if the switch is set at its Service terminal. Accordingly, during normal operation of the machine, while the switch is at its Normal setting, both inputs to driver circuit DC72A are lo.

The output 3 of driver circuit DC72A is related to the inputs of the circuit as follows. If either of the inputs is hi, the output of the driver circuit is also hi, resulting in operation of the machine at its low speed. Conversely, if both inputs of the driver circuit DC72A are lo, the output of the circuit is also lo, resulting in fast speed operation of the machine. Accordingly, during normal operation of the machine, when the pulse Stitch-P is received, both inputs to driver circuit DC72A will be lo, the output of the circuit will be lo, and the following events take place. A relay is closed which activates a triac, resulting in energization of the main brake/clutch solenoid of the Quick device. It will be recalled in connection with FIG. 17, the energized solenoid results in engagement of the disc 430 against the clutch surface 436 of the flywheel 422, such that the machine is driven at its fast speed. Once the flip flop ff84A has been set in the Stitch Mode, the brake/clutch solenoid remains energized until the flip flop has been reset, assuming that the Normal/Service Select Switch is at its Normal terminal and that the signal clamp Mode-OP does not go hi, and the needle will be reciprocated at fast speed so long as Stitch Commands are received from the PROM.

Since the stitch flip flop was reset during initialization by Reset-N, before the first pulse Stitch-P has been received, the input 1 of driver circuit DC72A is hi, and the main brake/clutch solenoid of the Quick device is deenergized. Accordingly, at this time the disc 430 will be engaged against the main brake surface 434 of the worm wheel 432. This condition will also prevail if the Normal/Service Select Switch is set at its Service terminal, or, as will be seen below, if a pulse is received from the signals Slow Stitch-P or End of Program-P. A hi condition for either of the signals NTB Mode-P or Clamp Mode-OP will cause the same result. In each case, at least one of the inputs to driver circuit DC72A will be in a hi condition.

Whether the disc 446 of the Quick device is engaged against the auxiliary clutch surface 448 or the auxiliary brake surface 450 depends upon the machine speed and the condition of the output signal from the driver circuit DC88B of FIG. 21g. If the Quick device determines from the synchronization unit 62 that the machine is being operated at its slow speed, the auxiliary brake will be engaged unless the proper condition has been established at the output of driver circuit DC88B. Satisfaction of this condition will be discussed below. It is sufficient at this point that the machine will operate at fast speed when the main brake/clutch solenoid is energized by the driver circuit DC72A of FIG. 21 l, i.e., during the Stitch Mode, and that the machine will operate at slow speed or will be stopped when this solenoid is deenergized.

As shown in FIG. 21g, the positive pulse Stitch-P sets flip flop ff39B with its output 1 lo, such that input 4 of AND gate A42A is lo, input 8 of flip flop ff57B is lo, and this flip flop is not set at this time. Also, the pulse Stitch-P is inverted and passed through NOR gate NO53A, with the resulting lo pulse resetting the slow stitch flip flop ff54C in the event that the previous command resulted in the Slow Stitch Mode. The flip flop is reset with its output 3 hi and its output 6 lo. Accordingly, input 8 of OR gate 053C is at a hi condiion, and input 1 of driver circuit DC88B is also hi.

The driver circuit DC88B operates as follows. If both inputs to the driver circuit are hi, its output signal Quick Slow Sew Cmd is hi, while if either input is lo, the signal Quick Slow Sew Cmd is also lo. Referring to FIG. 17, the Quick device is normally operated with the disc 446 against the auxiliary brake surface 448. If the Quick device determines that the machine is being operated at its slow speed, through use of one of the signals from the synchronization unit 62, the Quick device automatically initiates the cutting sequence and will stop the machine by moving the disc 446 against the auxiliary brake surface 450, unless prevented from doing so. While the signal Quick Slow Sew Cmd is lo, the Quick device will be inhibited from undertaking the cutting and stopping sequence, even though the machine is operating at slow speed. If the Quick Slow Sew Cmd is hi, the Quick device is permitted to carry out the cutting and stopping sequence, but this sequence will not be undertaken unless the Quick device determines from the unit 62 that the machine is operating at slow speed.

If the Normal/Service Select Switch is at its Service terminal, the main brake/clutch solenoid will be deenergized and the disc 430 will be engaged against the main brake surface 434, as may be seen in connection with FIGS. 17, 21 l, and 21m. Referring to FIGS. 21g and m, the signal Normal/Service Select will be hi at this time, as well as input 1 of NAND gate NA42B. When the Jog Switch on the front panel is closed, the Jog signal is hi, and input 2 of driver circuit DC88B is lo, since both inputs of NAND gate NA42B are hi. Accordingly, the signal Quick Slow Sew Cmd is lo during the Service Mode, and the Quick device is prevented from starting the cutting and stopping sequence. Hence, irrespective of the command from the program control word, the machine will operate at slow speed when the Jog Switch is closed during the Service Mode, although under program control. This follows since the disc 430 of the Quick device (FIG. 17) is engaged against the main brake surface 434, and the Quick device is prevented from disengaging the disc 446 from the auxiliary clutch surface 448. If the Jog Switch is opened, the signal Jog goes lo, and the normal stop and cut action associated with the Quick device takes place.

If the signal Quick Slow Sew Cmd is hi, e.g., during the Stitch Mode, and a thread break occurs, the following sequence takes place. As previously discussed in connection with FIGS. 21h and l, the flip flop ff84A will be reset responsive to a change in the signal NTB Mode-OP from hi to lo. At this time, the driver circuit DC72A will deenergize the main brake/clutch solenoid, and the disc 430 of the Quick device will be engaged against the brake surface 434 of the worm wheel 432. Accordingly, the machine will slow down to slow speed. When the Quick device determines that the machine is operating at slow speed from the synchronization unit 62, the Quick device will initiate the cutting sequence and stop the machine, since the signal Quick slow Sew Cmd is hi, and it is not prevented from undertaking this sequence.

In the Stitch Mode, if the Normal/Service Select Switch is set at the Normal setting, the signal Normal/Service Select will be lo. Accordingly, input 1 of NAND gate NA42B, as well as input 9 of OR GATE 053C, will be lo. Thus, the output signal from NAND gate NA42B will be hi, and both inputs to driver circuit DC88B are hi, resulting in a hi condition for signal Quick Slow Sew Cmd. Thus, the cutting and stopping sequence of the Quick device may be initiated during the Stitch Mode if a thread break is determined by the Thread Break Sensor.

As shown in FIG. 21g, when the flip flop ff57A is set as a result of the pulse Stitch-P during the Stitch Mode, input 9 of NOR gate NO44B is set lo by the flip flop. Also, the signal NTB Mode-P is normally lo, resulting in a hi condition at input 5 of NAND gate NA55C. However, if a thread break had previously been detected by the Thread Break Sensor and the signal NTB Mode-P went hi, input 5 of NAND gate NA55C will remain lo, and the control system will be prevented from driving the stepping motors in the Stitch Mode at this time. The signal Clamp Mode-1P at input 3 of NAND gate NA55C should be hi. However, if the signal Clamp Mode-1P is lo, this condition also prevents starting the stepping motors in the Stitch Mode. At this time, the NAND gate has been conditioned with hi signals at its input 3 and 5.

As previously discussed, a positive pulse is formed as the signal Needle Disengage Pulse-P when the photosensor in unit 62 indicates the clamps may be moved at the time T4 (FIG. 25) of the timing cycle. At this time all three inputs of NAND gate NA55C are hi, resulting in formation of a lo pulse at input 10 of NAND gate NA55A. The NAND gate NA55A in turn inverts and passes the pulse, resulting in formation of a positive pulse at input 11 of NOR gate NO44A. The gate NO44A again inverts the pulse, and forms a lo pulse as the signal Start Run-N, which initiates movement of the X and Y stepping motors, as will be described below.

It may be determined that the signal Start Run-N was in a hi condition before the pulse Needle Disengage Pulse-P was received. The signal Basic Home-N is hi at this time, resulting in a hi condition at input 9 of gate NA55A. When the flip flop ff57A is set by the pulse Stitch-P, a lo condition is established at input 1 of NAND gate NA55B, resulting in a hi signal at input 11 of OR gate 043D and a hi signal at input 11 of NAND gate NA55A. Accordingly, all three inputs of NAND gate NA55A are high until the pulse Needle Disengage Pulse-P is received, and the input 11 of NOR gate NO44A is lo until this time. Also, since the flip flop ff39B was reset by the pulse Stitch-P, input 13 of AND gate A42C is lo, resulting in a lo signal at input 12 of NOR gate NO44A. Thus, both inputs of NOR gate NO44A are lo, resulting in a hi condition for the signal Start Run-N until the pulse Needle Disengage Pulse-P has been received.

Movement of the stepping motors during the Stitch Mode is described as follows. Referring to FIG. 21d, when the lo pulse Start Run-N is received, the pulse is inverted by inverter I19C, and a positive pulse is formed at input 2 of NOR gate NO20A and input 5 of NOR gate NO20B. Accordingly, lo pulses are formed at the outputs of NOR gates NO20A and NO20B, thus setting the X and Y run flip flops ff21B and ff32B, respectively, with its outputs X Run-N and Y Run-N set lo, and with outputs X Run-P and Y Run-P set hi.

The operation of the control system in forming pulse trains for the stepping motors and moving the clamps is similar to that described in connection with the homing mode. Referring to FIG. 21j, when the signals X Run-N and Y Run-N go lo, the signals X Count Pulse-P and Y Count Pulse-P are again formed from the signal LS Osc-N, as previously described. It will be recalled that the signals X Count Pulse-P and Y Count Pulse-P are trains of positive pulses. It will also be recalled, with reference to FIG. 21e, that when the flip flop ff45A was reset by the signal Homing Clear-N, the signal LS Shift-N was set hi. Accordingly, as described in connection with FIG. 21c, the hi signal LS Shift-N results in formation of the signal LS Osc-N at its relatively high speed. The pulse trains X Count Pulse-P and Y Count Pulse-P are thus formed at their relatively high rate of 850 pulses/second.

Figure 34:
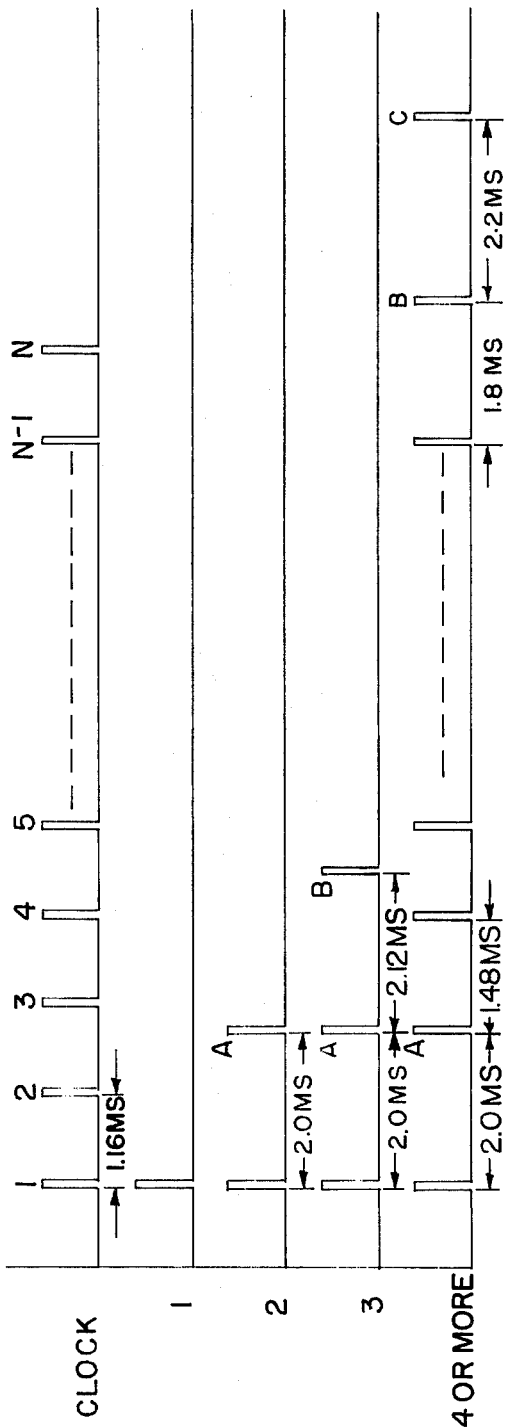
FIG. 34 is a timing diagram showing the relative timing of pulse trains formed for the driving means.

The relative timing between the pulses in the signals X Count Pulse-P and Y Count Pulse-P and the pulse trains to the stepping motor is described in connection with FIG. 34. The pulse trains X Count Pulse-P and Y Count Pulse-P are designated in the drawing as Clock, and the pulses in these signals occur at 1.16 millisecond intervals. The remaining lines illustrate the relative timing of the pulses transmitted to the stepping motors depending upon the number of pulses or counts coded in the X or Y data words. It will be seen that for one or more coded pulses, the Clock pulse No. 1 is utilized for the stepping motors in each case with the timing being the same. Of course, if no pulses have been coded into the X or Y data word, no pulse will be output to the corresponding stepping motor. If the control word indicates that two pulses should be generated for the corresponding stepping motor, the time of the first pulse to the stepping motor corresponds to Clock pulse No. 1, but the clock pulse No. 2 is inhibited and a pulse A is added to the pulse train for the stepping motor 2 milliseconds after the first pulse, such that pulse A occurs between the inhibited Clock pulses Nos. 2 and 3. If three pulses are to be formed for the X or Y stepping motors, the Clock pulse No. 1 is used, but the Clock pulses Nos. 2 and 3 are inhibited. As shown, pulse A is added 2.0 milliseconds after the first pulse to the stepping motor, and a third pulse B is added 1.8 milliseconds after pulse No. 3 and 2.12 milliseconds after Pulse A. If four or more pulses are formed for the X or Y stepping motors, the Clock pulse No. 1 is utilized for the first pulse to the stepping motors, while Clock pulses Nos. 2 and 3 are again inhibited. As will be seen, a pulse A is added 2.0 milliseconds after the first pulse to the stepping motor, and 1.48 milliseconds later the Clock pulse No. 4 is utilized for the stepping motor. Assuming that N pulses have been programmed in the control word, the Clock pulse No. 5 and subsequent pulses up to, and including, the Clock pulse No. (N-1) are utilized in forming the motor pulse train. However, the Clock pulse No. N is inhibited, and a pulse B is formed 1.8 milliseconds after Clock pulse No. (N-1). Finally, a pulse C is added to the motor pulse train 2.2 milliseconds after pulse B.

Accordingly, it will be seen that in each case for two or more pulses to the stepping motors, the basic clock rate 1.16 milliseconds has been modified, and, in particular, at the beginning and the end of the pulse trains to the stepping motors. The frequency has been reduced at the start and end of the pulse trains to provide gradual acceleration and deacceleration of the stepping motors to improve their operation under open loop control.

The formation of the pulse trains X Combo-N and Y Combo-N for the X and Y stepping motors is discussed in connection with FIG. 21k, as follows. The first condition discussed is the case when the number of pulses which will be output to the X or Y stepping motors will be one pulse, as determined by the corresponding X or Y data word. It will be recalled, as discussed in connection with FIG. 21i and FIG. 33, that for the condition of one pulse in the Y control word, the signal Y Decode 4 Plus-N was set hi, while the signals YA Pulse Inhibit-N, YB Pulse Inhibit-N, and YC Pulse Inhibit-N were set lo during the memory cycle. Similarly, for one count in the X control word, the signal X Decode 4 Plus-N was set hi, while the signals XA Pulse Inhibit-N, XB Pulse Inhibit-N and XC Pulse Inhibit-N were set lo. It will also be recalled that signals X Direction and Y Direction to control the proper direction of the X and Y stepping motors have previously been formed.

Reference is now made to FIGS. 21k and 35. As discussed in connection with the homing mode, when the X run flip flop is set and the signal X Run-P goes hi, the differentiator circuit 524 generates a positive pulse setting flip flop ff16A, resulting in a lo condition at pin 1 of single-shot SS28A. When the first pulse in the pulse train X Count Pulse-P (Pulse No. 1) is received at pin 2 of the single-shot SS28A after the signal at its pin 1 goes lo, the single-shot is triggered resulting in a hi condition at the Q output of the single-shot. The relative timing of these signals is shown in FIG. 35.

When the single-shot SS28A times out and its Q output goes lo, the single-shot SS28B is triggered at its pin 9. Accordingly, the Q output of the single-shot SS28B goes hi at this time, and the delayed hi signal at input 5 of flip flop ff16A resets the flip flop, resulting in a hi signal at pin 1 of single-shot SS28A to inhibit this single-shot. As will be seen from FIG. 35, the Q bar output of single-shot SS28B is hi at the time of Pulse No. 1 in the signal X Count Pulse-P. Accordingly, the pulse No. 1 is inverted by NAND gate NA5A, and is formed as a lo pulse at input 10 of NAND gate NA31A. Since the signal XA Pulse Inhibit-N is lo, a hi condition is established at pin 1 of single-shot SS6A preventing it from being triggered. Accordingly, the Q bar output of this single-shot remains hi, and input 11 of NAND gate NA31A is also hi. Additionally, since the signal XB Pulse Inhibit-N is lo, the input 9 of NAND gate NA31A is also hi. Thus, the output of NAND gate NA31A is a positive pulse at the time of the pulse No. 1 in the signal X Count Pulse-P, which passes through OR gate 082C, and triggers single-shot SS68A at its pin 2. This pulse is regenerated by the single-shot SS68A, and a single widened lo pulse is formed at the Q bar output of the single-shot as the signal X Combo-N for driving the X stepping motor one pulse. The lo signal XC Pulse Inhibit-N inhibits the single-shot SS68B from forming an XC Pulse.

As shown in FIG. 21j, the pulse train X Count Pulse-P is inverted by NOR gate NO80C, and the inverter pulse train is formed at pin 2 of the X counter CT61. Each of the pulses in the train will increment the counter by one count. Since the information loaded into the X counter from the Data-N signals corresponds to one count or pulse, the inverted binary configuration in the counter is 1110. When the X counter is counted once, responsive to the first pulse in the pulse train X Count Pulse-P, the counter is counted up to its full register or the binary configuration of 1111, at which time the counter output signal X Carry-P goes from lo to hi. As shown in FIG. 21e, the signal X Carry-P is connected to input 3 of AND gate A132B. The other input of the AND gate is connected to the signal Basic Home-N which is hi at this time. Since the lo signal Basic Home-P is connected to input 2 of AND gate A132A, input 1 of NOR gate NO134A is lo. Accordingly, the hi signal X Carry-P is inverted by NOR gate NO134A as a lo condition for the signal X Stop-N. As shown in FIG. 21d, the signal X Stop-N resets the X run flip flop ff21B, with its output X Run-N hi and its output X Run-P lo. As shown in FIG. 21j, the lo signal X Run-N inhibits further formation of pulses in the train X Count Pulse-P, and this signal only contained one pulse for the case under discussion. Also, the counter CT61 was incremented one time corresponding to this single pulse, and the signal to the X stepping motor, X Combo-N, contained only the one lo regenerated pulse at the time of the Pulse No. 1 in the pulse train X Count Pulse-P.

Assuming that one pulse was coded in the Y data word, the operation of the control system in operating the Y stepping motor is similar to that discussed above. The pulse train Y Count Pulse-P is started when the signal Y Run-N goes lo, as discussed in connection with FIG. 21j. Referring to FIG. 21k, when the signal Y Run-P goes hi, the flip flop ff16B is triggered to condition single-shot SS40A which is triggered by Pulse No. 1 in the signal Y Count Pulse-P. The same Pulse No. 1 is inverted by the NAND gate NA29A, since the Q bar output of single-shot SS40B is hi at this time. Since the signal YA Pulse Inhibit-N is lo, single-shot SS30A is inhibited, and input 4 of NAND gate NA31B remains hi. Since the signal YB Pulse Inhibit-N is lo, input 3 of NAND gate NA31B is also hi. Accordingly, one lo pulse at input 5 of NAND gate NA31B is inverted by this gate, and a positive pulse is formed at input 10 of single-shot SS69A after passage through OR gate 082D. The single-shot regenerates this pulse, and forms a single lo widened pulse at its Q bar output as the signal Y Combo-N for driving the Y stepping motor one pulse. The lo signal YC Pulse Inhibit-N inhibits the single-shot SS69B from forming a YC Pulse.

As shown in FIG. 21j, the pulse train Y Count Pulse-P is inverted by NOR gate NO104D, and an inverted pulse train is formed at pin 2 of Y counter CT62. When the Y counter is incremented by one count, responsive to Pulse No. 1 in the signal Y Count Pulse-P, the signal Y Carry-P goes hi. Referring now to FIG. 21e, since input 6 of AND gate A132C is connected to the hi signal Basic Home-N, and since input 7 of AND gate A132D is lo, the signal Y Carry-P, which is connected to input 5 of gate A132C, is inverted by NOR gate NO134B to form a lo condition for the signal Y Stop-N. Referring to FIG. 21d, the lo signal Y Stop-N resets the Y run flip flop ff32B, with its outputs Y Run-P lo and Y Run-N hi. Referring to FIG. 21j, the lo signal Y Run-N inhibits the signal Y Count Pulse-N. Thus, only one lo pulse is output to the Y stepping motor, and the Y counter CT62 was only incremented once.

Figure 36:
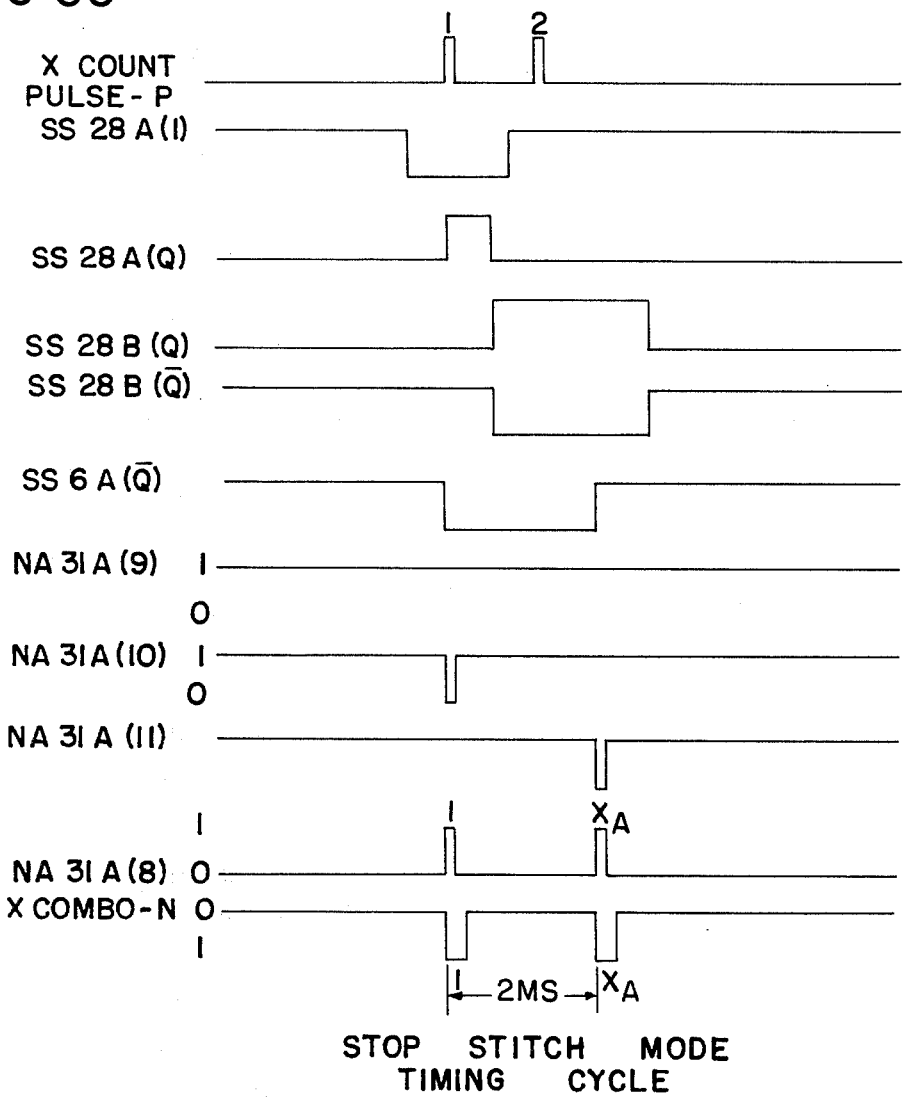
FIG. 36 is a timing diagram illustrating the relative timing of various signals utilized to form the pulse trains for the driving means for two motor steps.

Next, the condition for two counts or pulses coded into the X or Y data words is discussed as follows. Referring to FIG. 33, in this case, for the X data word the signals XA Inhibit-N and X Decode 4 Plus-N are set hi, while the signals XB Inhibit-N and XC Inhibit-N are set lo. The Y inhibit flip flops are set in a similar manner corresponding to the Y data word. As before, when the X and Y run flip flops are set, the outputs X Run-N and Y Run-N are set lo, and the pulse trains X Count Pulse-P and Y Count Pulse-P are initiated. Referring to FIGS. 21k and 36, when the signal X Run-P goes hi, the flip flop ff16A is set, the signal at pin 1 of single-shot SS28A goes lo, and the single-shot is triggered by Pulse No. 1 in the pulse train X Count Pulse-P, at which time the Q output of this single-shot goes hi. Since the single-shot SS28B is not triggered until the single-shot SS28A times out, the Q bar output of single-shot SS28B is hi at the time of Pulse No. 1. Accordingly, Pulse No. 1 in the signal X Count Pulse-P is inverted by NAND gate NA5A, and a lo pulse is formed at input 10 of NAND gate NA31A. When the single-shot SS28A times out and its Q output goes lo, the single-shot SS28B is triggered. At this time, the Q output of the single-shot SS28B goes hi, and the delayed output signal resets flip flop ff16A. The reset flip flop inhibits single-shot SS28A before the Pulse No. 2 in the signal X Count Pulse-P is received to prevent triggering this single-shot again. Also, when the single-shot SS28B is triggered its Q bar output goes lo. As shown in FIG. 36, the Q bar output of the single-shot SS28B is lo during the time of Pulse No. 2 in the signal X Count Pulse-P, since it does not time one until after receipt of this pulse. Accordingly, during this time the signal from the single-shot SS28B to NAND gate NA5A is lo to prevent passage of Pulse No. 2 through this NAND gate.

Since the signals XA Inhibit-N and LS Shift-N are hi, the single-shot SS6A is enabled by a lo signal at its input 1. When the single-shot SS28A is triggered and its Q output goes hi, the single-shot SS6A is triggered and its Q bar output goes lo at the time of Pulse No. 1 in the signal X Count Pulse-P. The delay in the single-shot SS6A is such that the single-shot times out 2 milliseconds after it is triggered, at which time its Q bar output goes hi. At this time, the differentiator circuit 526 generates a positive pulse which is inverted by inverter I56A, and a lo pulse is formed at input 11 of NAND gate NA31A. Since the signal XB Pulse Inhibit-N is lo, a high signal is formed at input 9 of NAND gate NA31A. Thus, as shown in FIG. 36, the signal formed at the output 8 of gate NA31A comprises a positive pulse at the time of the Pulse No. 1 in the signal X Count Pulse-P and a positive XA Pulse 2 milliseconds later when the single-shot SS6A times out. These pulses are regenerated by the single-shot SS68A, and are formed into a corresponding pulse train of lo widened pulses as the signal X Combo-N for control of the X stepping motor. Since the signal XC Pulse Inhibit-N is lo at this time, formation of an XC Pulse by single-shot SS68B is prevented. Accordingly, as shown in FIG. 36, the first pulse to the X stepping motor occurs at the time of Pulse No. 1 in the signal X Count Pulse-P, and the second XA Pulse is formed 2 milliseconds later to reduce the frequency between the pulses in the signal X Count Pulse-P.

Referring to FIG. 21j, each pulse in the signal X Count Pulse-P counts the X counter CT61 by one count, and on the second count the inverted data in the counter is incremented to full register. It should be noted that counting of the X counter is synchronized to the formation procedure of the motor pulse train X Combo-N by the signal X Count Pulse-P. When the counter has been incremented twice, the hi X Carry-P signal is formed, and the X run flip flop shown in FIG. 21d is reset. In turn, counting of the X counter CT61 is stopped, and the X Count Pulse-P pulse train is inhibited, thus terminating movement of the X stepping motor and the clamps in the X direction after passage of the XA pulse.

It will be apparent that operation of the system in driving the Y stepping motor for the case of two counts in the Y control word is very similar to that described in connection with the X stepping motor. Referring to FIG. 21k, the Pulse No. 1 in the signal Y Count Pulse-P is inverted by the NAND gate NA29A, and is utilized to form the first lo regenerated pulse in the signal Y Combo-N at the time of Pulse No. 1 in the signal Y Count Pulse-P. After the signal Y Run-P goes hi, the single-shot SS40A is triggered by Pulse No. 1, resulting in triggering of the single-shot SS30A, since the signals LS Shift-N and YA Pulse Inhibit-N are hi at this time. When the Q bar output of the single-shot SS30A times out 2 milliseconds after being triggered, the differentiator circuit 540 generates a positive pulse which is inverted and formed as a lo pulse at input 4 of NAND gate NA31B. Thus, the single-shot SS69A is triggered 2 milliseconds after Pulse No. 1 in the signal Y Count Pulse-P, and forms the second lo pulse in the signal Y Combo-N for control of the Y stepping motor. Referring to FIG. 21j, the Y counter CT62 is counted twice by the inverted signal Y Count Pulse-P resulting in a hi Y Carry-P signal responsive to the second pulse. At this time, a lo condition is obtained for the signal Y Stop-N which resets the Y run flip flop. In turn the pulse train Y Count Pulse-P is inhibited, thus preventing formation of further pulses for the Y stepping motor and further counting of the Y counter CT62.

Next, the condition for three counts in the X or Y control words is discussed as follows. In this case, as described in connection with FIG. 33, the corresponding XC or YC Pulse Inhibit-N signals are lo, while the corresponding signals XA or YA Pulse Inhibit-N, XB or YB Pulse Inhibit-N, and X or Y Decode 4 Plus-N are hi. As before, when the X and Y run flip flops are set and the signals X Run-N and Y Run-N go lo, the pulse trains X Count Pulse-P and Y Count Pulse-P are started. As shown in FIGS. 21k and 37, when the Pulse No. 1 in the signal X Count Pulse-P is received, the Q bar output of single-shot SS28B is hi, and the Pulse No. 1 is inverted by NAND gate NA5A and formed as a lo pulse at input 10 of NAND gate NA31A. The signal X Run-P sets the flip flop ff16A, and the single-shot SS28A is then triggered by the Pulse No. 1 in the signal X Count Pulse-P. As before, the single-shot SS28B is triggered by the Q output of single-shot SS28A when single-shot SS28A times out, and the delayed Q output of the single-shot SS28B resets flip flop ff16A to inhibit the single-shot SS28A from being further triggered at this time. As shown in FIG. 37, the single-shot SS28B does not time out until after receipt of the Pulse No. 3 in the signal X Count Pulse-P, and accordingly, the Q bar output of this single-shot is lo during the time of the Pulses Nos. 2 and 3 in this pulse train. Thus, single-shot SS28B prevents passage of Pulses Nos. 2 and 3 through NAND gate NA5A to NAND gate NA31A.

As before, the single-shot SS6A is triggered by the Q output of the single-shot SS28A at the time Pulse No. 1 in the signal X Count Pulse-P is received, since the signals XA Pulse Inhibit-N and LS Shift-N are both hi at this time to enable the single-shot with a lo signal at its input 1. Again, the single-shot SS6A times out 2 milliseconds after being triggered, and the differentiator circuit 526 generates a positive pulse, which is inverted by inverter I56A and formed as a lo pulse at input 11 of NAND gate NA31A, 2 milliseconds after Pulse No. 1 in the signal X Count Pulse-P. As shown in FIGS. 34 and 37, the XA Pulse formed at input 11 of NAND gate NA31A occurs between the Pulses Nos. 2 and 3 of the pulse train X Count Pulse-P which have been inhibited. Referring to FIG. 21j, as previously described, each of the inverted pulses of the signal X Count Pulse-P count the X counter CT61, and when the counter has been incremented three times by Pulses Nos. 1, 2, and 3, a hi condition for the X Carry-P signal is received. In turn, the X run flip flop is reset, as previously described, thus inhibiting the pulse train X Count Pulse-P.

It will be recalled in connection with FIG. 21d that the signal X Run-N goes from lo to hi when the X run flip flop ff21B is reset. Referring now to FIG. 21k, when the signal X Run-N goes hi, the signal is inverted twice by inverters I7C and I7D, such that the output of inverter goes from lo to hi at this time, and differentiator circuit 512 generates a positive pulse at pin 10 of single-shot SS6B. It will be recalled that the signal Basic Home-P is now lo, and, accordingly, the signal Homing Mode-OP is also lo at pin 9 of single-shot SS6B to enable the single-shot. Accordingly, the pulse at pin 10 of single-shot SS6B triggers the single-shot and the Q bar output of the single-shot goes lo at the time of the Pulse No. 3 in the pulse train X Count Pulse-P. This single-shot is utilized to form an XB Pulse which occurs 1.8 milliseconds after Pulse No. 3 and 2.12 milliseconds after the XA Pulse. Accordingly, the single-shot SS6B times out 1.8 milliseconds after Pulse No. 3 of the pulse train X Count Pulse-P. When the single-shot SS6B times out and its Q bar output goes hi, differentiator circuit 532 generates a positive pulse at input 13 of NAND gate NA5C. Since the signal XB Pulse Inhibit-N is hi at this time, the generated pulse is inverted, and is formed as a lo pulse at input 9 of NAND gate NA31A. Accordingly, positive pulses are formed at the output of NAND gate NA31A as follows. The first pulse is formed at the time of the Pulse No. 1 in the signal X Count Pulse-P, the second XA Pulse is formed 2 milliseconds later, and the third XB Pulse is formed 2.12 milliseconds after the XA Pulse. As discussed, the Pulses Nos. 2 and 3 in the pulse train X Count Pulse-P have been inhibited. Thus, the single-shot SS68A regenerates these three pulses and forms the corresponding lo pulse train of regenerated pulses as the signal X Combo-N for control of the X stepping motor.

The formation of the pulse train for the Y stepping motor in the case of three counts in the Y data word is very similar to that described in connection with the X circuitry. Referring to FIG. 21k, Pulse No. 1 in the signal Y Count Pulse-P is inverted by NAND gate NA29A and is utilized to form the first lo pulse in the signal Y Combo-N at the time of the Pulse No. 1 in the signal Y Count Pulse-P. When the signal Y Run-P previously went hi, the flip flop ff16B was set, and the single-shot SS40A was triggered by Pulse No. 1. Since the signals YA Pulse Inhibit-N and LS Shift-N are both hi, the single-shot SS30A is triggered by the single-shot SS40A at the time of Pulse No. 1 in the signal Y Count Pulse-P. The single-shot SS30A times out 2 milliseconds after being triggered, and the resulting pulse generated by the differentiator circuit 540 results in formation of a regenerated lo YA Pulse in the signal Y Combo-N 2 milliseconds after the first pulse. Referring to FIG. 21j, at the time of Pulse No. 3 in the signal Y Count Pulse-P, the Y counter CT62 has been counted 3 counts, resulting in a hi condition for the signal Y Carry-P, and the Y run flip flop is reset. Referring to FIG. 21d, when the Y run flip flop ff32B is reset, the signal Y Run-N goes from lo to hi. As shown in FIG. 21k, the signal Y Run-N is inverted twice by the inverters I7E and I7F, and when the signal Y Run-N and the output of inverter I7F goes hi, the differentiator circuit 514 generates a positive pulse at pin 2 of single-shot SS30B. As previously discussed, the signal Homing Mode-OP is lo at this time, and the pulse at pin 2 of single-shot SS30B triggers the single-shot. The single-shot is set to time out 1.8 milliseconds after Pulse No. 3 and 2.12 milliseconds after the YA Pulse is formed. When the single-shot times out and its Q bar output goes hi, the differentiator circuit 542 generates a positive pulse at input 5 of NAND gate NA29D. Since the signal YB Pulse Inhibit-N is hi, the pulse is inverted by the gate NA29D and is formed as a lo pulse at input 3 of NAND gate NA31B. This pulse is utilized to trigger the single-shot SS69A and form the regenerated YB pulse in the pulse train Y Combo-N 2.12 milliseconds after receipt of the YA Pulse.

When the X or Y data words have three counts, the corresponding signals XC Pulse Inhibit-N and YC Pulse Inhibit-N are both lo. Accordingly, the corresponding input to pin 10 of single-shot SS68B or input 2 of single-shot SS69B are lo, and the corresponding single-shot is inhibited for this condition of the X or Y data words. Accordingly, an XC or YC pulse is not formed for the corresponding state of 3 counts in the X or Y data words, and the corresponding pulse trains X or Y Combo-N are completed with the XB or YB Pulse.

The condition of four or more pulses in the X or Y data words is described as follows. In this case, as shown in FIG. 33, the corresponding signal X or Y Decode 4 Plus-N is lo, while the corresponding signals XA or YA Pulse Inhibit-N, XB or YB Pulse Inhibit-N and XC or YC Pulse Inhibit-N are hi irrespective of the number of counts in the data words above three. For convenience, a specific example of six counts coded into the X and Y data words will be discussed.

Figure 38:
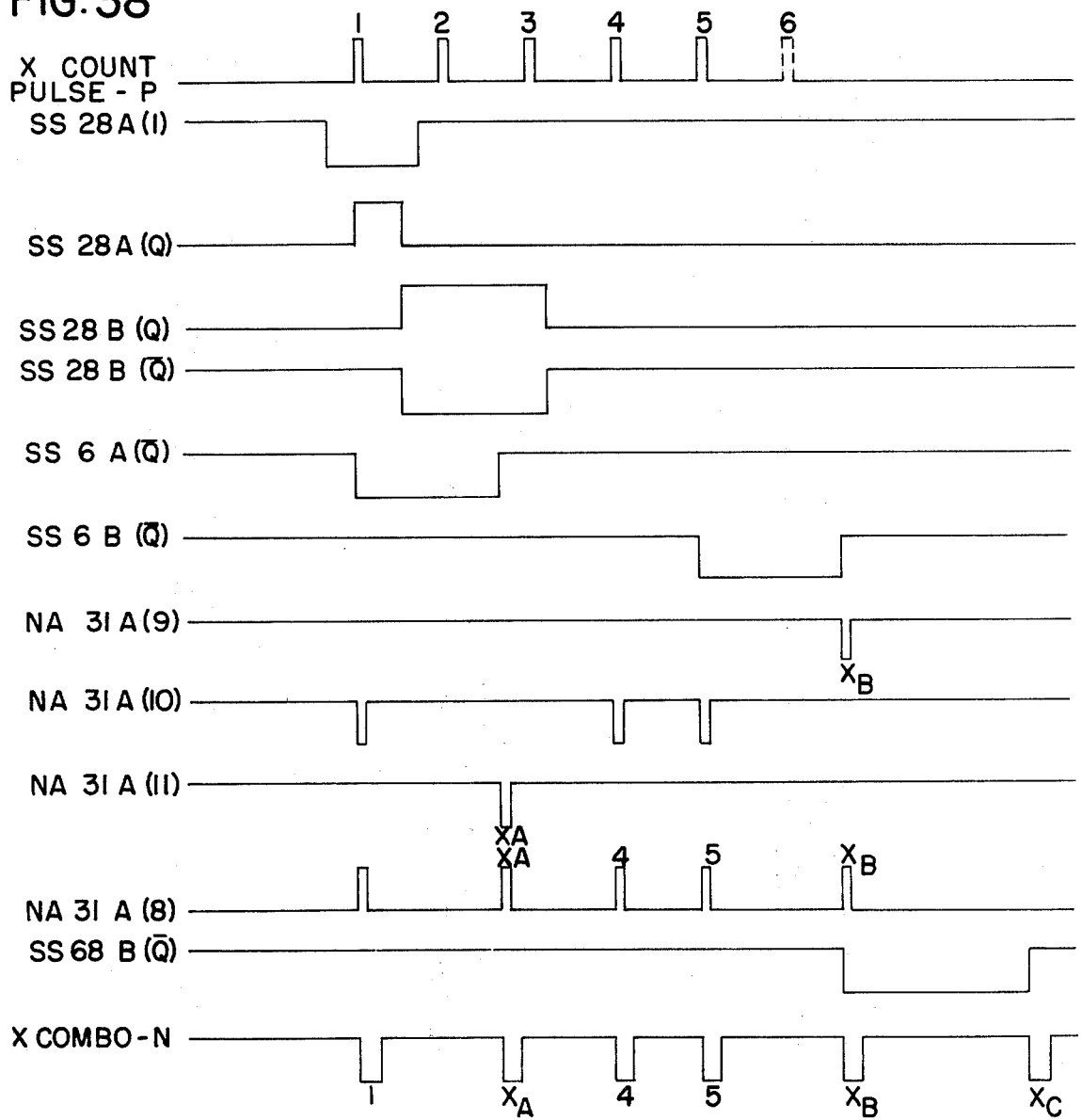
FIG. 38 is a timing diagram illustrating the relative timing of various signals utilized to form the pulse trains for the driving means for four or more motor steps.

As before, the X and Y run flip flops are set, and the pulse train X Count Pulse-P and Y Count Pulse-P are started when the pulse Needle Disengage Pulse-P has been received. Referring to FIGS. 21k and 38, the Q bar output of the single-shot SS28B will be hi at the time Pulse No. 1 in the signal X Count Pulse-P is received. Accordingly, the Pulse No. 1 is inverted by NAND gate NA5A, and is formed as a lo pulse at input 10 of NAND gate NA31A, resulting in a hi pulse at the output of gate NA31A, and a regenerated lo pulse for the signal X Combo-N at the time of Pulse No. 1 in the signal X Count Pulse-P. As previously described, when the signal X Run-P goes hi, the flip flop ff16A is set, and the single-shot SS28A is then triggered by the Pulse No. 1 of the signal X Count Pulse-P. The single-shot SS28A times out before receipt of Pulse No. 2 in the signal X Count Pulse-P, and the single-shot SS28B is triggered at this time. Thus, the Q output of the single-shot SS28B goes hi before receipt of the Pulse No. 2 in the signal X Count Pulse-P, and the flip flop ff16A is reset to inhibit the single-shot SS28A before the Pulse No. 2 has been received. The single-shot SS28B times out between Pulses Nos. 3 and 4 of the pulse train X Count Pulse-P, at which time the Q bar output of the single-shot SS28B returns hi. Accordingly, the NAND gate NA5A is inhibited during the time of the Pulses Nos. 2 and 3 in the signal X Count Pulse-P, and input 10 of NAND gate NA31A remains hi during this time.

Since the signals XA Pulse Inhibit-N and LS Shift-N are both hi, the signal at pin 1 single-shot SS6A is lo, and this single-shot is triggered by the Q output of single-shot SS28A at the time of the Pulse No. 1 in the signal X Count Pulse-P. As previously discussed, the single-shot SS6A does not time out until 2 milliseconds after receipt of Pulse No. 1. When the single-shot SS6A times out its Q bar output goes hi, and the differentiator circuit 526 generates a positive pulse which is inverted by inverter I56A and is formed as a lo XA Pulse at input 11 of NAND gate NA31A. Thus, the XA Pulse at input 11 of NAND gate NA31A occurs 2 milliseconds after the Pulse No. 1 in the signal X Count Pulse-P, and between the inhibited Pulses Nos. 2 and 3 in the pulse train X Count Pulse-P.

As previously noted, the single-shot SS28B times out between the Pulses Nos. 3 and 4 of the pulse train X Count Pulse-P. Accordingly, the Q bar output of this single-shot goes hi at this time, and Pulse No. 4 and subsequent pulses of the signal X Count Pulse-P are inverted and formed as lo pulses at input 10 of NAND gate NA31A. In the specific example at hand, Pulses Nos. 4 and 5 of the pulse train X Count Pulse-P are formed as lo pulses at input 10 of NAND gate NA31A. It will be seen below that the pulse train X Count Pulse-P is inhibited prior to receipt of Pulse No. 6.

Referring now to FIG. 21j, it will be recalled that if four or more pulses are coded in the X data word, resulting in a lo condition for the signal X Decode 4 Plus-N, the X counter CT61 is incremented by one count before the memory cycle is completed. Accordingly, it will require one less pulse from the signal X Count Pulse-P in this case to obtain the hi signal X Carry-P. In the specific example under discussion, where the count in the X data word is 6, the inverted data loaded into X counter CT61 was originally −6, but was incremented once to a count of −5. Thus, the X counter CT61 will be counted to a full register condition of all binary 1's responsive to five pulses in the signal X count Pulse-P, rather than the six counts which would normally be expected. Accordingly, when Pulse No. 5 in the pulse train X Count Pulse-P has been received, and the X counter CT61 has been incremented by five counts, the hi condition for the signal X Carry-P is obtained, resulting in a lo condition for the signal X Stop-N and resetting of the X run flip flop ff21B, as previously described in connection with FIG. 21d. At this time, the signal X Run-N from the flip flop ff21B goes hi. As shown in FIG. 21j, this signal then inhibits formation of further pulses in the pulse train X Count Pulse-P, and the Pulse No. 6 in this pulse train is never received. Thus, referring back to FIG. 21k, the last pulse in the pulse train X Count Pulse-P inverted by NAND gate NA5A is Pulse No. 5, and the last lo pulse formed at input 10 of NAND gate NA31A corresponds to the Pulse No. 5 in the pulse train X Count Pulse-P.

However, when the X run flip flop is reset by the signal X Stop-N at the time of the Pulse No. 5 in the pulse train X Count Pulse-P, and the signal X Run-N goes hi, the differentiator circuit 512 generates a positive pulse at pin 10 of single-shot SS6B. Since the signal Basic Home-P is lo at this time, the signal at pin 9 of single-shot SS6B is also lo. Accordingly, the single-shot SS6B is triggered by the positive pulse at its pin 10 at the time of the Pulse No. 5 in the signal X Count Pulse-P. The single-shot SS6B times out 1.8 milliseconds after being triggered, at a time after the Pulse No. 6 in the pulse train X Count Pulse-P would have been received if not inhibited. When the Q bar output of the single-shot SS6B goes hi, the differentiator circuit 532 generates a positive pulse at input 13 of NAND gate NA5C. Since the signal XB Pulse Inhibit-N is hi, a corresponding lo XB Pulse is formed at input 9 of NAND gate NA31A at a time 1.8 milliseconds after the Pulse No. 5 in the signal X Count Pulse-P.

Accordingly, the following positive pulses are formed at output 8 of NAND gate NA31A. A first pulse corresponding to the Pulse No. 1 in the pulse train X Count Pulse-P, an XA Pulse 2 milliseconds later, i.e., during the time that the Pulses Nos. 2 and 3 in the pulse train X Count Pulse-P are inhibited, the Pulses Nos. 4 and 5 of the pulse train X Count Pulse-P, and finally an XB Pulse 1.8 milliseconds after the Pulse No. 5 of the pulse train X Count Pulse-P. All of these pulses are formed as positive pulses at input 2 of single-shot SS68A, and trigger this single-shot. The single-shot regenerates the pulses, and forms them into widened lo pulses as the signal X Combo-N for control of the X stepping motor.

As discussed above, when the single-shot SS6B times out and its Q bar output goes hi, the differentiator circuit 532 generates a positive pulse which results in a lo XB Pulse at the output of NAND gate NA5C. As shown, this lo pulse is also formed at pin 9 of single-shot SS68B. It will be recalled that the signal Basic Home-N is hi at this time, as well as the signal XC Pulse Inhibit-N, resulting in a hi signal at input 10 of single-shot SS68B to enable the single-shot. Accordingly, the lo pulse at pin 9 of single-shot SS68B triggers the single-shot. The single-shot is configured to undergo a 2.2 millisecond delay after being triggered. When the single-shot times out and its Q bar output goes hi, differentiator circuit 534 generates a positive XC Pulse which is passed through OR gate 082C to trigger the single-shot SS68A at its pin 2. Accordingly, the pulse is regenerated by the single-shot, and a lo widened XC Pulse is formed into the signal X Combo-N for the X stepping motor at a time 2.2 milliseconds after formation of the XB Pulse. At this time six pulses have been transmitted to the X stepping motor, and formation of the signal X Combo-N has been completed.

In review, the pulse train X Combo-N for the X stepping motor has been formed as follows. Assuming that N counts were programmed into the X data word and that N is greater than three, the pulses are formed for the X stepping motor with the following timing. A first pulse is formed for the signal X Combo-N at the time of Pulse No. 1 in the signal X Count Pulse-P. The Pulses Nos. 2 and 3 of the signal X Count Pulse-P are inhibited, and an XA Pulse is formed 2 milliseconds after the time of the first pulse. Pulses in the signal X Combo-N are then formed corresponding to the pulses in the signal X Count Pulse-P up to, and including, the Pulse No. (N−1) in the signal X Count Pulse-P. The next pulse formed in the signal X Combo-N is the Pulse XB which occurs 1.8 milliseconds after Pulse No. (N−1) in the pulse train X Count Pulse-P. Finally, the last pulse in the pulse train X Combo-N is the XC Pulse which is formed 2.2 milliseconds after the XB Pulse. Thus, it has been shown how the pulse train X Count Pulse-P has been modified to form a ramped pulse train to the stepping motor.

It will be seen that formation of the signal Y Combo-N for control of the Y stepping motor in the case of four or more counts in the Y control word is very similar to that discussed above. When the Y run flip flop is set and its output Y Run-N goes lo, the pulse train Y Count Pulse-P is initiated. Referring to FIG. 21k, Pulse No. 1 in the pulse train Y Count Pulse-P is inverted by NAND gate NA29A, and is utilized to form the first regenerated lo pulse in the signal Y Combo-N corresponding to the time of the Pulse No. 1. When the signal Y Run-P previously goes hi and the flip flop ff16B is set, the single-shot SS40A is triggered by Pulse No. 1 in the pulse train Y Count Pulse-P, as previously described. When the single-shot SS40A times out and its Q output goes lo, Pulses Nos. 2 and 3 in the pulse train Y Count Pulse-P are inhibited by the NAND gate NA29A. Also, as previously described, the Q output of single-shot SS40B resets flip flop ff16B to inhibit single-shot SS40A after receipt of the Pulse No. 1 in the pulse train Y Count Pulse-P. As discussed above, the triggered single-shot SS40A is utilized to trigger the single-shot SS30A, since both signals LS Shift-N and YA Pulse Inhibit-N are hi resulting in a lo signal at pin 9 of this single-shot. When the single-shot SS30A times out and its Q bar output goes hi, the differentiator circuit 540 generates a positive pulse which results in formation of a lo YA Pulse at input 4 of NAND gate NA31B. The corresponding pulse is regenerated by single-shot SS69A and is formed as a lo widened YA Pulse in the signal Y Combo-N 2 milliseconds after formation of the first pulse, and during the time that Pulses Nos. 2 and 3 in the signal Y Count Pulse-P have been inhibited. The Pulse No. 4 and subsequent pulses in the pulse train Y Count Pulse-P are utilized to form regenerated lo pulses in the signal Y Combo-N up to, and including, Pulse (N−1) which in this case is Pulse No. 5.

As previously described in connection with FIG. 21j, since the lo signal Y Decode 4 Plus-N caused the Y counter CT62 to be incremented by one count during the memory cycle, a hi condition for the signal Y Carry-P is obtained when the counter has been strobed (N−1) or 5 times by the inverted signal Y Count Pulse-P. At this time, the signal Y Stop-N goes lo, and the Y run flip flop ff32B shown in FIG. 21d is reset with its output Y run-N reset hi. Referring to FIG. 21j, the Nth or 6th pulse in the pulse train Y Count Pulse-P is inhibited as a result of the hi signal Y Run-N. Referring back to FIG. 21k, the Nth or 6th pulse is not formed into the pulse train Y Combo-N. However, when the signal Y Run-N of the Y run flip flop goes hi, a positive pulse is generated by the differentiator circuit 514 at pin 2 of single-shot SS30B. Since the signal Homing Mode-OP is lo at this time, the single-shot SS30B is triggered by the pulse at its input 2. When the single-shot times out 1.8 milliseconds later, the differentiator circuit 542 generates a positive pulse at input 5 of NAND gate NA29D. Since the signal YB Pulse Inhibit-N is hi, a lo YB Pulse is formed at input 3 of NAND gate NA31B, resulting in a corresponding hi pulse at pin 10 of single-shot SS69A. The triggered single-shot regenerates the pulse as a lo widened YB pulse in the signal Y Combo-N at a time 1.8 milliseconds after the Pulse No. (N−1) or 5 in the pulse train Y Count Pulse-P.

It will be noted that the output of NAND gate NA29D is also connected to pin 1 of the single-shot SS69B. Since the signals Basic Home-N and YC Pulse Inhibit-N are both hi, the signal at pin 2 of single-shot SS69B is also hi. Accordingly, the lo YB Pulse at pin 1 of single-shot SS69B triggers the single-shot. The single-shot SS69B times out 2.2 milliseconds after being triggered. When the single-shot SS69B times out and its Q bar output goes hi, the differentiator circuit 542 generates a positive pulse which passes through OR gate 082D to trigger single-shot SS69A at its input 10. The single-shot SS69A regenerates the pulse as a lo widened YC Pulse in the signal Y Combo-N for Accordingly, the pulse train Y Combo-N for the Y stepping motor has been formed in a similar fashion to that described in connection with the X circuitry.

Although, for convenience, formation of the pulse trains X Combo-N and Y Combo-N have been described together for the same counts coded into the X and Y data words, it will be understood that control of the X and Y stepping motors is independent. Accordingly, in the usual situation a different number of pulses will be coded in the X and Y data words, resulting in different pulse trains X Combo-N and Y Combo-N for the X and Y stepping motors. It will be recalled in connection with FIG. 21d that the X and Y run flip flops ff21B and ff32B are set at the same time by the signal Start Run-N, Accordingly, with reference to FIG. 21j, it will be seen that the pulse trains X Count Pulse-P and Y Count Pulse-P will be initiated at the same time, since they are started by the X and Y run flip flop outputs, and since they are both formed from the signal LS Osc-N. So long as one or more pulses have been coded into the X and Y data words, the first pulse formed into the pulse trains X Combo-N and Y Combo-N will occur at the same time. However, after this time, the pulse trains to the X and Y stepping motors are dependent upon the number of counts coded in the respective X or Y data word, and may vary from each other. It will be recalled in connection with FIG. 25 that the last pulse transmitted to the stepping motors will occur before the time T9 when the needle enters the fabric.

The final condition discussed for the X and Y data words corresponds to zero counts in the data words. With reference to FIGS. 21j and 33, since the X or Y data word is inverted as the Data-N signals, all of the Data-N signals will be hi and the X or Y counters CT61 or CT62, respectively, will be full when the data is loaded into the counters. Referring to FIGS. 21d, e, and j, the corresponding signal X Stop-N or Y Stop-N will be lo due to the resulting hi condition for the corresponding signal X Carry-P or Y Carry-P from the full counters. For example, the signal X Stop-N is lo since the signal X Carry-P is hi. When the lo pulse for the signal Start Run-N is received, the signal X Run-N will remain hi even though the lo pulse is formed at the output of NOR gate NO20A of FIG. 21d, which would normally set the X run flip flop ff21B. When the signal Start Run-N decays, the signal X Run-P will return to its lo condition. Referring to FIG. 21j, since the signal X Run-N remains hi, the signal X Count Pulse-P is inhibited and remains lo. Thus, referring to FIG. 21k, since no pulses are formed in the signal X Count Pulse-P, no pulses are formed at input 10 of NAND gate NA31A nor other inputs to this gate. Although the signal X Run-P goes temporarily hi, and then returns to its lo state, resulting in setting of flip flop ff16A, the lack of a pulse in the signal X Count Pulse-P prevents the single-shot SS28A from being triggered. Since the remaining pulses are dependent upon triggering of single-shot SS28A or formation of pulses in the signal X Count Pulse-P, no pulses are formed in the signal X Combo-N to the X stepping motor, and the clamps will not be moved in the X direction. It will be appreciated that the same result occurs for the Y stepping motor due to the fact that the Y Carry-P signal is hi before the Stitch Mode is entered. Of course, if both the X and Y data words are coded with zero counts, the clamps would not be moved in the X or Y directions. Accordingly, only one of the two X or Y control words would normally ever be coded with zero counts. For example, it may be desired to drive the Y stepping motor 5 pulses, while the X stepping motor remains at rest, in which case zero counts are programmed into the X control word and 5 counts are coded into the Y control word, such that only the Y stepping motor is moved.

For convenience of discussion at this time, it is noted that the control of the X and Y stepping motors corresponding to the X and Y data words for movement of the clamps relative the needle is substantially the same irrespective of whether the program is in the Stitch Mode, Stop Stitch Mode or the Slow Stitch Mode. In each case, the X and Y data words are decoded to form the X Combo-N and Y Combo-N signals for control of the X and Y stepping motors according to the discussion above.

When both of the X and Y run flip flops of FIG. 21d have been reset, both inputs 8 and 9 of NOR gate NO20C are reset lo. Thus, at the time of the last of the two signals X Stop-N and Y Stop-N to go lo, the output of NOR gate NO20C goes from a lo to a hi condition, and the differentiator circuit 550 generates a positive pulse at the input of inverter I19D. The inverter I19D inverts the positive pulse, and forms a lo pulse at input 3 of OR gate O8C. It will be recalled that the flip flop ff21A was reset by the signal Homing Clear-N, and that the signal Basic Home-P is lo at this time. Since the condition at input 3 of OR gate O8C is hi until the lo pulse is received at this input, a lo pulse is formed at input 1 of NAND gate NA11B, and a hi pulse is formed at its output which triggers single-shot SS22B at its input 10.

The single-shot SS22B undergoes a 5 millisecond delay, which occurs during the time period delta T4, between times T8 and T2, as discussed in connection with FIG. 25. When the single-shot times out and its Q bar output goes hi, the differentiator circuit 578 generates a positive pulse which is inverted by gate NA11C as a low pulse at input 11 of NOR gate NO34B, since the signal NTB Mode-OP is normally hi. Also, the signal Clamp Mode-OP was set lo prior to the homing mode, and the lo pulse is inverted as a positive pulse at input 1 of NOR gate NO135A. As previously discussed, the signal Aux Start-P is normally lo, and the NOR gate NO135A inverts the positive pulse, the inverter I131B inverts the corresponding lo pulse again to form a positive pulse at input 6 of flip flop ff34A, which sets the memory cycle flip flop. It will be recalled that this flip flop was reset by the pulse EMC-P during the previous memory cycle. Accordingly, the signal Mem Cycle Enable-P is again set hi, and the signal Mem Cycle Enable-N is set lo to initiate another memory cycle at time T2 of the timing cycle shown in FIG. 25. Thus, referring to FIG. 21c, when the signal Mem Cycle Enable-N goes lo, the signal Clock Pulse is again formed from the H.S. Clock signal for use during the memory cycle. Also, as discussed in connection with FIG. 21i, it will be recalled that the signal Mem Cycle Enable-P results in the resetting of the pulse inhibit flip flops on chips 598–604.

It will be seen in connection with the timing cycle shown in FIG. 25 how the control system sequences through the program in the PROM. After the completion of the homing mode, the first 5 millisecond delay undergone by the single-shot SS22B of FIG. 21d took place during the time period delta T4. After the delay was completed, the memory cycle flip flop ff34A of FIG. 21d was set at time T2 to initiate the first memory cycle. During the memory cycle, the Y data word was first read from the memory of the PROM, was inverted as the Data-N signals, and was decoded. Next, the X data word was read from the PROM, was inverted as the Data-N signals, and was decoded. The control word was read from the PROM, was inverted as the Data-N signals, and was decoded, and the memory cycle then ended at time T3. In addition, the address registers were incremented three times during the memory cycle. At this time, the control system was prepared for initiating movement of the clamps by the X and Y stepping motors. However, this procedure does not take place until time T4 when the Needle Disengage Sensor causes a positive pulse to be formed as the signal Needle Disengage Pulse-P, indicating that the sewing machine is sufficiently advanced in the timing cycle to permit movement of the clamps. As previously discussed, the signals to the stepping motors may be started before the needle has been actually removed from the fabric, due to the lag time associated with the stepping motors and inertia of the clamps. At time T5 the needle has been removed from the fabric, and actual movement of the clamps is started at time T6 responsive to the signals sent to the X and Y stepping motors. Movement of the clamps has been completed at time T8, which is some time prior to the time T9 when the needle again enters the fabric. Next, the 5 millisecond delay is undertaken by the single-shot SS22B of FIG. 21d during the time delta T4, after which a subsequent memory cycle is again started at time T2. In this manner, the control system sequences through the program, particularly in the Stitch Mode.

Next, it is assumed that a Slow Stitch Command has been received from one of the control words. As previously noted, a series of Slow Stitch Commands are normally used before a Stop Stitch Command or End of Program Command, in order to slow the sewing machine in preparation for these commands. As shown in FIG. 21l the pulse Slow Stitch-P results in formation of a lo pulse at input 13 of NAND gate NA70A, and the positive pulse formed at the output of this gate resets the flip flop ff84A. Thus, the signal Stitch Mode-P is set lo to remove the system from the Stitch Mode. Also, output 1 of this flip flop is set hi, resulting in a hi signal at input 1 of driver circuit DC72A. It will be recalled that if either input to the driver circuit DC72A is hi, the resulting output of the driver circuit is hi, and the main clutch/brake solenoid is deenergized. It will be recalled in connection with FIG. 17 that the disc 430 will be engaged against the main brake surface 434 of worm wheel 432 at this time.

As shown in FIG. 21g, the pulse Slow Stitch-P is inverted by inverter I52F to set flip flop ff54C with its output 3 lo, and with its output 6 hi. Accordingly, input 8 of OR gate O53C is lo, and if the Normal/Service Select Switch is at its Normal terminal, the other input of OR gate O53C is also lo, resulting in a lo signal at input 1 of driver circuit DC88B. It will be recalled that if either input of driver circuit DC88B is lo, the output signal Quick Slow Sew Cmd is also lo. As discussed, this condition of the signal prevents the Quick device from starting the cutting and stopping sequence of the machine even when the Quick device determines from the signals of the unit 62 that the machine is being operated at slow speed. Accordingly, the disc 446 of FIG. 17 remains engaged against the auxiliary clutch surface 448, and a sequence of Slow Speed Commands may be used to slow the machine from fast to slow speed during the Slow Stitch Mode.

Referring to FIG. 21g, the signal Slow Stitch Mode-1P is set hi by flip flop ff54C to indicate that the system is in the Slow Stitch Mode. The delayed signal at input 5 of AND gate A42A is also hi to condition this gate for a subsequent Stop Stitch Command, if any. It will be recalled that input 4 of AND gate A42A is lo, since the flip flop ff39B was reset with its output 1 lo by the pulse Stitch-P during the Stitch Mode, which preceded the Slow Stitch Mode. The pulse Slow Stitch-P also sets flip flop ff57A with its output STCH-1P set hi, and with its output STCH-0P set lo. It will be recalled that flip flop ff57A is reset by the signal X Strobe-N during the memory cycle.

Referring to FIG. 21g, since the output of the set flip flop ff57A to input 9 of NOR gate NO44B is lo, it will be seen that a lo pulse is formed for the signal Start Run-N to again initiate formation of the pulse trains to X and Y stepping motors. Thus, with reference to FIG. 21d, the lo pulse Start Run-N causes the X and Y run flip flops ff21B and ff32B, respectively, to be set, and the pulse trains X Count Pulse-P and Y Count Pulse-P are initiated. As previously described, each of the pulses in the pulse train X Count Pulse-P and Y Count Pulse-P result in counting of the X and Y counters CT61 and CT62, respectively, and, as described in connection with FIG. 21k, the signals X Combo-N and Y Combo-N for control of the X and Y stepping motors are formed from the pulse trains X Count Pulse-P and Y Count Pulse-P, and from the decoded X and Y control words, as described above in connection with the Stitch Mode. However, at this time the sewing needle is being reciprocated at the slow speed. When the X and Y run flip flops of FIG. 21d are reset after completion of clamp movement, the differentiator circuit 550 again generates a positive pulse, resulting in triggering of the single-shot SS22B. After a 5 millisecond delay, the memory cycle flip flop ff34A is again set to initiate a new memory cycle.

It will be recalled that during normal operation of the sewing machine, the Needle Disengage Pulse-P signal is utilized to initiate formation of the pulse trains to the stepping motors for moving the clamps in the X and Y directions. However, the needle is not reciprocating during the Stop Stitch Mode, and the pulse Needle Disengage Pulse-P will not be generated in this mode. Accordingly, a new reference is needed during the Stop Stitch Mode to sequence the system through its operation.

As shown in FIG. 21g, the positive pulse EMC-P formed at the end of each memory cycle triggers the single-shot SS18A at its pin 2. The single-shot SS18A undergoes a 7 millisecond delay, and when it times out its Q bar output goes hi. At this time, the differentiator circuit 616 generates a positive pulse at input 2 of NAND gate NA55B, which is utilized to form a lo pulse as the signal Start Run-N and set the X and Y run flip flops for initiating the pulse trains to the stepping motors. Assuming that more than one consecutive Stop Stitch Command has been programmed in the PROM, the signal EMC-P is utilized to sequemce each timing cycle, in lieu of the signal Needle Disengage Pulse-P, after the first such timing cycle, as will be seen below.

Figure 39:
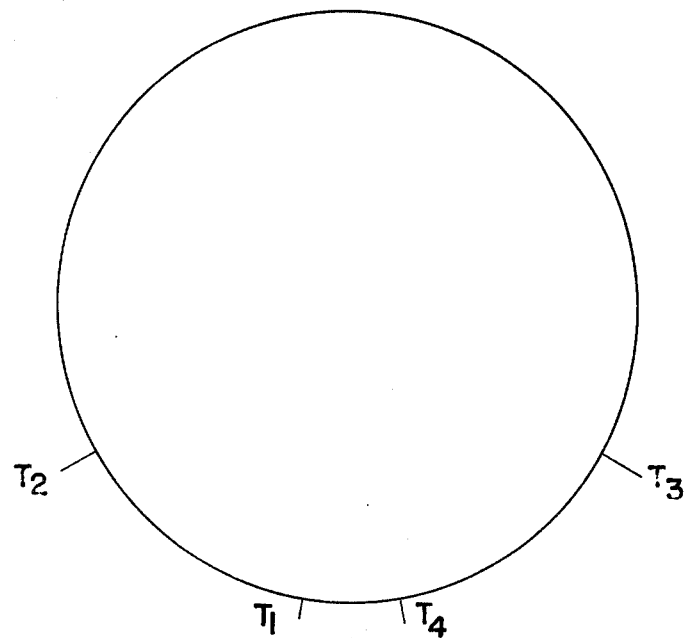
FIG. 39 is a timing diagram for operation of the machine while reciprocation of a sewing needle is stopped.

The timing cycle during the Stop Stitch Mode, after the first timing cycle, is illustrated in FIG. 39. At time T1 the pulse EMC-P at the end of the memory cycle goes hi, and the single-shot SS18A of FIG. 21g is triggered, resulting in the 7 millisecond delay which ends at time T2. On the second and subsequent timing cycles in the Stop Stitch Mode, the pulse generated responsive to timing out of the single-shot SS18A causes the X and Y run flip flops to be set, resulting in formation of the pulse trains to the X and Y stepping motors which ends at time T3. Of course, the time interval between the times T2 and T3, during which the clamps are being moved by the stepping motors, is dependent upon the number of pulses output to the stepping motors in the X and Y directions. Accordingly, this variable time period will be dependent upon the number of counts in the X and Y control words. When the motor pulse trains have been formed, and the X and Y run flip flops have been reset, the single-shot SS22B of FIG. 21d will be triggered, resulting in a 5 millisecond delay which ends at the time T4. At this time, the next memory cycle is initiated, and, when completed, the pulse EMC-P again triggers single-shot SS18A of FIG. 21g at time T1.

Thus, on the second and subsequent timing cycles in the Stop Stitch Mode, the system is sequenced through the program by the signal EMC-P at the end of each memory cycle. It should be noted that during the Stitch Mode and Slow Stitch Mode the flip flop ff57A of FIG. 21g has been set by the signals Stitch-P or Slow Stitch-P, respectively, resulting in a lo signal at input 1 of NAND gate NA55B. Accordingly, although the positive pulse will be generated by the differentiator circuit 616 during the Stitch and Slow Stitch Modes, the pulse is not generated until input 1 of NAND gate NA55B has been conditioned lo, due to the 7 millisecond delay associated with single-shot SS18A, thus preventing the delayed positive pulse at input 2 of this gate from setting the signal Start Run-N lo. Accordingly, the flip flop ff57A inhibits the gate NA55B during the Stitch and Slow Stitch Modes. However, the flip flop ff57A is reset by the signal X Strobe-N during each memory cycle, and the gate NA55B will be enabled with a hi signal at its input 1 during the Stop Stitch Mode.

It will be recalled that cutting of the thread is initiated in the Stop Stitch Mode, and it is desired that completion of this operation take place before movement of the clamps in this mode. Accordingly, the pulse generated by differentiator circuit 616 responsive to triggering of the single-shot SS18A will be inhibited during the first timing cycle of the Stop Stitch Mode to prevent premature starting of the X and Y stepping motors, since the 7 millisecond delay may not be sufficient before the thread has been cut.

The time at which the thread has been cut is determined by the circuitry shown in FIG. 21h. When the thread is cut, the End of Cut signal goes lo, thus triggering single-shot SS18B. When the single-shot times out its Q bar output goes hi, and the differentiator circuit 618 generates a positive pulse which passes through AND gate A32C as the pulse End of Cut Pulse-P. It will be recalled that the signal End of Program Mode-1P is lo at this time, thus preventing passage of the pulse through NAND gate NA31C.

Referring to FIG. 21*l*, it will be recalled that the stitch flip flop ff84A was reset during the Slow Stitch Mode, such that the main brake/clutch solenoid remains deenergized during the Stop Stitch Mode. Thus, the disc 430 of the Quick device, shown in FIG. 17, remains against the main brake surface 434. Referring to FIG. 21*g*, since the signal End of Program-P is lo at this time, the positive pulse Stop Stitch-P is inverted by NOR gate NO53B, and a lo pulse is formed at input 12 of NAND gate NA54B. Since the signal NTB Mode Pulse-N is normally hi, the lo pulse is inverted by NAND gate NA54B, and a positive pulse is formed at input 11 of NOR gate NO53A. Since the signal Stitch-P is lo at this time, the pulse is inverted by NOR gate NO53A, and a lo pulse is formed at input 1 of flip flop ff54C to reset the flip flop and clear out the Slow Stitch Mode. Accordingly, output 3 of flip flop ff54C is set hi, which is the same condition of the flip flop discussed in connection with the Stitch Mode. In this case, assuming the the Normal/Service Select Switch has been set at its Normal terminal, both inputs of driver circuit DC88B are hi, and the circuit output signal Quick Slow Sew Cmd is also hi.

At this time, the machine should be operating at its slow speed, since a sequence of Slow Sew Commands have been used during the Slow Stitch Mode to slow the machine. As previously discussed, the Quick device monitors the signals from the unit 62 to determine whether the machine is operating at slow speed. During the Slow Stitch Mode, the Quick device is prevented from starting the cutting and stopping sequence due to the lo signal output from driver circuit DC88B. However, during the Stop Stitch Mode this signal is hi, and the Quick device is permitted to start this sequence as soon as it determines the machine is operating at slow speed. As previously discussed, this should occur at the start of the Stop Stitch Mode. Thus, the Quick device initiates the cutting device, and engages the disc 446 against the auxiliary brake surface 450 to stop reciprocation of the needle with the needle in its up position. When the pulse End of Cut Pulse-P is received, indicating that the thread has been cut, the clamps may be moved without obstruction by the needle.

Referring now to FIG. 21*g*, when the positive pulse Stop Stitch-P is received, the flip flop ff39B is set with its output 1 set hi. Accordingly, the signal Stop Stitch Mode-1P and input 4 of AND gate A42A are set hi. The flip flop ff54C is reset with its output 6 set lo, which is delayed to input 5 of AND gate A42A by delay circuit 620. It will be recalled that in the Slow Stitch Mode input 5 of AND gate A42A was set hi, and, accordingly, since input 4 of this gate is set hi, there will be a short period of time during which both inputs of the gate are hi. Thus, the output of AND gate A42A will be momentarily hi to set flip flop ff57B, after which the delayed signal at input 5 of AND gate A42A goes lo, resulting in a lo signal at input 8 of flip flop ff57B. Accordingly, output 10 of flip flop ff57B is set lo at this time, resulting in a lo condition at input 13 of NAND gate NA55B, which will occur before the single-shot SS18A times out, and before the pulse is generated by differentiator circuit 616. The lo signal at input 13 of NAND gate NA55B prevents passage of the pulse generated by differentiator circuit 616 through the NAND gate NA55B during the first timing cycle of the Stop Stitch Mode. Accordingly, during the first timing cycle, the pulse EMC-P is not utilized to initiate formation of the pulse trains to the X and Y stepping motors.

When the thread has been cut, and the positive pulse End of Cut Pulse-P is received, the flip flop ff57B is reset by this signal to enable gate NA55B during subsequent timing cycles. The positive pulse is also formed at input 12 of AND gate A42C. Since output 1 of flip flop ff39B has been set hi, the positive pulse is passed through the gate to input 12 of NOR gate NO44A.

It will be seen that input 11 of NOR gate NO44A is lo at this time. Since the signal Basic Home-N is hi, input 9 of NAND gate NA55A is also hi. Also, the signal Needle Disengage Pulse-P is lo, resulting in a hi condition at input 10 of NAND gate NA55A. Since the time has passed for the pulse from circuit 616, input 2 of NAND gate NA55B is lo, and input 11 of OR gate O43D will be hi at this time, resulting in a hi condition at input 11 of NAND gate NA55A and a lo signal at input 11 of NOR gate NO44A. Accordingly, the NOR gate NO44A inverts the positive pulse at its input 12, and forms a lo pulse for the signal Start Run-N.

As previously discussed, the lo pulse Start Run-N sets the X and Y run flip flops, and initiates formation of the pulse trains to the X and Y stepping motors. After movement of the clamps has been completed, the differentiator circuit 550 of FIG. 21*d* generates a positive pulse, resulting in setting of flip flop ff34A, and initiation of another memory cycle. Assuming that a second consecutive Stop Stitch Command has been utilized in a control word, when the pulse EMC-P triggers the single-shot SS18A and its Q bar output goes hi, the differentiator circuit 616 generates a positive pulse at input 2 of NAND gate NA55B. It will be recalled that the flip flop ff57B has been reset by the signal End of Cut Pulse-P, resulting in a hi signal at input 13 of NAND gate NA55B. Also, since the flip flop ff57A has been reset by the signal X Strobe-N, the signal at input 1 of NAND gate NA55B will also be hi. Accordingly, the positive pulse formed at input 2 of NAND gate NA55B is inverted, and a corresponding lo pulse is formed at input 11 of OR gate O43D. Since the other input of this gate is lo, and since input 11 of OR gate O43D was previously hi, the lo pulse is passed through the gate and is formed as a lo pulse at input 11 of NAND gate NA55A. The lo pulse is inverted by gate NA55A, and a positive pulse is formed at input 11 of NOR gate NO44A, since inputs 9 and 10 of NAND gate NA55A remain hi. Since the pulse End of Cut Pulse-P has decayed prior to this time, input 12 of AND gate A42C will be lo, resulting in a lo signal at input 12 of NOR gate NO44A. Accordingly, the positive pulse at input 11 of NOR gate NO44A is inverted, and a lo pulse is formed as the signal Start Run-N, which sets the X and Y run flip flops to initiate formation of the pulse trains to the X and Y stepping motors and movement of the clamps in the X and Y directions. Again, when movement of the clamps has been completed, and the X and Y run flip flops have both been reset, the single-shot SS22B of FIG. 21*d* is triggered, resulting in a 5 millisecond delay, and then initiation of another memory cycle. If another Stop Stitch Command has been coded into the next control word, the positive pulse EMC-P, at the end of the memory cycle, is utilized to trigger the single-shot SS18A, and start another operation of the X and Y stepping motors in the Stop Stitch Mode.

As previously discussed, the last command which is given in a programming sequence in the PROM is the End of Program Command. Also, it will be recalled that a sequence of Slow Stitch Commands are given before coding this command to slow the sewing machine in the Slow Stitch Mode for the final command. It was also discussed above that the End of Program Command results in stopping of the machine, cutting of the thread, and automatic entry into the homing mode to reposition the clamps relative the needle at the home position after the thread has been cut.

Referring to FIG. 21g, when the positive pulse End of Program-P is received, the flip flop ff39A is set with its output 10 set lo, and with the signal End of Program Mode-1P set hi. The lo signal at output 10 of flip flop ff39A passes through delay circuit 512 to input 10 of NAND gate NA54A, resulting in a hi condition for the signal Address Clear-P. It is noted that the signal Start Pulse-N is hi at this time. Accordingly, the hi signal Address Clear-P clears the registers AR1 and AR2 of FIG. 21a, and resets flip flop ff130A in preparation for another program.

The hi signal End of Program Mode-1P is connected to OR gate O43D, as shown in FIG. 21g, such that input 11 of NAND gate NA55A will remain hi when a pulse is generated at the time the triggered single-shot SS18A times out, thus preventing formation of a lo pulse for the signal Start Run-N and initiation of clamp movement.

Referring to FIG. 21l, the pulse End of Program-P causes the stitch flip flop ff84A to be reset through gates NO44C and NA70A to assure that the main brake/clutch solenoid is deenergized, although the stitch flip flop had been reset during the Slow Stitch Mode. Turning to FIG. 21g, the pulse End of Program-P connected to input 5 of NOR gate NO53B resets the slow stitch flip flop ff54C with its output 3 set hi, and with its output 6 set lo, in order to clear out the Slow Stitch Mode. Assuming that the Normal/Service Select Switch is at its Normal terminal, both input signals to driver circuit DC88B are hi, and the signal Quick Slow Sew Cmd is therefore hi. Since the machine has been slowed to its slow speed during the Slow Stitch Mode, the Quick device initiates the cutting device and stops reciprocation of the sewing needle by causing engagement of its auxiliary brake, as previously described in connection with the Stop Stitch Mode.

Referring now to FIG. 21h, when the thread has been cut and the End of Cut Signal goes lo, the single-shot SS18B is triggered. When the single-shot times out and its Q bar output goes hi, differentiator circuit 618 generates a positive pulse which is passed through AND gate A32C as a positive pulse for the signal end of Cut Pulse-P, which is connected to input 1 of NAND gate NA31C. It will be recalled that the signal End of Prog Mode-1P is hi at this time, and the normal condition for the signal NTB Mode-OP is hi. Accordingly, the positive pulse End of Cut Pulse-P is inverted by NAND gate NA31C, and a lo pulse is formed as the signal End of Final Cut-N.

As shown in FIG. 21f, the lo pulse End of Final Cut-N is inverted by inverter I91D, and on the leading edge of the positive pulse thus formed, the differentiator circuit 622 generates a positive pulse which resets flip flop ff90A. The flip flop is set with its output 1 or the signal Clamp Mode-1P set lo, and with its output 4 or the signal Clamp Mode-OP set hi. The lo signals at input 8 of NOR gate NO90B and input 11 of NOR gate NO90C result in the outputs of these gates going hi, and cause the driver circuits DC89A and DC89B to release the fabric and label clamps. Accordingly, the clamps are raised during the final homing mode, as will be described below.

Referring back to FIG. 21h, it will be recalled that the signal Start Pulse-N is hi at this time. Accordingly the lo pulse formed at input 4 of NAND gate NA32A is inverted by the gate, and a positive pulse is formed as the signal Homing Set-P. The hi pulse is inverted again by inverter I19A, and a lo pulse is formed as the signal Homing Set-N. The signals Homing Set-N and Homing Set-P are utilized to initiate the start of the final homing mode, as previously described. Thus, referring to FIG. 21d, the signal Homing Set-N sets the flip flop ff21A with its output signals Basic Home-P hi and Basic Home-N lo, and the basic homing mode is entered at this time. The homing mode will proceed through the basic home mode, the auxiliary homing mode, and possibly the subauxiliary homing mode if the final approach by the stepping motors did not take place in the specified direction.

When the homing mode is completed and the clamps have been raised, the operator may remove the fabric which has been sewn according to the program selected in the PROM. The operator may insert a new piece of fabric below the fabic clamp and initiate the start of a new homing mode and a new program by depressing the pedals, as previously described.

The operation of the circuitry associated with the Thread Break Sensor is discussed in connection with FIG. 21o. During initialization, the flip flops ff124A, ff125A, and ff125B are reset by the signal Reset-N. Accordingly, the flip flop ff125A is reset with its output signal NTB Mode-OP reset hi, which is the normal condition for this signal. Also, the reset flip flop ff124A results in a lo signal at input 10 of AND gate A124C, and thus a lo signal at input 12 of flip flop ff125A. Finally, initialization of the flip flop ff125B causes a lo signal to be formed at input 2 of NAND gate NA124D.

Figure 21O:
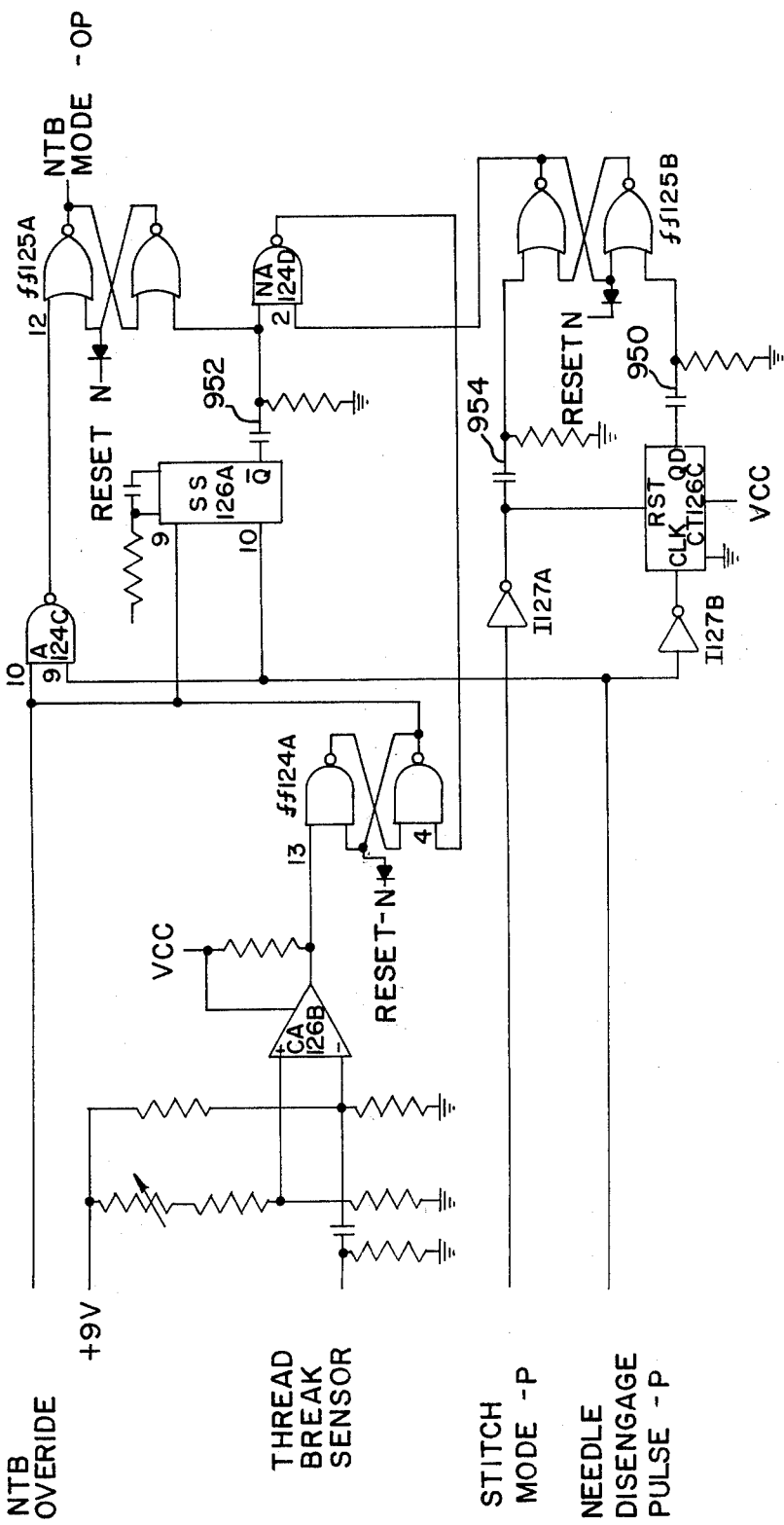

Referring to FIG. 21m, if the NTB Override Switch is selected at its Override terminal, a lo condition is established for the signal NTB Override, and, as may be seen in FIG. 21o, the signals at input 10 of AND gate A124C and input 12 of flip flop ff125A remain lo during operation of the system with the NTB Override Switch in this setting. Accordingly, the signal NTB Mode-OP remains in its normal hi condition during this time, and the Thread Break Sensor will not cause a fault condition to the system. However, it the NTB Override Switch is positioned at its Automatic terminal, the signal NTB Override is disconnected from ground, and the corresponding signal at input 10 of AND gate A124C is permitted to assume a hi state. It will be recalled that during initialization input 10 of AND gate A124C was reset lo by the flip flop ff124A. As will be seen below, the flip flop ff124A is not set until after the Stitch Mode is entered, and, accordingly, the signal NTB Mode-OP is not permitted to assume a lo fault condition until that time.

As discussed above, the signal Stitch Mode-P from the Stitch flip flop ff84A of FIG. 21l is at a lo state until the Stitch Mode is entered. The lo signal Stitch Mode-P is inverted by inverter I127A, and a hi signal is thus formed at the RST input of the counter CT126C. The counter CT126C comprises a count-to-four counter similar to the counters CT58 and CT87 described in connection with FIG. 21e. Thus, the hi signal at the RST input of the counter CT126C of FIG. 21o clears the counter, and prevents it from counting at this time. As shown, the positive pulses Needle Disengage Pulse-P are inverted by inverter I127B and corresponding lo pulses are formed at the CLK input of counter CT126C.

However, since the RST input of the counter is hi before the Stitch Mode is entered, the lo pulses formed at the CLK input of the counter have no effect upon the counter at this time.

When the Stitch Mode is entered by the system, the signal Stitch Mode-P goes hi, as previously discussed, and a lo signal is formed during the Stitch Mode at the RST input of the counter CT126C. Accordingly, the counter is enabled, and each of the lo pulses formed at the CLK input of the counter responsive to the positive pulses Needle Disengage Pulse-P cause the counter to be incremented one time. When four Needle Disengage Pulse-P pulses have been received, the counter has been incremented four times, and the QD output of the counter goes hi at this time. In response, the differentiator circuit 950 generates a positive pulse which sets flip flop ff125B with its output signal at input 2 of NAND gate NA124D being set in a hi condition. As will be described below, the hi signal at input 2 of NAND gate NA124D enables the circuitry to monitor the Thread Break Sensor for a possible thread break. Accordingly, the circuitry does not operate during the first four stitches in the Stitch Mode, in the event that the Thread Break Sensor may possibly provide a false indication of thread break when the Stitch Mode is first entered and the thread is first used for stitching.

After the counter CT126C has been incremented four times and the flip flop ff125B has been set, the first positive pulse Needle Disengage Pulse-P triggers the single-shot SS126A at its pin 10, since the signal at pin 9 of the single-shot was previously reset lo by the initialized flip flop ff124A. The triggered single-shot SS126A then undergoes a 1 millisecond delay. When the single-shot times out and its Q bar output goes hi, the differentiator circuit 952 generates a positive pulse. Since input 2 of NAND gate NA124D is hi at this time, the positive pulse is inverted by the NAND gate, and a corresponding lo pulse is formed at input 4 of flip flop ff124A which sets the flip flop with its output signal at input 10 of AND gate A124C being set hi. (Although the single-shot SS126A was triggered by previous pulses Needle Disengage Pulse-P, the previous lo signal at input 2 of NAND gate NA124D prevented passage of the corresponding pulses from differentiator circuit 952 to the flip flop ff124A.) Since the flip flop ff124A is not set until 1 millisecond after receipt of the pulse Needle Disengage Pulse-P, the pulse Needle Disengage Pulse-P has decayed by this time, and the signal at input 9 of AND gate A124C assumes a lo condition before the flip flop ff124A has been set, resulting in a continuous lo signal at input 12 of flip flop ff125A. However, the set flip flop ff124A conditions the AND gate A124C for the next pulse Needle Disenage Pulse-P by the delayed hi signal at input 10 of this gate.

After the flip flop ff124A has been set, and before the next pulse Needle Disengage Pulse-P has been received, the Thread Break Sensor measures the thread for tension to determine whether the thread has broken. If the Thread Break Sensor determines that tension remains on the thread, indicating that the thread has not broken, the resulting signal Thread Break Sensor formed at the (−) input of comparator CA126B temporarily exceeds the reference signal at the (+) input of the comparator formed from the +9 volt power source. In this case, a lo signal is temporarily formed at input 13 of flip flop ff124A which resets the flip flop, resulting in a lo signal at input 10 of AND gate A124C. Thus, when the thread has not broken, the flip flop is reset, and the AND gate A124C is inhibited by the resulting lo signal at its input 10 to prevent passage of the next positive pulse Needle Disengage Pulse-P to the flip flop ff124A.

However, if the Thread Break Sensor does not measure tension on the thread, that the thread has broken, the signal at the (−) input of comparator CA126B remains at a lower condition than the reference signal at the (+) input of the comparator, and the output signal of the comparator at input 13 of flip flop ff124A remains in a hi condition. Thus, the flip flop ff124A is not reset in this case, and the output signal of the flip flop at input 10 of AND gate A124C remains in a hi state. Accordingly, when the next positive pulse Needle Disengage Pulse-P is received, the pulse is passed through the conditioned gate A124C and sets the flip flop ff125A with its output signal NTB Mode-OP being set lo, indicating to the control system that the thread on the machine has broken. Once the thread has been fixed, the signal Thread Break Sensor then causes the flip flop ff124A to be reset, and the next pulse Needle Disenage Pulse-P triggers the single-shot SS126A, such that the resulting pulse formed by differentiator circuit 592 resets the flip flop ff125A with its output signal NTB Mode-OP being set in its normal hi condition.

In review, after four stitches in the Stitch Mode, the flip flop ff124A is set approximately 1 millisecond after receipt of the pulse Needle Disengage Pulse-P. The flip flop is reset before receipt of the next pulse Needle Disengage Pulse-P if the thread has not broken, and the signal NTB Mode-OP remains hi in this case. However, if the thread has broken on the machine, the flip flop ff124A is not reset, and the next pulse Needle Disengage Pulse-P causes the flip flop ff125A to be set and the signal NTB Mode-OP to go lo, thus indicating that the thread has broken.

When the system enters another mode, such as the Slow Stitch Mode, the signal Stitch Mode-P returns to its lo condition, resulting in a hi signal at the RST input of counter CT126C, which clears and holds the counter. Also, since the signal at the output of inverter I127A goes from a lo to hi condition at this time, differentiator circuit 954 generates a positive pulse which resets flip flop ff125B with its output signal at input 2 of NAND gate NA124D being set lo. Accordingly, the circuitry is then inhibited from indicating a thread break until the Stitch Mode is again entered, since the lo conditions at input 2 of NAND gate NA124D prevents the flip flop ff124A from being set. It is noted that the flip flop ff125B has been reset for entry into another Stitch Mode as described above in connection with initialization of the circuit. Thus, if the Stitch Mode is again entered, the counter CT126C is enabled at its RST input, and when four pulses from the signal Needle Disengage Pulse-P have been received, the flip flop ff125B is set with its output signal at input 2 of NAND gate NA124D being set hi to again enable the circuitry for indicating a break in thread.

If the Thread Break Sensor detects a break in thread, the control system operates as follows. In the event of a thread break the normally hi signal NTB Mode-OP goes lo, as discussed above, resulting in a hi condition for the signal NTB Mode-P, as shown in FIG. 21h, immediately after a positive pulse is formed for the signal Needle Disengage Pulse-P. As shown in FIG. 21 l, when the signal NTB Mode-P goes hi, differentiator circuit 610 generates a positive pulse which is inverted by inverter I83C to form a lo pulse for the signal NTB Mode Pulse-N. As previously discussed, the lo pulse is inverted by NAND gate NA70A to reset flip flop ff84A and clear out the Stitch Mode. In turn, the main brake/clutch solenoid is deenergized to slow the machine. If the system was in the Stitch Mode, the output of driver circuit DC88B of FIG. 21g is hi, and the Quick device will automatically stop reciprocation of the needle when it determines from unit 62 that the machine has been slowed to slow speed. The signal NTB Mode-OP establishes a lo condition at the following gates: (a) input 2 of NOR gate NO44D of FIG. 21 l; (b) input 2 of NAND gate NA78A of FIG. 21f; and (c) input 5 of NAND gate NA11C of FIG. 21d. As illustrated in FIG. 21g, the lo pulse NTB Mode Pulse-N at input 13 of NAND gate NA54B results in formation of a lo pulse at input 1 of flip flop ff54C to reset the flip flop and clear out the Slow Stitch Mode, if any, and thus permit the Quick device to stop the machine. Finally, as shown in FIG. 21g, the hi signal NTB Mode-P is formed at an input of NOR gate NO44B.

Since the signals resulting from a thread break are not formed until immediately after the pulse Needle Disengage, Pulse-P, it will be apparent that all the conditions have been established for driving the X and Y stepping motors and the clamps. Accordingly, with reference to FIG. 21g, when the pulse Needle Disengage Pulse-P is received, a lo pulse is formed for the signal Start Run-N, the X and Y run flip flops are set, the pulse trains are formed for the X and Y stepping motors to move the clamps. When clamp movement has been completed, and the X and Y run flip flops have been reset, the differentiator circuit 550 of FIG. 21d generates a positive pulse resulting in triggering of the single-shot SS22B. When this single-shot times out, differentiator circuit 578 generates a positive pulse, as before, but passage of the pulse to the memory cycle flip flop ff34A is prevented by the lo signal NTB Mode-OP at input 5 of NAND gate NA11C. Thus, when the thread breaks, the clamps are moved according to the information in the last data read from the PROM, but a new memory cycle is not entered. Meanwhile, reciprocation of the needle is stopped. With reference to FIG. 21h, it is noted that the lo signal NTB Mode-OP will inhibit formation of the lo pulse End of Final Cut-N, and will prevent the clamps from being raised.

After the thread has been fixed by the operator, she may continue sewing in a few different manners. If desired, she may push the Reset Swtich, as shown in FIG. 21b, to cause the signal Reset-N to go lo, and reinitialize the circuits of the control system, as previously described. An override switch is provided for the operator to prevent the clamps from being raised, in the event that she wishes to retrace the sewing pattern on the current fabric. Accordingly, after the Reset Switch has been closed, the control system will enter the homing mode, as discussed above. At the end of the homing mode, the control system will sequence into the program and start sewing anew, in a manner as previously described.

Alternatively, the operator may continue the program at the point where it had been interrupted responsive to a break in thread. After the thread has been fixed, she may push the second foot pedal again to start the program where it has been stopped. Referring to FIG. 21f, when the Pedal Go Switch has been actuated, a lo pulse is formed for the signal Cond Go-P. Since the signal NTB Mode-OP is lo at this time, the corresponding pulse is blocked by NAND gate NA78B to prevent formation of the pulses Start Pulse-N and Start Pulse-P.

Referring to FIG. 21l, the lo pulse Cond Go-P will be passed through and inverted as a positive pulse at input 2 of AND gate A70D, since the signal NTB Mode-OP is lo at this time. If the system was in the End of Program Mode when the thread broke, the program was completed, and the signal End of Prog Mode-1P was set hi. In this case, the signal is inverted by inverter I115A, and the resulting lo signal at input 1 of AND gate A70D prevents formation of a pulse Aux Start-P. Otherwise, the signal at input 1 of AND gate A70D is hi, and a positive pulse is formed for the signal Aux Start-P. It will be recalled that if the system was in the Stitch or Slow Stitch Mode the signal STCH-1P is hi, and, in this case, the gate NA70C is conditioned by this signal, in order that the pulse from gate NO44D sets the flip flop ff84A, energizes the main brake/clutch solenoid and starts reciprocation of the needle. Of course, if the system was in the Slow Stitch Mode, this solenoid will be deenergized when the next command is decoded to again stop the machine.

As shown in FIG. 21d, the positive pulse Aux Start-P, which is connected to NOR gate NO135A, results in a positive pulse being formed at input 6 of the memory cycle flip flop ff34A, thus setting the flip flop to start the next memory cycle and read the next three words from the PROM. As discussed above in connection with FIG. 21o, after the thread has been fixed the flip flop ff125A is reset with the signal NTB Mode-OP being reset hi responsive to a pulse Needle Disengage Pulse-P. Referring to FIG. 21h, when the signal NTB Mode-OP goes hi, the inverted signal NTB Mode-P then goes lo. As shown in FIG. 21g, when the first positive pulse Needle Disengage Pulse-P is received at input 4 of NAND gate NA55C after the signal NTB Mode-P goes lo, the lo pulse Start Run-N is formed, and the pulse trains are formed for the X and Y stepping motors to move the clamps. Accordingly, at this point the program continues in its normal sequence, with the signals associated with the Thread Break Sensor being in their normal condition.

If for any reason the flip flop ff90A of FIG. 21f is configured with the clamps being raised during program control of the system, resulting in a hi condition for the signal Clamp Mode-OP and a lo condition for the signal Clamp Mode-1P, the system operates as follows. AS shown in FIG. 21l, the hi signal Clamp Mode-OP causes deenergization of the main brake/clutch solenoid to slow and stop the machine if in the Stitch mode. Also, as shown in FIG. 21g, the lo signal Clamp Mode-1P prevents passage of the pulse Needle Disengage Pulse-P through NAND gate NA55C and thus movement of the clamps by the stepping motors. Finally, as shown in FIG. 21d, the hi signal Clamp Mode-OP prevents passage of a pulse formed by differentiator circuit 578 to prevent initiation of a new memory cycle. The system may be restarted by the operator by closing the Reset Switch to initialize the system, as previously described in connection with FIG. 21b.

What is claimed is:
1. An automatic sewing machine, comprising:
memory means having a plurality of randomly addressable storage locations, said storage locations having a plurality of information bits defining a plurality of separate data banks with said storage locations sharing bits in separate banks;
address means for selecting said storage locations;
means for separately selecting any of said data banks of the selected storage locations and excluding at least one unselected bank at the start of a sewing sequence;

means for reading information from the selected data bank of the selected storage locations and for generating signals representing the read information; and means responsive to said signals corresponding to the selected bank for forming a stitch pattern in a work piece.

2. The sewing machine of claim 1 including means for initializing the address means at a predetermined storage location to initiate a sewing sequence.

3. The sewing machine of claim 2 including means responsive to a predetermined set of said signals for initializing the address means at said predetermined storage location.

4. The sewing machine of claim 1 including switch means, and in which the bank selecting means is responsive to said switch means.

5. The sewing machine of claim 4 in which the bank selecting means selects different banks responsive to different condigurations of said switch means.

6. The sewing machine of claim 1 including means for automatically changing the bank selecting means to select a different bank at a predetermined storage location in a selected bank.

7. The sewing machine of claim 6 wherein the bank changing means includes means for establishing the address means at a predetermined storage location.

8. The sewing machine of claim 7 including means for initializing the address means at a predetermined storage location to initiate a sewing sequence, and wherein the predetermined storage locations of the selected and changed banks are the same.

9. The sewing machine of claim 6 wherein the bank changing means comprises means responsive to a high order address in said address means for selecting banks.

10. The sewing machine of claim 4 including second switch means effective at a configuration of the first switch means, said bank selecting means successively changing data banks responsive to successive operations of the second switch means.

11. The sewing machine of claim 1 including means for indicating the selected data bank.

12. The sewing machine of claim 1 including means for generating a clock signal asynchronous relative the operation of the sewing machine, and in which the address means selects sequential storage locations responsive to successive pulses of the clock signal.

13. The sewing machine of claim 1 including means for changing the address means for sequential selections a plurality of times during a sewing cycle of the machine.

14. The sewing machine of claim 1 wherein the memory means forms output signals responsive to selection of each of said storage locations by the address means, and in which the bank selecting means comprises means for enabling said output signals from the selected bank and for inhibiting the output signals from any unselected bank.

15. The sewing machine of claim 1 wherein the bank selecting means includes means for separately forming information from the plural data banks into a common set of data signals.

16. The sewing machine of claim 15 wherein the forming means includes means for inverting said information during formation of said data signals.

17. An automatic sewing machine of the type having a sewing needle defining a timing cycle of the machine between consecutive reciprocations of the needle, comprising:

memory means having a plurality of randomly addressable storage locations;

means for generating a clock signal asynchronous relative the timing of said machine;

address means responsive to applied pulse of said clock signal for sequentially selecting said storage locations;

means for applying the clock signal to the address means and for removing the signal from the address means subsequent to application of a plurality of pulses less than the total number of said storage locations for selecting a plurality of storage locations during a timing cycle of the machine;

means for sequentially reading information from the plurality of selected storage locations and for generating signals responsive to the read information during the timing cycle; and means responsive to said signals for forming a stitch pattern in a work piece.

18. The sewing machine of claim 17 wherein the reading means includes means responsive to said clock signal for decoding said read information.

19. The sewing machine of claim 17 including means for generating a pulse in timed relation with the machine, and including means for initiating the forming means responsive to said pulse.

20. An automatic sewing machine, comprising:

a work holder for retaining a work piece;

a sewing needle;

memory means having a plurality of randomly addressable storage locations;

means for forming a first signal at a first time during a cycle of the machine;

address means responsive to the first signal for selecting said storage locations;

means for reading information from said storage locations and for generating signals responsive to the read information;

means for generating a timing pulse at a second preselected time in a cycle of the machine after reading said storage locations; and means responsive to said signals and pulse for simultaneously moving the work holder relative the needle along different coordinate directions to perform a sewing operation.

21. The sewing machine of claim 20 wherein the generating means generates said pulse at approximately the time said needle leaves the work piece during the machine cycle.

22. The sewing machine of claim 21 wherein the generating means generates said pulse slightly prior to the time said needle leaves the work piece.

23. An automatic sewing machine, comprising:

a work holder for retaining a work piece;

a sewing needle;

memory means having a plurality of randomly addressable storage locations;

means for sequentially reading information from said storage locations and for generating signals responsive to the read information;

means for generating a timing pulse at a preselected time in a cycle of the machine, said generating means including means for forming a first pulse at a first time in the machine cycle, means for forming a second pulse at a different second time in the machine cycle, and means for selecting said first and second pulses from the pulse generating means for formation of said timing pulse at different times in the machine cycle; and means responsive to said signals and pulse for simultaneously moving the work holder relative the needle along different coordinate directions to perform a sewing operation.

24. The sewing machine of claim 23 in which said selecting means comprises switch means.

25. The sewing machine of claim 23 wherein the pulse generating means generates said second pulse at a time after the needle leaves the work piece and before the needle subsequently enters the work piece.

26. The sewing machine of claim 23 including means for reciprocating the needle at fast and slow speeds, and including means for initiating operation of the reciprocating means at said slow speed while the selecting means selects the second pulse from the pulse generating means.

27. An automatic sewing machine, comprising:
a sewing needle;
memory means having a plurality of randomly addressable storage locations;
means for generating a clock signal asynchronous relative timing of the sewing machine;
address means for selecting a plurality of different storage locations responsive to pulses in said clock signal during a timing cycle of the machine between successive reciprocations of of the needle;
means responsive to pulses in said clock signal for reading and decoding information in the selected storage locations, said decoding means being initiated by said pulses between selection of subsequent addresses by the address means during the timing cycle; and
means responsive to the reading and decoding means for performing a sewing operation on a work piece.

28. An automatic sewing machine, comprising:
a sewing needle;
means for retaining a work piece during sewing;
memory means having a plurality of randomly addressable storage locations;
means for reading said storage locations and generating signals representing information in the storage locations;
means responsive to said signals for driving the retaining means relative the needle;
means for determining the temperature associated with said driving means and for forming an out of temperature signal; and
means responsive to said out of temperature signal for deenergizing the driving means to prevent damage to the driving means resulting from an out of temperature condition, and for interrupting operation of the retaining means at a selected time after receipt of the out of temperature signal.

29. The sewing machine of claim 28 wherein the deenergizing means deenergizes the driving means after completion of a sewing sequence through movement of the retaining means responsive to a plurality of sequentially read storage instructions.

30. An automatic sewing machine, comprising:
a sewing needle;
a work holder for holding a work piece during sewing;
driving means for moving the work holder relative the needle;
memory means having a plurality of randomly addressable storage locations;
address means for selecting said storage locations during a timing cycle of the machine between successive reciprocations of the needle;
means for generating a clock signal for forming a pulse train at a first frequency for sequencing said address means; and
means responsive to said clock signal for forming a second pulse train at a second lower frequency for energizing the driving means.

31. An automatic sewing machine, comprising:
a sewing needle;
a work holder for retaining a work piece during sewing;
driving means for moving the work holder relative the needle;
means for generating a clock signal asynchronous relative the timing of the sewing machine;
means responsive to the clock signal for forming a first pulse train at a first frequency for energizing the driving means;
means responsive to the clock signal for forming a second pulse train at a second lower frequency for energizing the driving means; and
means for selectively connecting one of said first and second pulse trains to the driving means.

32. An automatic sewing machine, comprising:
a sewing needle;
means for reciprocating the sewing needle;
a work holder for retaining a work piece during sewing;
means for driving the work holder relative the needle;
memory means having a plurality of randomly addressable storage locations, said storage locations being capable of including data words commanding movement of the work holder without reciprocation of the needle;
address means for electrically selecting said data words;
electrical means for reading the data words and for forming signals representing the selected data words; and
electrical means responsive to said signals representing selected command data words for controlling the reciprocating means and preventing reciprocation of the needle.

33. The sewing machine of claim 32 in which the controlling means effectively stops reciprocation of the needle if said selected command data word is selected while the needle is being reciprocated by the reciprocating means.

34. The sewing machine of claim 33 wherein the controlling means prevents the reciprocating means from reciprocating the needle upon selection of consecutive command data words after the first command data word.

35. The sewing machine of claim 32 wherein said reciprocating means automatically stops reciprocation of the needle in the absence of a signal from the controlling means, and in which the controlling means permits the reciprocating means to stop reciprocation of the needle in response to one of said command data words.

36. The sewing machine of claim 32 wherein said storage locations are capable of including data words representing positional information associated with said command data words, and including means responsive to selected positional data words for moving the work holder relative the needle.

37. The sewing machine of claim 36 including means responsive to the controlling means for cutting a thread on said machine, means for indicating when said thread has been cut, and means responsive to the indicating means for initiating the moving means when the thread has been cut.

38. The sewing machine of claim 36 including means for generating a pulse of initiating operation of said machine while reciprocation of the needle has been stopped by the reciprocating means.

39. The sewing machine of claim 38 wherein the controlling means includes means for decoding said selected data words, and in which the generating means is responsive to said decoding means.

40. The sewing machine of claim 38 wherein the moving means is responsive to the generating means.

41. The sewing machine of claim 39 wherein the moving means is responsive to the generating means, including means for indicating when the moving means has completed movement of the work holder, and in which the decoding means is responsive to the indicating means.

* * * * *